US008874413B2

(12) United States Patent
Mulligan et al.

(10) Patent No.: US 8,874,413 B2
(45) Date of Patent: Oct. 28, 2014

(54) COMPUTER-IMPLEMENTED SYSTEM AND METHOD FOR DESIGNING A FIRE PROTECTION SYSTEM

(75) Inventors: David Mulligan, Lynbrook, NY (US); George Mathew, Queens Village, NY (US); Shibu Chellappan, New Hyde Park, NY (US); Solomon Mathai, Floral Park, NY (US)

(73) Assignee: Rael Automatic Sprinkler Company, Inc., Lynbrook, NY (US)

( * ) Notice: Subject to any disclaimer, the term of this patent is extended or adjusted under 35 U.S.C. 154(b) by 397 days.

(21) Appl. No.: 13/208,337

(22) Filed: Aug. 11, 2011

(65) Prior Publication Data

US 2013/0006588 A1 Jan. 3, 2013

Related U.S. Application Data

(60) Provisional application No. 61/502,857, filed on Jun. 29, 2011.

(51) Int. Cl.
*G06F 17/50* (2006.01)

(52) U.S. Cl.
CPC .......... *G06F 17/509* (2013.01); *G06F 17/5004* (2013.01); *G06F 2217/34* (2013.01)
USPC ................................ 703/2; 716/112; 716/117

(58) Field of Classification Search
CPC ........................... G06F 17/509; G06F 17/5004
USPC .................................... 703/2, 14; 716/5, 112
See application file for complete search history.

(56) References Cited

U.S. PATENT DOCUMENTS

| | | | | |
|---|---|---|---|---|
| 4,964,060 | A | 10/1990 | Hartsog | |
| 5,227,983 | A | 7/1993 | Cox et al. | |
| 5,260,883 | A | 11/1993 | Wilson | |
| 5,557,537 | A | 9/1996 | Normann et al. | |
| 5,768,149 | A | 6/1998 | Umney et al. | |
| 5,808,905 | A | 9/1998 | Normann et al. | |
| 6,131,077 | A | 10/2000 | Normann et al. | |
| 6,405,156 | B1 | 6/2002 | Kern et al. | |
| 6,567,772 | B1 | 5/2003 | Hoeft | |
| 6,662,144 | B1 | 12/2003 | Normann et al. | |
| 6,701,288 | B1 | 3/2004 | Normann et al. | |
| 6,778,871 | B2 | 8/2004 | Holman et al. | |
| 7,065,476 | B2 | 6/2006 | Dessureault et al. | |
| 7,096,163 | B2 | 8/2006 | Reghetti | |
| 7,111,270 | B2 * | 9/2006 | Neal et al. | 716/112 |
| 7,146,295 | B2 | 12/2006 | Goodman et al. | |
| 7,171,341 | B2 | 1/2007 | Hoeft | |
| 7,209,870 | B2 | 4/2007 | Simmons et al. | |

(Continued)

*Primary Examiner* — Thai Phan

(74) *Attorney, Agent, or Firm* — Antoinette M. Tease

(57) ABSTRACT

A computer-implemented system for designing a fire protection and/or piping system comprising a personal computer for loading programs into dynamic memory and storing data on a static memory device, means for providing user input, and program files comprising a process algorithm, traversing algorithm, and tagging algorithm. The process algorithm performs data validation, error checking and error resolution, saves data to a start point inserted by a user, pulls layer details into programming variables, applies processing logic to the system, and comprises a main pipes algorithm and a branch resizing algorithm. The traversing algorithm travels the system and presents objects to the process, main pipes and branch resizing algorithms in a logical order. The tagging algorithm attaches to each pipe in the system a tag with property set data pulled into and displayed in the tag. A method of using the foregoing system to design a fire protection and/or piping system.

80 Claims, 145 Drawing Sheets

(56) References Cited

U.S. PATENT DOCUMENTS

| | | | | |
|---|---|---|---|---|
| 7,542,886 | B2 | 6/2009 | Storms et al. | |
| 7,624,002 | B2 | 11/2009 | Berwanger | |
| 2003/0036889 | A1 | 2/2003 | Goodman et al. | |
| 2003/0061011 | A1 | 3/2003 | Hoeft | |
| 2003/0125826 | A1 | 7/2003 | Holman et al. | |
| 2003/0167155 | A1 | 9/2003 | Reghetti | |
| 2003/0200062 | A1 | 10/2003 | Dessureault et al. | |
| 2003/0208341 | A9 | 11/2003 | Simmons et al. | |
| 2004/0153305 | A1* | 8/2004 | Enescu et al. | 704/2 |
| 2004/0168138 | A1* | 8/2004 | Neal et al. | 716/5 |
| 2005/0172260 | A1 | 8/2005 | Eichstaedt et al. | |
| 2006/0052989 | A1 | 3/2006 | Berwanger | |
| 2007/0180425 | A1 | 8/2007 | Storms et al. | |
| 2008/0275674 | A1 | 11/2008 | Reghetti et al. | |
| 2008/0303844 | A1 | 12/2008 | Reghetti et al. | |
| 2008/0309678 | A1 | 12/2008 | Reghetti et al. | |
| 2009/0119071 | A1 | 5/2009 | Ghantous et al. | |
| 2009/0273598 | A1 | 11/2009 | Reghetti et al. | |

* cited by examiner

FIG. 7

Application
Compile
Debug
References
Resources
Services
Settings
Signing
My Extensions References:

| Reference Name | Type | Version | Copy Local | Path |
|---|---|---|---|---|
| AcCui | .NET | 18.1.0.0 | True | C:\Program Files\Autodesk\AutoCAD MEP 2011\AcCui.dll |
| acdbmgd | .NET | 18.1.0.0 | False | C:\Program Files\Autodesk\AutoCAD MEP 2011\acdbmgd.dll |
| acmgd | .NET | 18.1.0.0 | False | C:\Program Files\Autodesk\AutoCAD MEP 2011\acmgd.dll |
| AecBaseMgd | .NET | 6.5.262.0 | False | C:\Program Files\Autodesk\AutoCAD MEP 2011\AecBaseMgd.dll |
| AecBaseUtilsMgd | .NET | 6.5.262.0 | False | C:\Program Files\Autodesk\AutoCAD MEP 2011\AecBaseUtilsMgd.dll |
| AecbBldSrvMgd | .NET | 6.5.262.0 | False | C:\Program Files\Autodesk\AutoCAD MEP 2011\AecbBldSrvMgd.dll |
| AecbPartBaseMgd | .NET | 6.5.262.0 | False | C:\Program Files\Autodesk\AutoCAD MEP 2011\AecbPartBaseMgd.dll |
| AecbPipeBaseMgd | .NET | 6.5.262.0 | False | C:\Program Files\Autodesk\AutoCAD MEP 2011\AecbPipeBaseMgd.dll |
| AecPropDataMgd | .NET | 6.5.262.0 | False | C:\Program Files\Autodesk\AutoCAD MEP 2011\AecPropDataMgd.dll |
| AecUiBaseMgd | .NET | 6.5.262.0 | False | C:\Program Files\Autodesk\AutoCAD MEP 2011\AecUiBaseMgd.dll |
| AutoCAD 2011 Type Library | COM | 1.0.0.0 | False | C:\Widows\assembly\GAC_MSIL\Autodesk.AutoCAD.Interop\18.1.0.0eed84259d7cbf30b\Autodesk.AutoCAD.Interop.dll |
| PresentationCore | .NET | 3.0.0.0 | False | C:\Program Files(x86)\Reference Assemblies\Microsoft\Framework\v3.0\PresentationCore.dll |
| PyroCADReportLibrary | .NET | 1.0.0.0 | True | C:\Program Files\PyroCAD 2011\PyroCADApp\PyroCADReportLibrary.dll |
| System | .NET | 2.0.0.0 | False | C:\Windows\Microsoft.NET\Framework\v2.0.50727\System.dll |
| System.Core | .NET | 3.5.0.0 | False | C:\Program Files(x86)\Reference Assemblies\Microsoft\Framework\v3.5\System.Core.dll |
| System.Drawing | .NET | 2.0.0.0 | False | C:\Windows\Microsoft.NET\Framework\v2.0.50727\System.Drawing.dll |
| System.Windows.Forms | .NET | 2.0.0.0 | False | C:\Windows\Microsoft.NET\Framework\v2.0.50727\System.Windows.Forms.dll |
| System.Xml | .NET | 2.0.0.0 | False | C:\Windows\Microsoft.NET\Framework\v2.0.50727\System.Xml.dll |
| System.Xml.Linq | .NET | 3.5.0.0 | False | C:\Program Files(x86)\Reference Assemblies\Microsoft\Framework\v3.5\System.Xml.Linq.dll |

FIG. 25

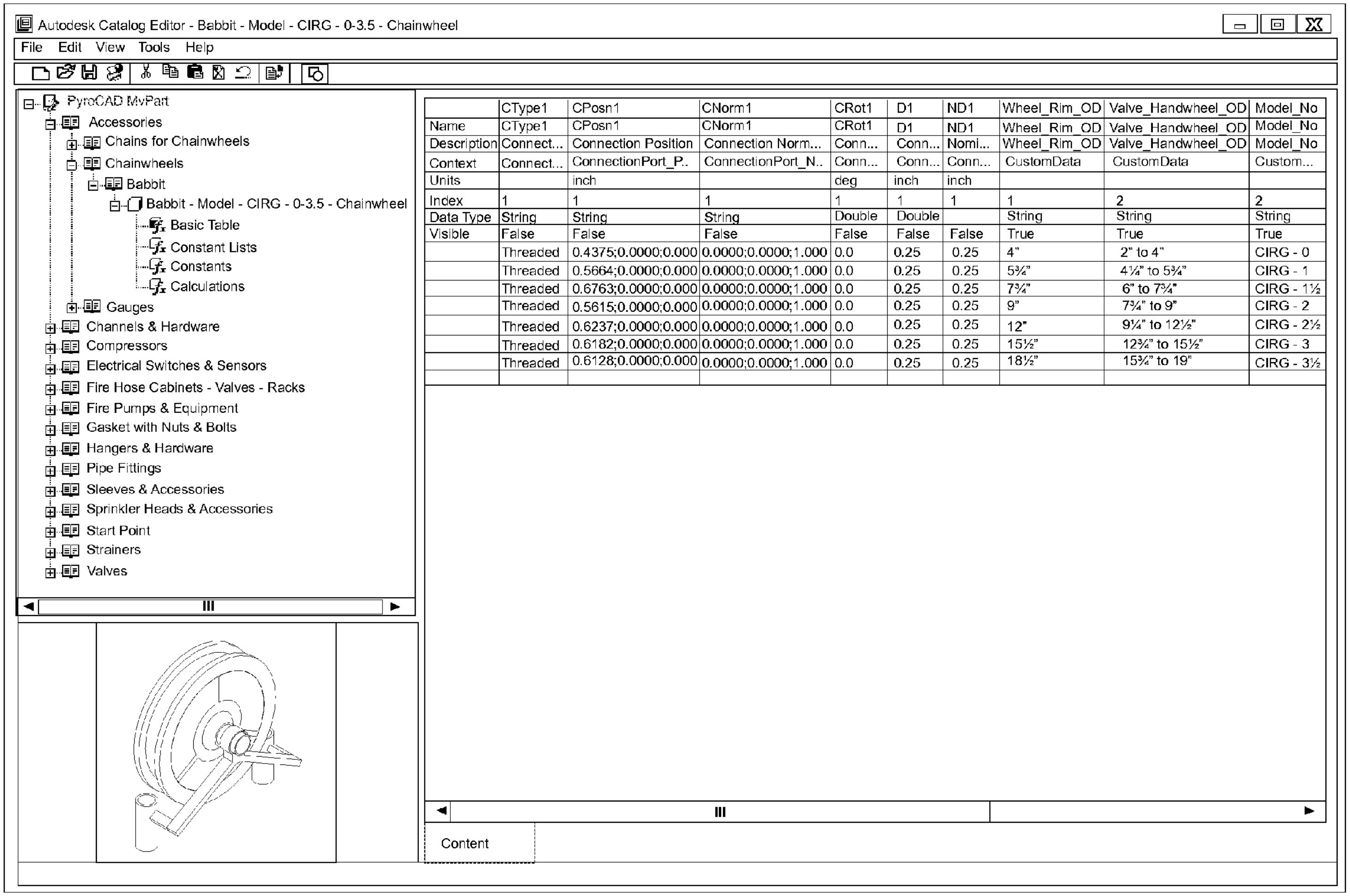

| | CType1 | CPosn1 | CNorm1 | CRot1 | D1 | ND1 | Wheel_Rim_OD | Valve_Handwheel_OD | Model_No |
|---|---|---|---|---|---|---|---|---|---|
| Name | CType1 | CPosn1 | CNorm1 | CRot1 | D1 | ND1 | Wheel_Rim_OD | Valve_Handwheel_OD | Model_No |
| Description | Connect... | Connection Position | Connection Norm... | Conn... | Conn... | Nomi... | Wheel_Rim_OD | Valve_Handwheel_OD | Model_No |
| Context | Connect... | ConnectionPort_P.. | ConnectionPort_N.. | Conn... | Conn... | Conn... | CustomData | CustomData | Custom... |
| Units | | inch | | deg | inch | inch | | | |
| Index | 1 | 1 | 1 | 1 | 1 | 1 | 1 | 2 | 2 |
| Data Type | String | String | String | Double | Double | | String | String | String |
| Visible | False | False | False | False | False | False | True | True | True |
| | Threaded | 0.4375;0.0000;0.000 | 0.0000;0.0000;1.000 | 0.0 | 0.25 | 0.25 | 4" | 2" to 4" | CIRG - 0 |
| | Threaded | 0.5664;0.0000;0.000 | 0.0000;0.0000;1.000 | 0.0 | 0.25 | 0.25 | 5¾" | 4¼" to 5¾" | CIRG - 1 |
| | Threaded | 0.6763;0.0000;0.000 | 0.0000;0.0000;1.000 | 0.0 | 0.25 | 0.25 | 7¾" | 6" to 7¾" | CIRG - 1½ |
| | Threaded | 0.5615;0.0000;0.000 | 0.0000;0.0000;1.000 | 0.0 | 0.25 | 0.25 | 9" | 7¾" to 9" | CIRG - 2 |
| | Threaded | 0.6237;0.0000;0.000 | 0.0000;0.0000;1.000 | 0.0 | 0.25 | 0.25 | 12" | 9¼" to 12½" | CIRG - 2½ |
| | Threaded | 0.6182;0.0000;0.000 | 0.0000;0.0000;1.000 | 0.0 | 0.25 | 0.25 | 15½" | 12¾" to 15½" | CIRG - 3 |
| | Threaded | 0.6128;0.0000;0.000 | 0.0000;0.0000;1.000 | 0.0 | 0.25 | 0.25 | 18½" | 15¾" to 19" | CIRG - 3½ |

A pipe part creation session within content builder

A multiview part creation session within content builder

Catalog Library - Autodesk Content Browser 2011

FIG. 37
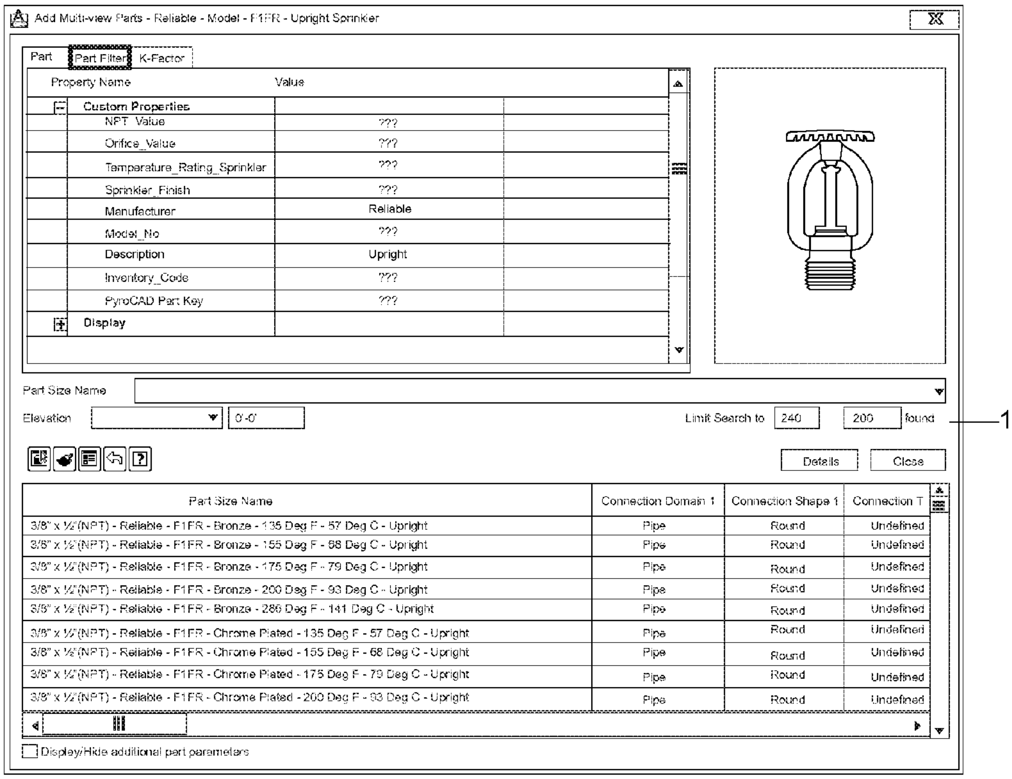
1
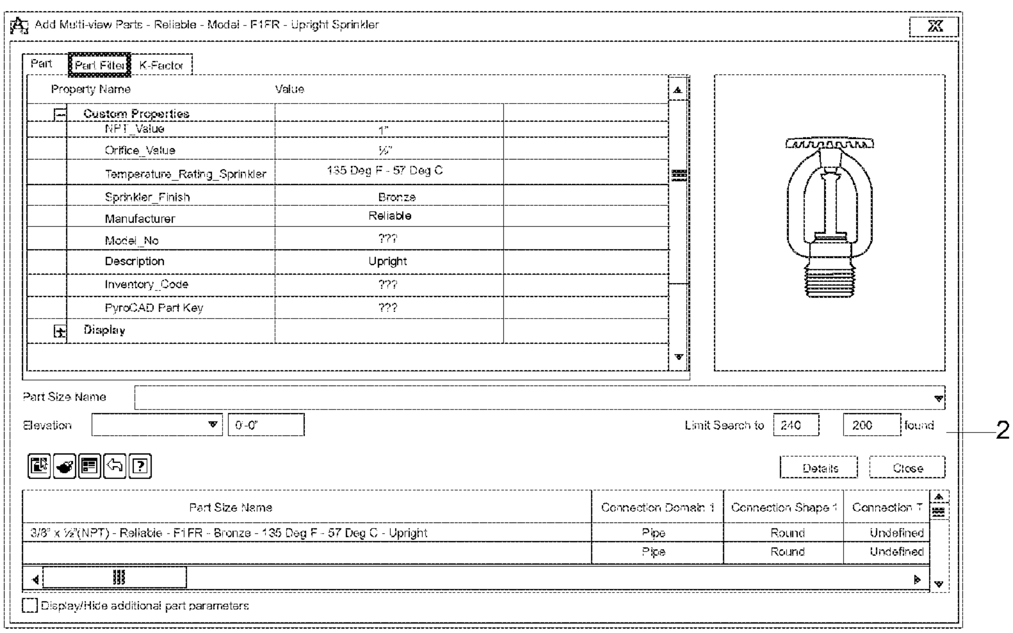
2

FIG. 124

RAEL
AUTOMATIC
SPRINKLER
COMPANY, INC

PyroCAD Reports For Draftsman

| | | | |
|---|---|---|---|
| **StartPoint ID** | DM-111010-705531 | **Description** | Mechanical Space and Office |
| **Job Number** | 1234 | **Level** | 1st Floor |
| **List Date** | 11/10/2010 3:26 PM | **Job Name** | Warehouse 8 |
| **Ship Date** | 11/24/2010 2:33 PM | **Draftsman** | DAVID MULLIGAN |
| **Address** | 123 West Side. Islip NY | | |

PyroCAD Reports For Draftsman generated on 11/10/2010 3:37 : 00 PM

Page 1 of 10

FIG. 125

Complete Mains Report

| | | | |
|---|---|---|---|
| **StartPoint ID** | DM-111010-705531 | **Description** | Mechanical Space and Office |
| **Job Number** | 1234 | **Level** | 1st Floor |
| **Job Name** | Warehouse 8 | | |

| Main # | Materials | Schedule | Finish | End 1 | End 2 | Diameter | Length | Fitting |
|---|---|---|---|---|---|---|---|---|
| **M-1** | St | 10 | Bk | Gr | Gr | 3" | 1'-0" | 3" - Vic - Sty - 005 - Gr - FLock Rigid Coupling |
| **M-2** | St | 10 | Bk | Gr | Gr | 3" | 10'-6" | 3" - Vic - Sty - 005 - Gr - FLock Rigid Coupling |
| **M-3** | St | 10 | Bk | Gr | Gr | 3" | 9'-10¼" | 3" - Vic - Sty - 005 - Gr - FLock Rigid Coupling |

M-2:

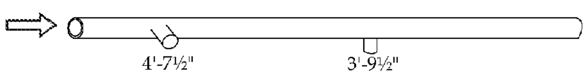

(BK) 3" x 1½" - Merit - Type A - Female Th - Welded Outlet (UP) 3" x 1¼" - Merit - Type A - Female Th - Welded Outlet

M-3:

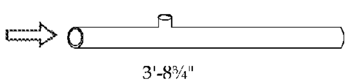

(UP) 3" x 1¼" - Merit - Type A - Female Th - Welded Outlet

FIG. 127

| Branch Report Without ArmOver & Nipples Sorted By Diameter & Length For Shipment Now | | | | | | | | | |
|---|---|---|---|---|---|---|---|---|---|
| StartPoint ID | DM-111010-705531 | | | | | Description | Mechanical Space and Office | | |
| Job Number | 1234 | | | Level | 1st Floor | Job Name | Warehouse 8 | | |

| Branch # | Piece ID | Materials | Schedule | Finish | End 1 | End 2 | Diameter | Length | Fitting |
|---|---|---|---|---|---|---|---|---|---|
| **B-6** | **C** | St | 40 | Bk | Th | Th | 1½" | 9'-10½" | 1½" x 1½" x½" - Generic - CL 125 - Th - Cast iron tee |
| **B-6** | **B** | St | 40 | Bk | Th | Th | 1½" | 9'-10½" | 1½" x 1½" x½" - Generic - CL 125 - Th - Cast iron tee |
| **B-6** | **D** | St | 40 | Bk | Th | Th | 1½" | 4'-3¼" | 1½" x 1½" - Generic - CL 125 - Th - Cast iron tee 90 deg |
| **B-5** | **A** | St | 40 | Bk | Th | Th | 1½" | 1'-2" | 1½" x 1½" x½" - Generic - CL 125 - Th - Cast iron tee |
| **B-3** | **A** | St | 40 | Bk | Th | Th | 1¼" | 1'-2" | 1½" x 1½" x½" - Generic - CL 125 - Th - Cast iron tee |
| **B-1** | **A** | St | 40 | Bk | Th | Th | 1¼" | 1'-2" | 1½" x 1½" x½" - Generic - CL 125 - Th - Cast iron tee |
| **B-6** | **A** | St | 40 | Bk | Th | Th | 1½" | 1'-2" | 1½" x 1½" x½" - Generic - CL 125 - Th - Cast iron tee |
| **B-6** | **A** | St | 40 | Bk | Th | Th | 1½" | 0'-10½" | 3" x 1½" Merit - Type A - Female Th - Welded Outlet |

*denotes branch piece length exceeds maximum length (12'-0") setup for the system.

COMPUTER-IMPLEMENTED SYSTEM AND METHOD FOR DESIGNING A FIRE PROTECTION SYSTEM

CROSS-REFERENCE TO RELATED APPLICATION

This application claims priority back to U.S. Patent Application No. 61/502,857 filed on Jun. 29, 2011, the contents of which are incorporated herein by reference.

BACKGROUND OF THE INVENTION

1. Field of the Invention

The present invention relates generally to the field of software programs, and more specifically, to a computer-implemented system that interfaces with AUTOCAD® software to design fire protection systems for commercial buildings.

2. Description of the Related Art

As a mechanical subcontractor, Rael Automatic Sprinkler Company, Inc. ("Rael") of Lynbrook, N.Y., has been undertaking projects to design and implement fire protection systems for major construction projects in and around New York since 1963. During the company's initial days, designs were generated manually using traditional drawing methods. Typically, designs were drafted manually on drawing sheets, and the final list of materials was also prepared manually.

Over the course of the ensuing decades, as computer systems came into use, computer-aided design and drafting ("CADD") become popular in the mechanical construction field. Around this time, Rael began using CADD tools like AUTOCAD® owned by Autodesk, Inc. ("Autodesk") of Sausalito, Calif., to draft its fire protection system designs. Although computer-assisted drafting was initially two-dimensional, Rael adopted three-dimensional CADD methods when Autodesk introduced its AUTOCAD® mechanical, electrical and plumbing ("MEP") software product.

Even though Rael was using state-of-the-art CADD software from an industry leader, some portions of the design process were still inordinately time-consuming. For example, it was taking a lot of time for the draftsmen to list out the materials. All of the materials were counted manually from the finished drawing, the list was sent to shops for fabrication, and the list was sent—together with the fabricated pipe and materials—to the worksites for implementation (construction) of the design. To identify each piece in the system, it was necessary to tag each piece during the drafting and listing process. The fabricated pieces were later marked with the same tags for easy identification in the field. This tagging process was manual, required significant time, and was prone to human error.

To overcome the limitations described above, Rael decided to develop its own software program that would function as an add-on tool to AUTOCAD® MEP. The AUTOCAD® software provides an application program interface ("API") for customization of the AUTOCAD® software, and Rael used this API to develop the present invention.

One object of the present invention is to provide a three-dimensional CADD software program for piping systems that is capable of building information modeling ("bim"). It is a further object of the present invention to provide software that can be used from the earliest design stages through fabrication and installation drawings. Yet another object of the present invention is to reduce drafting hours by providing a software program that makes low-level design decisions automatically.

SUMMARY

The present invention is a computer-implemented system for designing a fire protection system comprising: a personal computer for loading programs into dynamic memory and storing data on a static memory device; means for providing user input; and program files comprising a process algorithm, a traversing algorithm, and a tagging algorithm; wherein the process algorithm performs data validation, error checking and error resolution, saves data to a start point inserted by a user, pulls layer details into programming variables, applies processing logic to the system, and comprises a main pipes algorithm and a branch resizing algorithm; wherein the traversing algorithm supports the process algorithm, the main pipes algorithm, the branch resizing algorithm, and the tagging algorithm by traveling the system and presenting objects to each of these algorithms in a logical order; and wherein the tagging algorithm attaches to each pipe in the system a tag with property set data pulled into and displayed in the tag.

In a preferred embodiment, the system comprises an output device for generating hard copies of drawings and fabrication lists. In a preferred embodiment, the main pipes algorithm breaks main pipes at cut lengths specified by the user, rotates main pipes in a model space, and inserts couplings to the main pipes that have been broken at the specified cut lengths. In yet another preferred embodiment, the traversing algorithm presents a current object to the branch resizing algorithm, and the branch resizing algorithm determines whether the current object is a branching object, creates and stores path relation collections for branching objects, updates a head count when a sprinkler head is found on a run of the current object, stores a root connector for the current object in a root connectors list, loops through the root connectors list and applies the head count that is found for each root connector to all objects in a run that are attached to an incoming connector, and loops through each branch line and automatically resizes branch pipes and replaces fittings according to sizing specifications provided by the user.

In a preferred embodiment, the path relation collection for a current object comprises a parent object ID for the incoming connector, a connector number, a head count, and path relationships including branching objects upstream of the current object. In a preferred embodiment, the user inserts a parent start point on a main pipe, and the system stores fabrication parameters in the parent start point. In yet another preferred embodiment, the fabrication parameters include start point ID, job number, job name, level, description of project, ship date, list date, and system type.

In a preferred embodiment, the fabrication parameters include a branch resizing schedule, and the branch resizing schedule is used by a branch resizing algorithm to resize branch pipes and replace fittings. In a preferred embodiment, the traversing algorithm begins at the parent start point inserted by the user. In yet another preferred embodiment, the system allows the user to insert a child start point in each of one or more separate piping systems, the system groups the child start points together to connect separate piping systems for fabrication purposes, and the traversing algorithm traverses from the parent start point and from all child start points in all of the connected piping systems.

In a preferred embodiment, property set data is attached to objects in the system, and the property set data comprises custom property set definitions. In a preferred embodiment, the tagging algorithm validates start point data, identifies orphaned tags, obtains parent layer details for the tags, and dynamically creates child tag layers. In yet another preferred embodiment, the tagging algorithm creates and maintains a tag index that is attached to every tag and incremented by one each time the system is tagged.

In a preferred embodiment, the tag index for all tags in the system is stored in the parent start point. In a preferred embodiment, the tagging algorithm creates a tag dynamically by cloning a required property set from a drawing template, attaching the cloned property set to an object, cloning an mvblock for the tag in the drawing template, modifying the cloned mvblock to match the required property sets, and anchoring the tag to the object. In yet another preferred embodiment, the tagging algorithm groups branch pipes into branch lines and numbers both mains and branch lines.

In a preferred embodiment, tags in a given layer are shown or not shown based on parent layers specified by the user. In a preferred embodiment, tag components in a given layer are shown or not shown based on child layers created automatically by the system. In yet another preferred embodiment, the system further comprises a head annotation utility that automatically adds block symbols to installation drawings. Preferably, the system allows the user to switch block symbols assigned to a multi-view part sprinkler head from standard to below and from below to standard.

The present invention is also a computer-implemented method for designing a fire protection system comprising: providing a personal computer for loading programs into dynamic memory and storing data on a static memory device; providing means for providing user input; and installing on the personal computer program files comprising a process algorithm, a traversing algorithm, and a tagging algorithm; wherein the process algorithm performs data validation, error checking and error resolution, saves data to a start point inserted by a user, pulls layer details into programming variables, applies processing logic to the system, and comprises a main pipes algorithm and a branch resizing algorithm; wherein the traversing algorithm supports the process algorithm, the main pipes algorithm, the branch resizing algorithm, and the tagging algorithm by traveling the system and presenting objects to each of these algorithms in a logical order; and wherein the tagging algorithm attaches to each pipe in the system a tag with property set data pulled into and displayed in the tag.

In a preferred embodiment, the method further comprises providing an output device for generating hard copies of drawings and fabrication lists. In a preferred embodiment, the main pipes algorithm breaks main pipes at cut lengths specified by the user, rotates main pipes in a model space, and inserts couplings to the main pipes that have been broken at the specified cut lengths. In yet another preferred embodiment, the traversing algorithm presents a current object to the branch resizing algorithm, and the branch resizing algorithm determines whether the current object is a branching object, creates and stores path relation collections for branching objects, updates a head count when a sprinkler head is found on a run of the current object, stores a root connector for the current object in a root connectors list, loops through the root connectors list and applies the head count that is found for each root connector to all objects in a run that are attached to an incoming connector, and loops through each branch line and automatically resizes branch pipes and replaces fittings according to sizing specifications provided by the user.

In a preferred embodiment, the path relation collection for a current object comprises a parent object ID for the incoming connector, a connector number, a head count, and path relationships including branching objects upstream of the current object. In a preferred embodiment, the method further comprises allowing the user to insert a parent start point on a main pipe and storing fabrication parameters in the parent start point. In yet another preferred embodiment, the fabrication parameters include start point ID, job number, job name, level, description of project, ship date, list date, and system type.

In a preferred embodiment, the fabrication parameters include a branch resizing schedule, and the branch resizing schedule is used by a branch resizing algorithm to resize branch pipes and replace fittings. In a preferred embodiment, the traversing algorithm begins at the parent start point inserted by the user. In yet another preferred embodiment, the method further comprises allowing the user to insert a child start point in each of one or more separate piping systems and grouping the child start points together to connect separate piping systems for fabrication purposes, and the traversing algorithm traverses from the parent start point and from all child start points in all of the connected piping systems.

In a preferred embodiment, the method further comprises attaching to objects property set data comprising custom property set definitions. In a preferred embodiment, the tagging algorithm validates start point data, identifies orphaned tags, obtains parent layer details for the tags, and dynamically creates child tag layers. In yet another preferred embodiment, the tagging algorithm creates and maintains a tag index that is attached to every tag and incremented by one each time the system is tagged.

In a preferred embodiment, the tag index for all tags is stored in the parent start point. In a preferred embodiment, the tagging algorithm creates a tag dynamically by cloning a required property set from a drawing template, attaching the cloned property set to an object, cloning an mvblock for the tag in the drawing template, modifying the cloned mvblock to match the required property sets, and anchoring the tag to the object. In yet another preferred embodiment, the tagging algorithm groups branch pipes into branch lines and numbers both mains and branch lines.

In a preferred embodiment, tags in a given layer are shown or not shown based on parent layers specified by the user. In a preferred embodiment, tag components in a given layer are shown or not shown based on automatically created child layers. In yet another preferred embodiment, the method further comprises providing a head annotation utility that automatically adds block symbols to installation drawings. Preferably, the method further comprises allowing the user to switch block symbols assigned to a multi-view part sprinkler head from standard to below and from below to standard.

The present invention is also a computer-implemented system for designing a piping system comprising: a personal computer for loading programs into dynamic memory and storing data on a static memory device; means for providing user input; and program files comprising a process algorithm, a traversing algorithm, and a tagging algorithm; wherein the process algorithm performs data validation, error checking and error resolution, saves data to a start point inserted by a user, pulls layer details into programming variables, applies processing logic to the system, and comprises a main pipes algorithm and a branch resizing algorithm; wherein the traversing algorithm supports the process algorithm, the main pipes algorithm, the branch resizing algorithm, and the tagging algorithm by traveling the system and presenting objects to each of these algorithms in a logical order; and wherein the tagging algorithm attaches to each pipe in the system a tag with property set data pulled into and displayed in the tag.

In a preferred embodiment, the system further comprises an output device for generating hard copies of drawings and fabrication lists. In a preferred embodiment, the main pipes algorithm breaks main pipes at cut lengths specified by the user, rotates main pipes in a model space, and inserts couplings to the main pipes that have been broken at the specified cut lengths. In yet another preferred embodiment, the traversing algorithm presents a current object to the branch resizing algorithm, and the branch resizing algorithm determines whether the current object is a branching object, creates and stores path relation collections for branching objects, updates a head count when a sprinkler head is found on a run of the current object, stores a root connector for the current object in a root connectors list, loops through the root connectors list and applies the head count that is found for each root connector to all objects in a run that are attached to an incoming connector, and loops through each branch line and automatically resizes branch pipes and replaces fittings according to sizing specifications provided by the user.

In a preferred embodiment, the path relation collection for a current object comprises a parent object ID for the incoming connector, a connector number, a head count, and path relationships including branching objects upstream of the current object. In a preferred embodiment, the user inserts a parent start point on a main pipe, and the system stores fabrication parameters in the parent start point. In yet another preferred embodiment, the fabrication parameters include start point ID, job number, job name, level, description of project, ship date, list date, and system type.

In a preferred embodiment, the fabrication parameters include a branch resizing schedule, and the branch resizing schedule is used by a branch resizing algorithm to resize branch pipes and replace fittings. In a preferred embodiment, the traversing algorithm begins at the parent start point inserted by the user. In yet another preferred embodiment, the system allows the user to insert a child start point in each of one or more separate piping systems, the system groups the child start points together to connect separate piping systems for fabrication purposes, and the traversing algorithm traverses from the parent start point and from all child start points in all of the connected piping systems.

In a preferred embodiment, property set data is attached to objects in the system, and the property set data comprises custom property set definitions. In a preferred embodiment, the tagging algorithm validates start point data, identifies orphaned tags, obtains parent layer details for the tags, and dynamically creates child tag layers. In yet another preferred embodiment, the tagging algorithm creates and maintains a tag index that is attached to every tag and incremented by one each time the system is tagged.

In a preferred embodiment, the tag index for all tags in the system is stored in the parent start point. In a preferred embodiment, the tagging algorithm creates a tag dynamically by cloning a required property set from a drawing template, attaching the cloned property set to an object, cloning an mvblock for the tag in the drawing template, modifying the cloned mvblock to match the required property sets, and anchoring the tag to the object. In yet another preferred embodiment, the tagging algorithm groups branch pipes into branch lines and numbers both mains and branch lines.

In a preferred embodiment, tags in a given layer are shown or not shown based on parent layers specified by the user. In a preferred embodiment, tag components in a given layer are shown or not shown based on child layers created automatically by the system. In yet another preferred embodiment, the system further comprises a head annotation utility that automatically adds block symbols to installation drawings. Preferably, the system allows the user to switch block symbols assigned to a multi-view part sprinkler head from standard to below and from below to standard.

The present invention is also a computer-implemented method for designing a piping system comprising: providing a personal computer for loading programs into dynamic memory and storing data on a static memory device; providing means for providing user input; and installing on the personal computer program files comprising a process algorithm, a traversing algorithm, and a tagging algorithm; wherein the process algorithm performs data validation, error checking and error resolution, saves data to a start point inserted by a user, pulls layer details into programming variables, applies processing logic to the system, and comprises a main pipes algorithm and a branch resizing algorithm; wherein the traversing algorithm supports the process algorithm, the main pipes algorithm, the branch resizing algorithm, and the tagging algorithm by traveling the system and presenting objects to each of these algorithms in a logical order; and wherein the tagging algorithm attaches to each pipe in the system a tag with property set data pulled into and displayed in the tag.

In a preferred embodiment, the method further comprises providing an output device for generating hard copies of drawings and fabrication lists. In a preferred embodiment, the main pipes algorithm breaks main pipes at cut lengths specified by the user, rotates main pipes in a model space, and inserts couplings to the main pipes that have been broken at the specified cut lengths. In yet another preferred embodiment, the traversing algorithm presents a current object to the branch resizing algorithm, and the branch resizing algorithm determines whether the current object is a branching object, creates and stores path relation collections for branching objects, updates a head count when a sprinkler head is found on a run of the current object, stores a root connector for the current object in a root connectors list, loops through the root connectors list and applies the head count that is found for each root connector to all objects in a run that are attached to an incoming connector, and loops through each branch line and automatically resizes branch pipes and replaces fittings according to sizing specifications provided by the user.

In a preferred embodiment, the path relation collection for a current object comprises a parent object ID for the incoming connector, a connector number, a head count, and path relationships including branching objects upstream of the current object. In a preferred embodiment, the method further comprises allowing the user to insert a parent start point on a main pipe and storing fabrication parameters in the parent start point. In yet another preferred embodiment, the fabrication parameters include start point ID, job number, job name, level, description of project, ship date, list date, and system type.

In a preferred embodiment, the fabrication parameters include a branch resizing schedule, and the branch resizing schedule is used by a branch resizing algorithm to resize branch pipes and replace fittings. In a preferred embodiment, the traversing algorithm begins at the parent start point inserted by the user. In yet another preferred embodiment, the method further comprises allowing the user to insert a child start point in each of one or more separate piping systems and grouping the child start points together to connect separate piping systems for fabrication purposes, and the traversing algorithm traverses from the parent start point and from all child start points in all of the connected piping systems.

In a preferred embodiment, the method further comprises attaching to objects property set data comprising custom property set definitions. In a preferred embodiment, the tagging algorithm validates start point data, identifies orphaned tags, obtains parent layer details for the tags, and dynamically creates child tag layers. In yet another preferred embodiment, the tagging algorithm creates and maintains a tag index that is attached to every tag and incremented by one each time the system is tagged.

In a preferred embodiment, the tag index for all tags is stored in the parent start point. In a preferred embodiment, the tagging algorithm creates a tag dynamically by cloning a required property set from a drawing template, attaching the cloned property set to an object, cloning an mvblock for the tag in the drawing template, modifying the cloned mvblock to match the required property sets, and anchoring the tag to the object. In yet another preferred embodiment, the tagging algorithm groups branch pipes into branch lines and numbers both mains and branch lines.

In a preferred embodiment, tags in a given layer are shown or not shown based on parent layers specified by the user. In a preferred embodiment, tag components in a given layer are shown or not shown based on automatically created child layers. In yet another preferred embodiment, the method further comprises providing a head annotation utility that automatically adds block symbols to installation drawings. Preferably, the method further comprises allowing the user to switch block symbols assigned to a multi-view part sprinkler head from standard to below and from below to standard.

BRIEF DESCRIPTION OF THE DRAWINGS

FIG. 7 is a screenshot of the assemblies referenced by the PYROCAD™ project within the VISUAL STUDIO® software.

FIG. 25 is a screenshot of the Autodesk catalog editor form used for creating new PYROCAD™ part catalogs.

FIG. is a screenshot of the AUTOCAD® content browser from where the PYROCAD™ library is managed shown at the tool palette group level and individual palette level.

Figure 31:
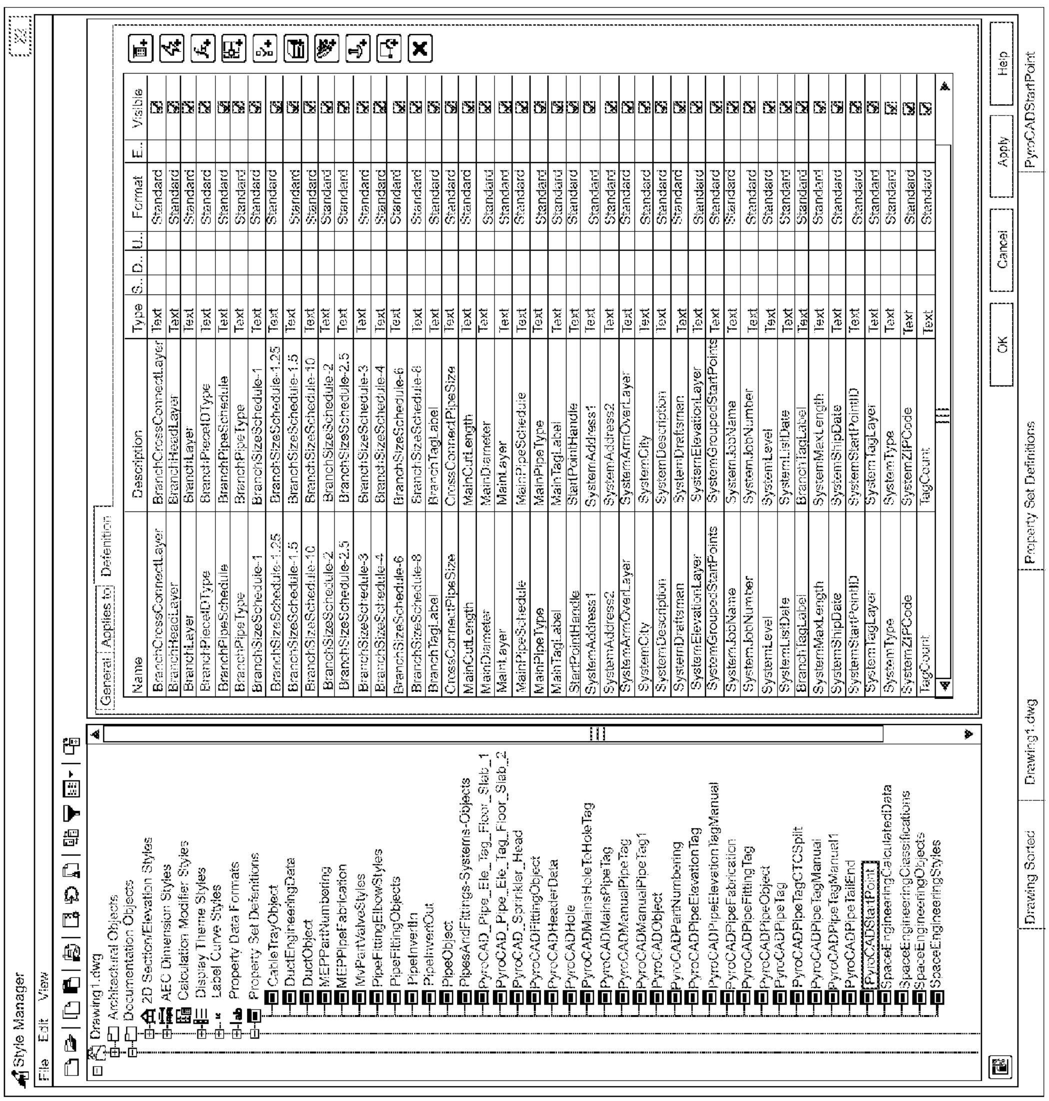

FIG. 31 is a screenshot of the AUTOCAD® MEP style manager form that is used for creating the custom PYROCAD™ property sets.

Figure 32:
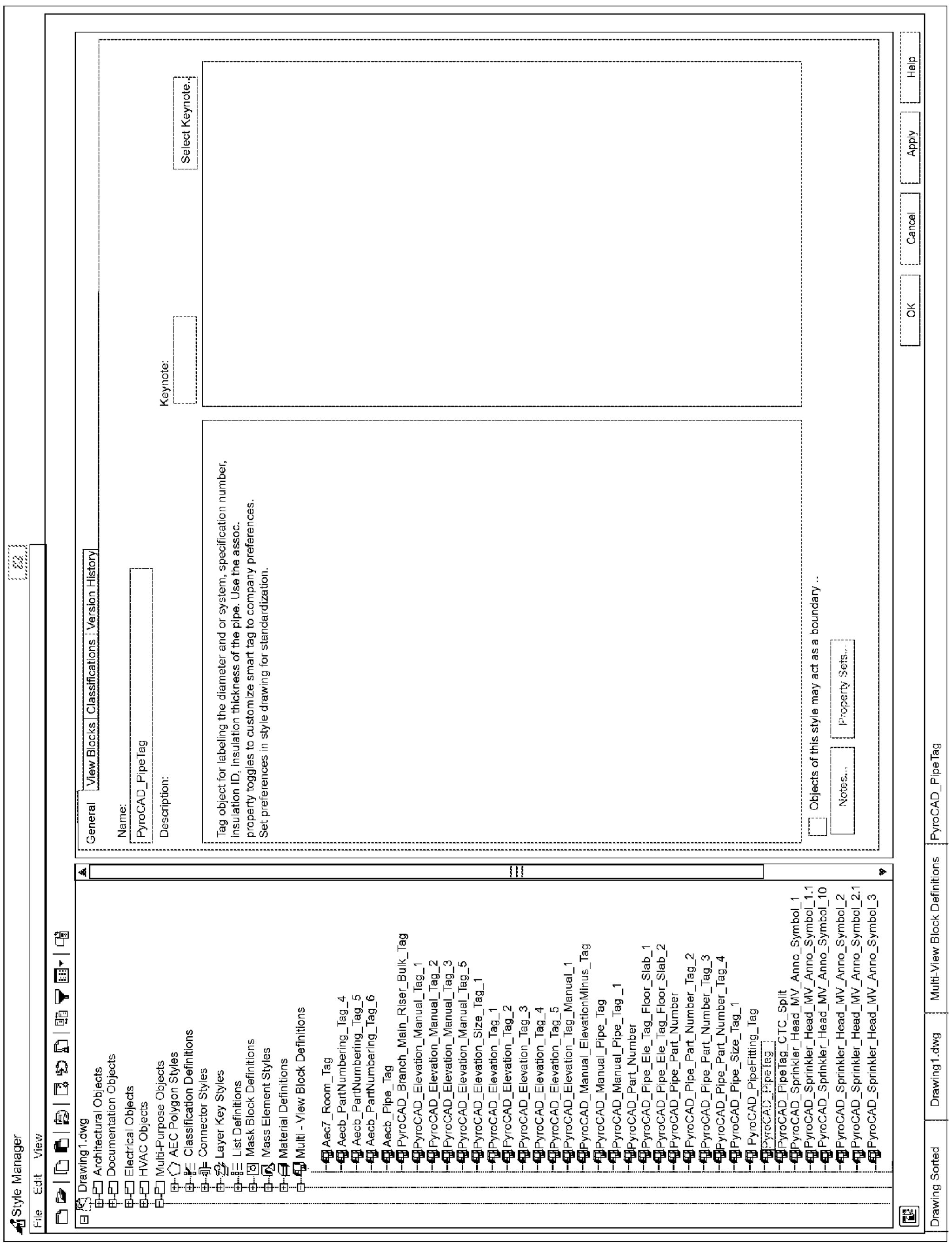

FIG. 32 is a screenshot of the AUTOCAD® MEP style manager from that is used for creating the custom PYROCAD™ tags and multi-view blocks.

Figure 33:
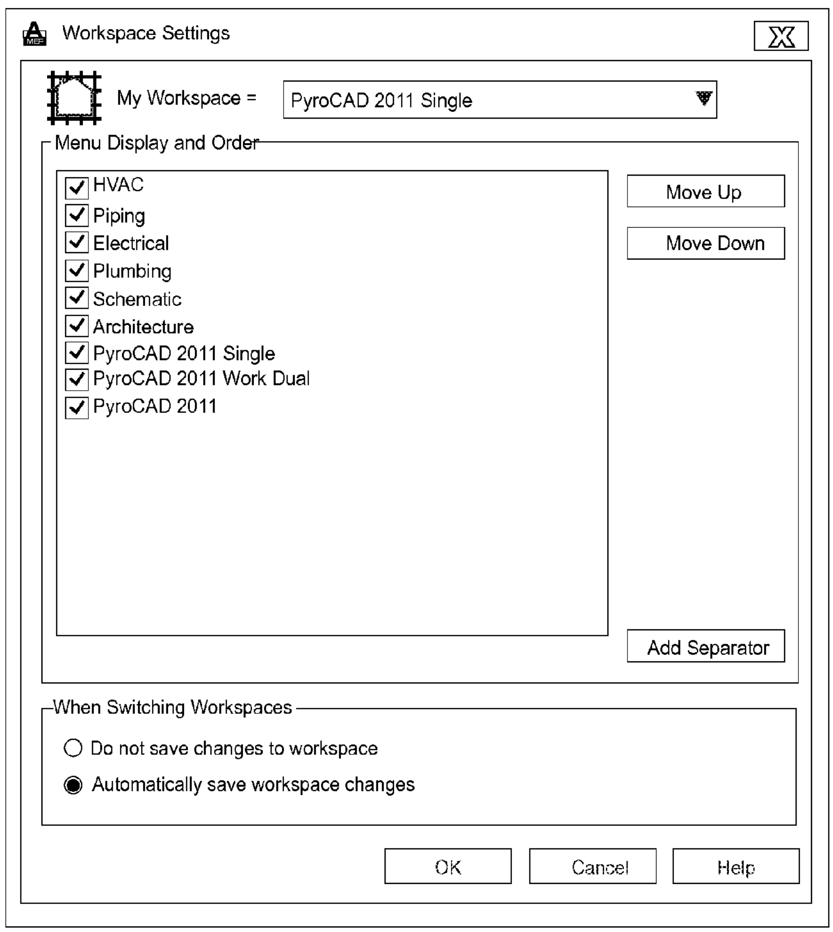

FIG. 33 is a screenshot of the AUTOCAD® MEP workspace settings form.

Figure 34:
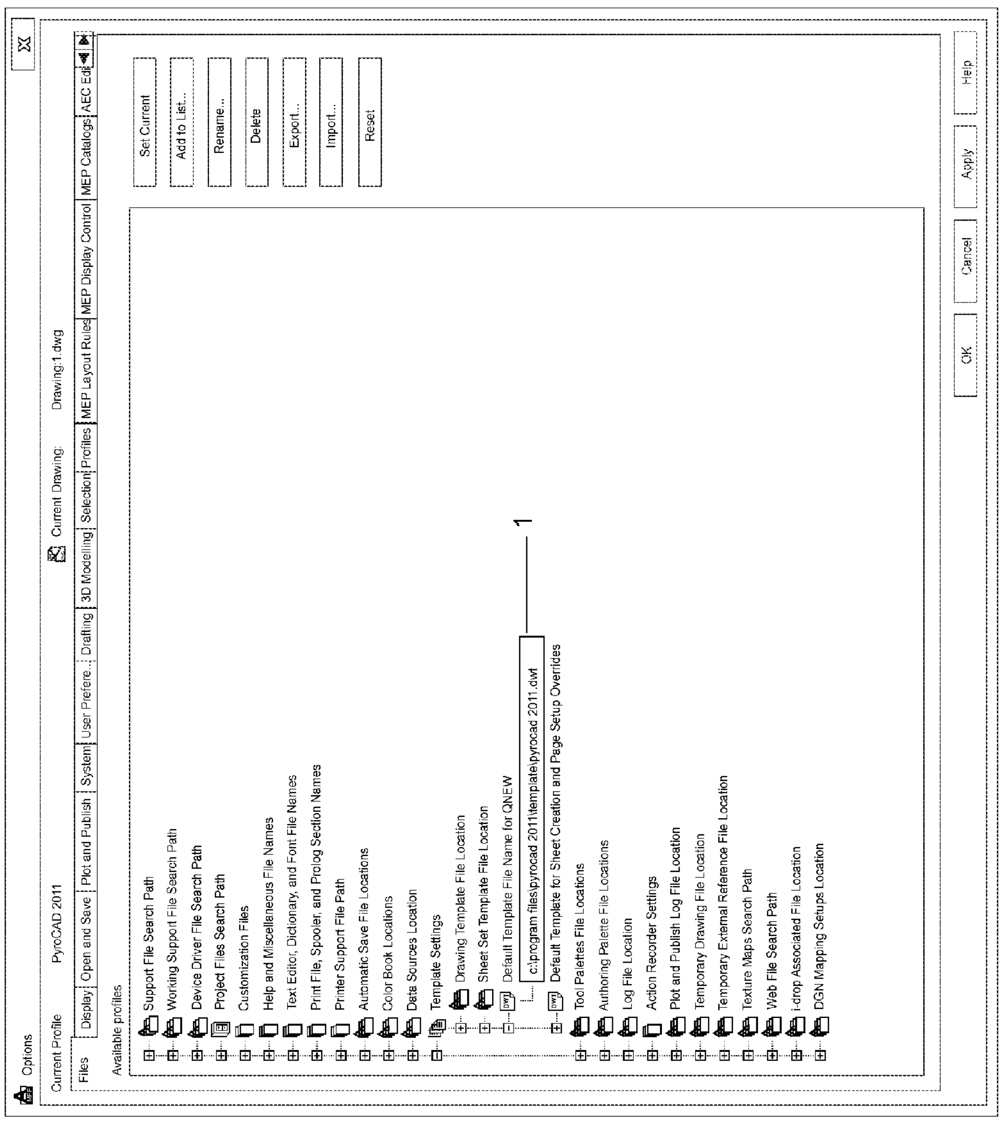

FIG. 34 is a screenshot AUTOCAD® MEP options form with the profiles tab selected showing the location of the PYROCAD™ template file PYROCAD2011.dwt.

Figure 35:
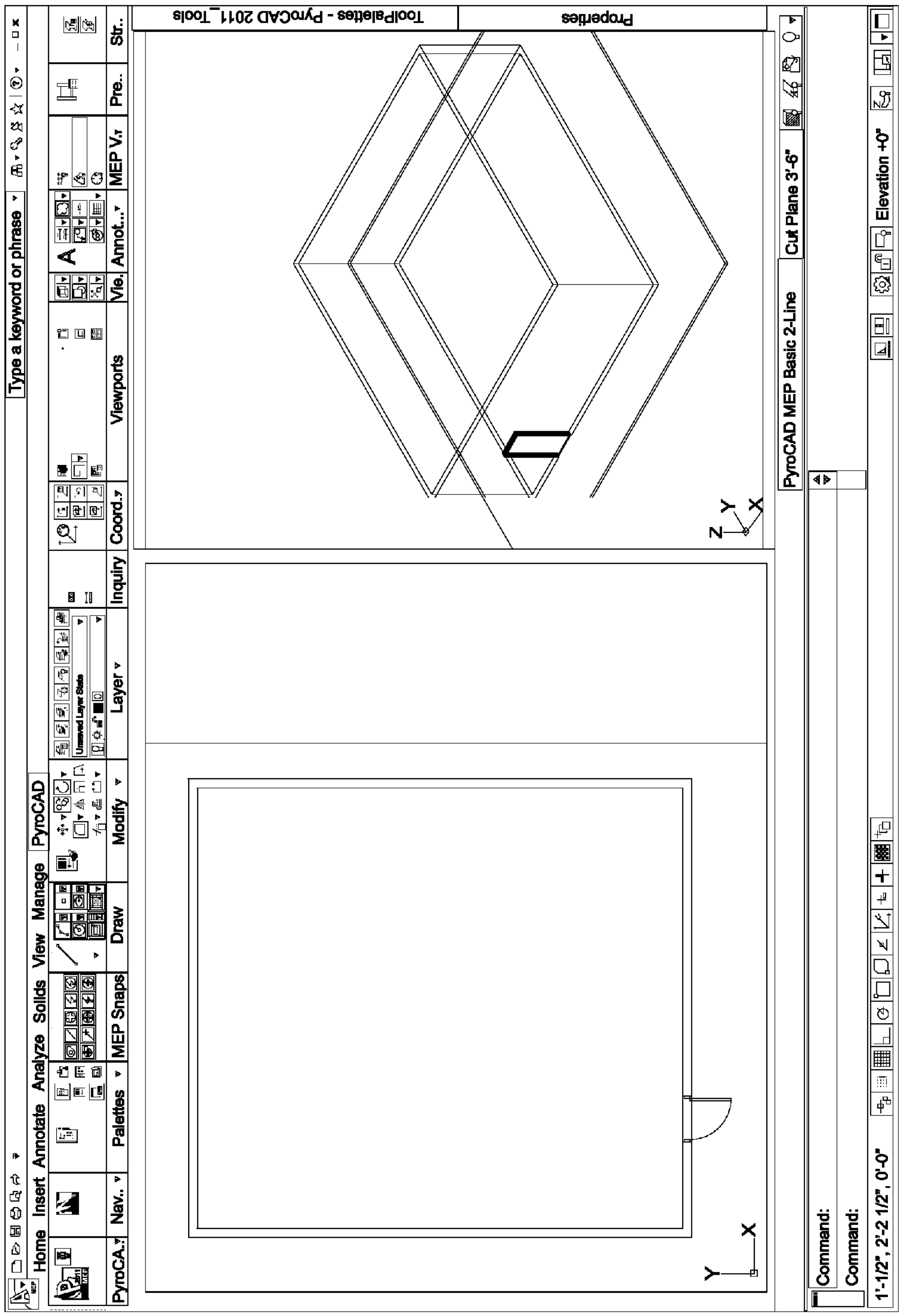

FIG. 35 is a screenshot of the AUTOCAD® MEP/PYROCAD™ interface with a sample architectural plan showing a small building in two viewports.

Figure 36:
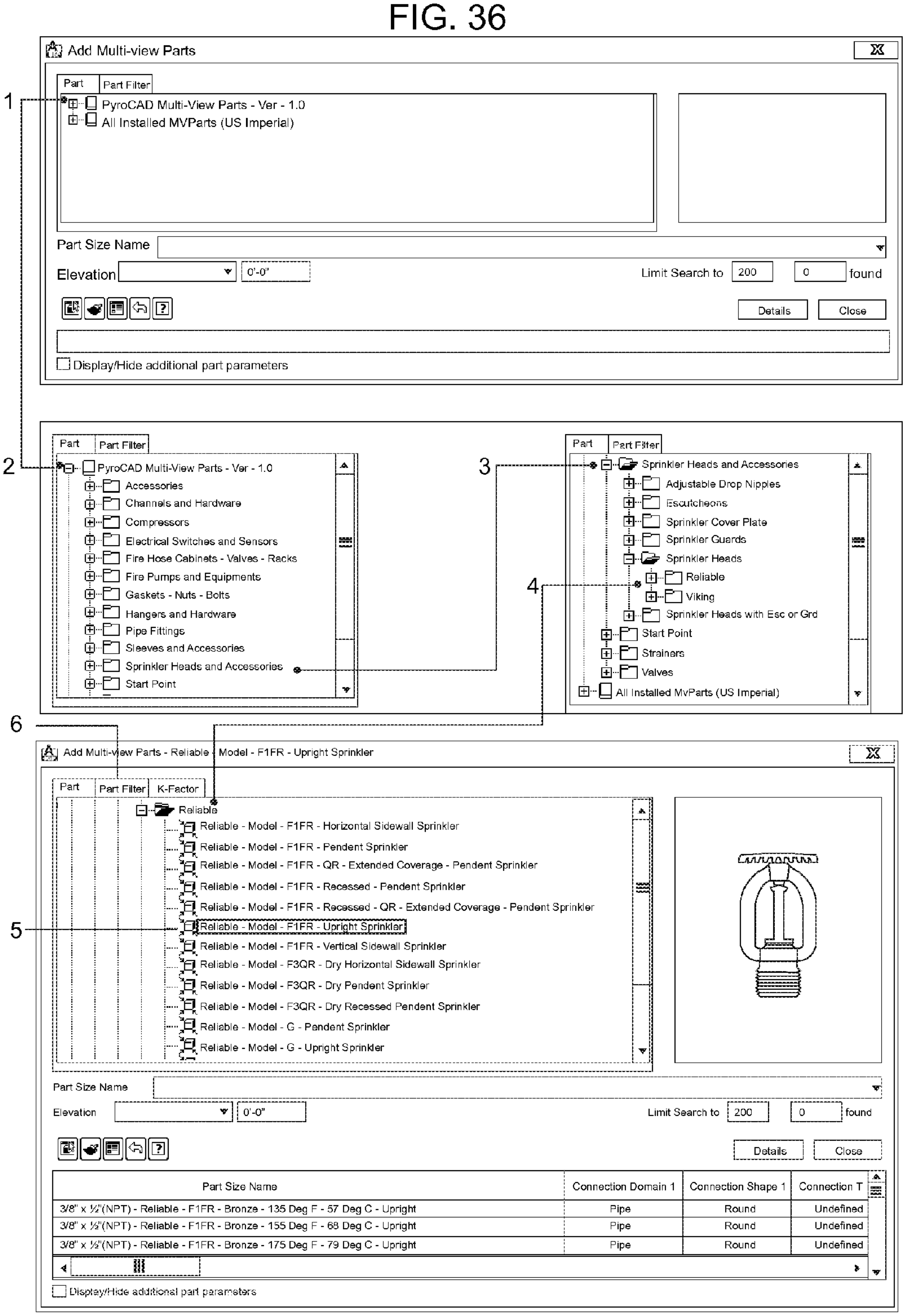

FIG. 36 is a screenshot of the AUTOCAD® MEP add multi-view parts form showing the steps for adding a sprinkler into the drawing.

FIG. 37 is a continuation of the screenshot shown in FIG. 36.

Figure 38:
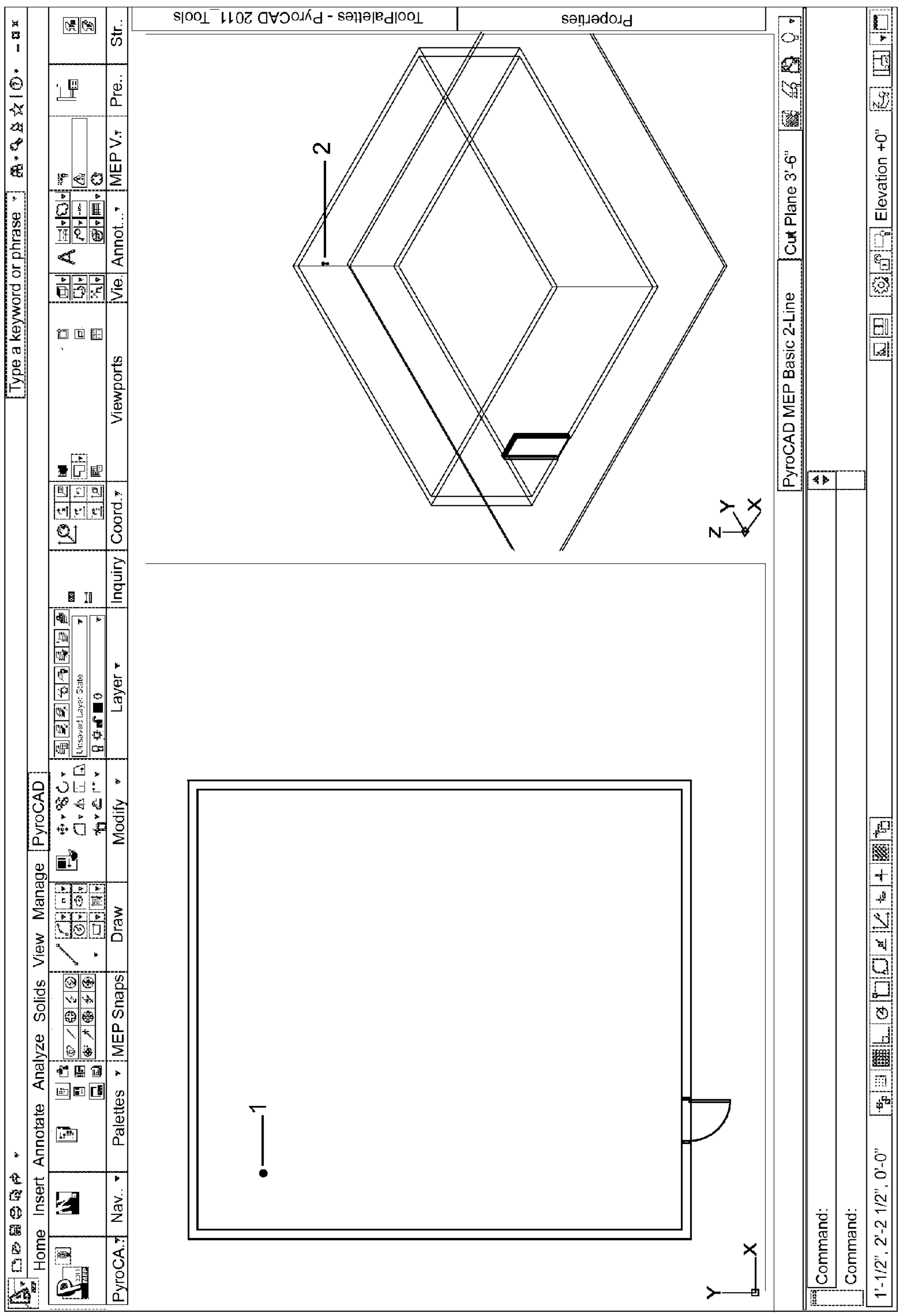

FIG. 38 is a screenshot of the AUTOCAD®/PYROCAD™ interface showing the sprinkler head inserted into the model space of the drawing.

Figure 39:
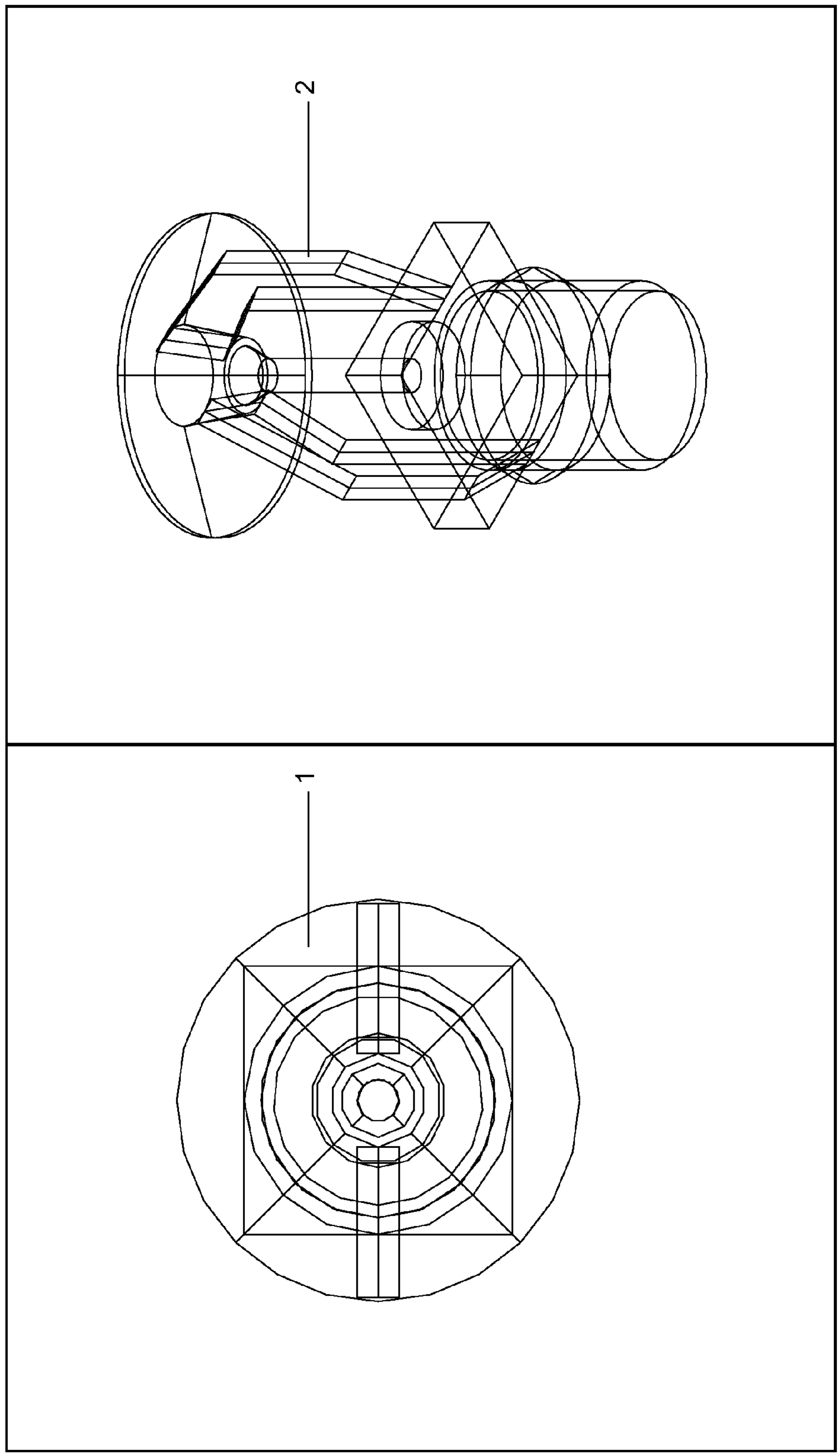

FIG. 39 is an enlarged view of the sprinkler head shown in FIG. 38.

Figure 40:
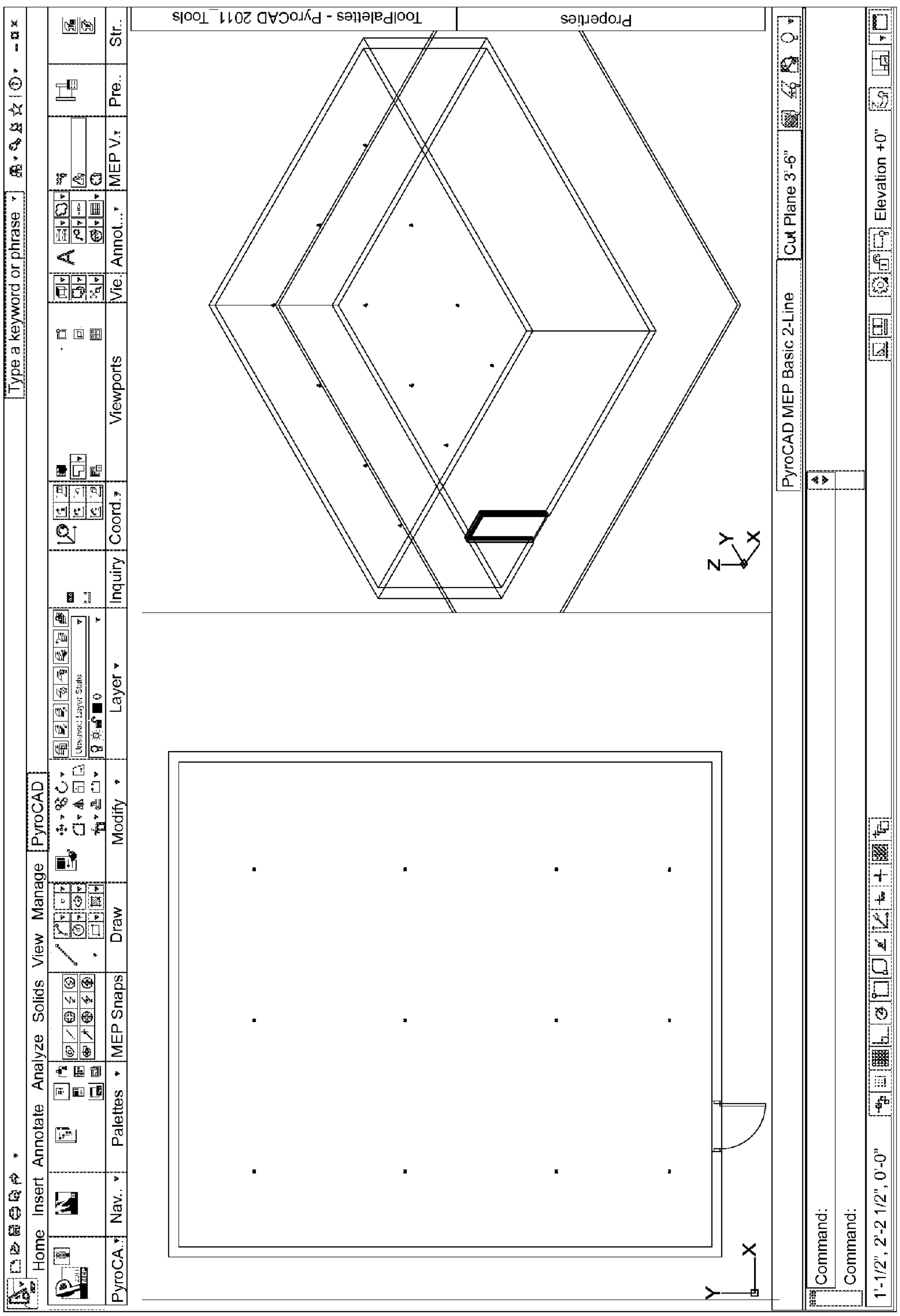

FIG. 40 is a screenshot of the AUTOCAD®/PYROCAD™ interface showing additional sprinkler heads that were required for the sample architectural drawing.

Figure 41:
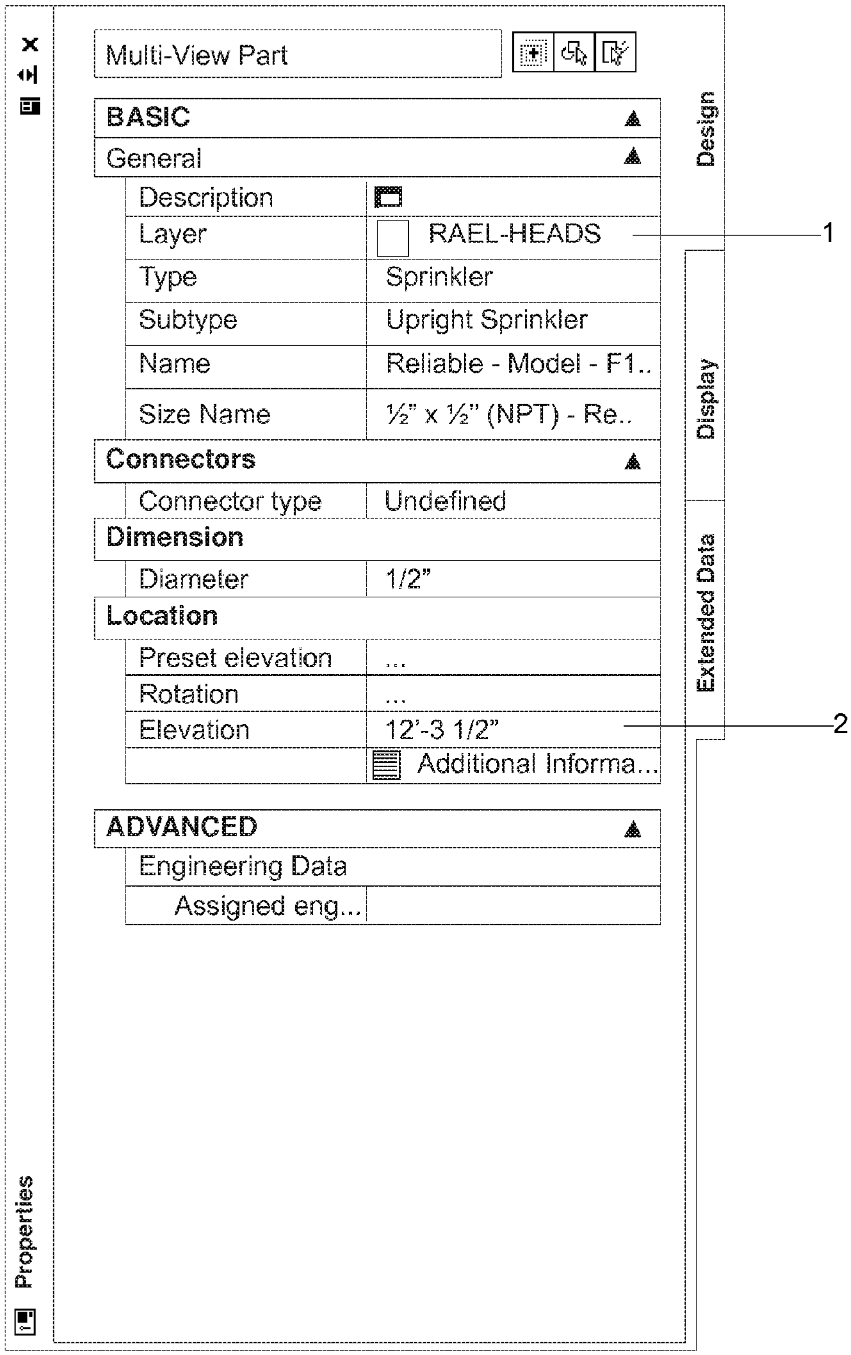

FIG. 41 is a screenshot of the AUTOCAD® MEP properties palette displaying the properties of the selected sprinkler heads.

Figure 42:
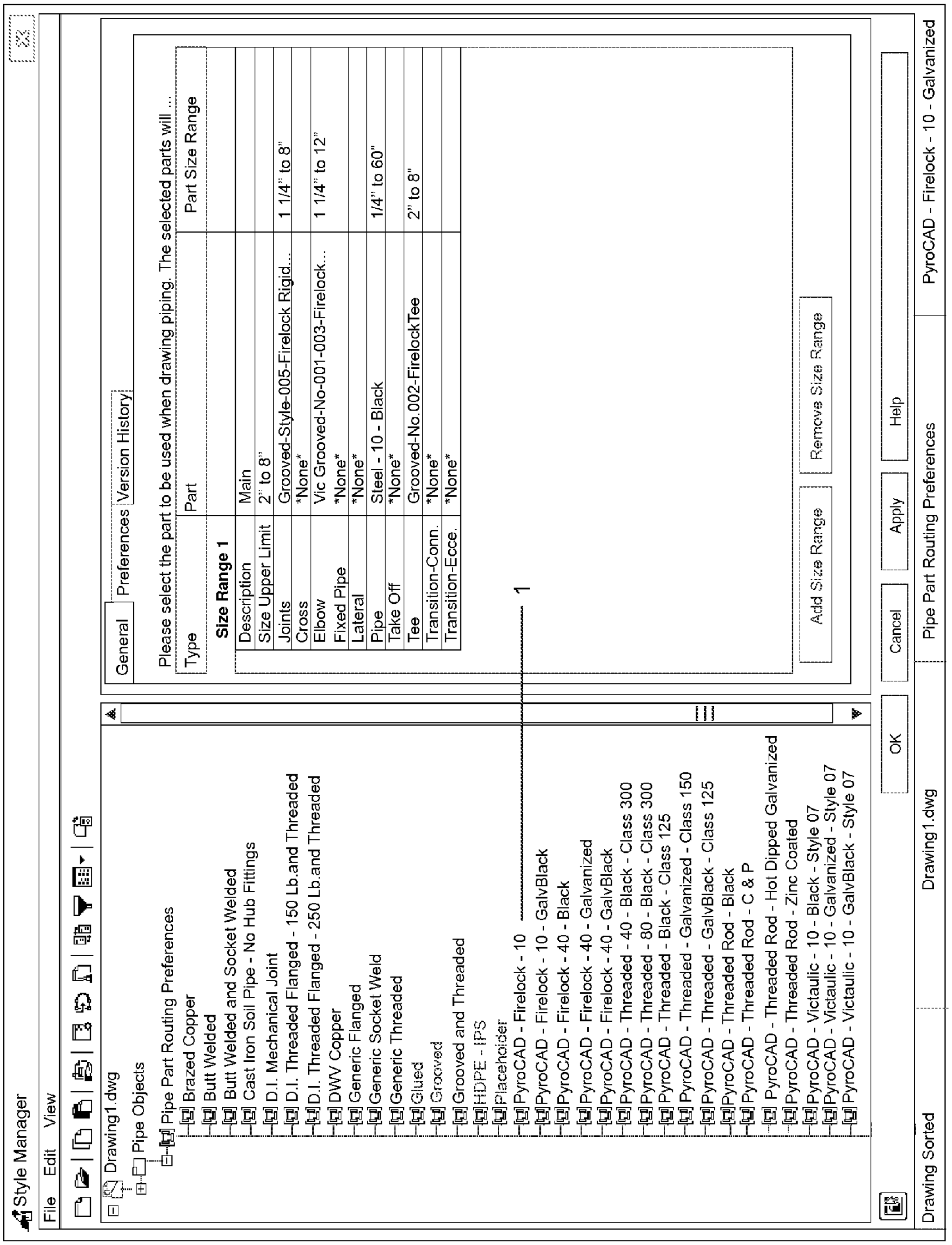

FIG. 42 is a screenshot of the AUTOCAD® MEP style manager form showing The PYROCAD™ routing preference.

Figure 17:
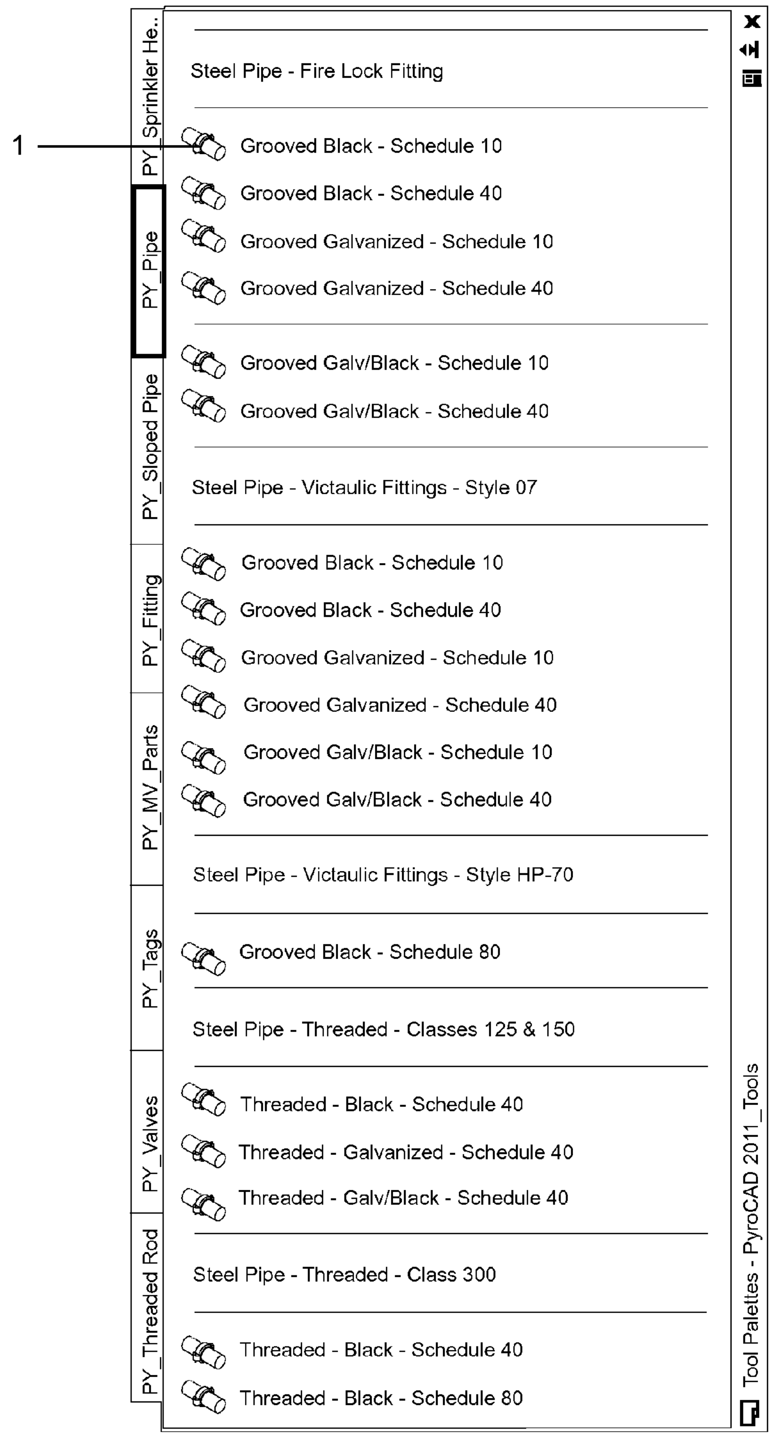
FIG. 17 is a screenshot of the py_pipe tool palette showing pipe tools with multiple routing preferences.
Figure 18:
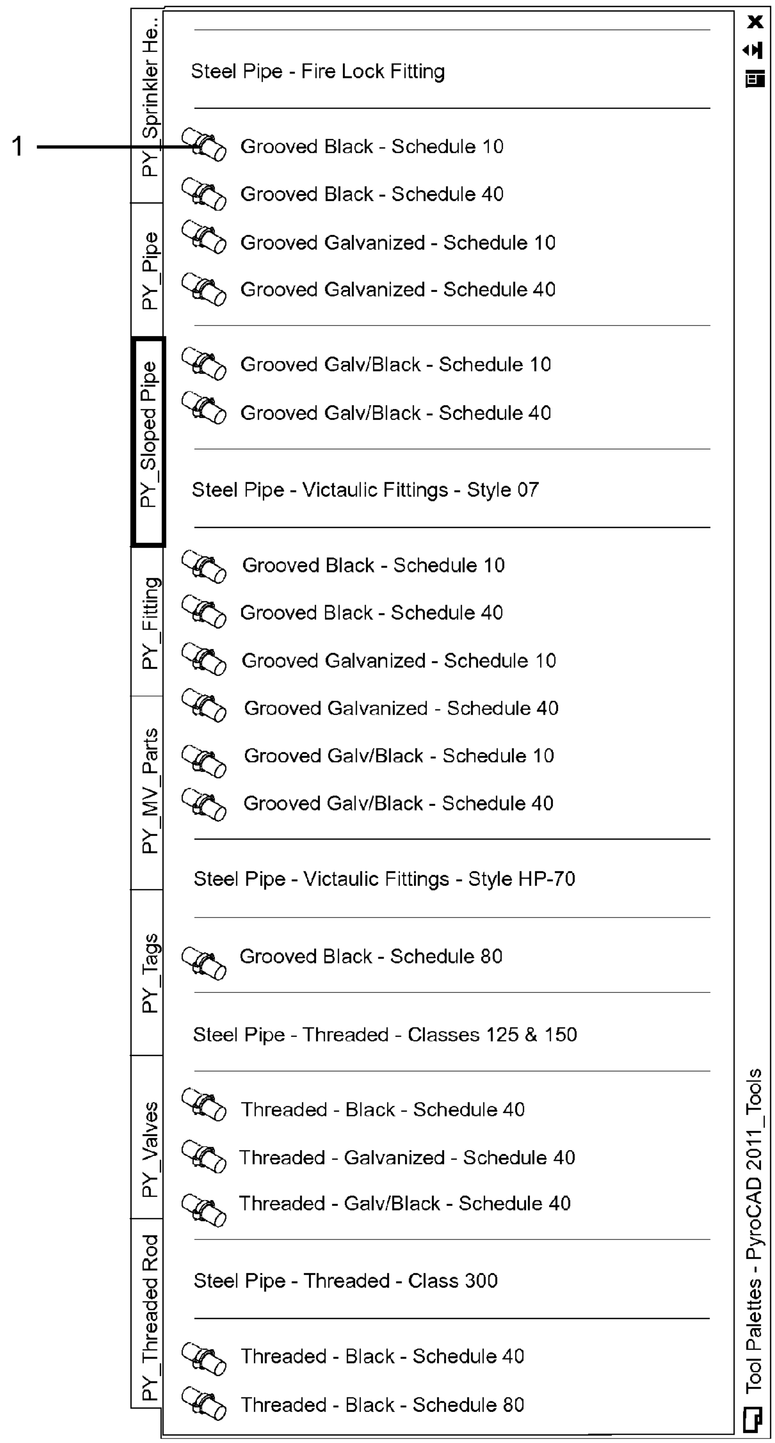
FIG. 18 is a screenshot of the py_pipe palette showing sloped pipe tools with multiple routing preferences.
Figure 43:
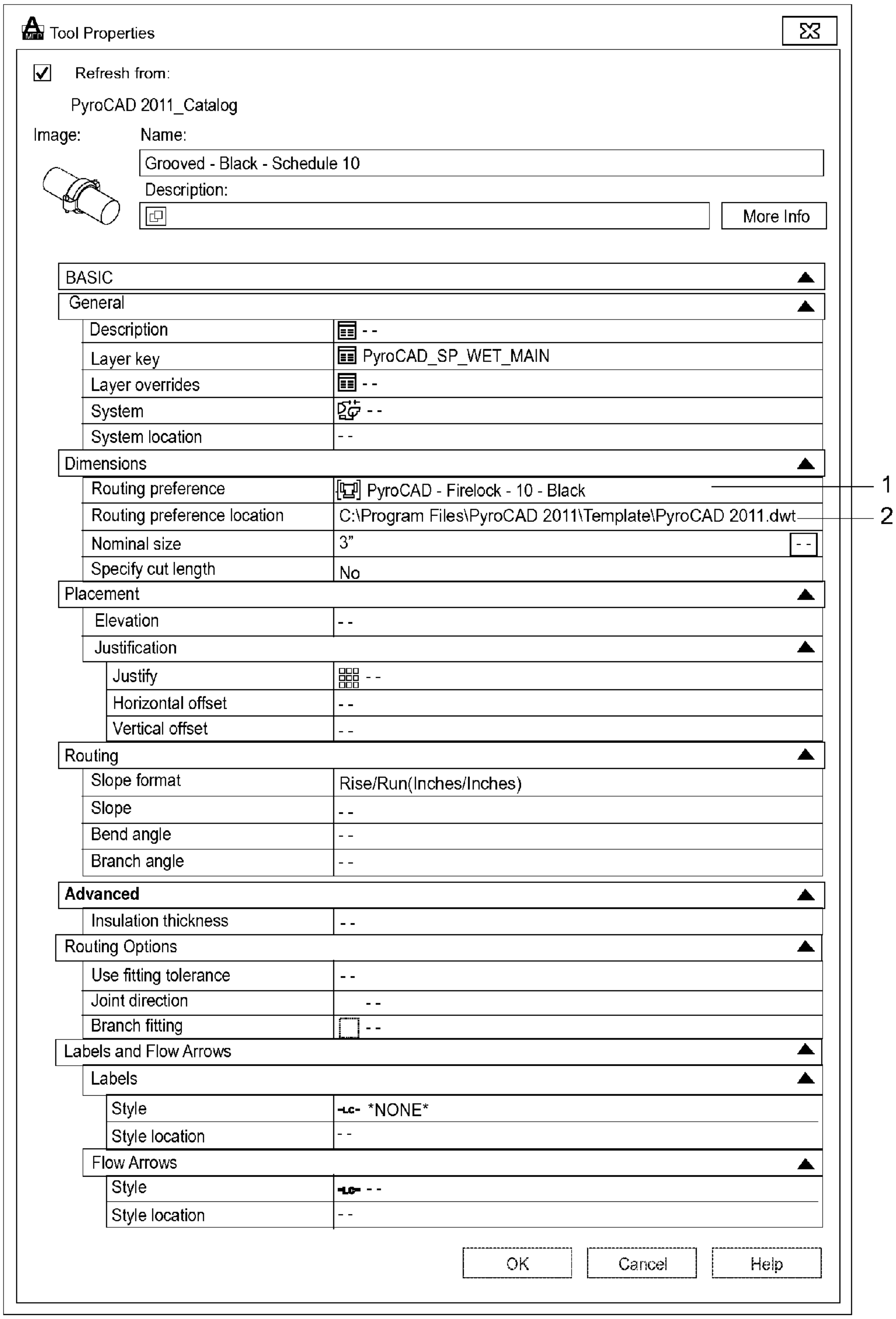

FIG. 43 is a screenshot of the AUTOCAD® MEP tool properties window of FIG. 17 showing how piping tool palettes are created and how they link to the PYROCAD™ routing preferences within the PYROCAD™ drawing template.

Figure 44:
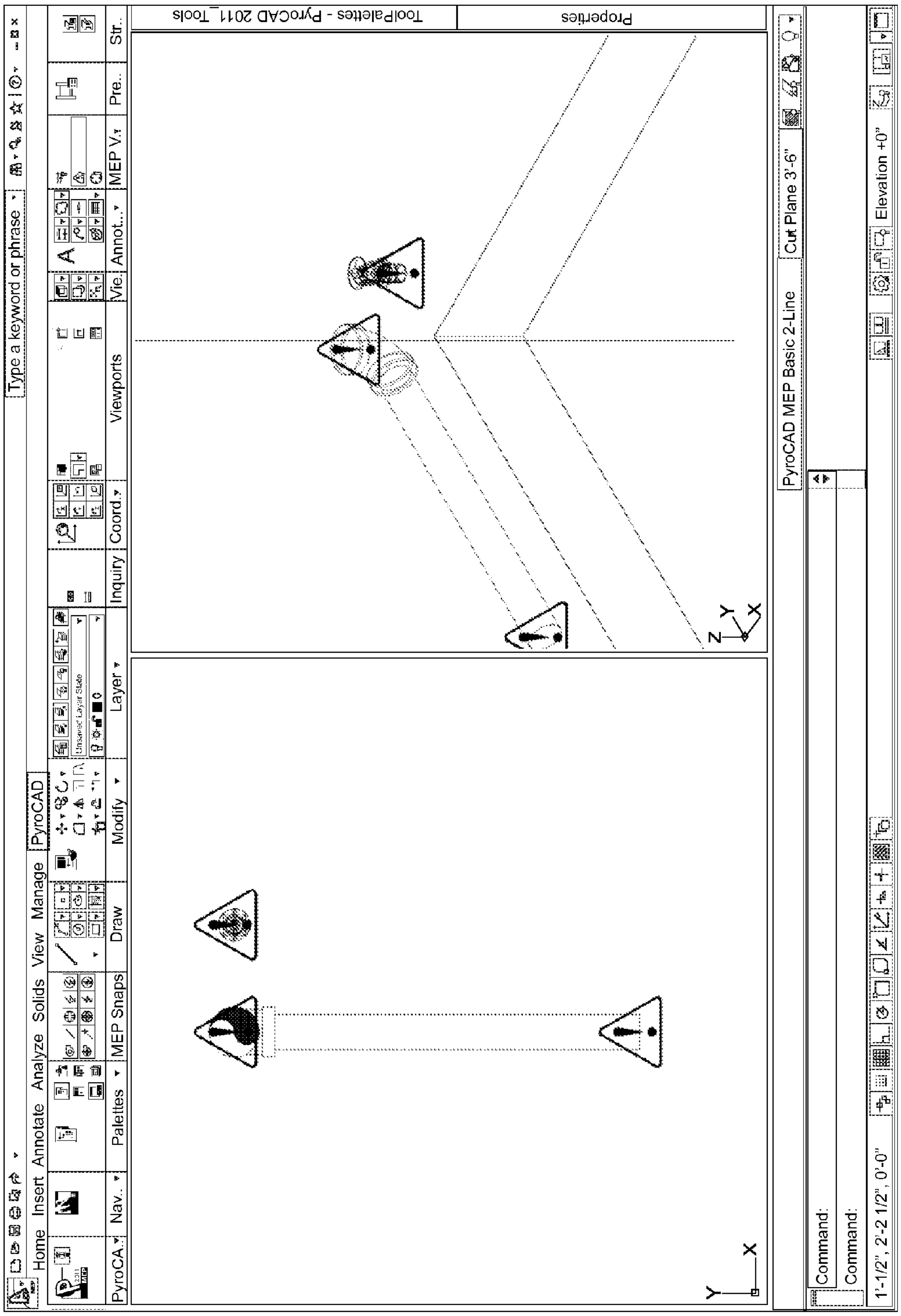

FIG. 44 is a screenshot of the AUTOCAD®/PYROCAD™ interface showing a sprinkler head and a branch pipe disconnected with warning symbols visible for the unconnected pipe connectors.

Figure 45:
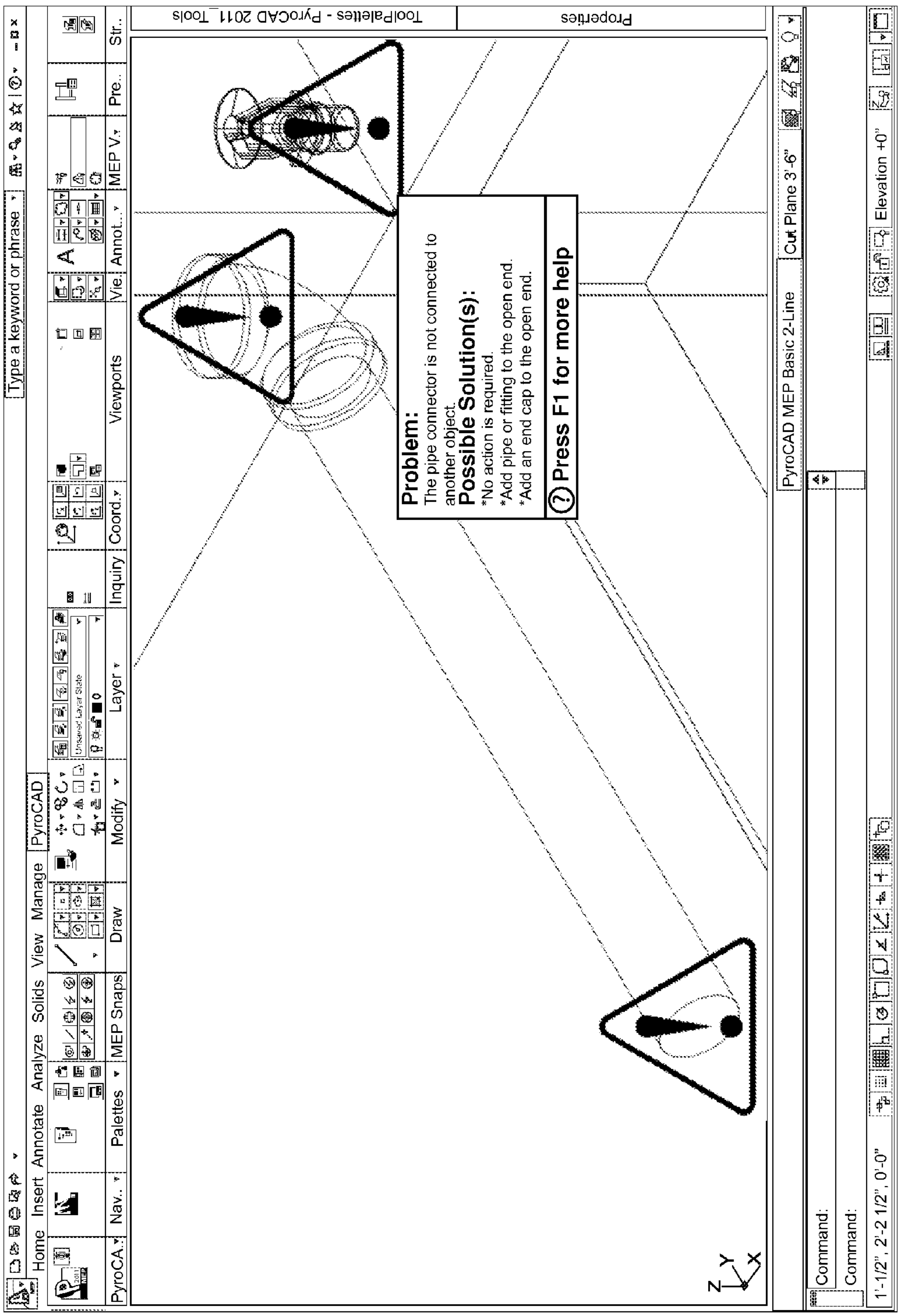

FIG. 45 is a screenshot of the AUTOCAD®/PYROCAD™ interface showing the dialog box that is presented if the user hovers the cursor over the warning symbol of the unconnected pipe connector.

Figure 46:
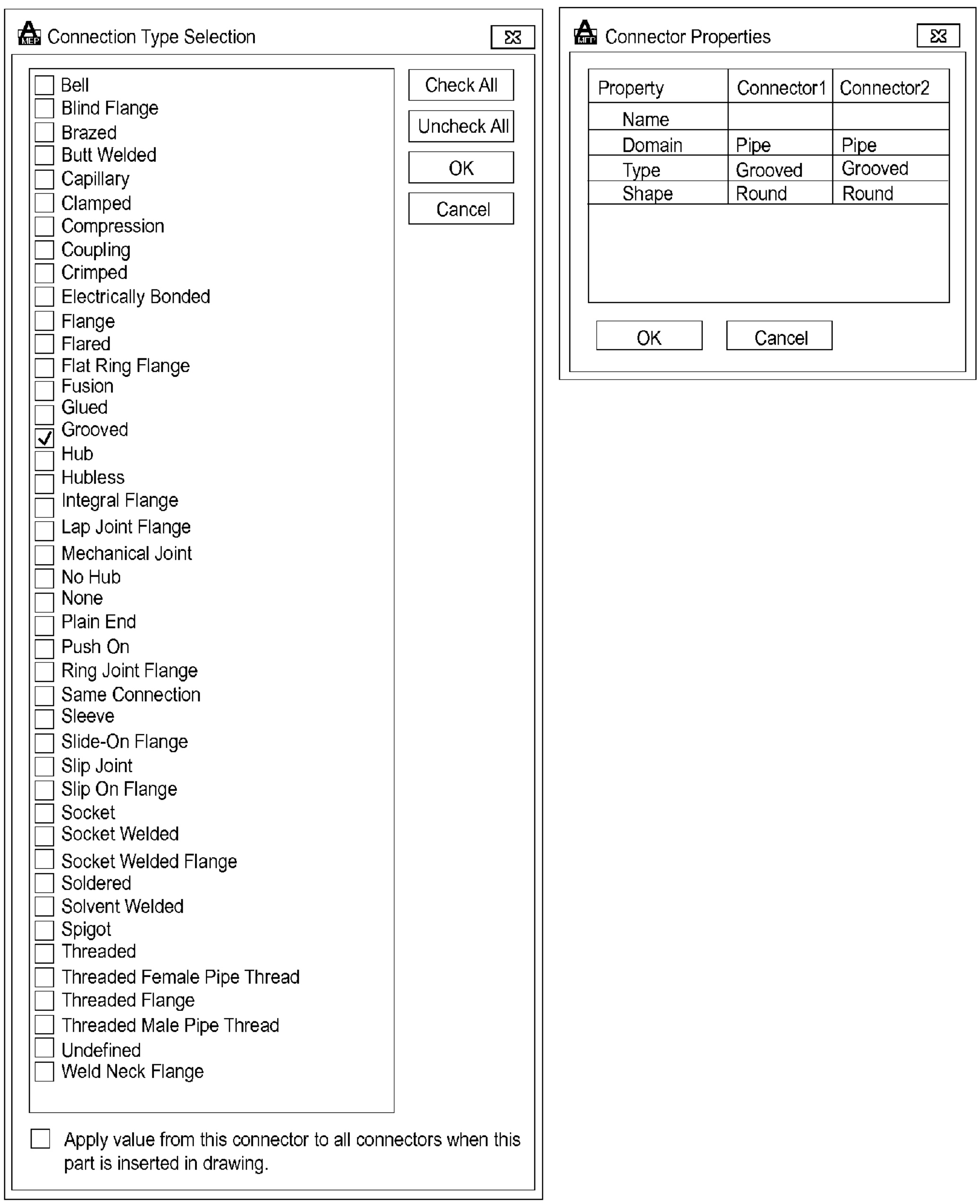

FIG. 46 is a screenshot of the AUTOCAD® MEP connection type selection form and the connector properties form used during the part creation process.

Figure 47:
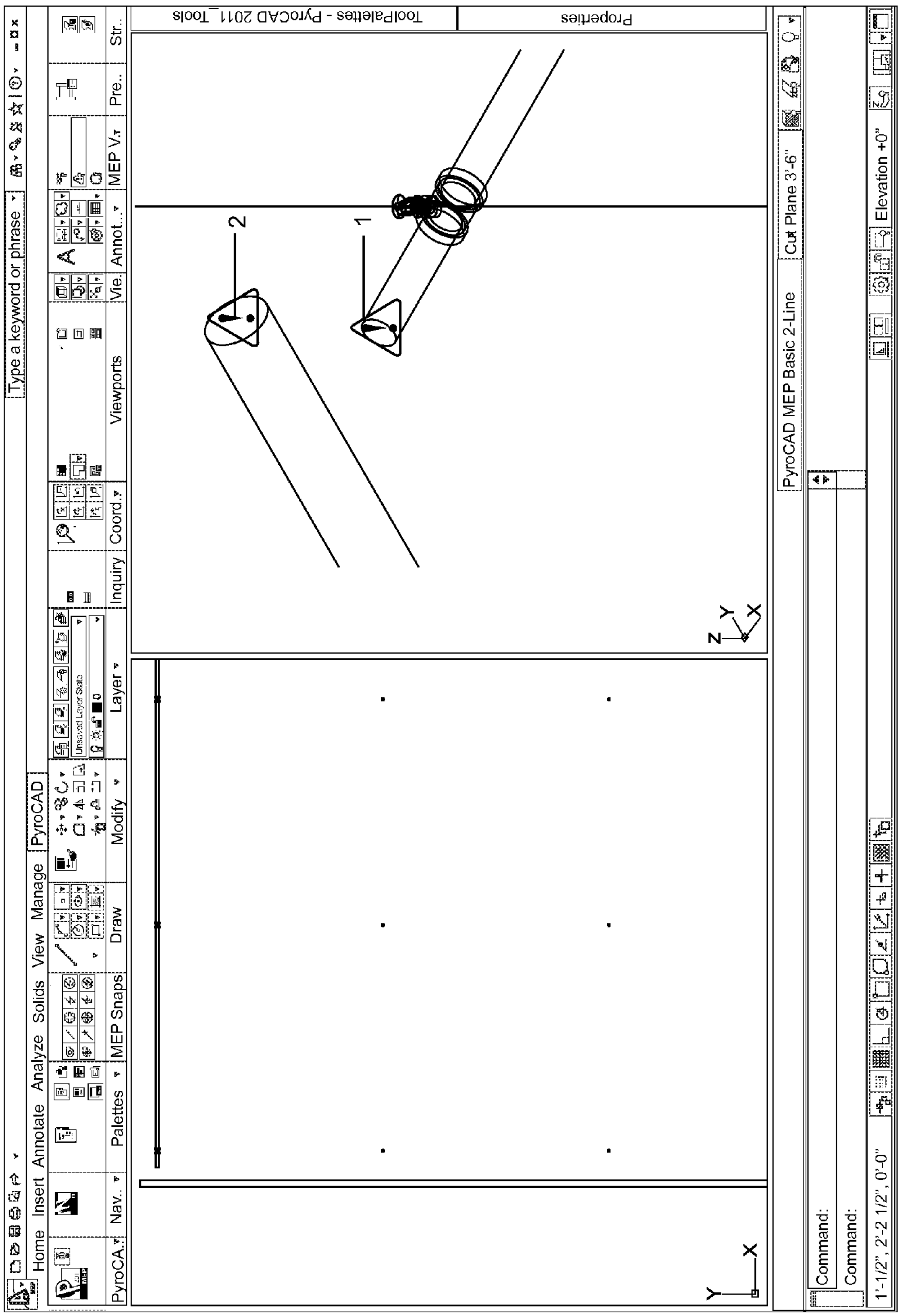

FIG. 47 is a screenshot of the AUTOCAD®/PYROCAD™ interface showing a sprinkler head on a branch pipe with a main pipe added.

Figure 48:
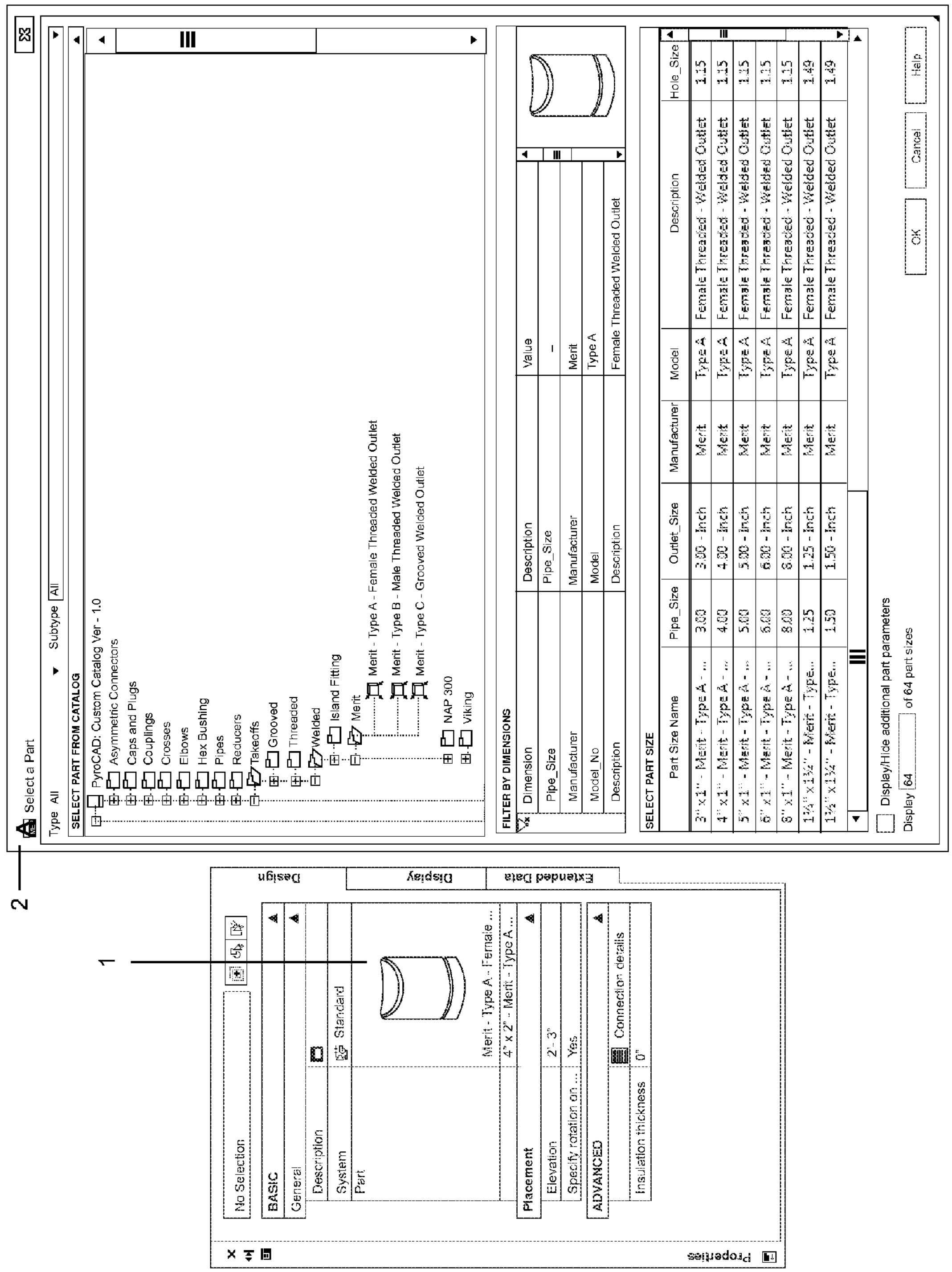

FIG. 48 is a screenshot of the AUTOCAD® MEP properties-palette and the select a part form used in adding a takeoff fitting that is not configured.

Figure 49:
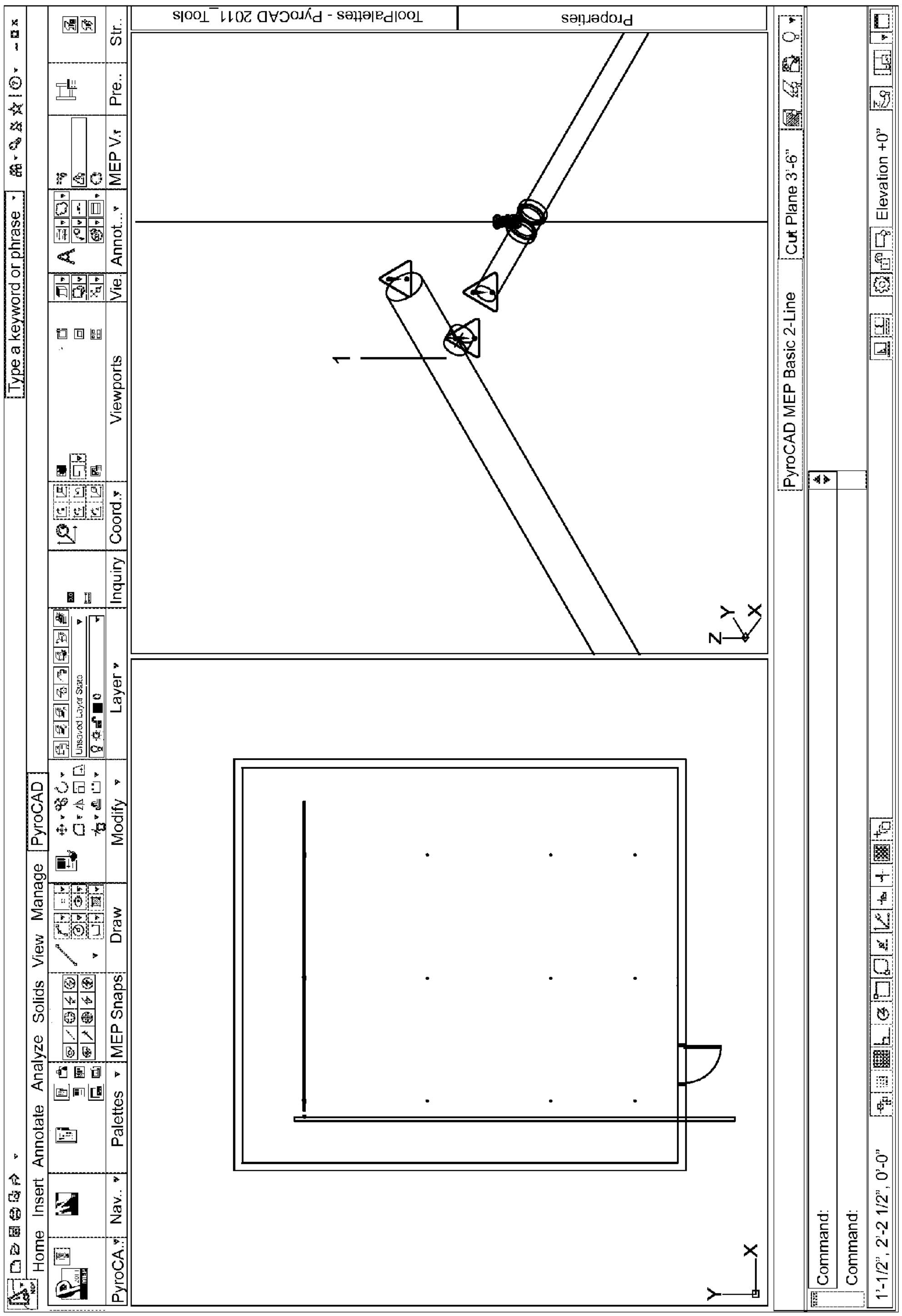

FIG. 49 is a screenshot of the AUTOCAD®/PYROCAD™ interface showing a sprinkler head on a branch pipe, a main pipe and the newly aided takeoff fitting on the main pipe.

Figure 50:
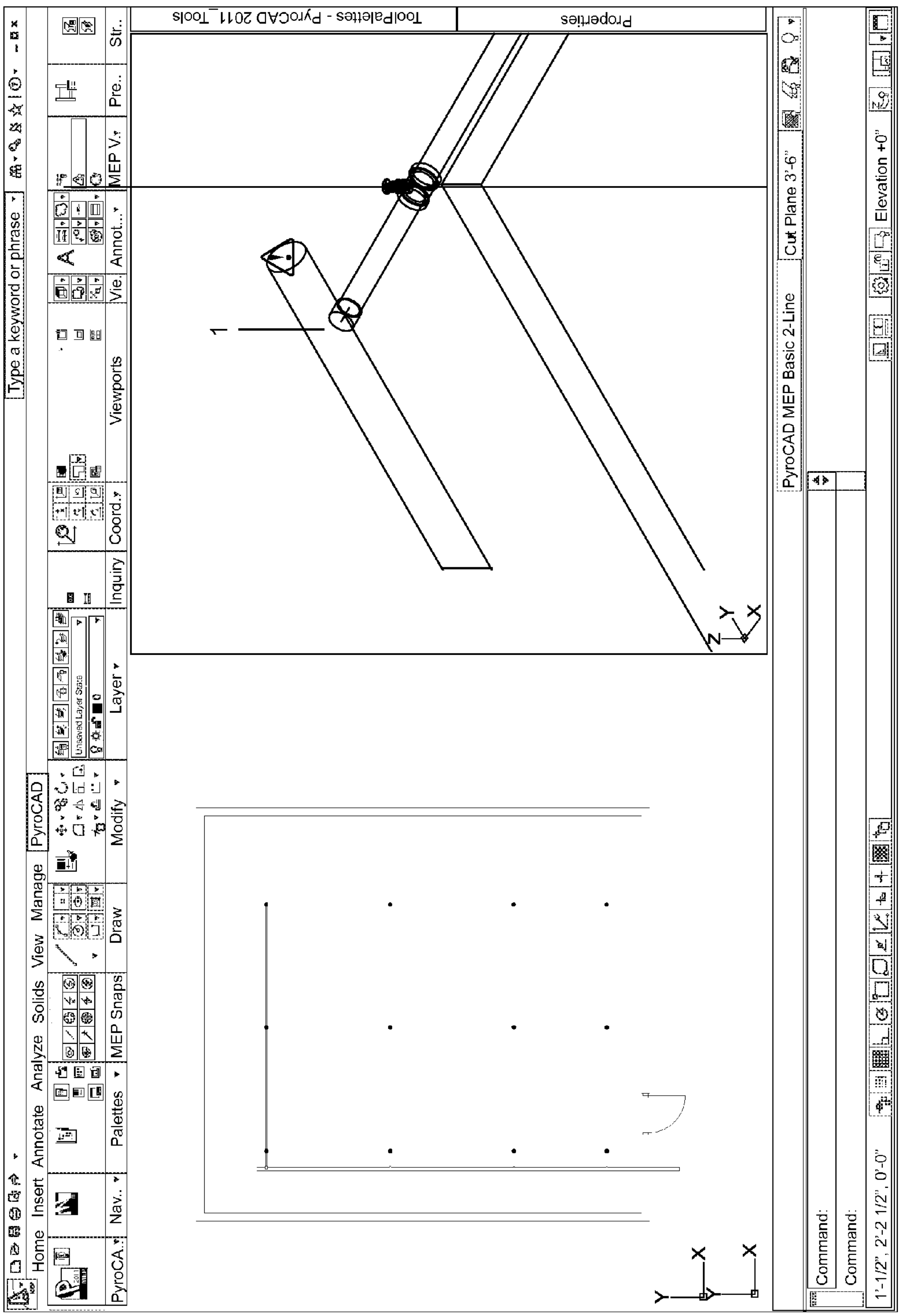

FIG. 50 is a screenshot of AUTOCAD®/PYROCAD™ interface showing a sprinkler head on a branch pipe now connected to the takeoff fitting on the main pipe.

Figure 51:
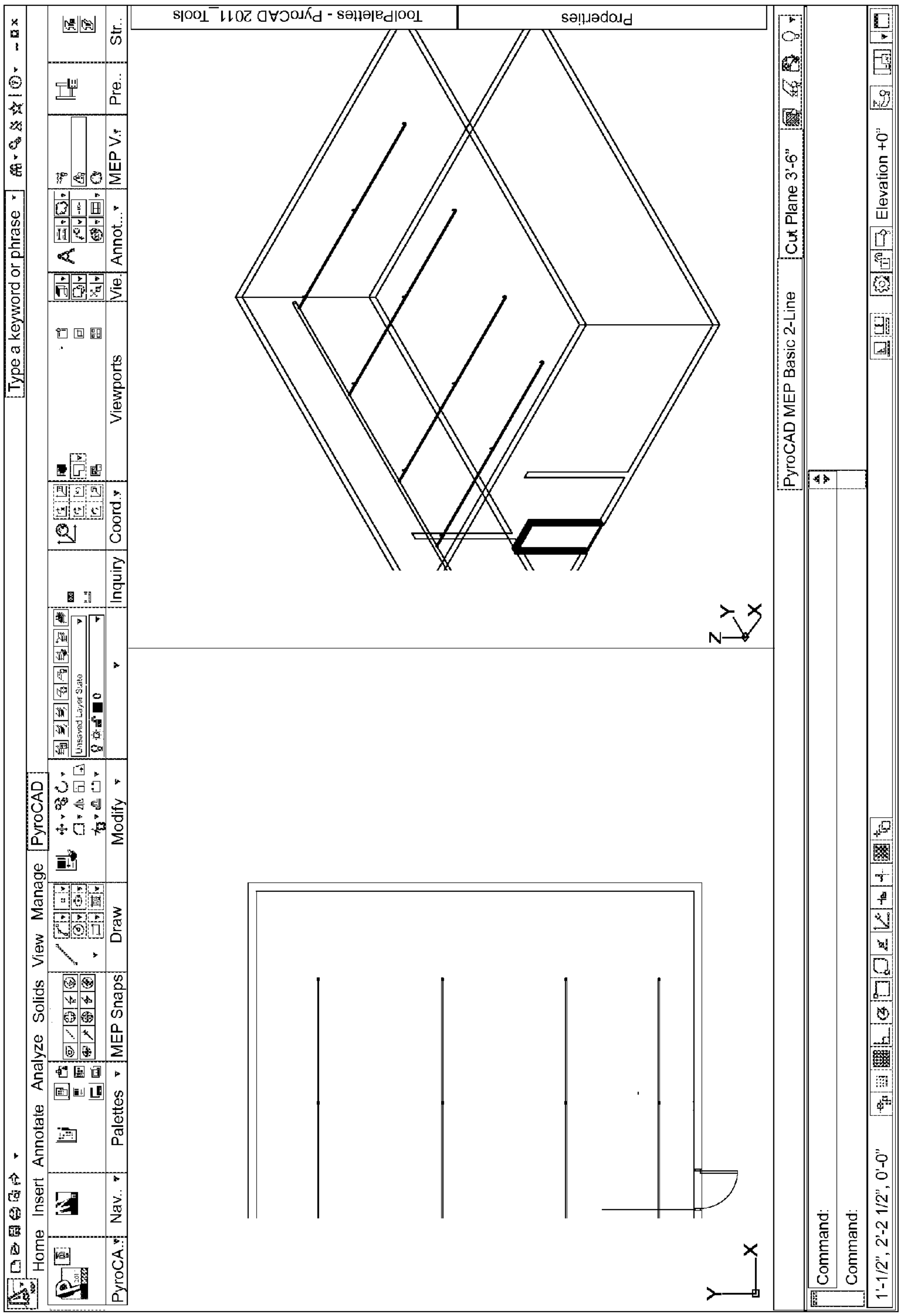

FIG. 51 is a screenshot of the AUTOCAD®/PYROCAD™ interface showing the completed branch line copies four times along the main pipe.

Figure 52:
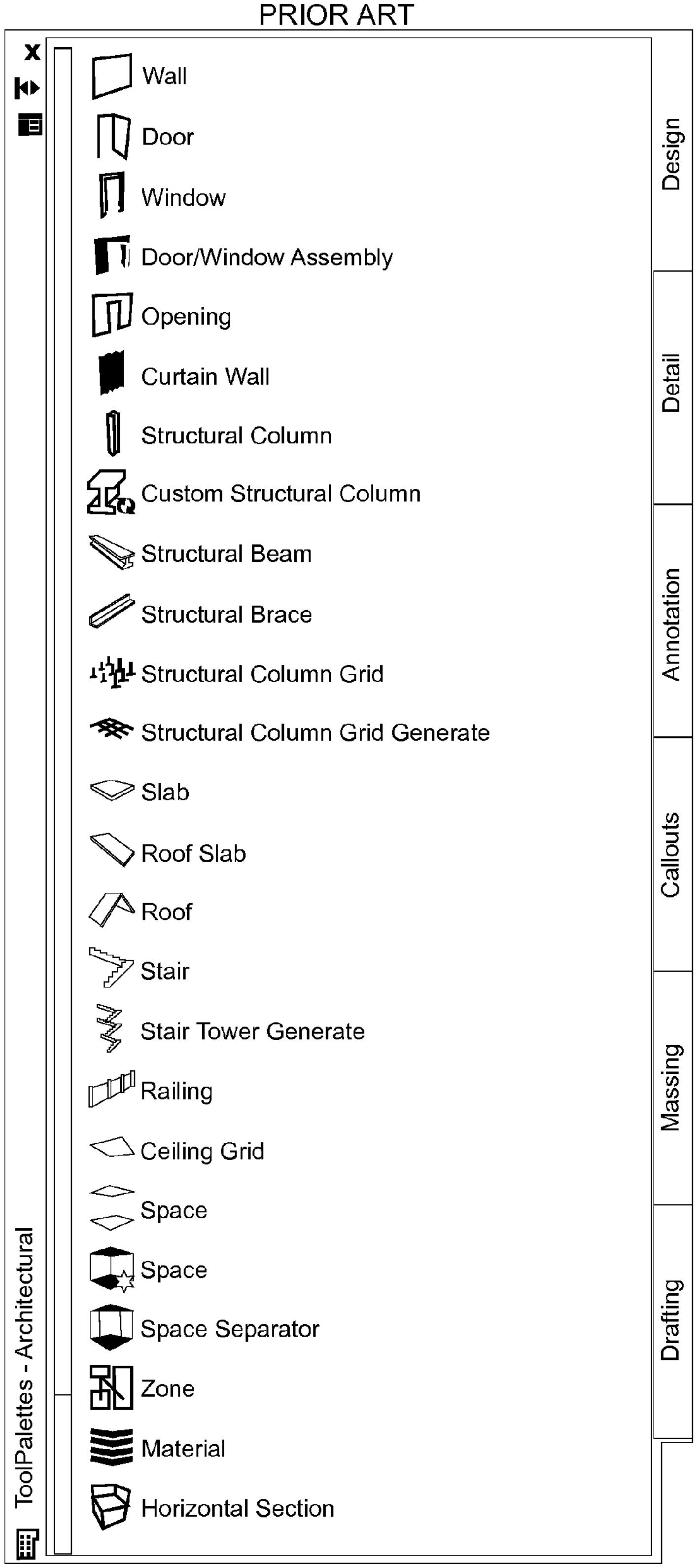

FIG. 52 is a screenshot of the AUTOCAD®/PYROCAD™ architectural tool palate used for drawing the supporting architectural objects.

Figure 53:
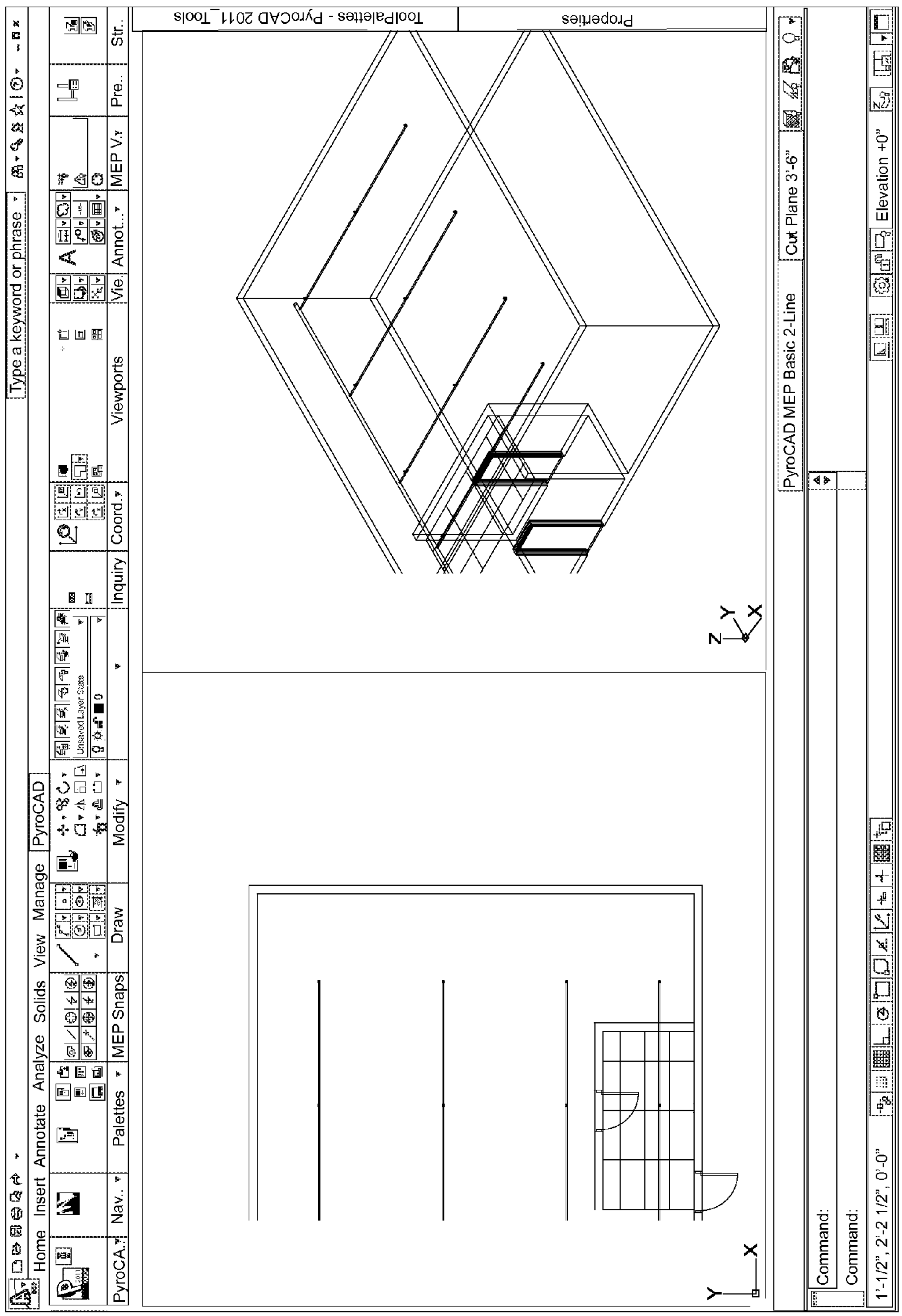

FIG. 53 is a screenshot of the AUTOCAD®/PYROCAD™ interface showing the newly added vestibule in the southwest corner of the building.

Figure 54:
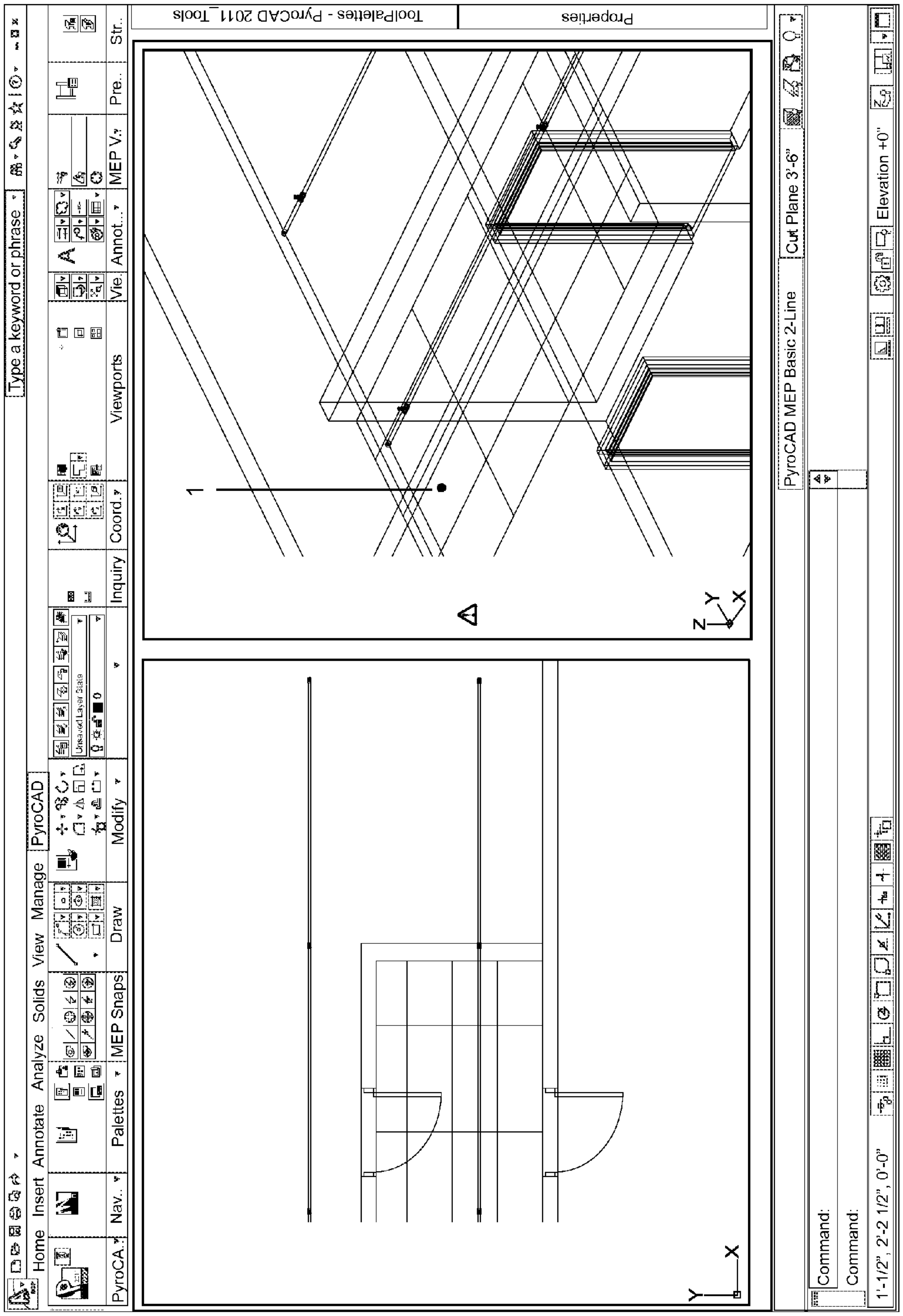

FIG. 54 is a screenshot of the AUTOCAD®/PYROCAD™ interface showing the newly added concealer sprinkler head in the vestibule ceiling.

Figure 55:
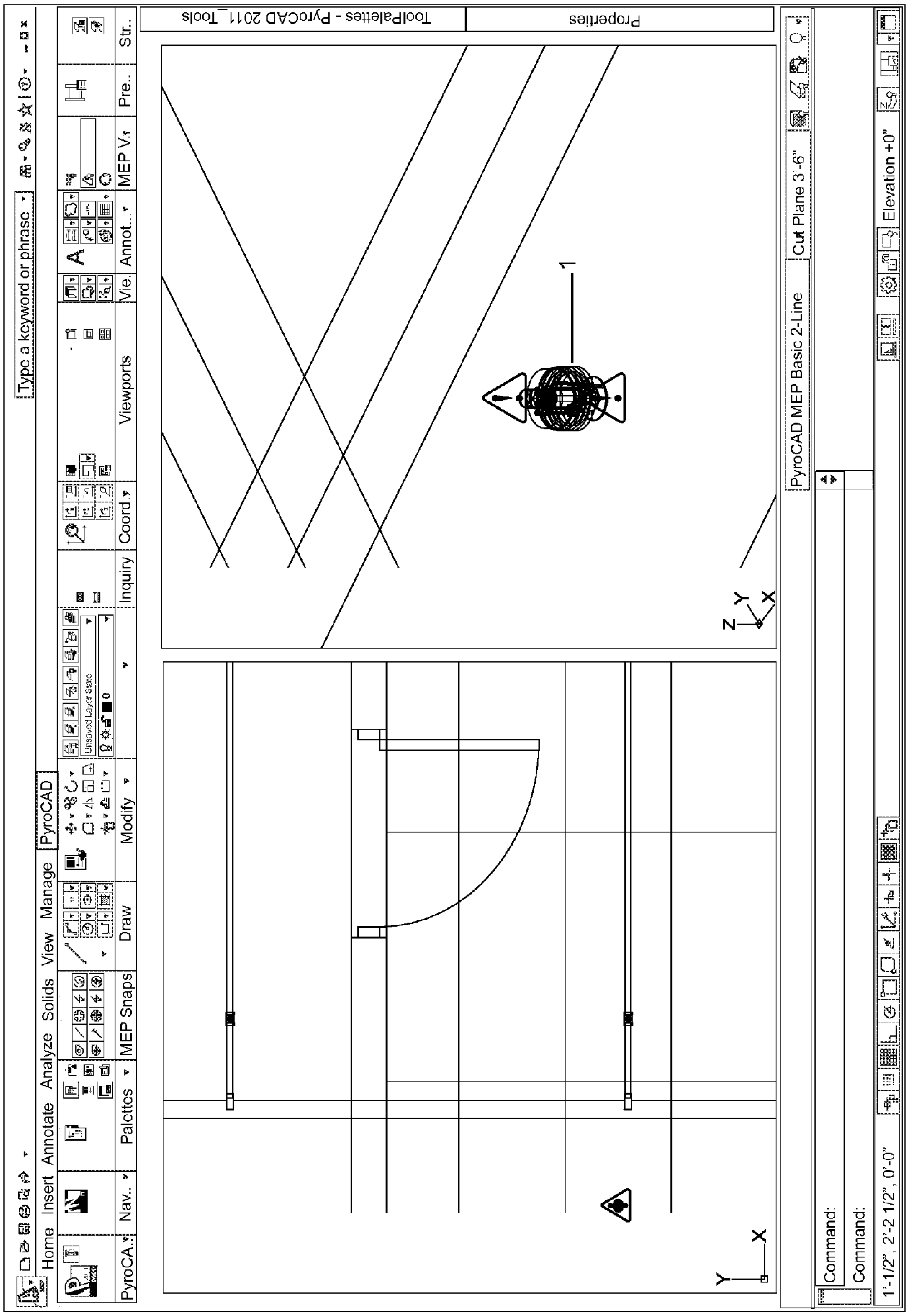

FIG. 55 is a screenshot of the AUTOCAD®/PYROCAD™ interface showing the the newly added concealer sprinkler head enlarged and the two warning signs representing the two pipe connectors that are unconnected.

Figure 56:
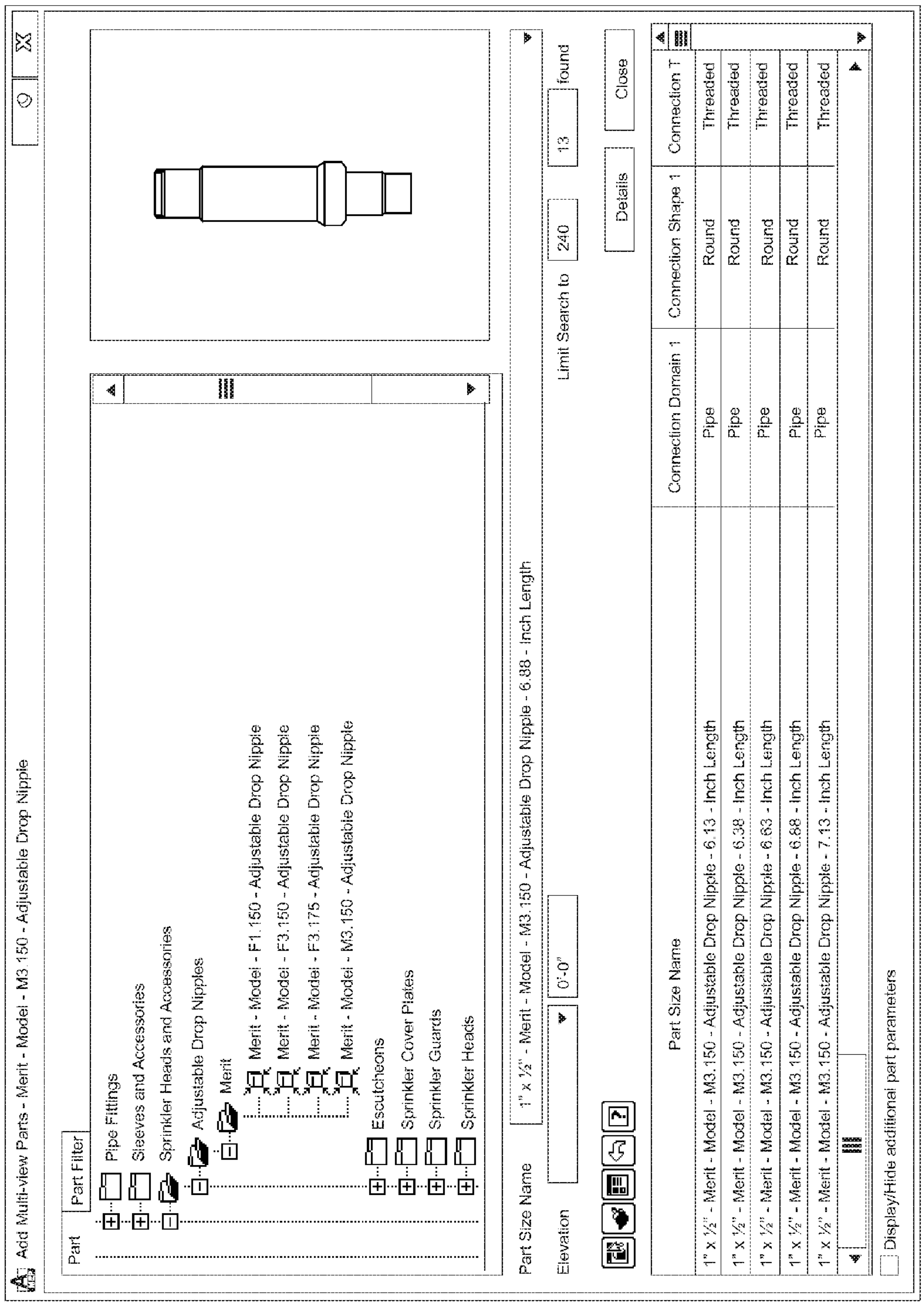

FIG. 56 is a screenshot of the AUTOCAD® MEP add multi-view parts form and the steps for adding an adjustable drop nipple into the drawing.

Figure 57:
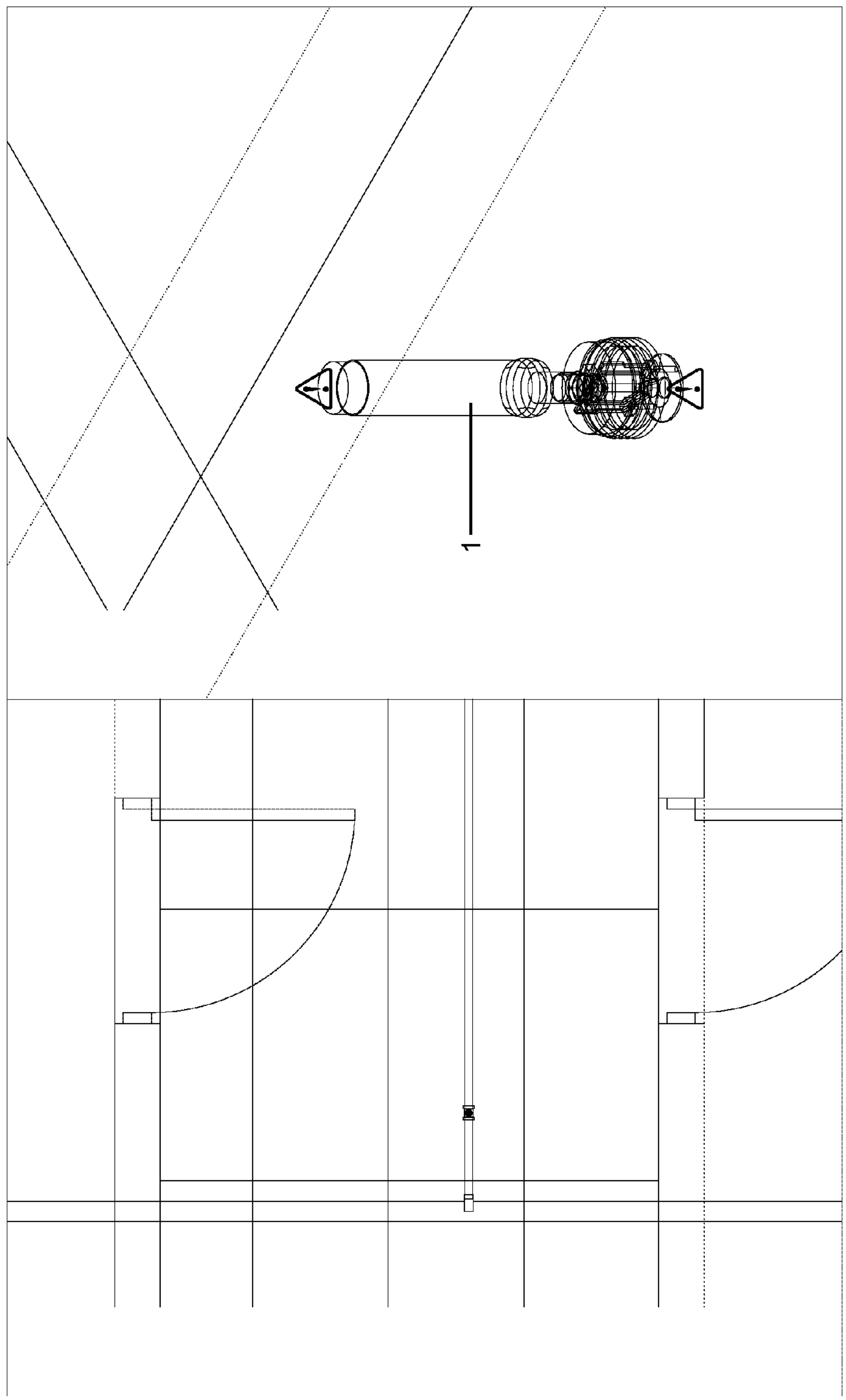

FIG. 57 is a screenshot of the AUTOCAD®/PYROCAD™ interface showing the newly added adjustable drop nipple attached to one of the concealer sprinkler head connectors.

Figure 58:
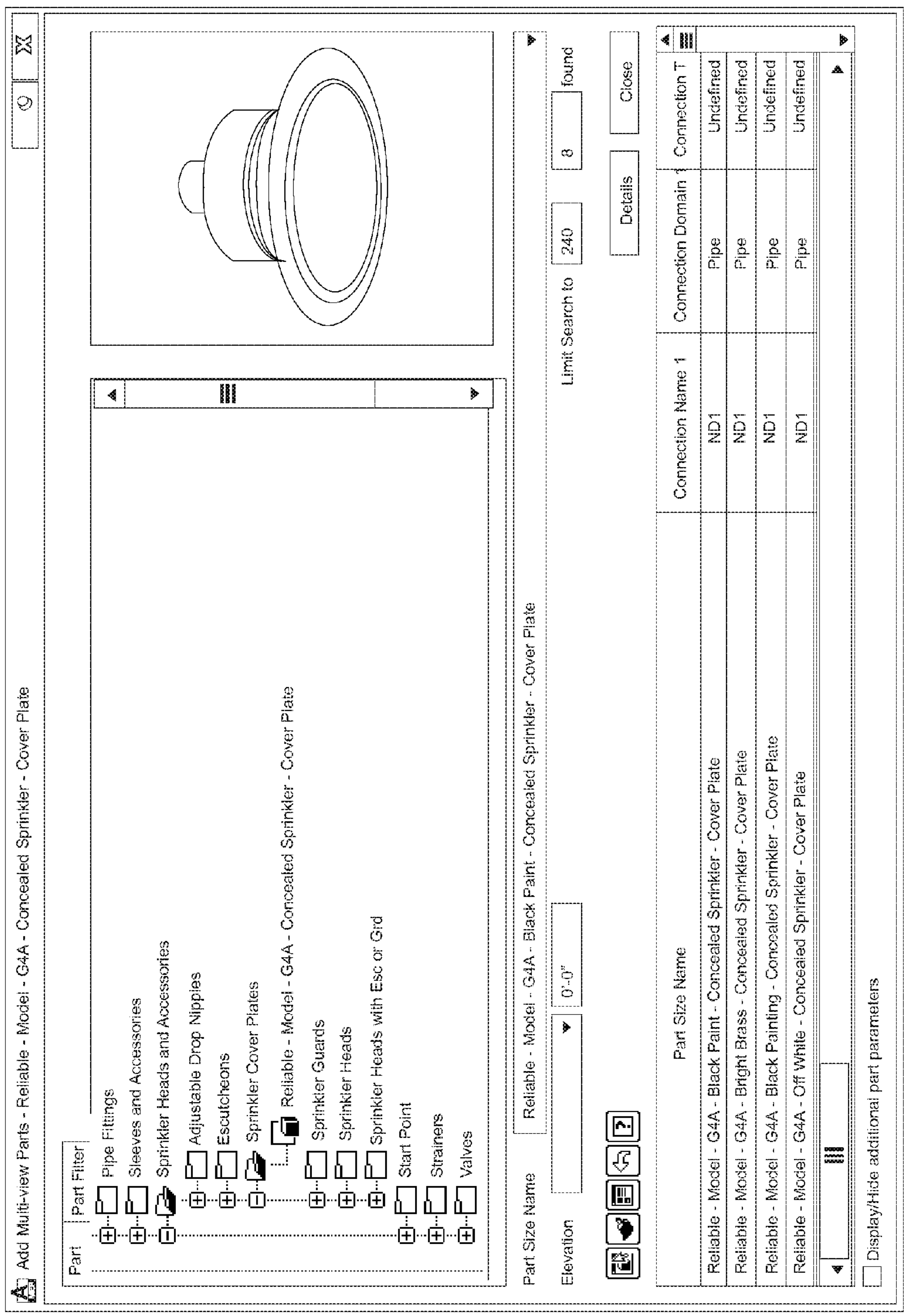

FIG. 58 is a screenshot of the AUTOCAD® MEP add multi-view parts form and the steps for adding a cover plate into the drawing.

Figure 59:
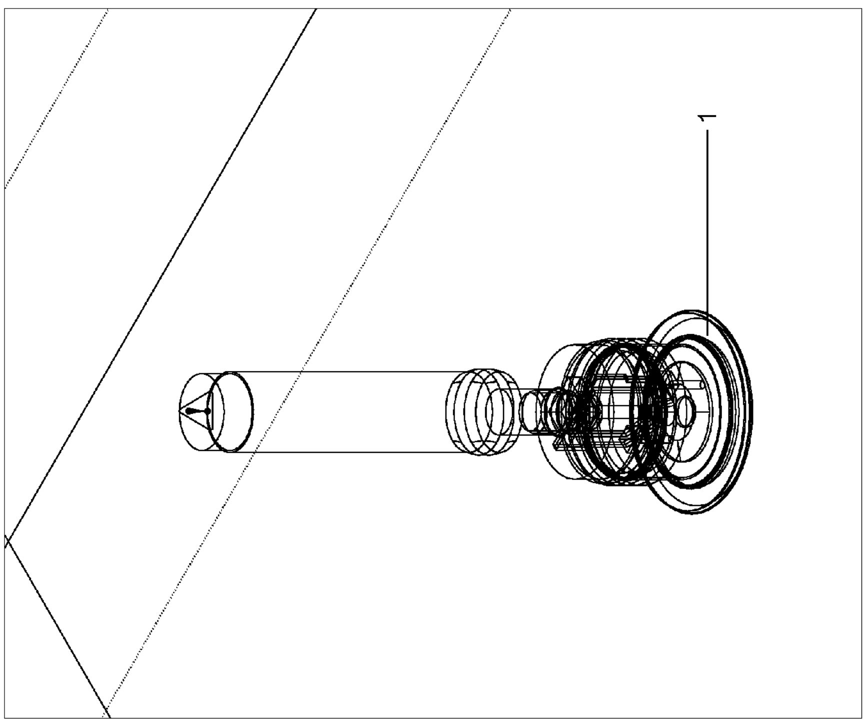

FIG. 59 is a screenshot of the AUTOCAD®/PYROCAD™ interface showing the newly added cover plate attached to the remaining connector on the concealer sprinkler heads.

Figure 60:
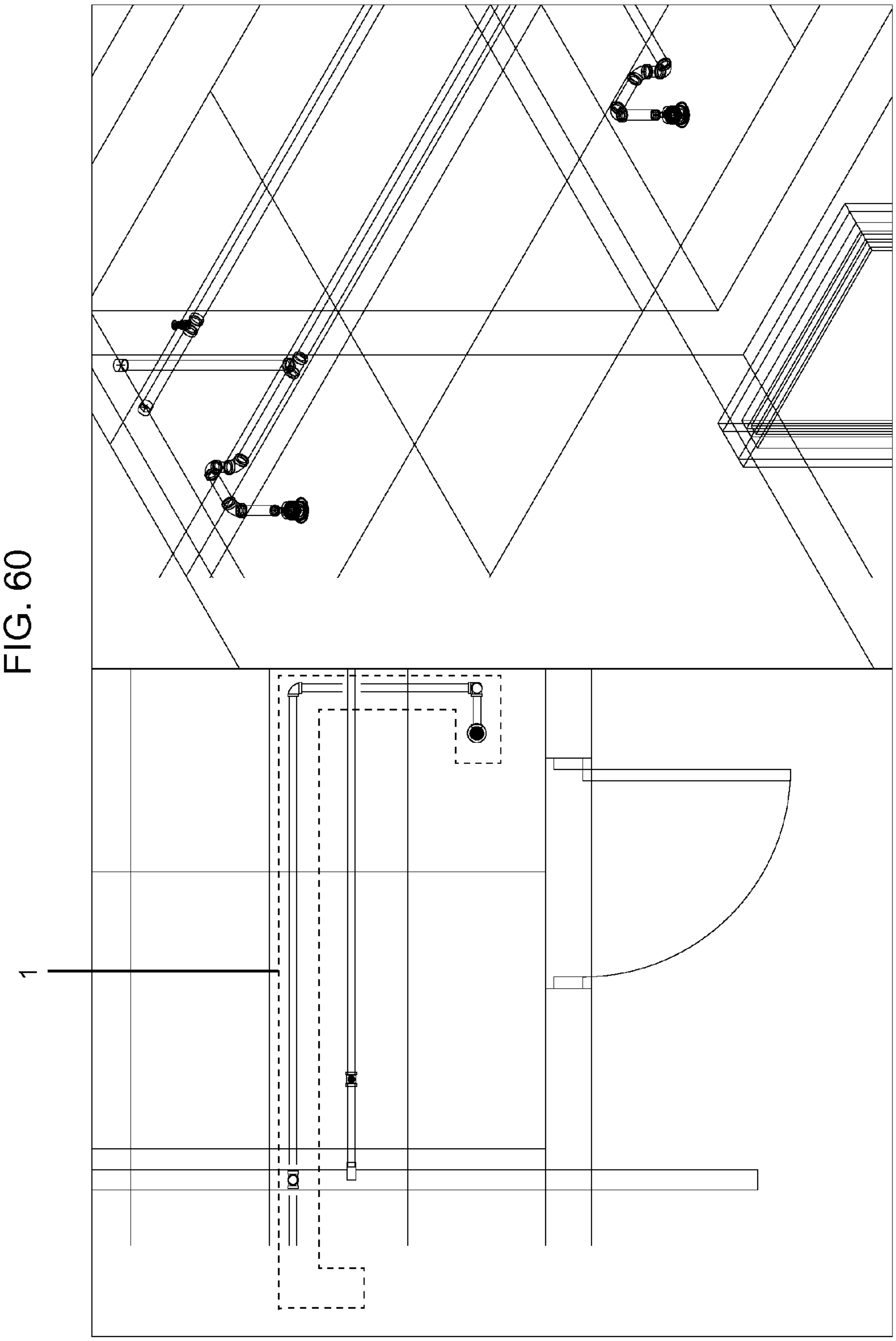

FIG. 60 is a screenshot of the AUTOCAD®/PYROCAD™ interface showing the newly added branch piping connecting the concealer sprinkler heads back to the main pipe.

Figure 61:
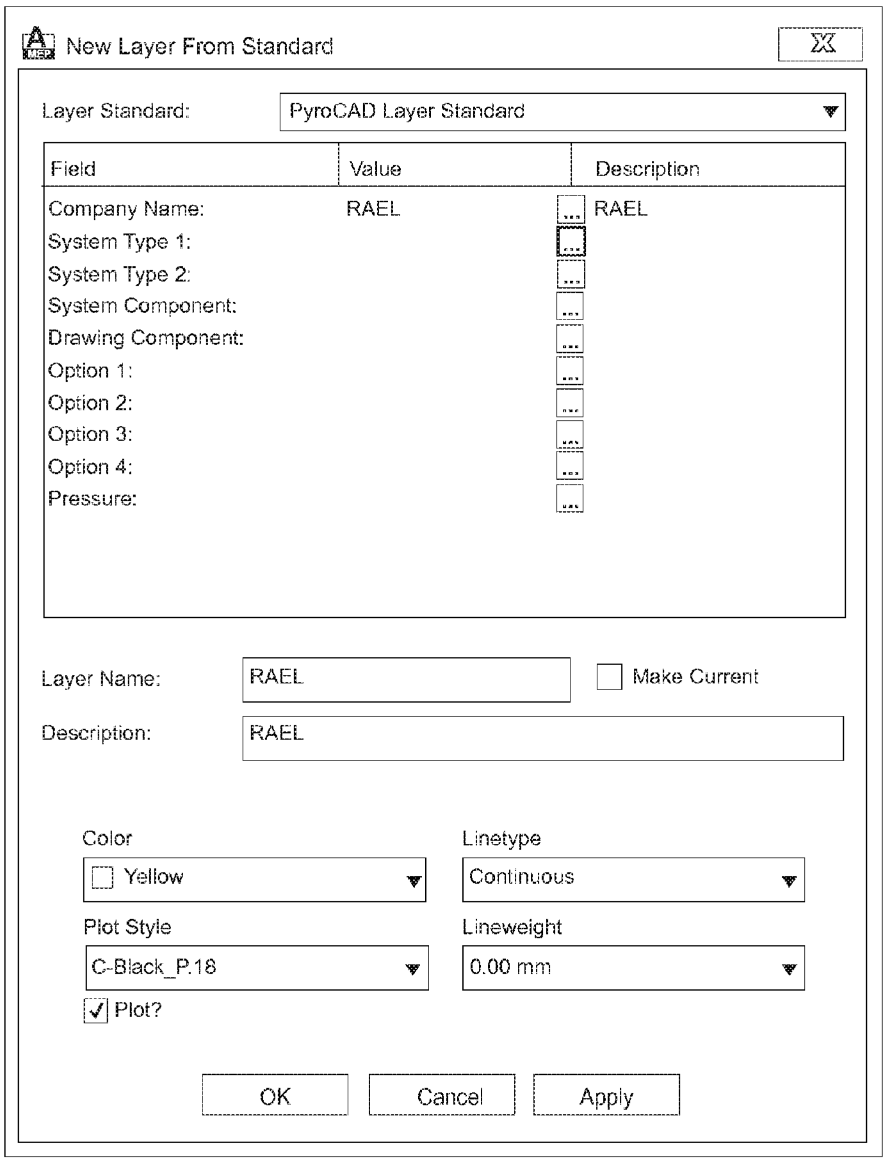

FIG. 61 is a screenshot of the AUTOCAD® MEP new layer from standard form.

Figure 62:
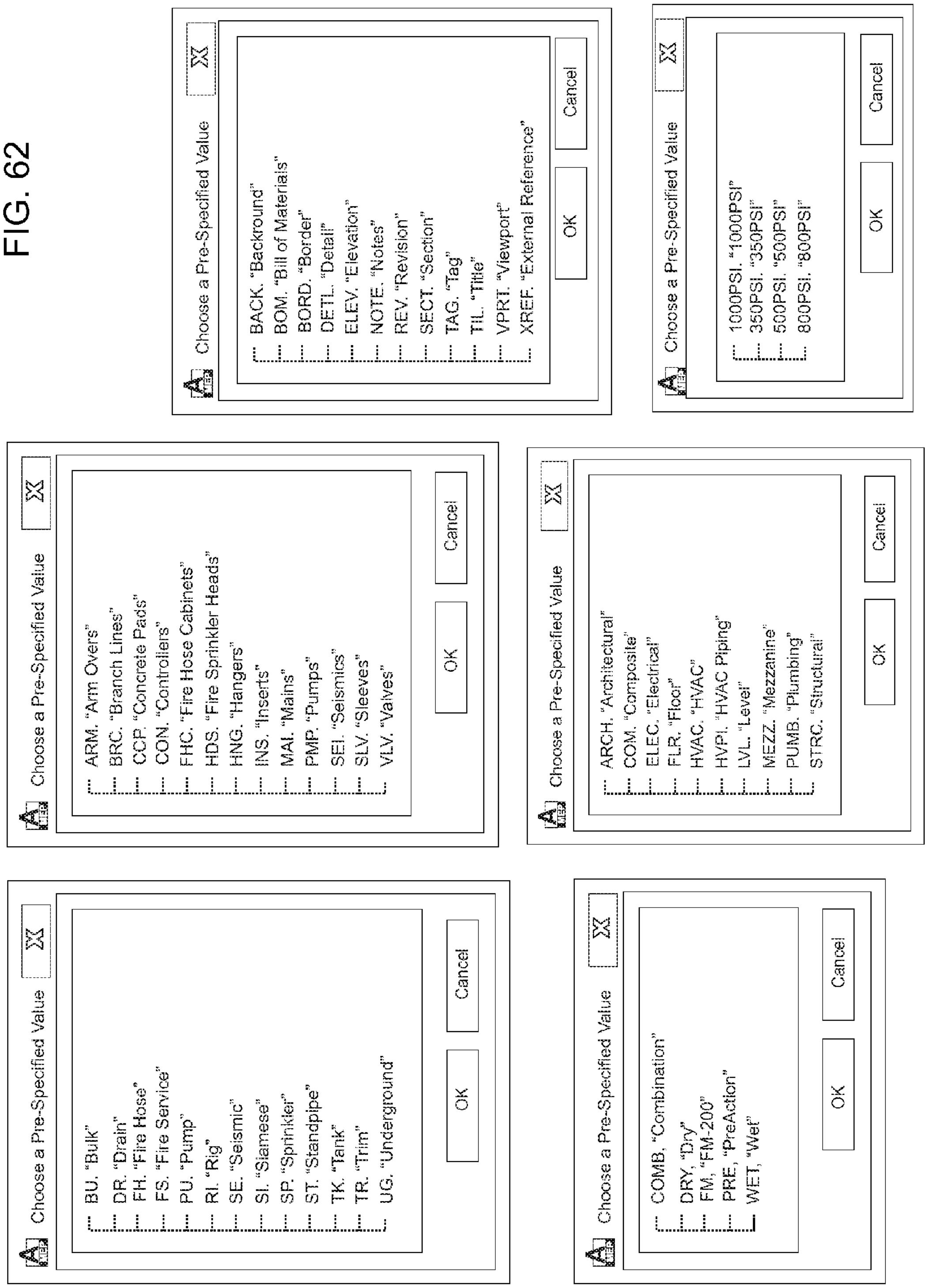

FIG. 62 is a screenshot of the child forms of the AUTOCAD® MEP new layer from standard form showing the choices that make up the PYROCAD™ layer standard.

Figure 63:
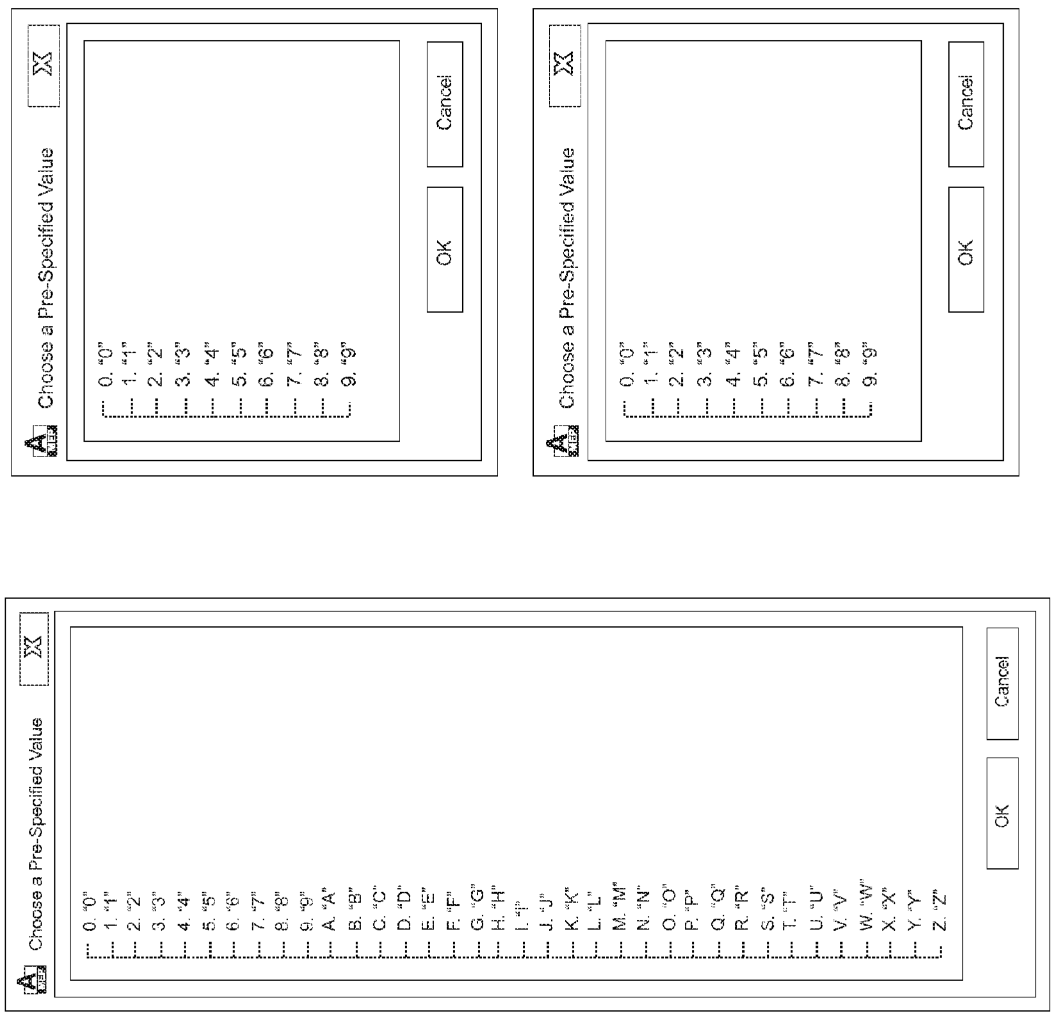

FIG. 63 is a continuation of FIG. 62.

Figure 64:
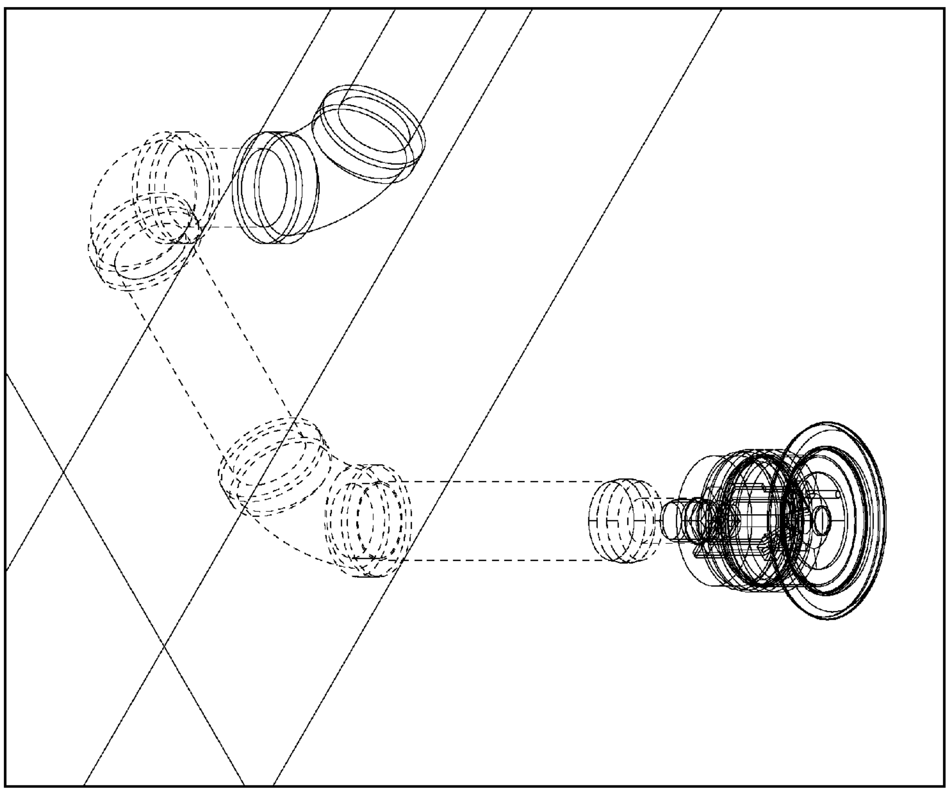

FIG. 64 is an enlarged view of the concealer sprinkler head in the vestibule ceiling connected to the branch line with the arm over portion highlighted.

Figure 65:
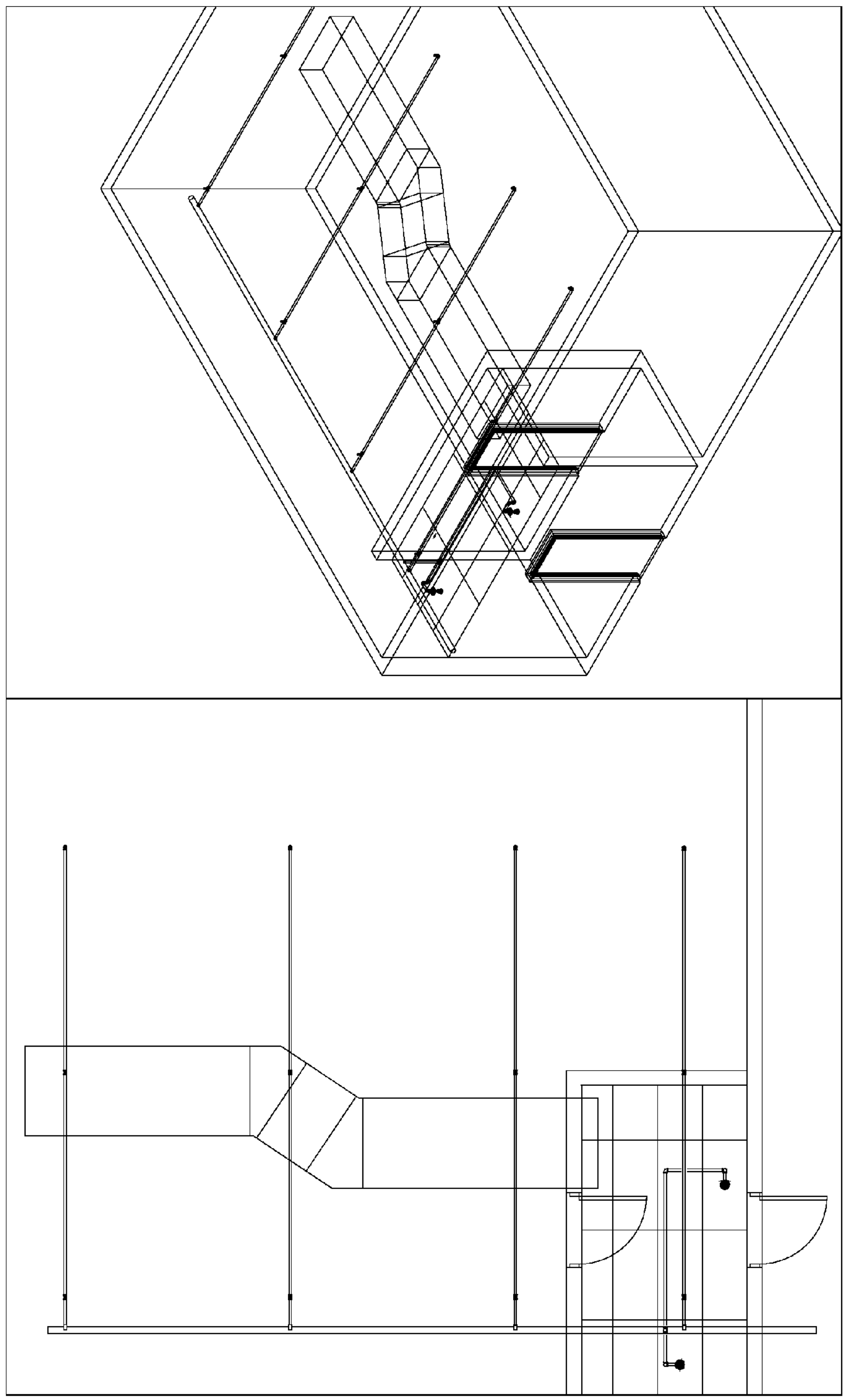

FIG. 65 is an enlarged screenshot of the fire protection piping example and the architectural background in a top and isometric view showing the newly added duct.

Figure 66:
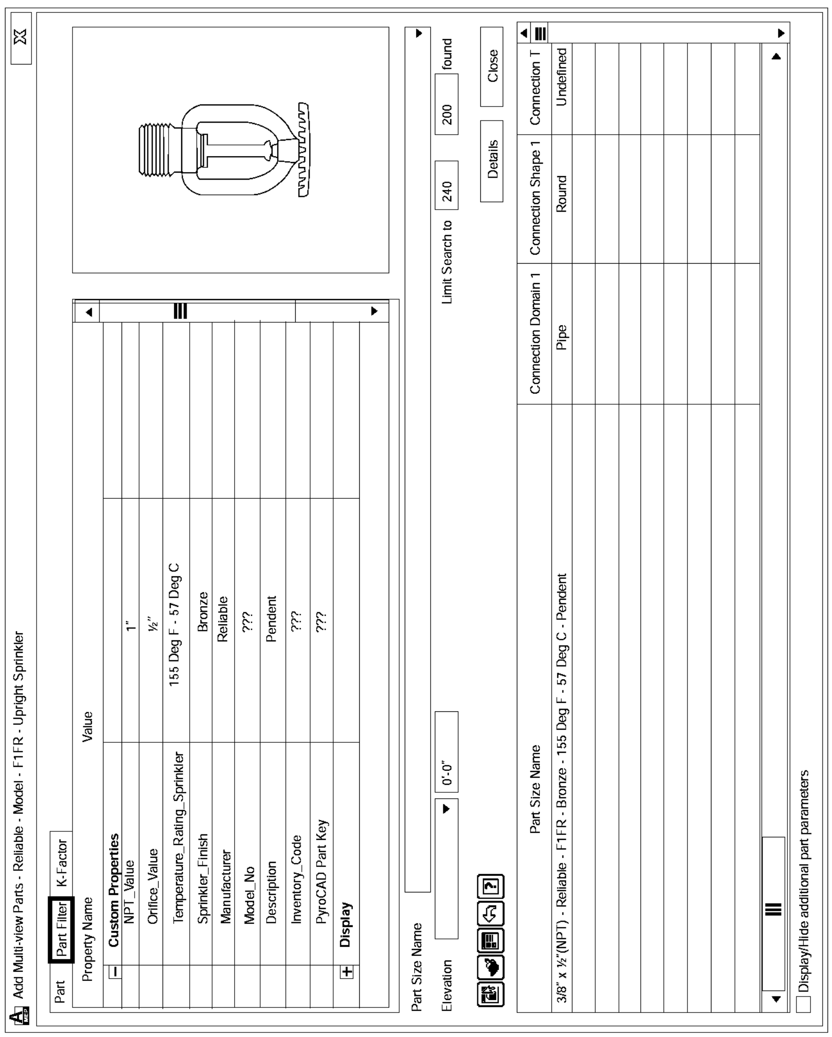

FIG. 66 is a screenshot of the AUTOCAD® MEP add multi-view parts form used to add the pendent sprinkler into the drawing.

Figure 67:
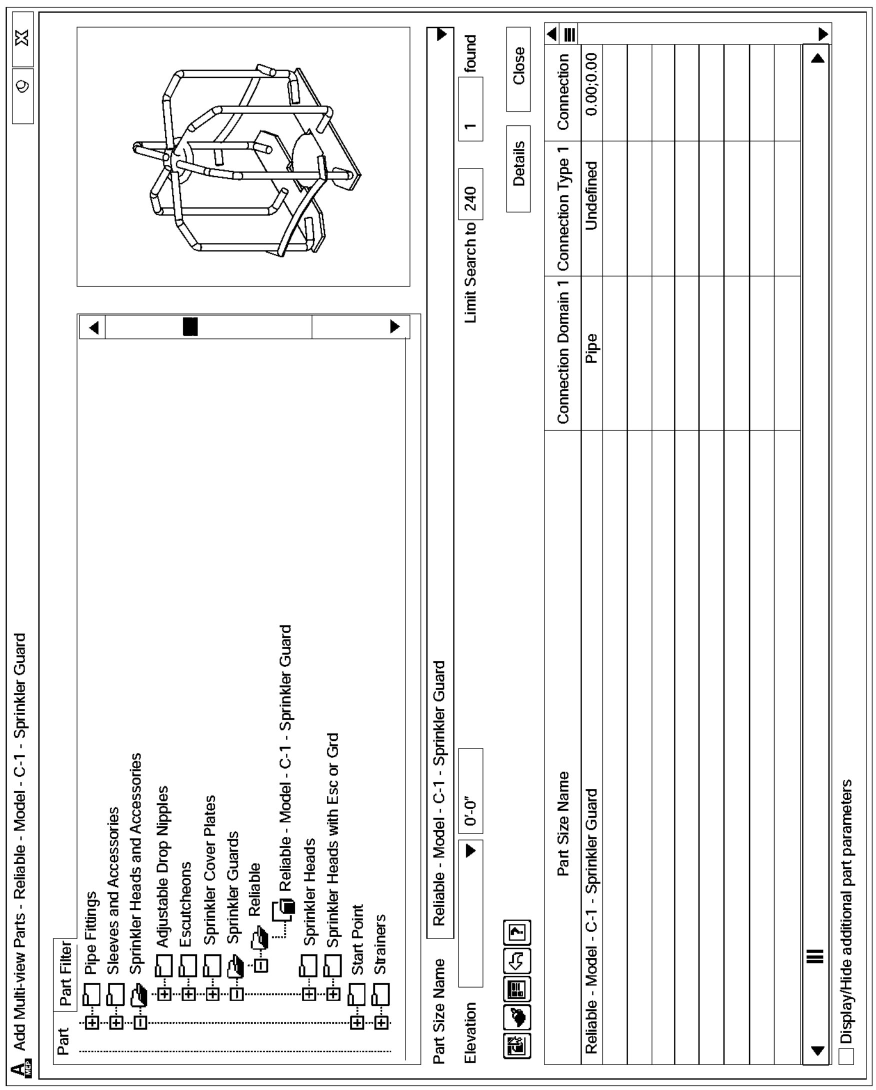

FIG. 67 is a screenshot of the AUTOCAD® MEP add multi-view parts form used to add the sprinkler guard into the drawing.

Figure 68:
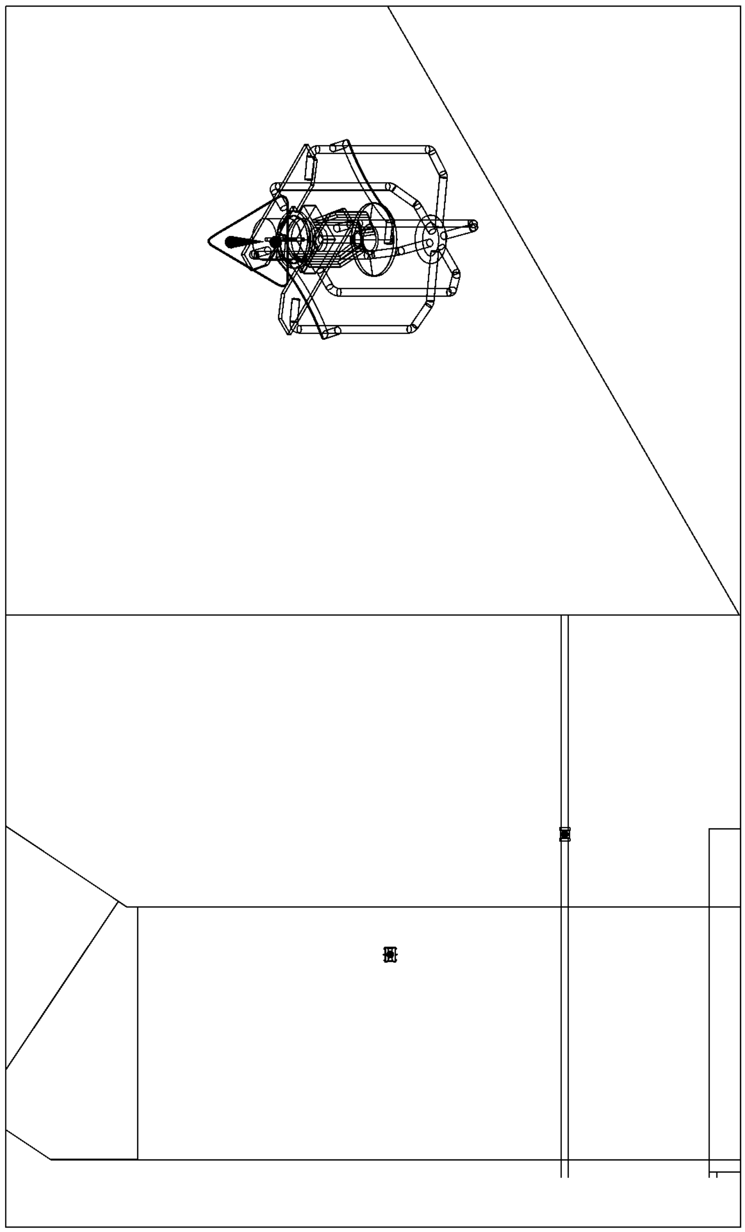

FIG. 68 is an enlarged view of the pendent sprinkler head with a protective guard under the duct.

Figure 69:
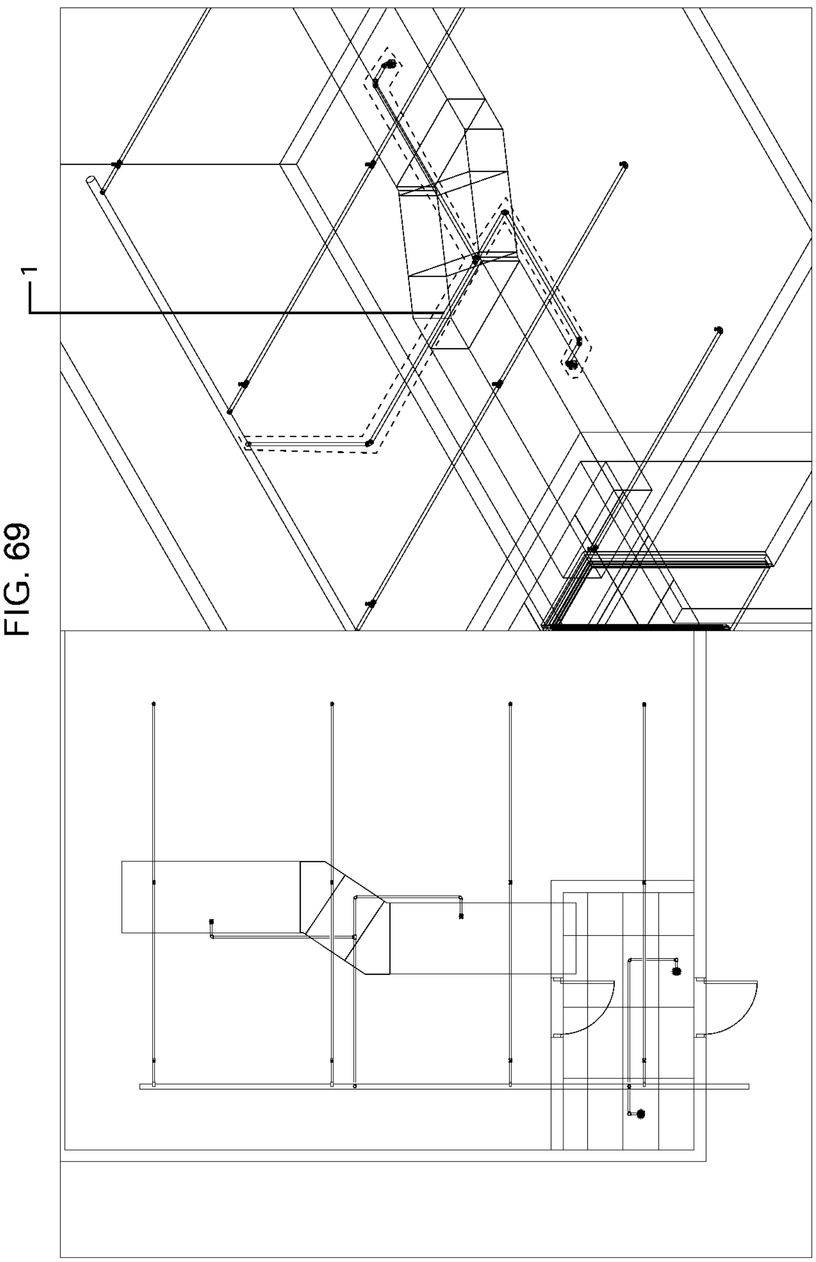

FIG. 69 is an enlarged view of the two pendent sprinkler heads with protective guards under the duct and the newly added branch piping connecting them back to the main pipe.

Figure 70:
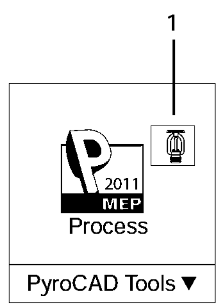

FIG. 70 is an illustration of the PYROCAD™ pyhd command button located on the PYROCAD™ panel show in 4.2.

Figure 71:
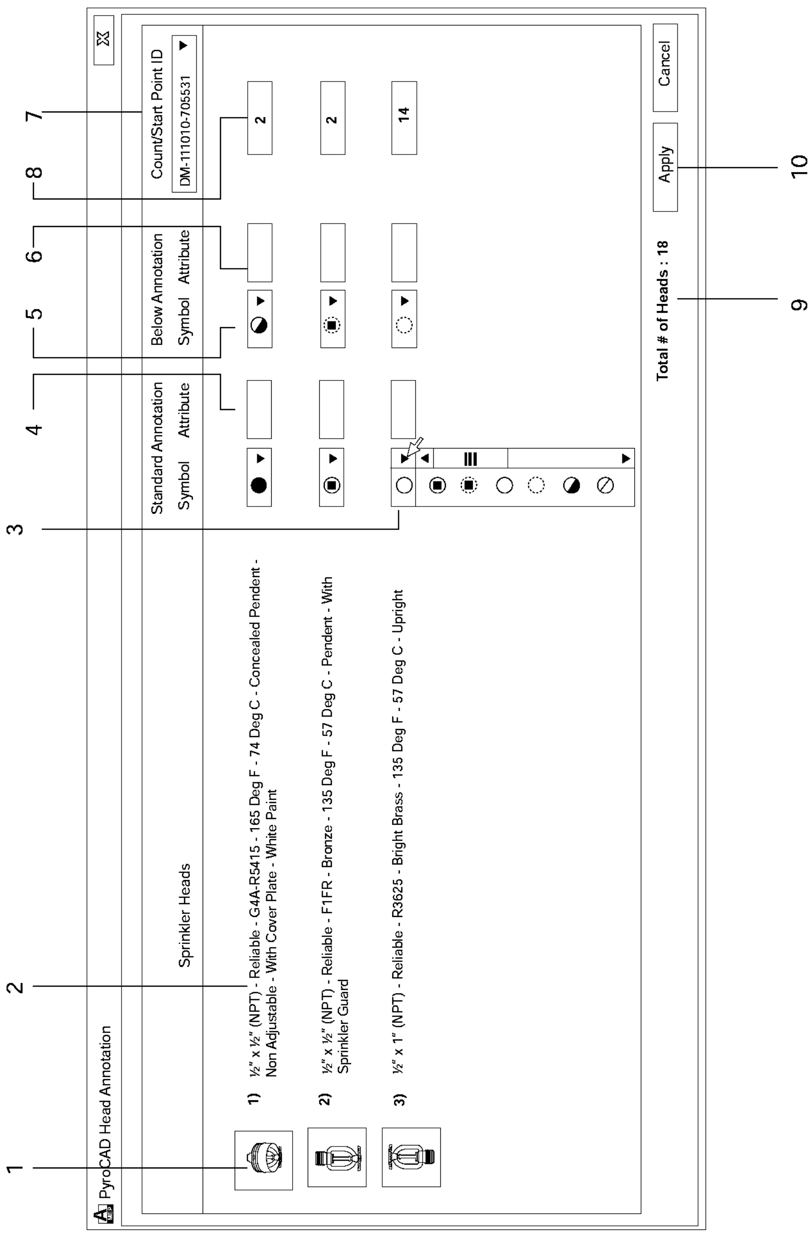

FIG. 71 is a screenshot of the PYROCAD™ head annotation form used to attach block symbols to their matching multi-view part sprinkler head.

Figure 72:
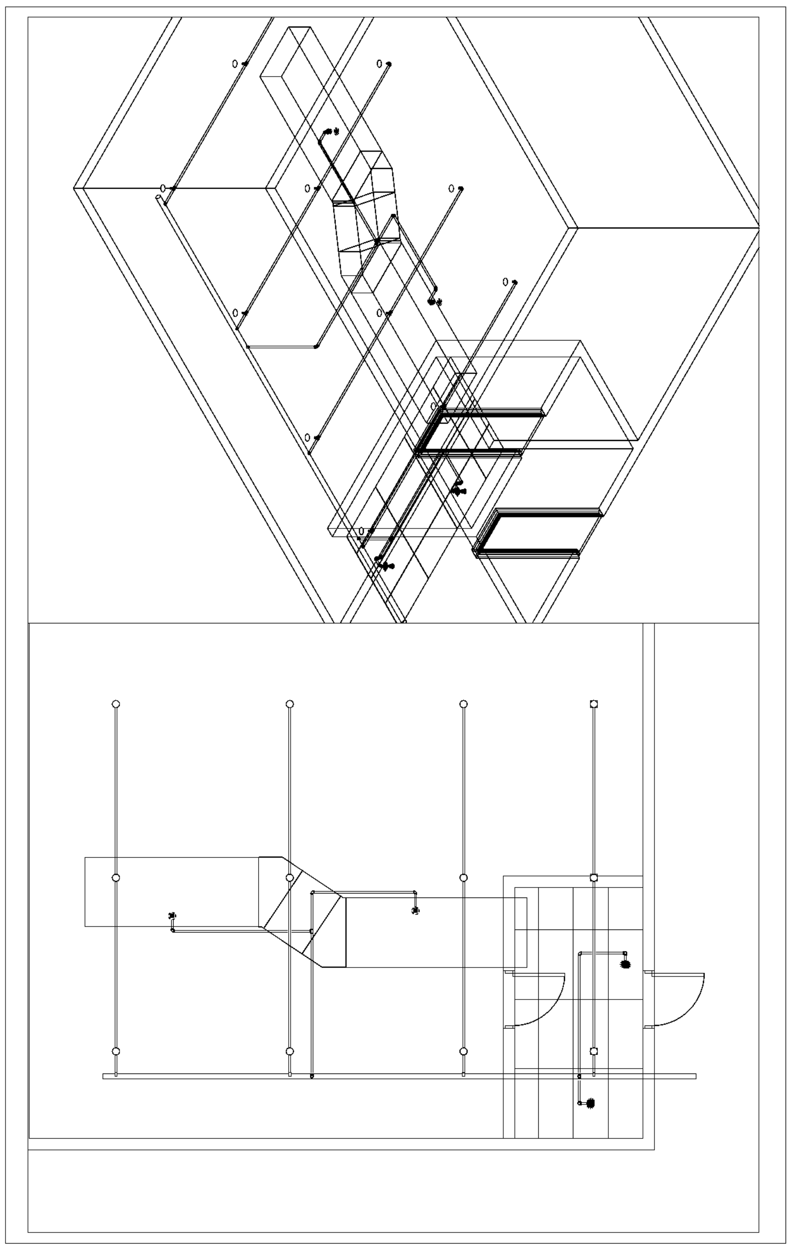

FIG. 72 is a screenshot of a view of the piping system with the newly created Head annotation blocks attached to their matching multi-view parts.

Figure 73:
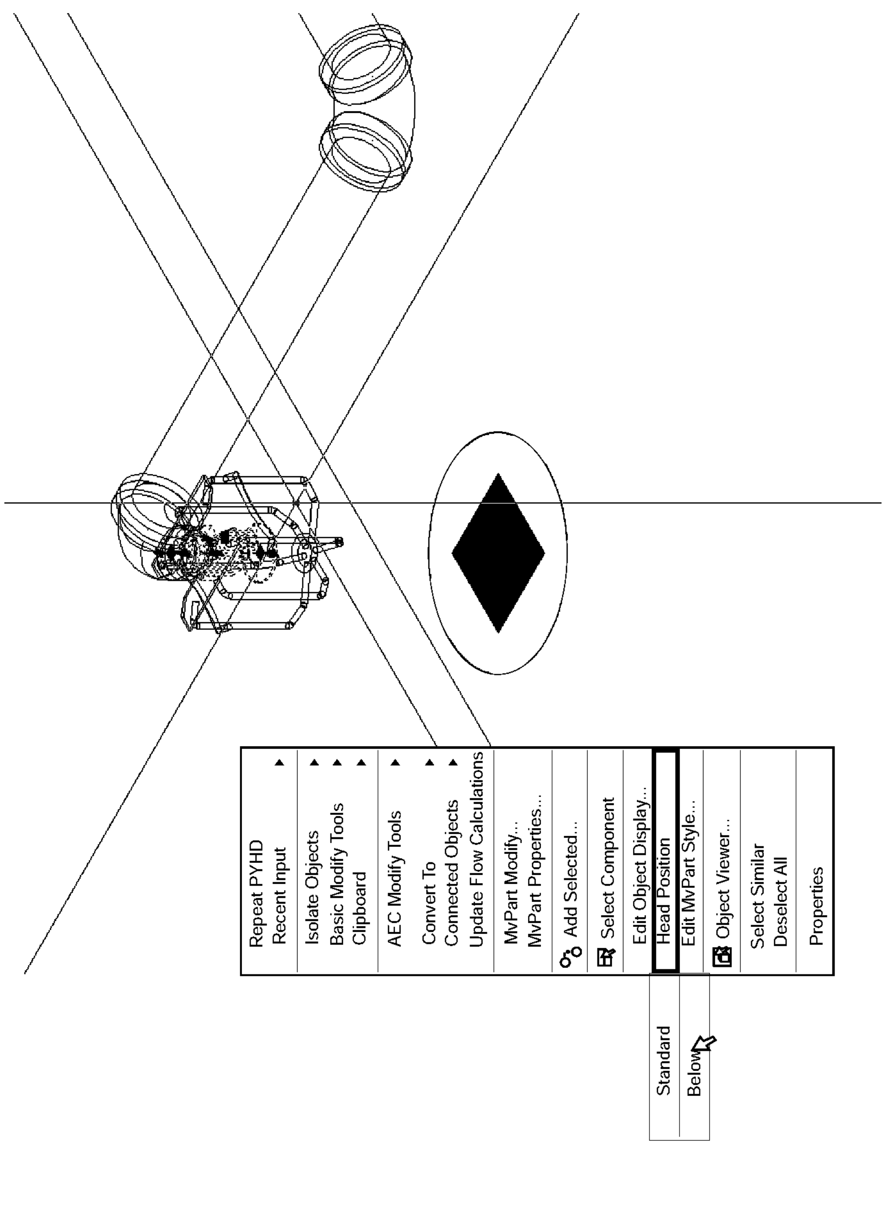

FIG. 73 is a screenshot of the menu displayed when the user right clicks while a sprinkler head is selected.

Figure 74:
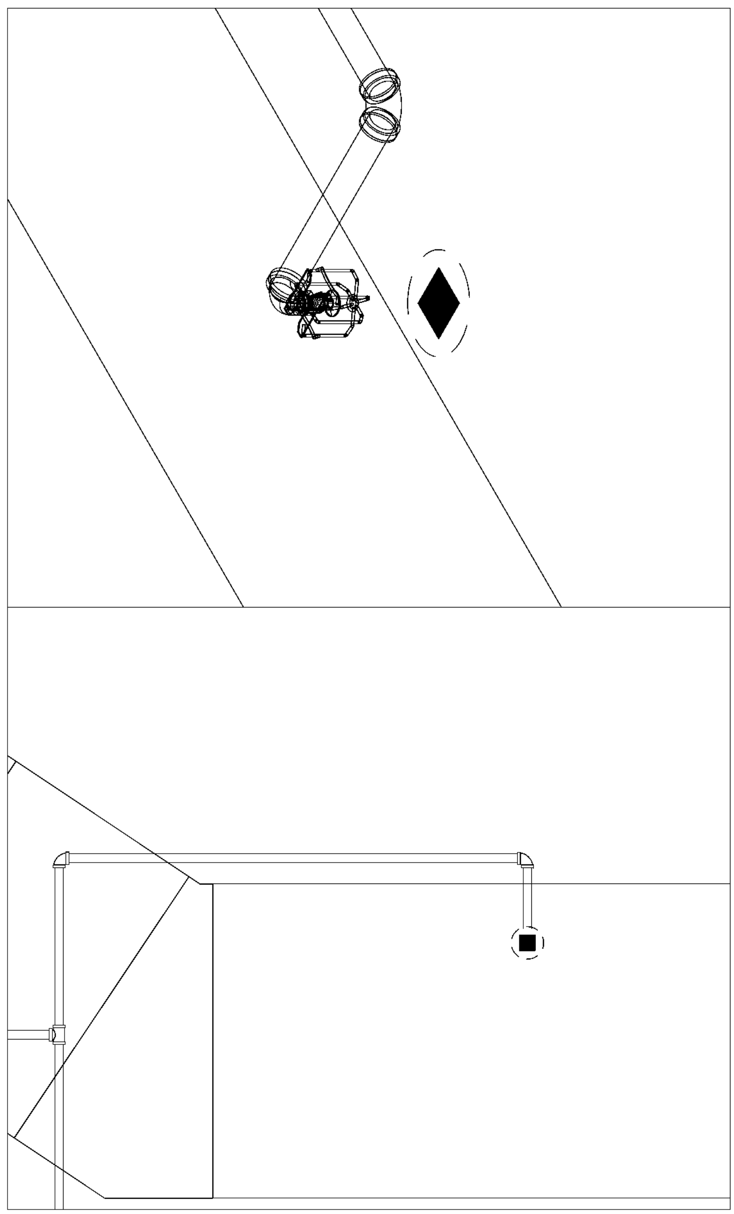

FIG. 74 is an enlarged view of the sprinkler head with annotation block symbol attached and switched to the below symbol.

Figure 75:
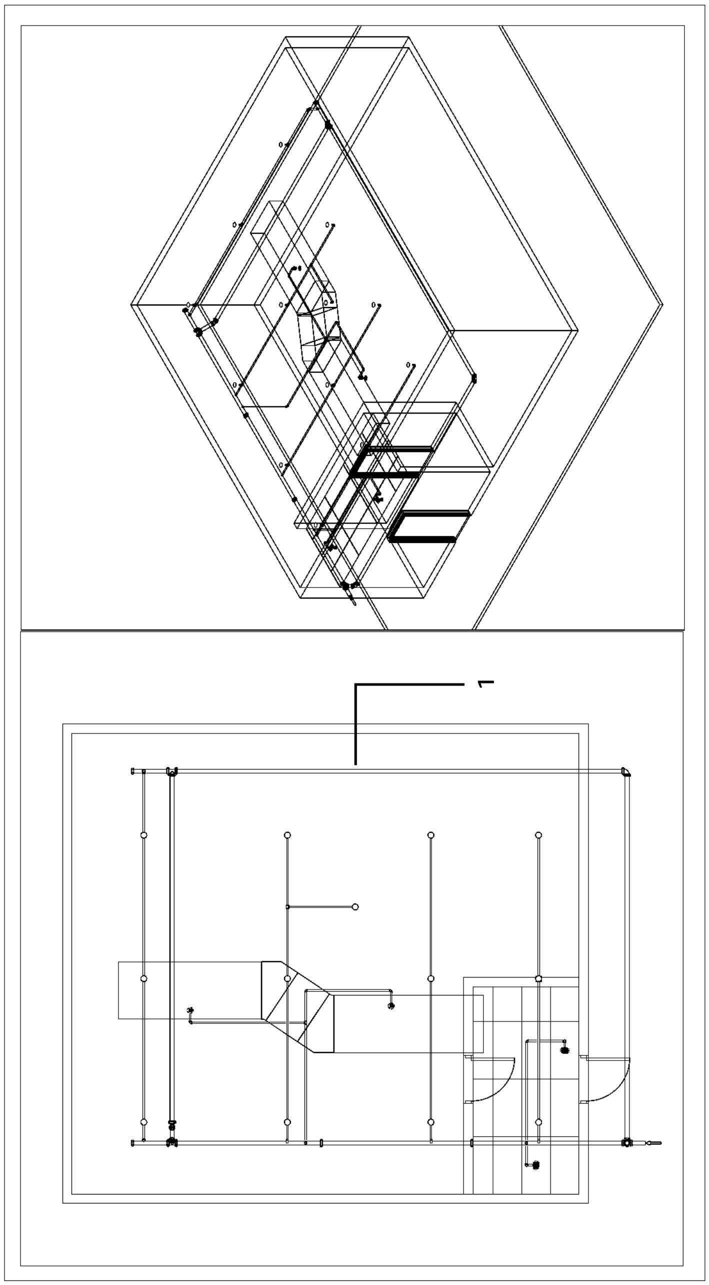

FIG. 75 is a screenshot of the newly added main piping forming a loop of main piping.

Figure 76:
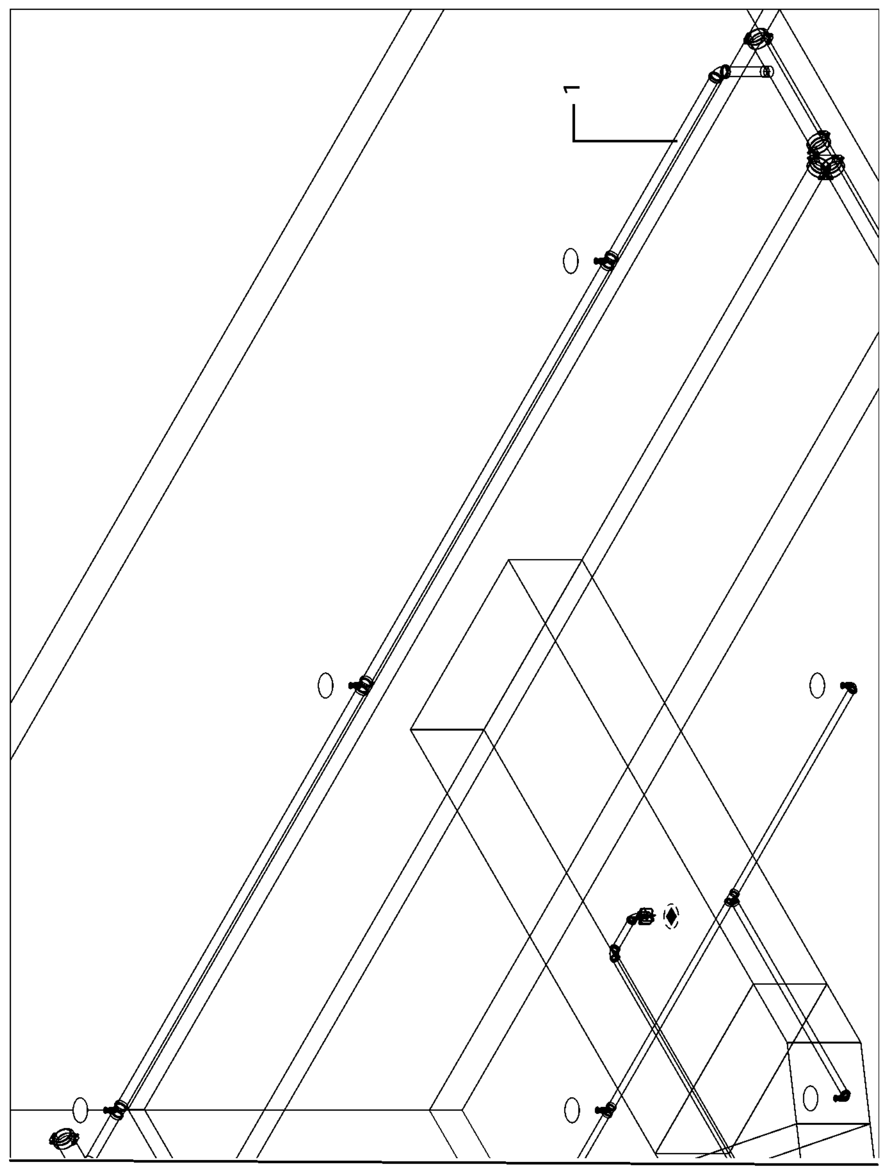

FIG. 76 is a screenshot of the newly added branch piping forming a cross connection.

Figure 77:
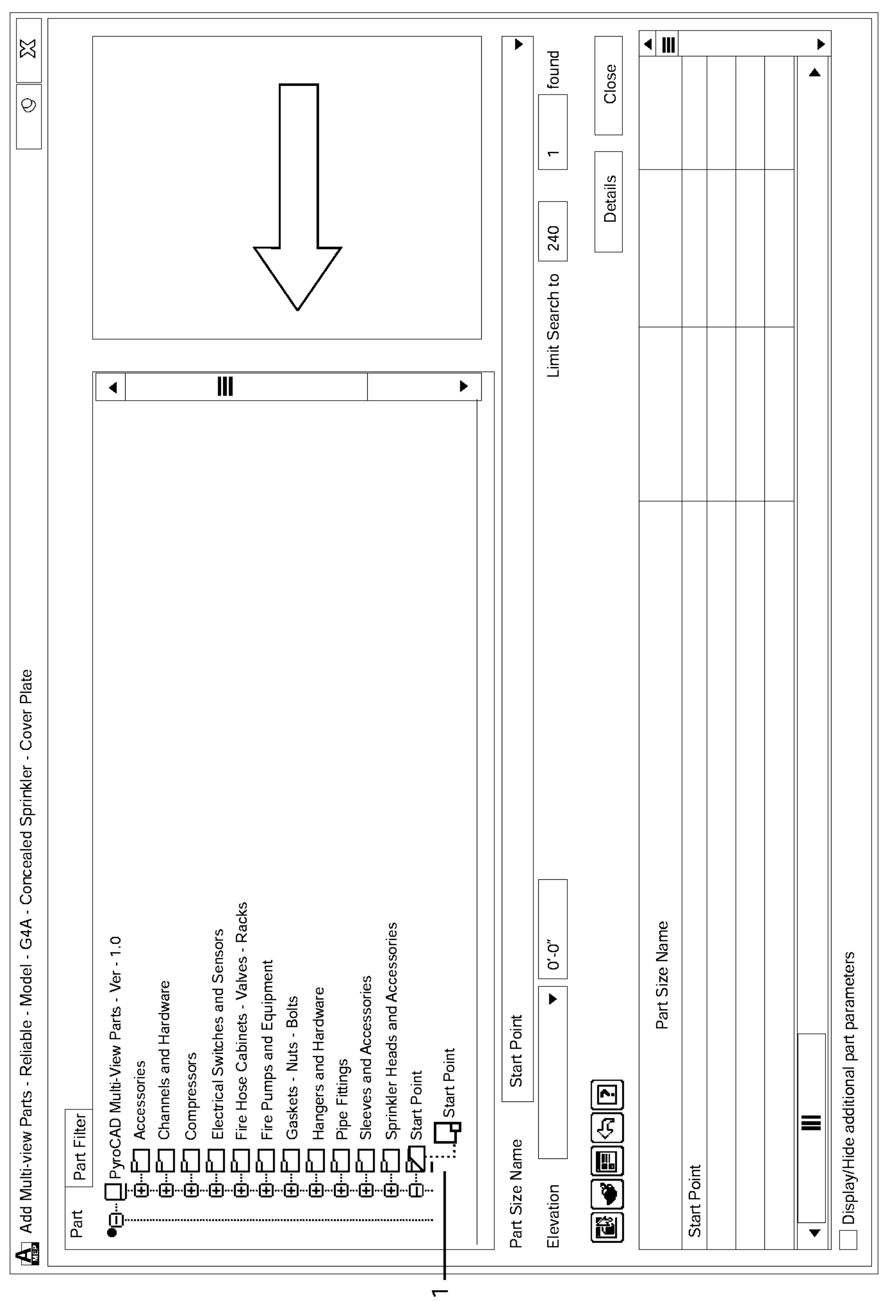

FIG. 77 is a screenshot of the AUTOCAD® MEP add multi-view parts form used to add the PYROCAD™ start point into the drawing.

Figure 78:
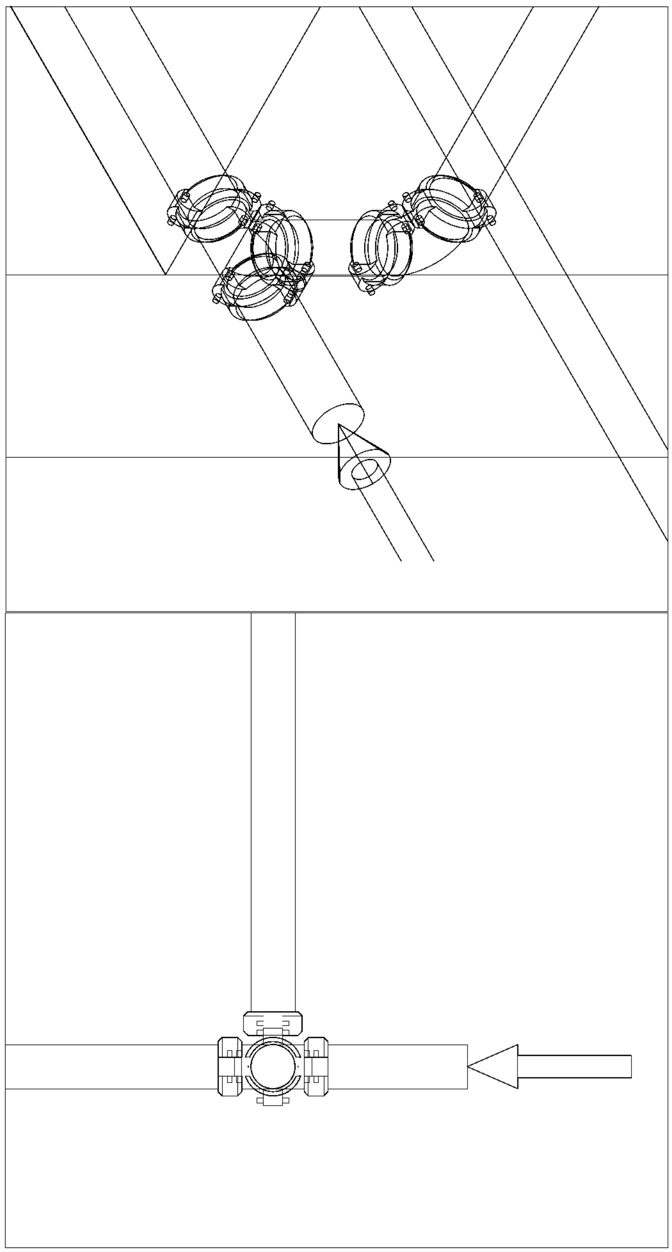

FIG. 78 is an enlarged view of the PYROCAD™ start point-placed on the supply point of the main pipe.

Figure 79:
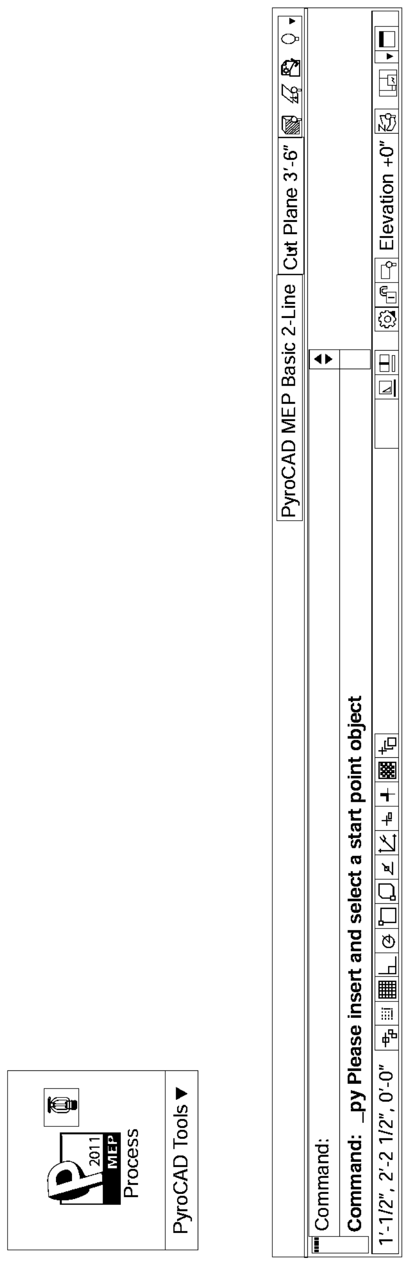

FIG. 79 is a screenshot of the PYROCAD™ py command button located on the PYROCAD™ panel in 4.2 and the AUTOCAD® MEP command line prompting the user to insert and select a start point.

Figure 80:
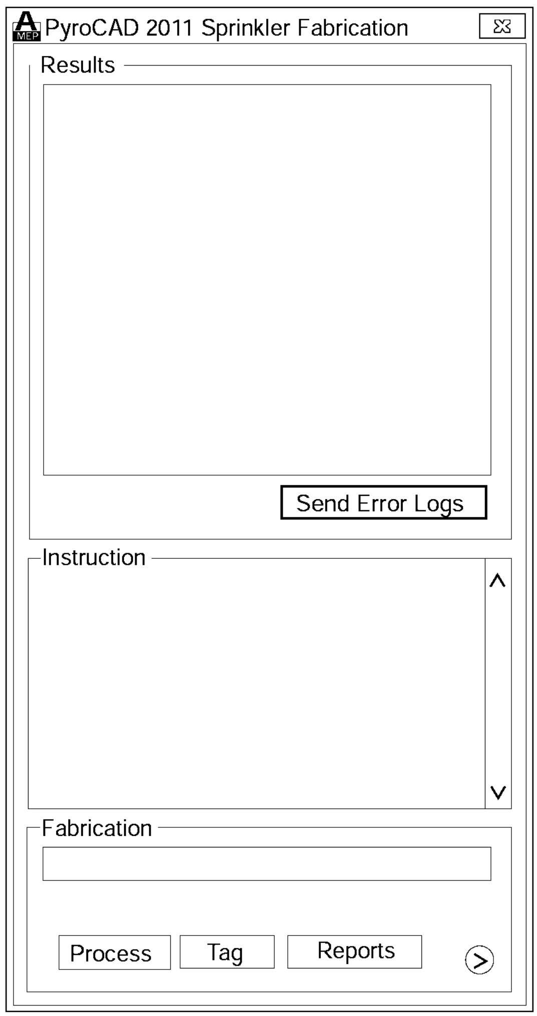

FIG. 80 is a screenshot of the PYROCAD™ application form named PYROCAD 2011 sprinkler fabrication displayed in a closed state.

Figure 81:
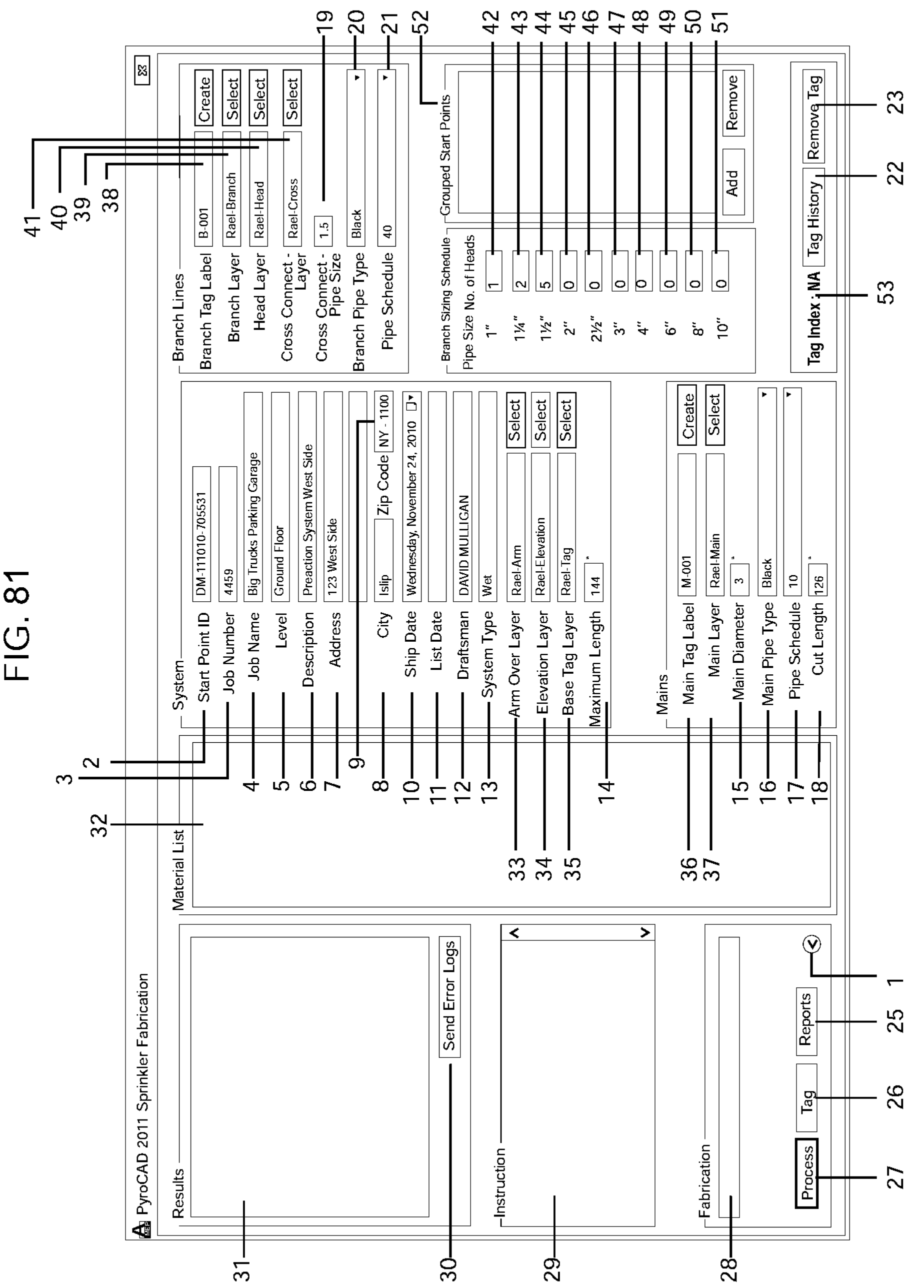

FIG. 81 is a screenshot of the PYROCAD™ application form in an open state.

Figure 82:
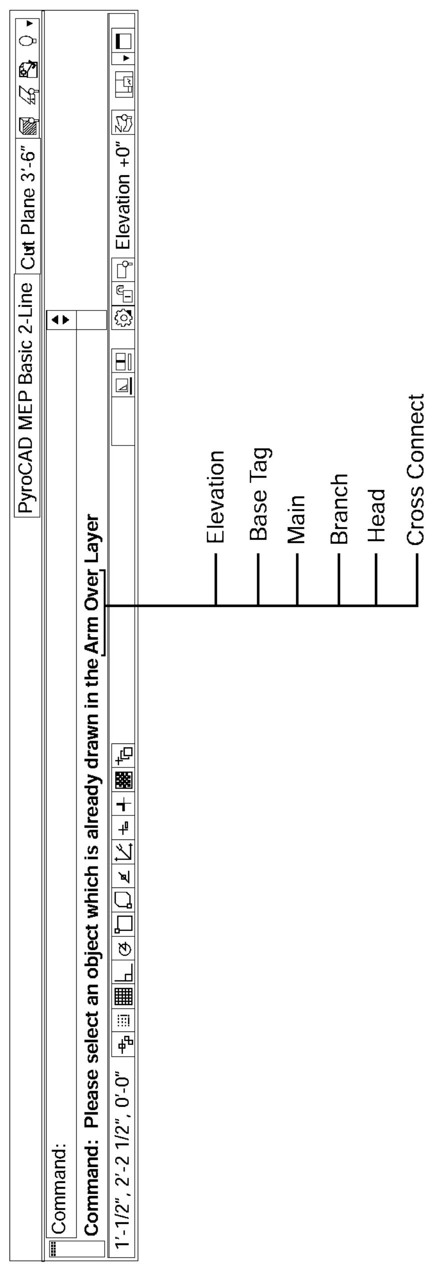

FIG. 82 is a screenshot of the AUTOCAD® MEP command line prompt from PYROCAD™ regarding multiple layer selections.

Figure 83:
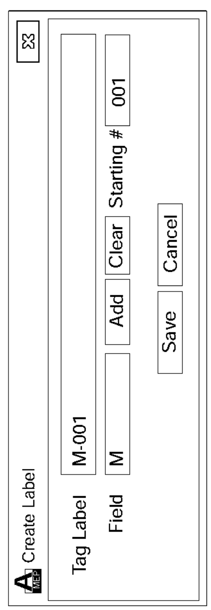

FIG. 83 is a screenshot of the PYROCAD™ create label form showing the creation of main pipe labels.

Figure 84:
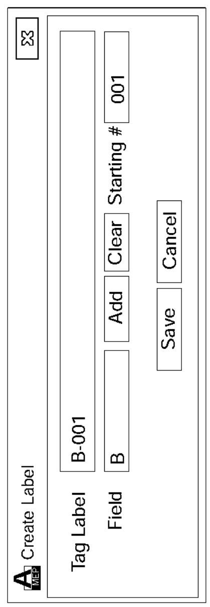

FIG. 84 is a screenshot of the PYROCAD™ create label form showing the creation of branch pipe labels.

Figure 85:
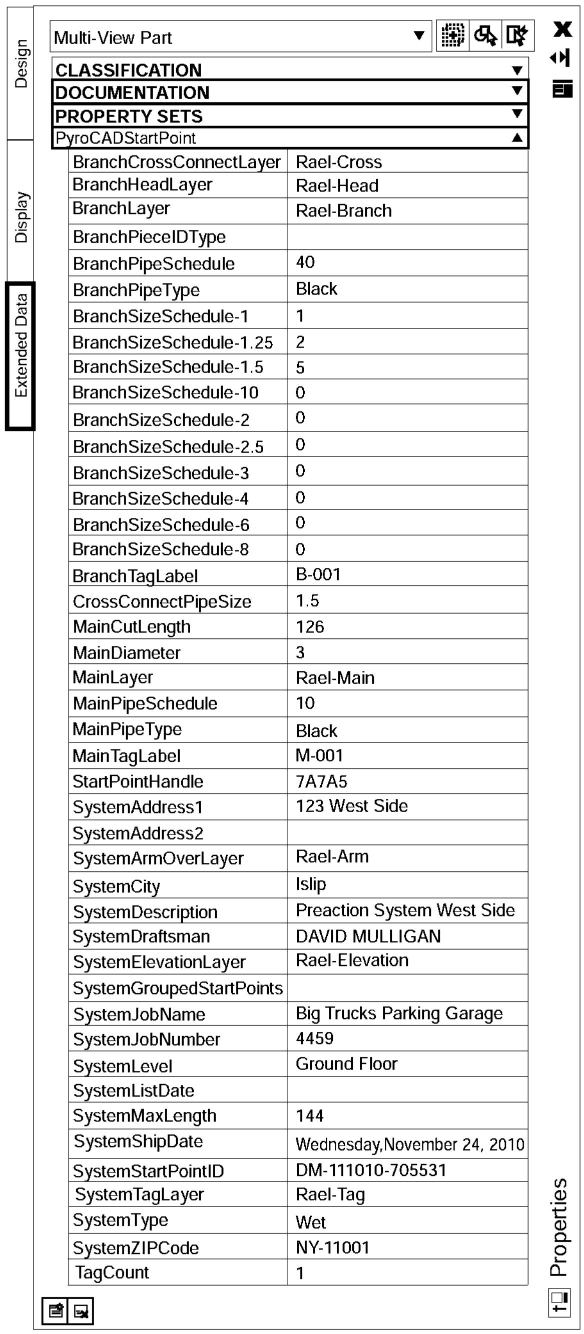

FIG. 85 is a screenshot of the extended tab of the AUTOCAD® MEP properties Palette showing the PYROCAD start point property set data for FIG. 81.

Figure 86:
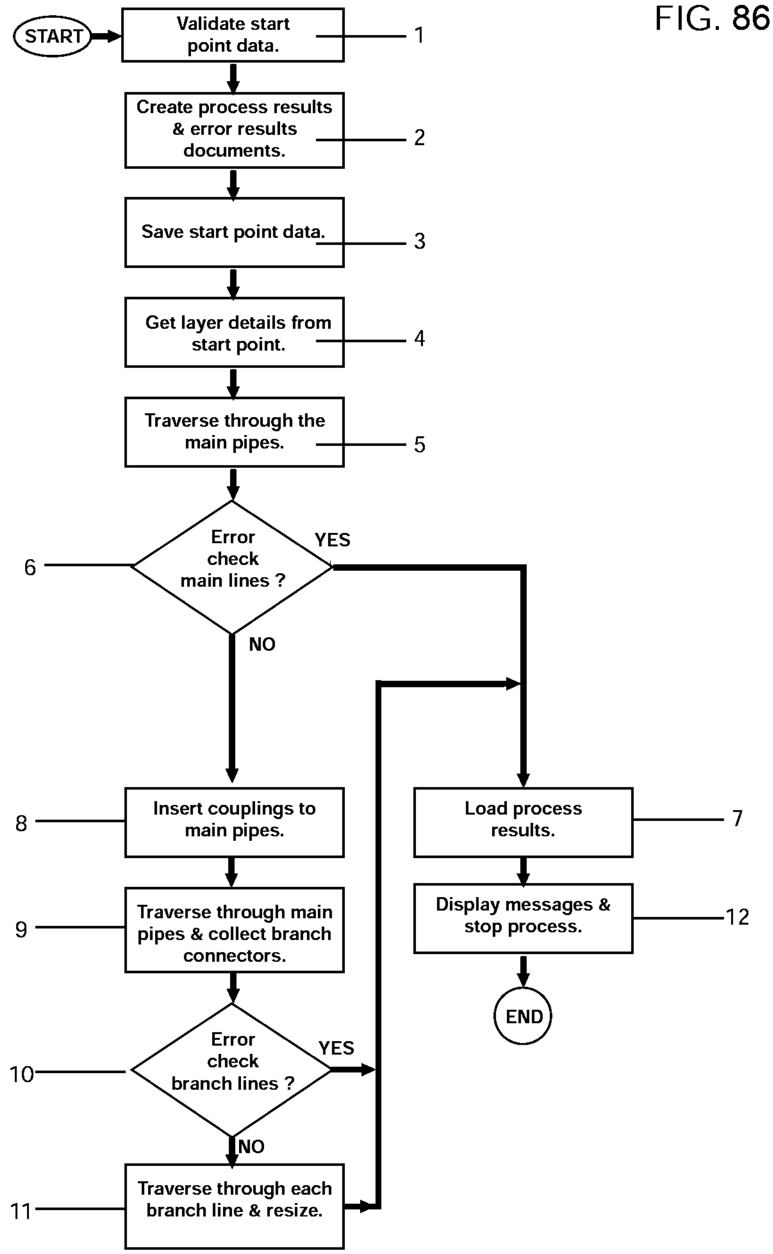

FIG. 86 is a flowchart showing the process algorithm of the present invention.

Figure 87:
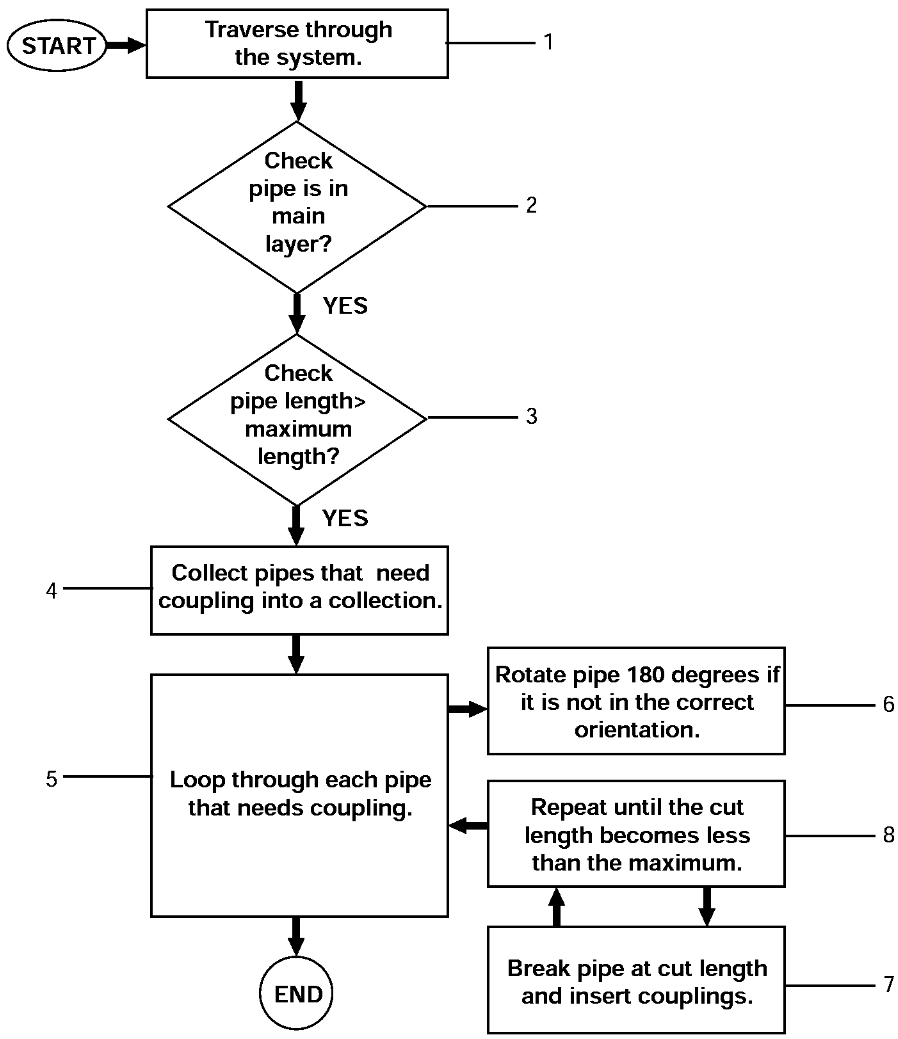

FIG. 87 is a flowchart showing the main pipes algorithm of the present invention.

Figure 88:
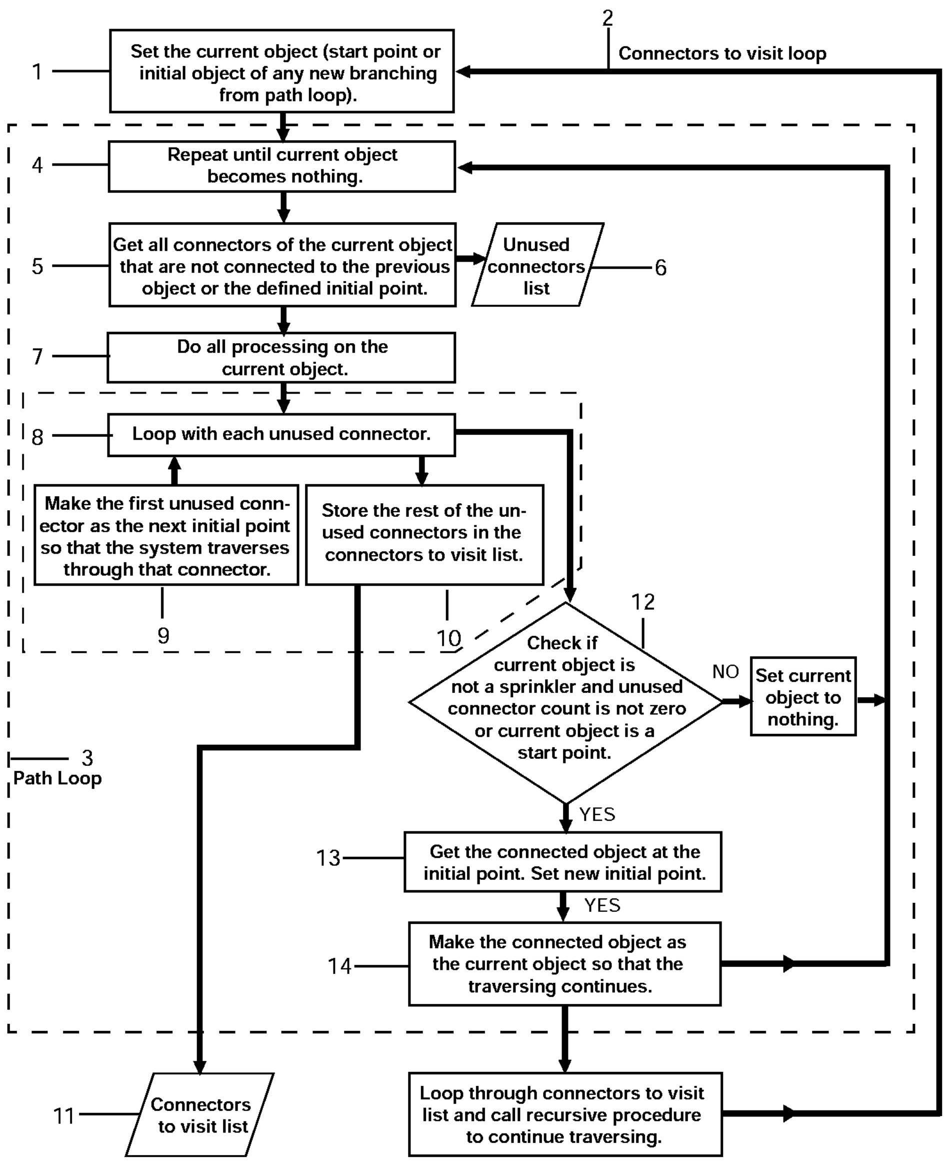

FIG. 88 is a flowchart showing the traversing algorithm of the present invention.

Figure 89:
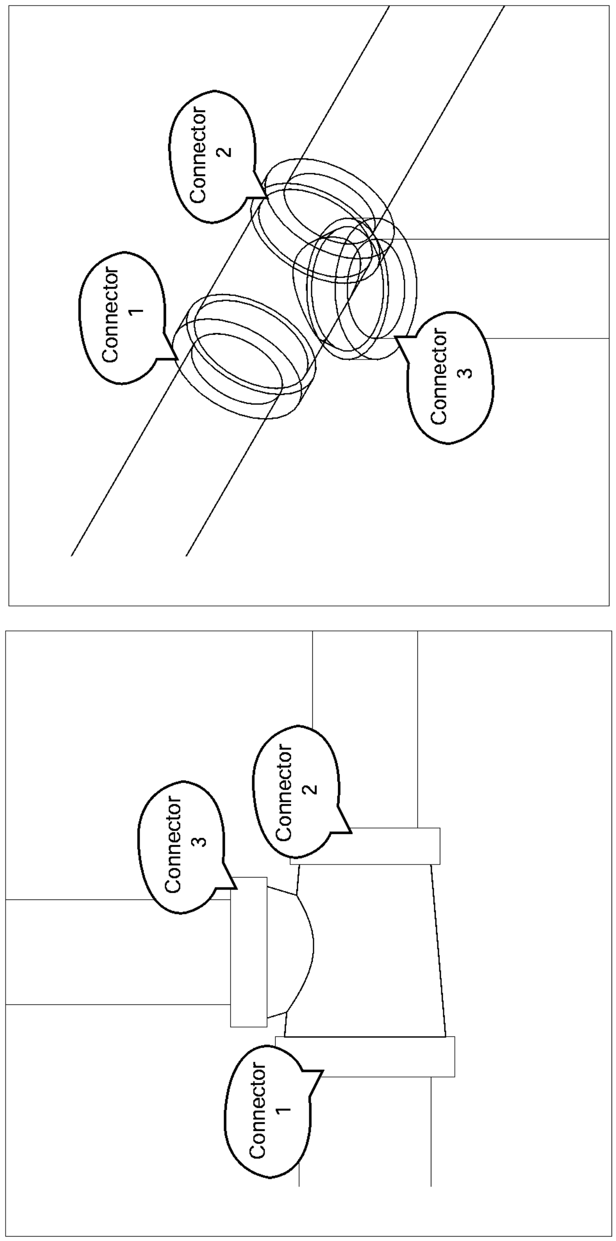

FIG. 89 is an enlarged view of the labeled AUTOCAD® MEP connectors.

Figure 90:
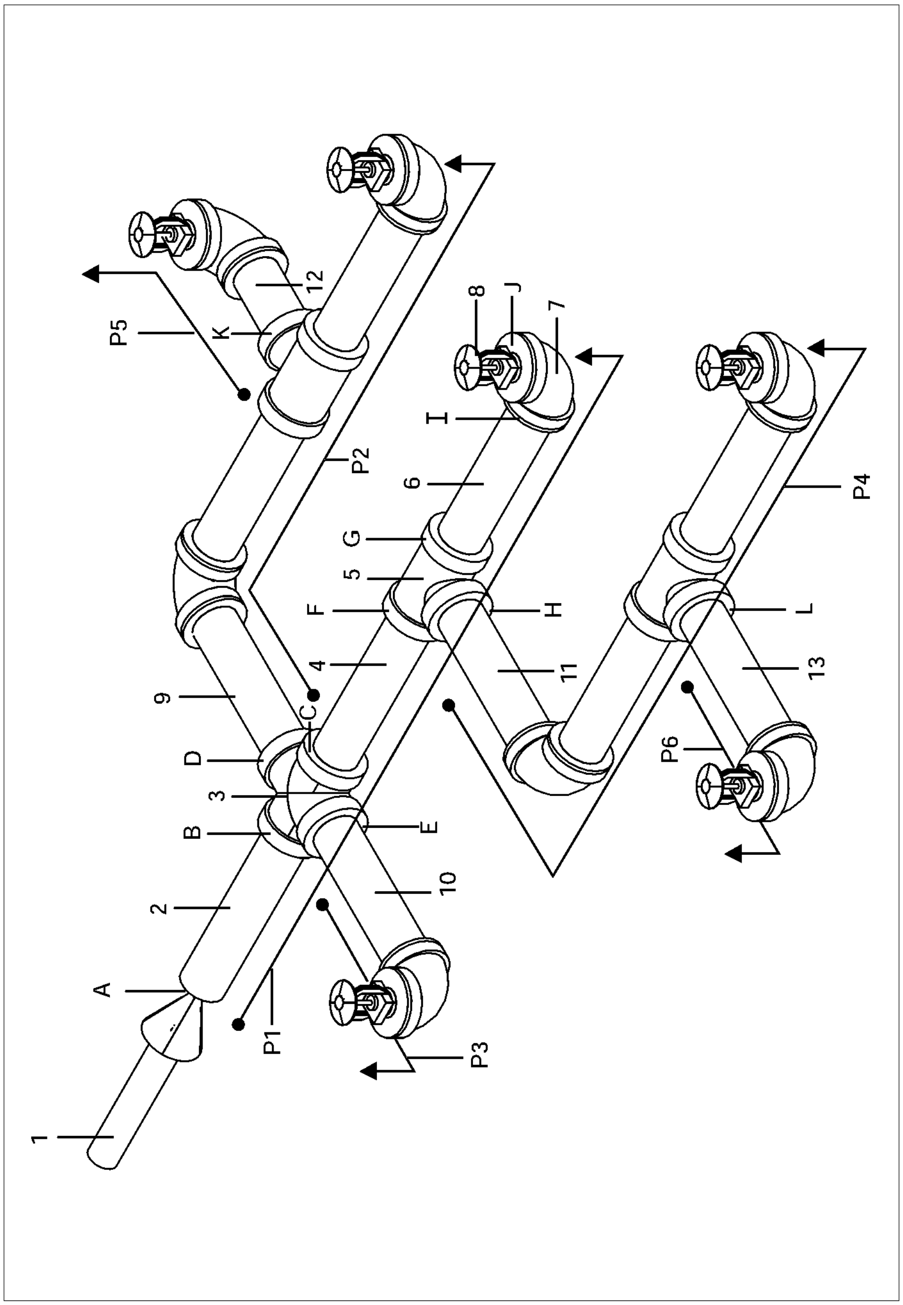

FIG. 90 is a diagram of a small, enlarged portion of a piping system used to explain the traversing algorithm.

Figure 91:
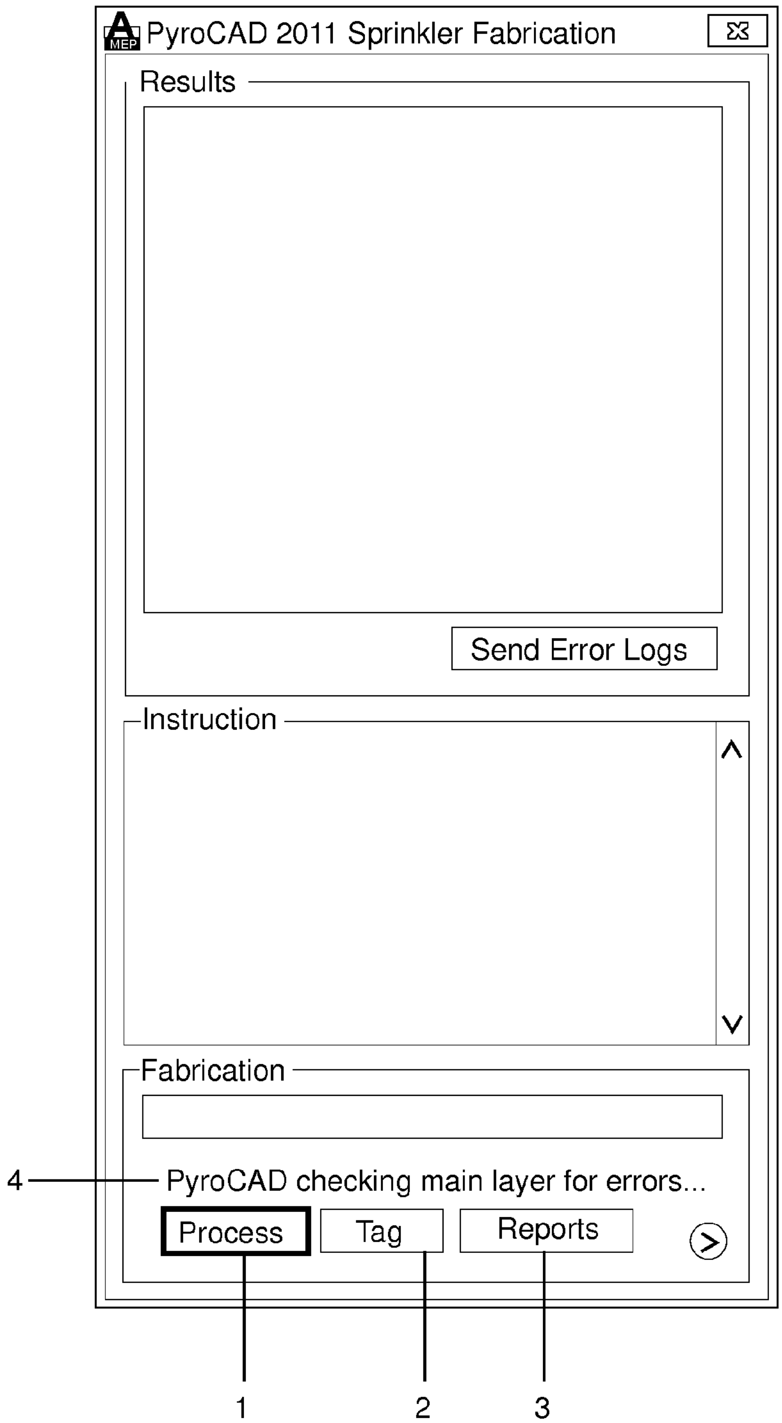

FIG. 91 is a screenshot of the PYROCAD™ application form after the process button has been pressed and processing has commenced.

Figure 92:
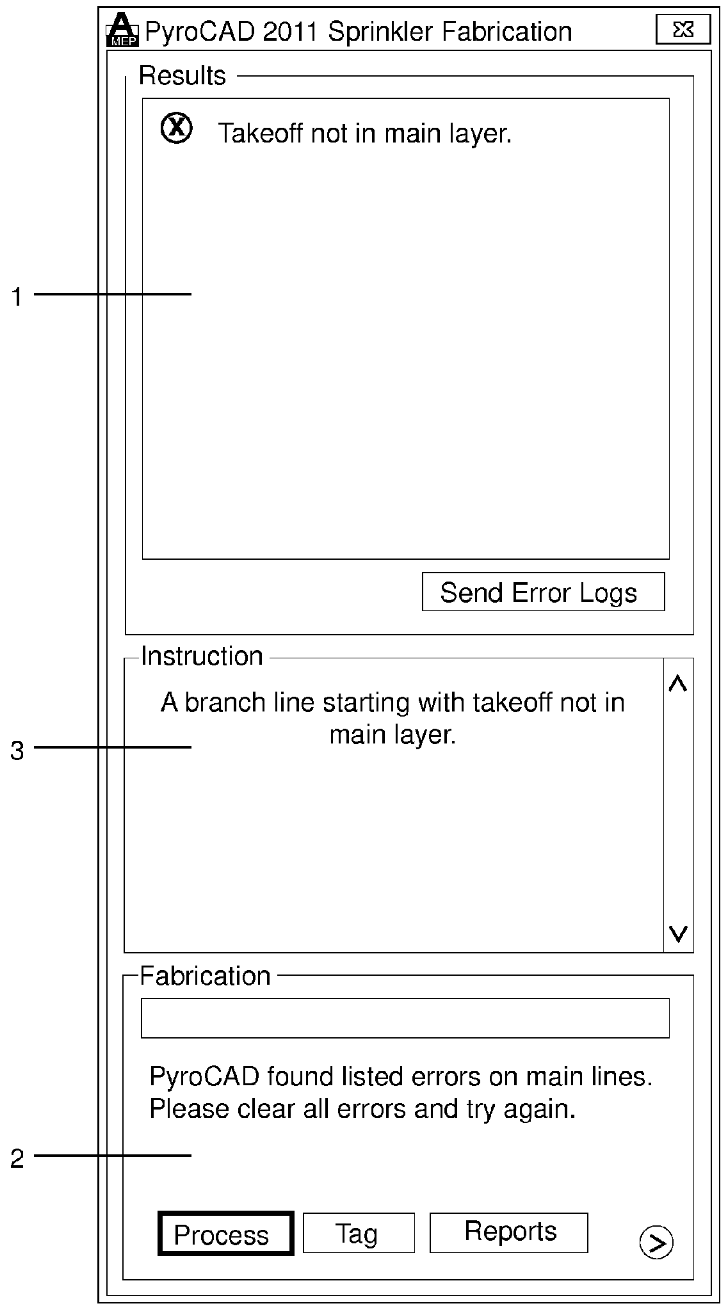

FIG. 92 is a screenshot of the PYROCAD™ application form after stopping to display processing errors for the main pipes.

Figure 93:
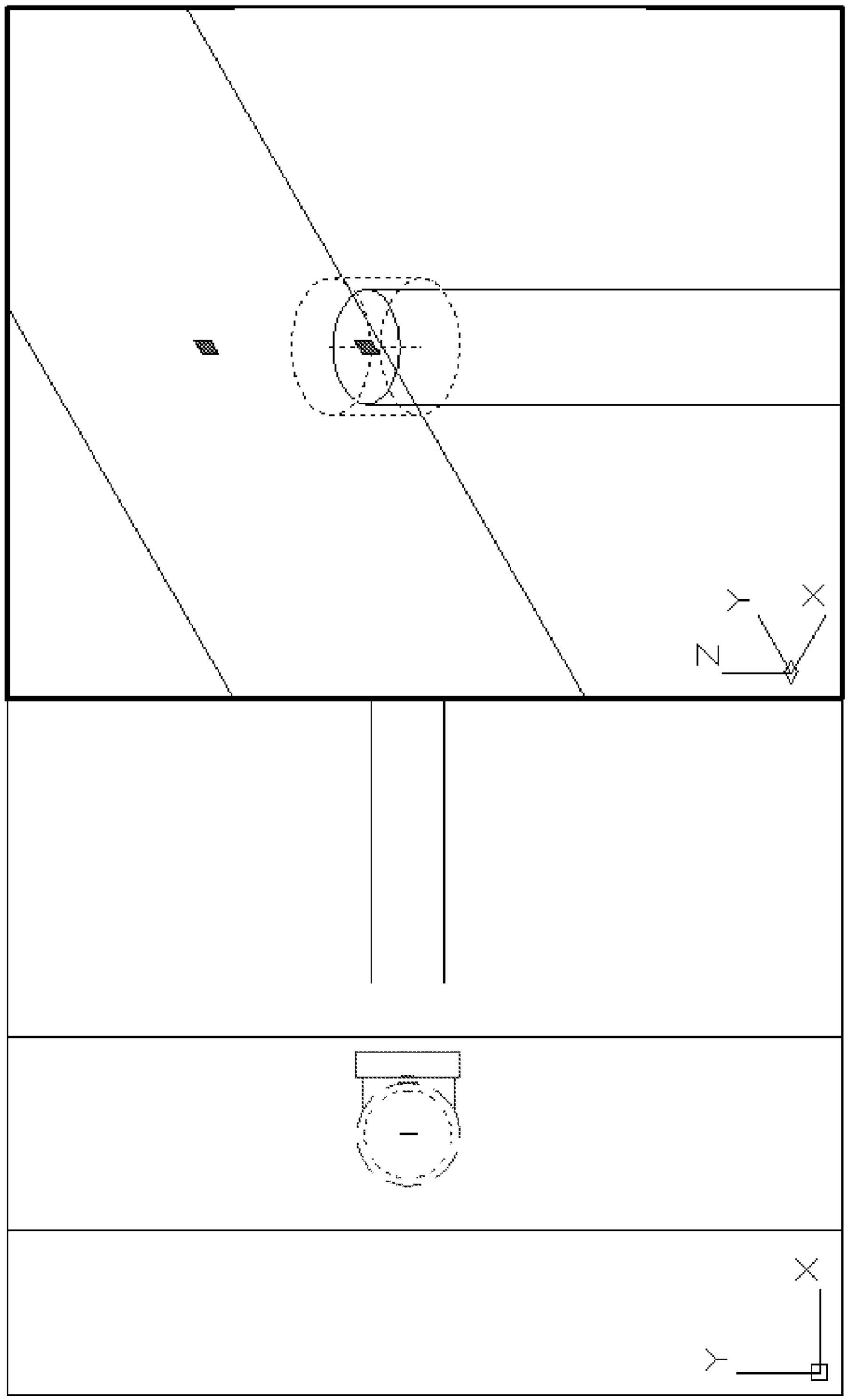

FIG. 93 is an enlarged view of the takeoff fitting on the main pipe creating the error shown in FIG. 92.

Figure 94:
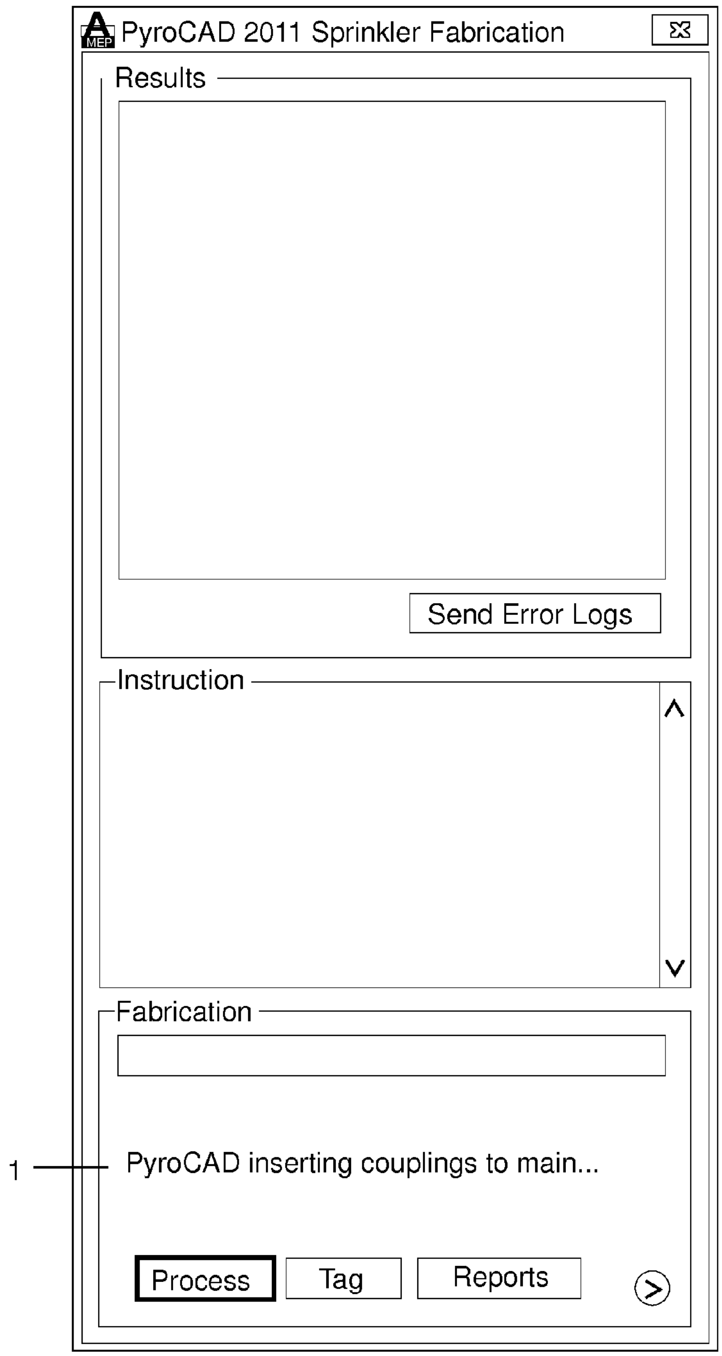

FIG. 94 is a screenshot of the PYROCAD™ application form showing the insertion of couplings to the main message in the status frame.

Figure 95:
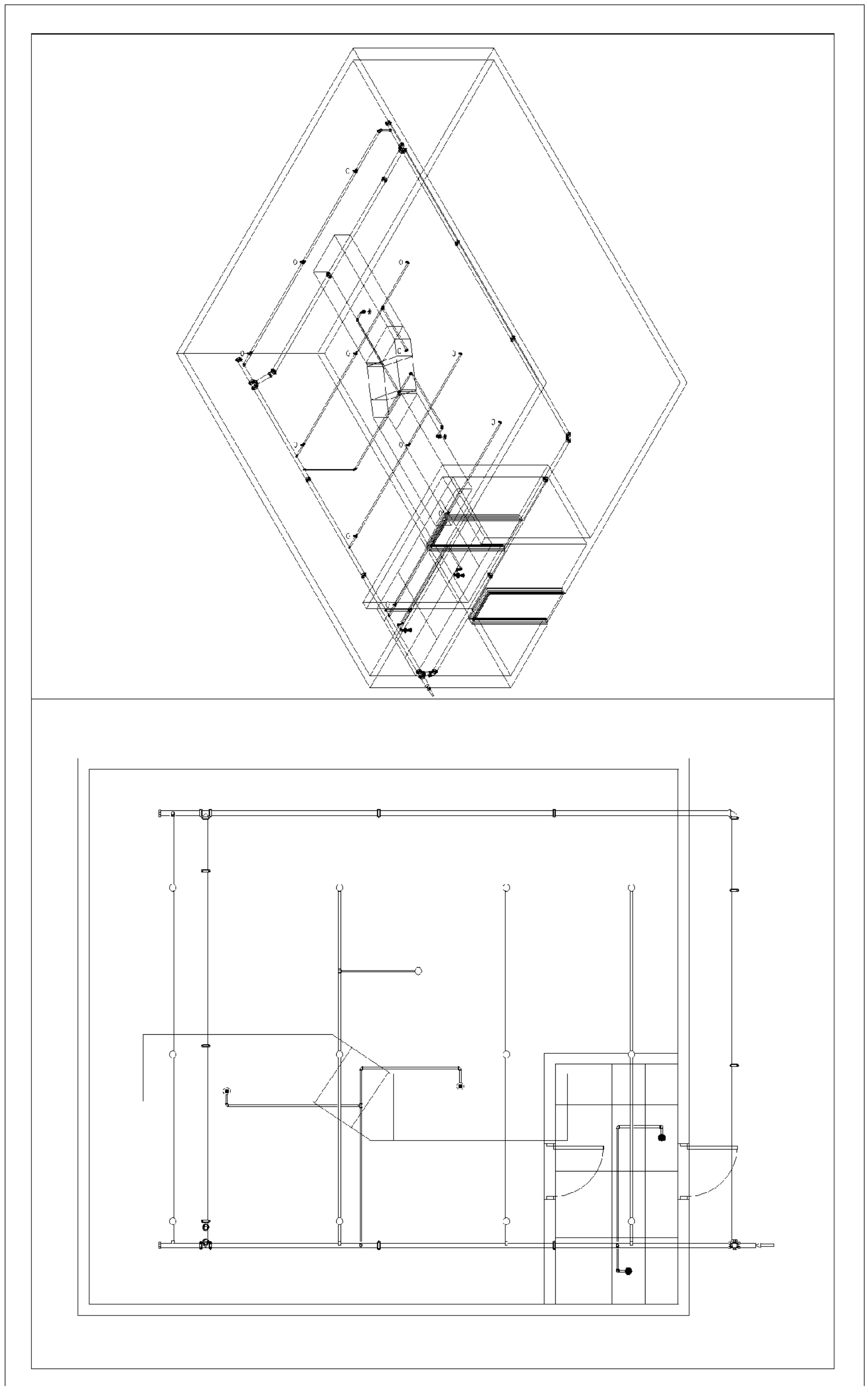

FIG. 95 is a screenshot of the newly added couplings to the main piping and the main piping segmented by the new couplings.

Figure 96:
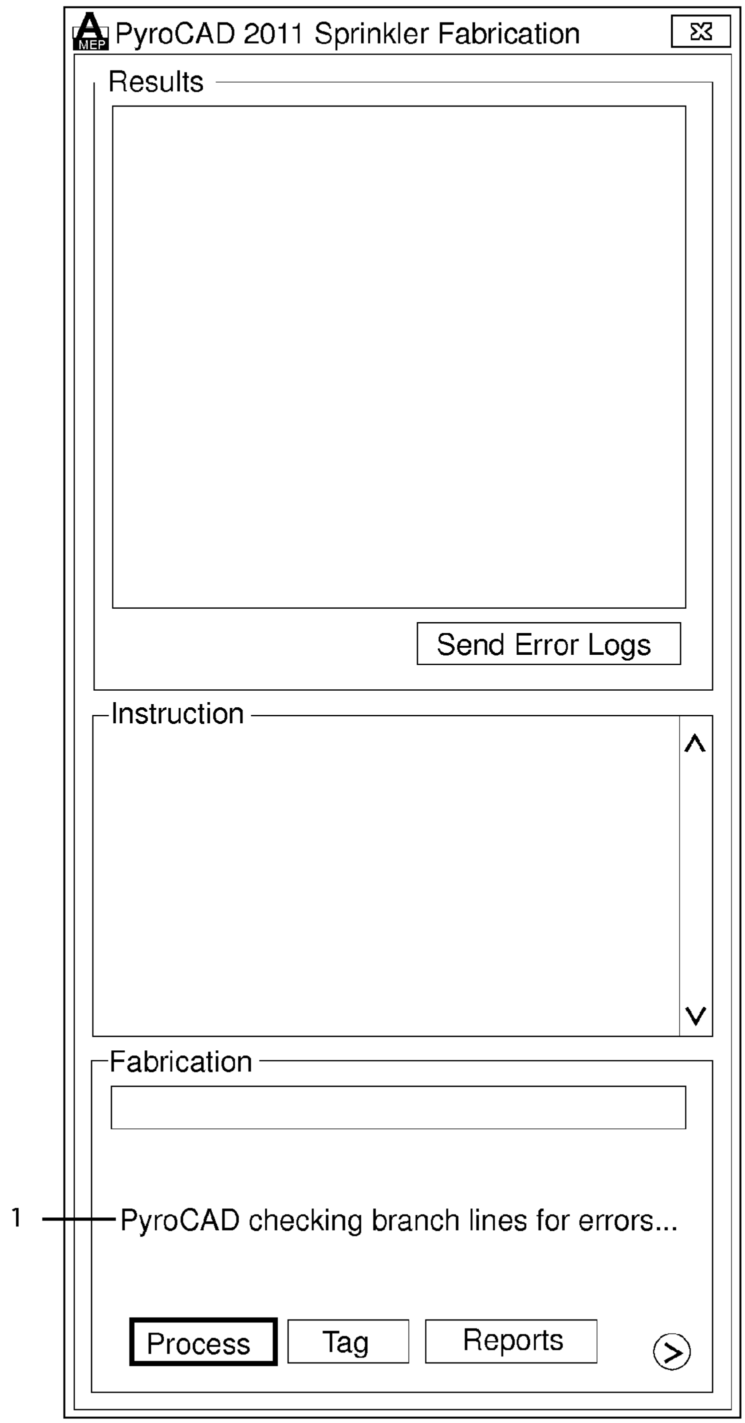

FIG. 96 is a screenshot of the PYROCAD™ application form showing checking branch lines for errors message in the status frame.

Figure 97:
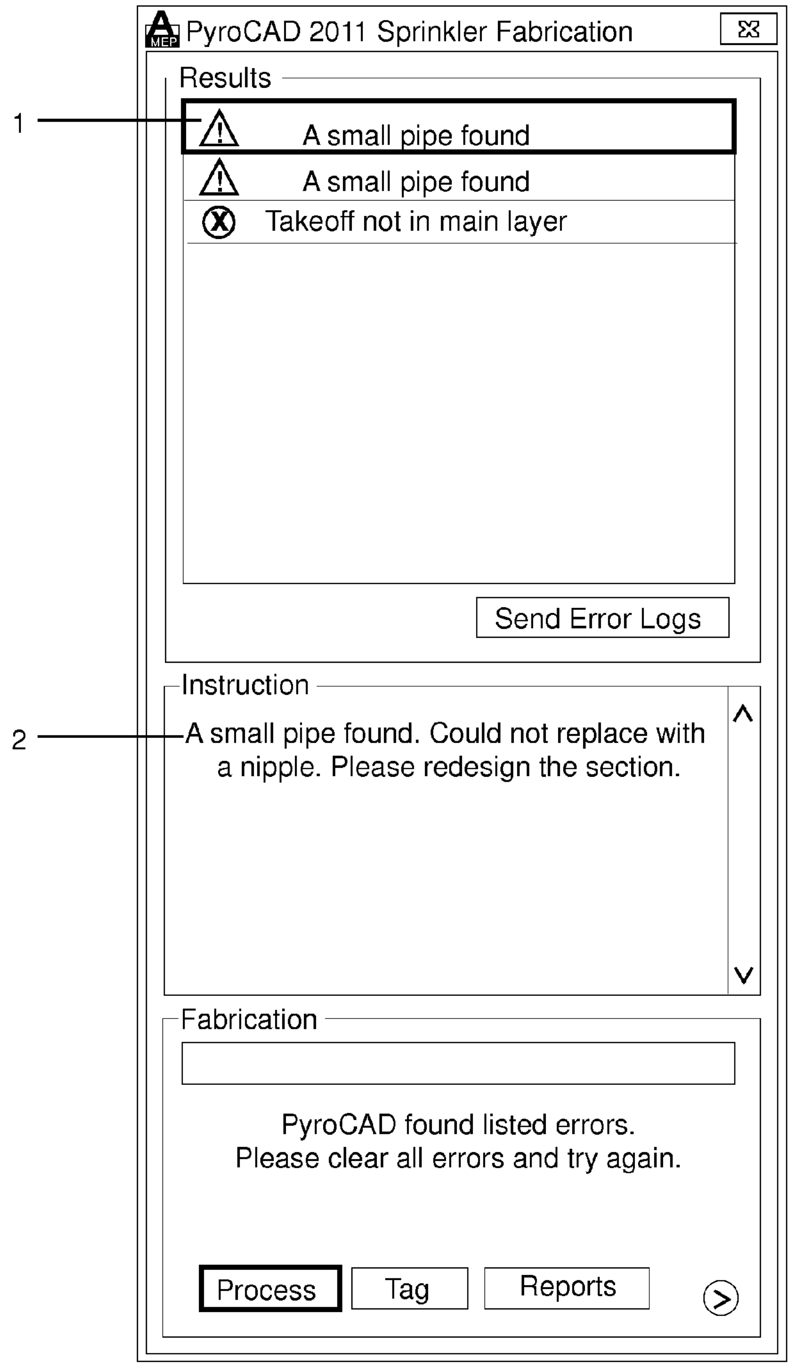

FIG. 97 is a screenshot of the PYROCAD™ application form after stopping to display processing errors and warnings for the branch pipes.

Figure 98:
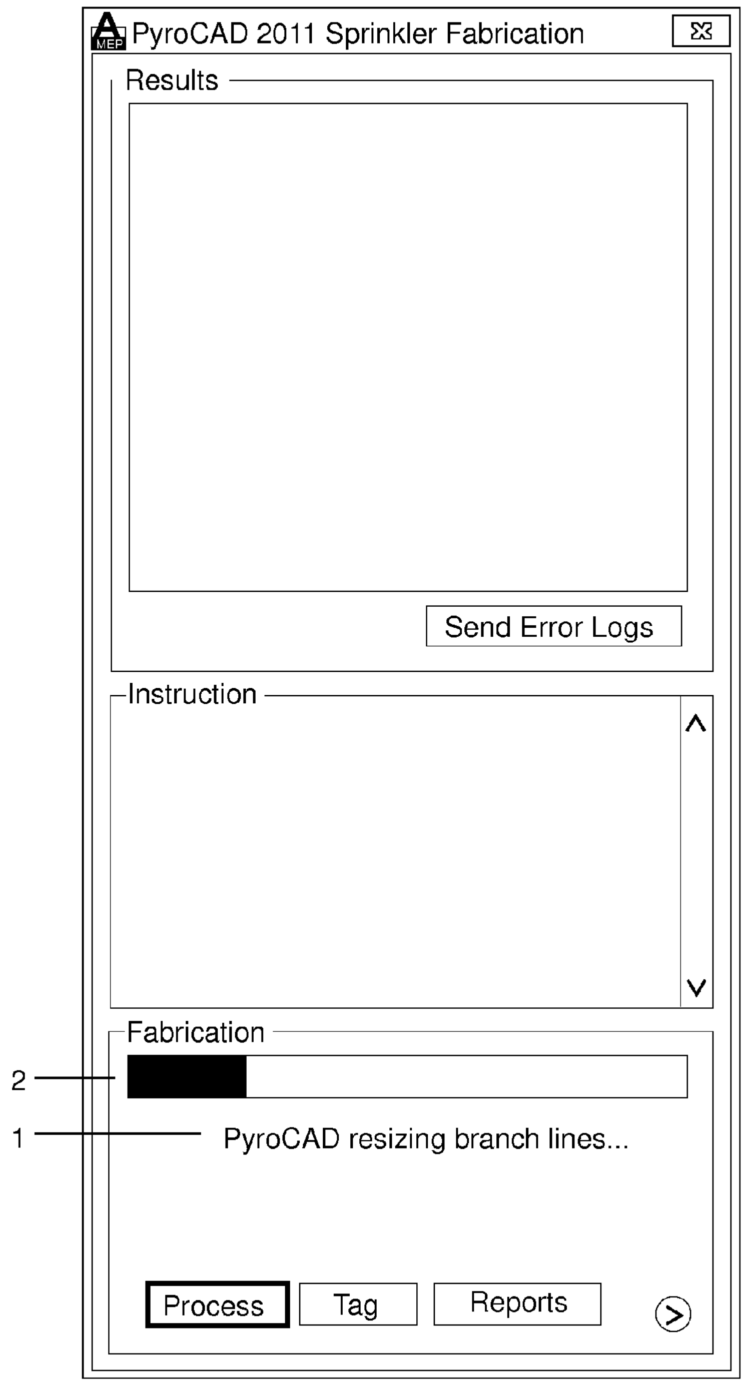

FIG. 98 is a screenshot of PYROCAD™ application form showing resizing branch lines messages in the status frame and the progress bar displaying percentage complete.

Figure 99:
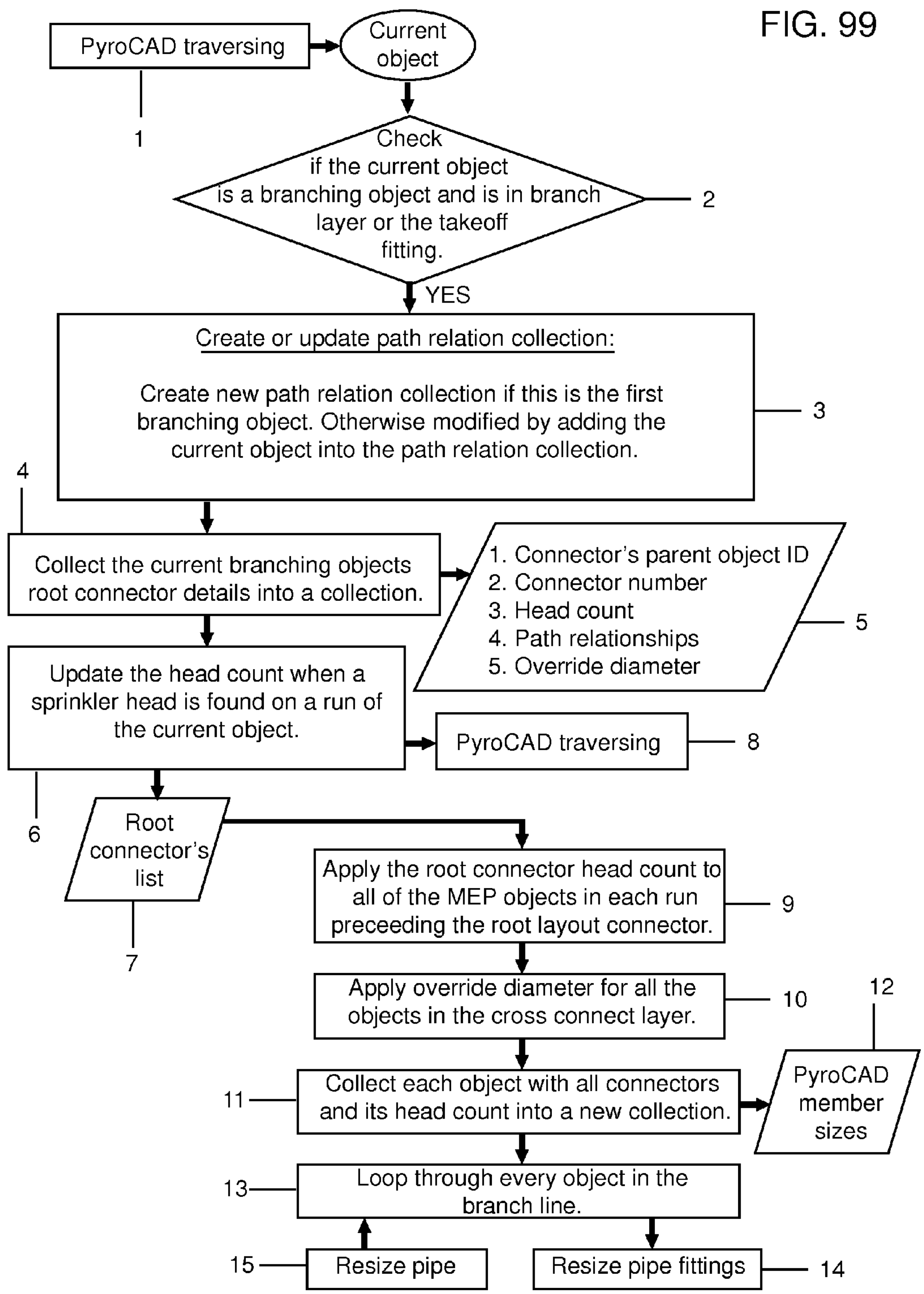

FIG. 99 is a flowchart showing the branch resizing algorithm of the present invention.

Figure 100:
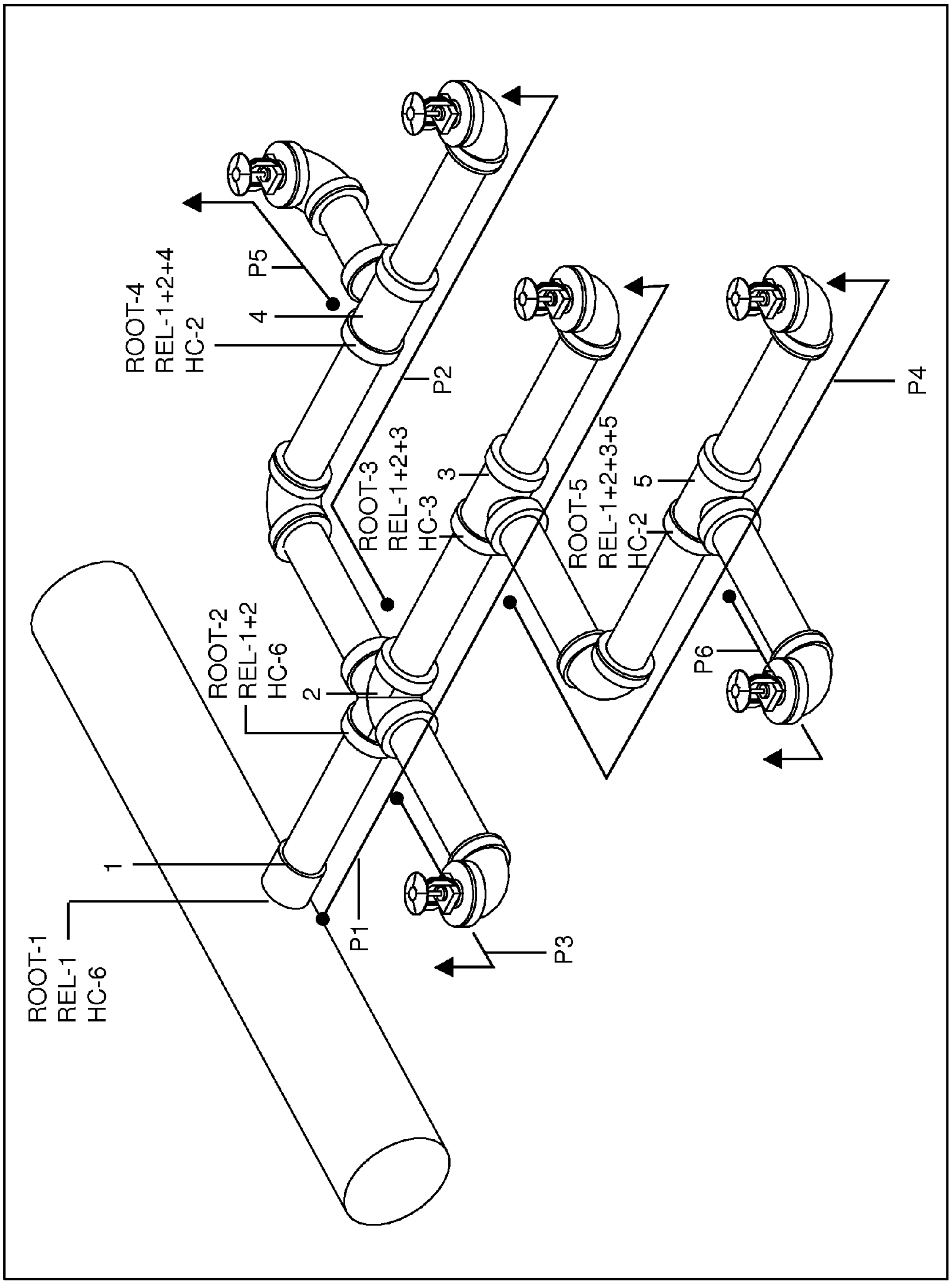

FIG. 100 is a diagram of a small, enlarged portion of a piping system used to explain the branch resizing algorithm.

Figure 101:
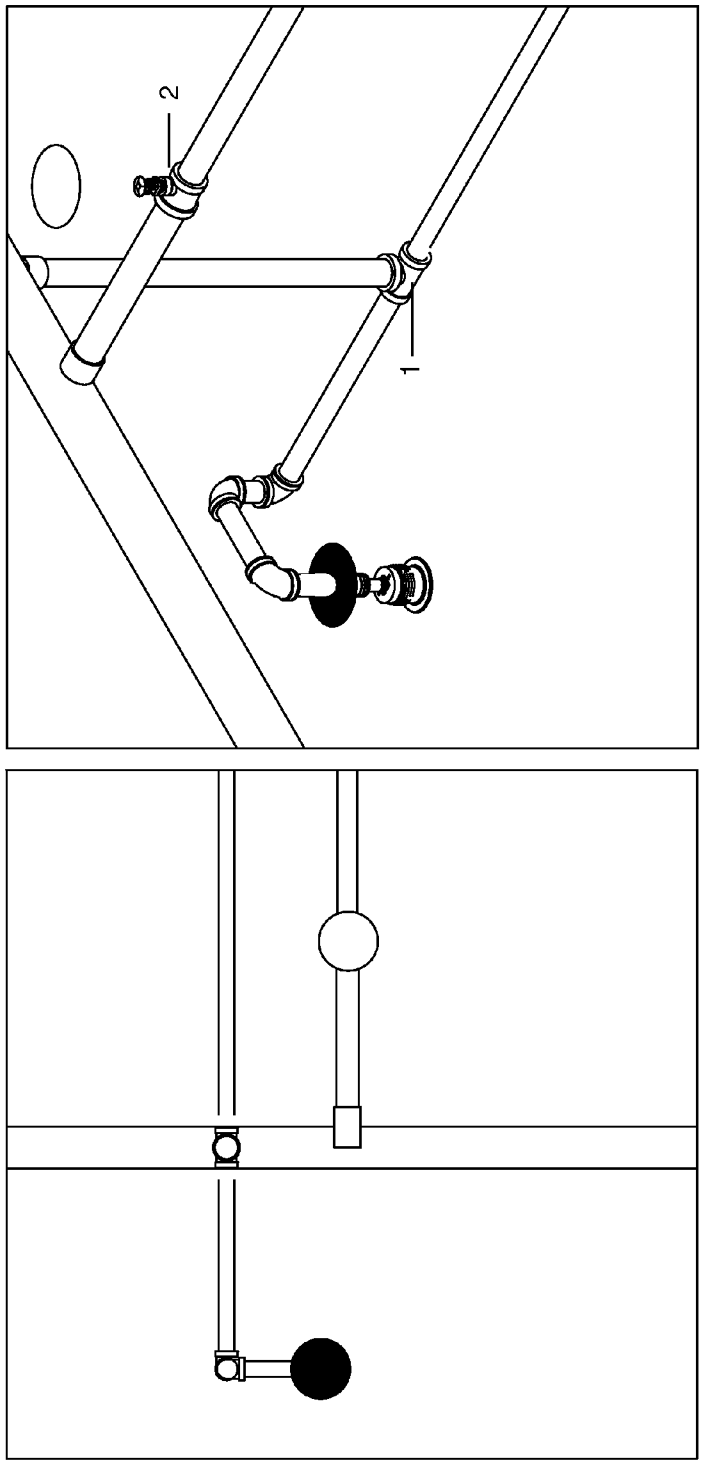

FIG. 101 is a screenshot of a view of the resized pipe and fittings.

Figure 102:
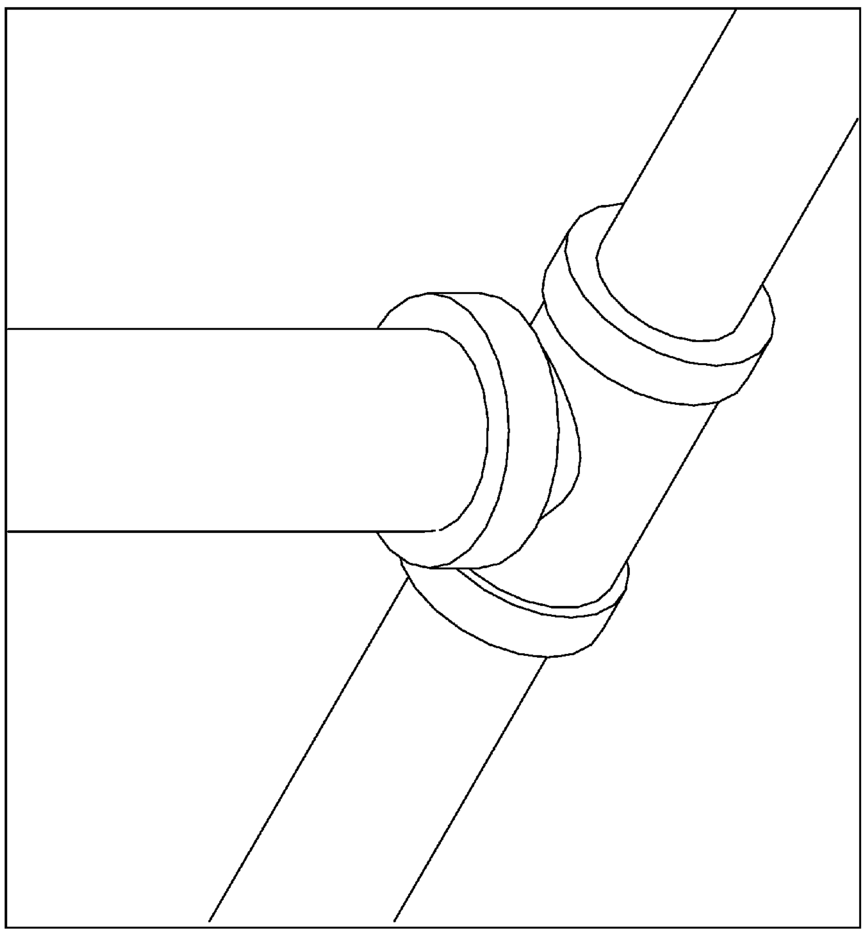

FIG. 102 is an enlarged of 101.1 a view of the resized pipe and fittings.

Figure 103:
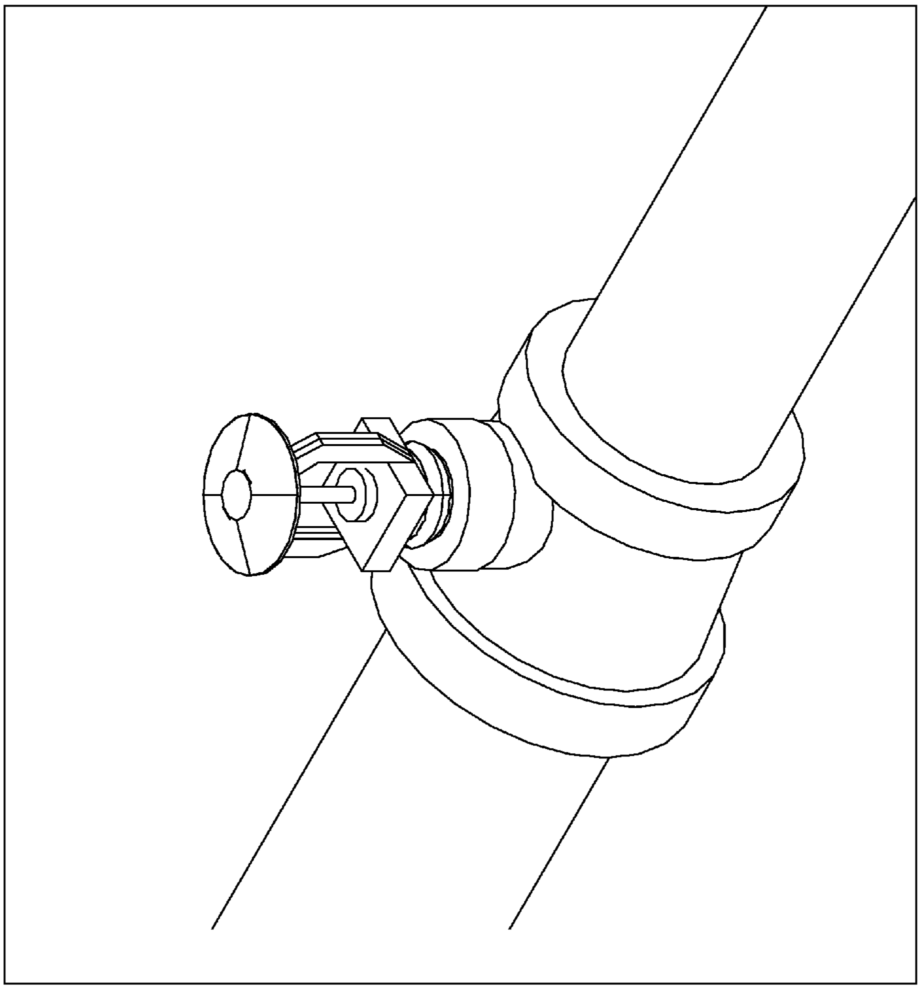

FIG. 103 is an enlarged screenshot of 101.2 a view of the resized pipe and fittings.

Figure 104:
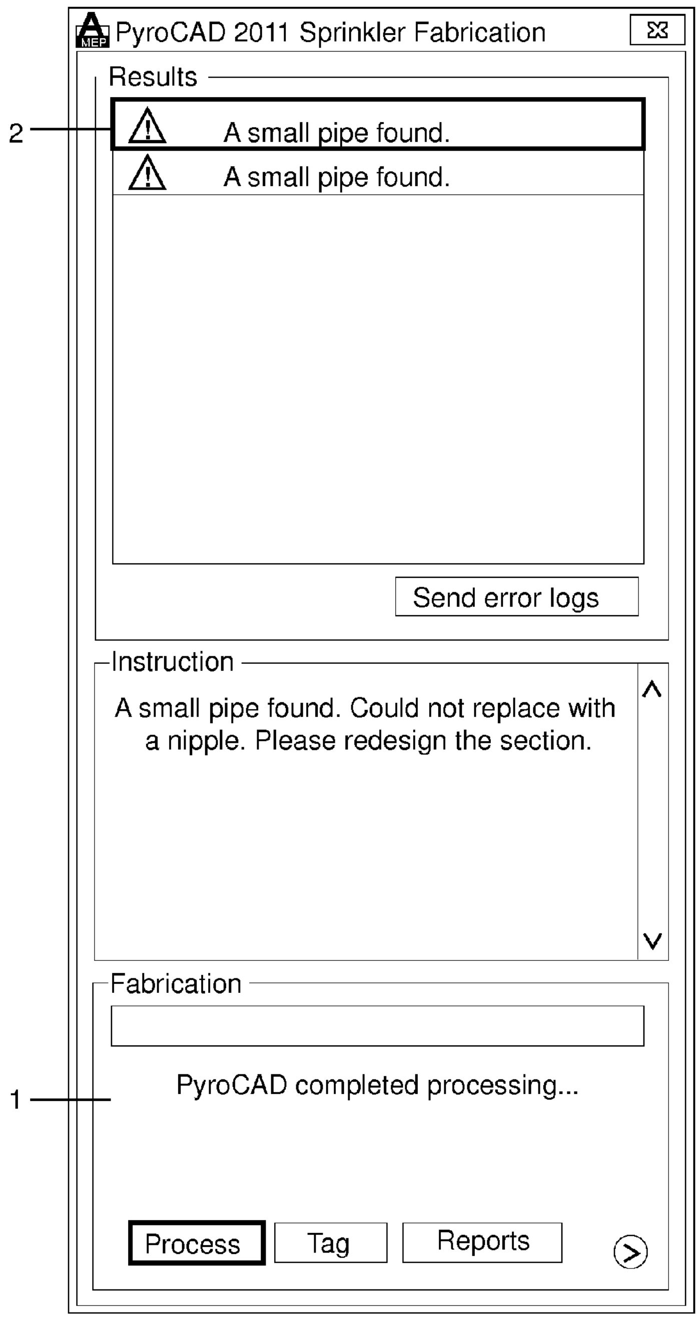

FIG. 104 is a screenshot of the PYROCAD™ application form showing completed processing message in the status frame and two warnings in the results frame.

Figure 105:
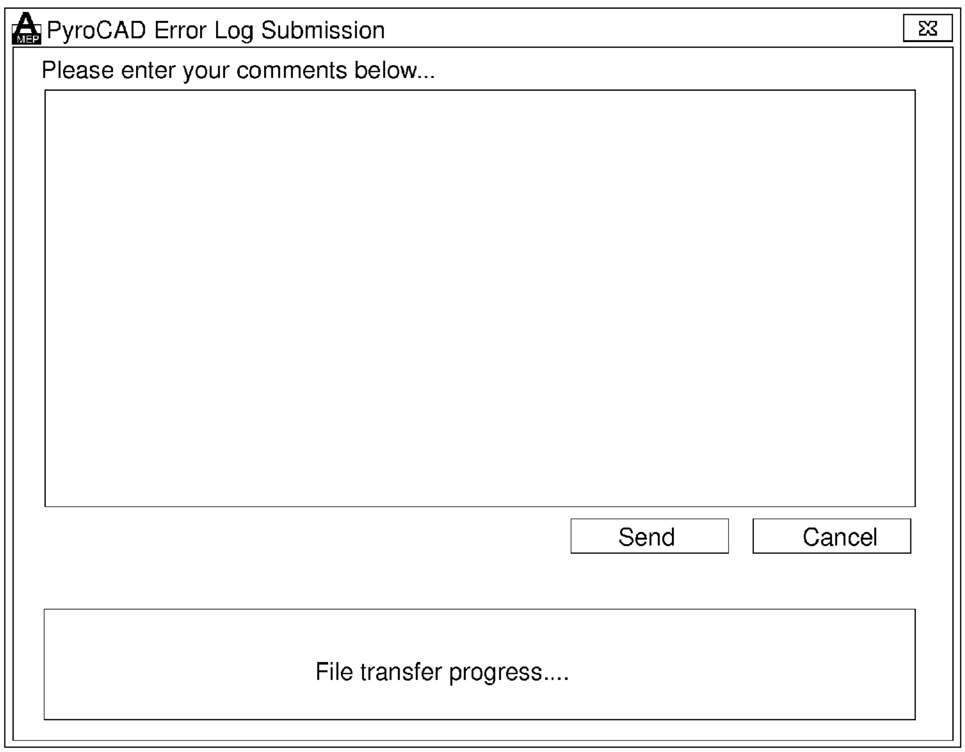

FIG. 105 is a screenshot of the PYROCAD™ send error log form.

Figure 106:
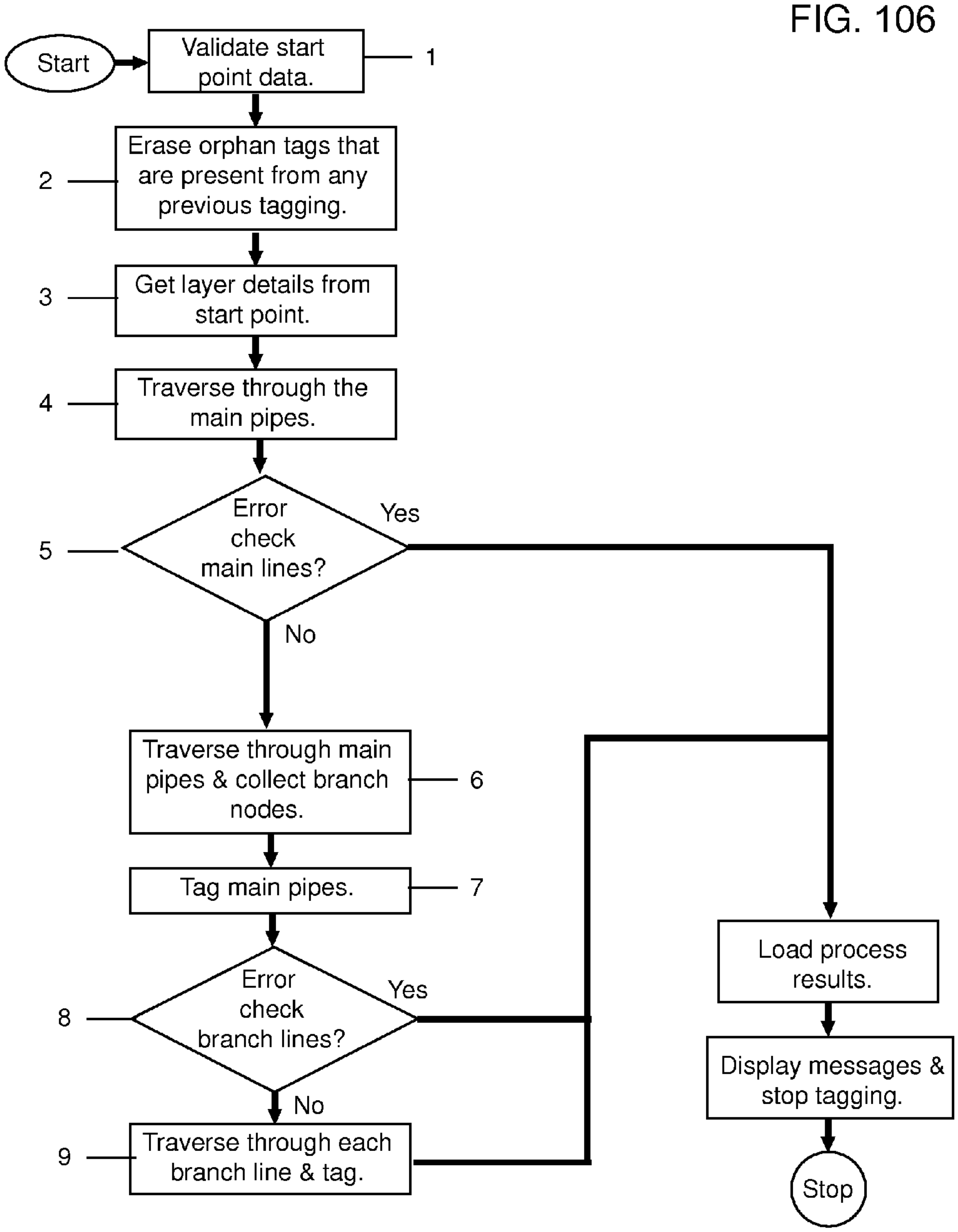

FIG. 106 is a flowchart showing the tagging algorithm of the present invention.

Figure 107:
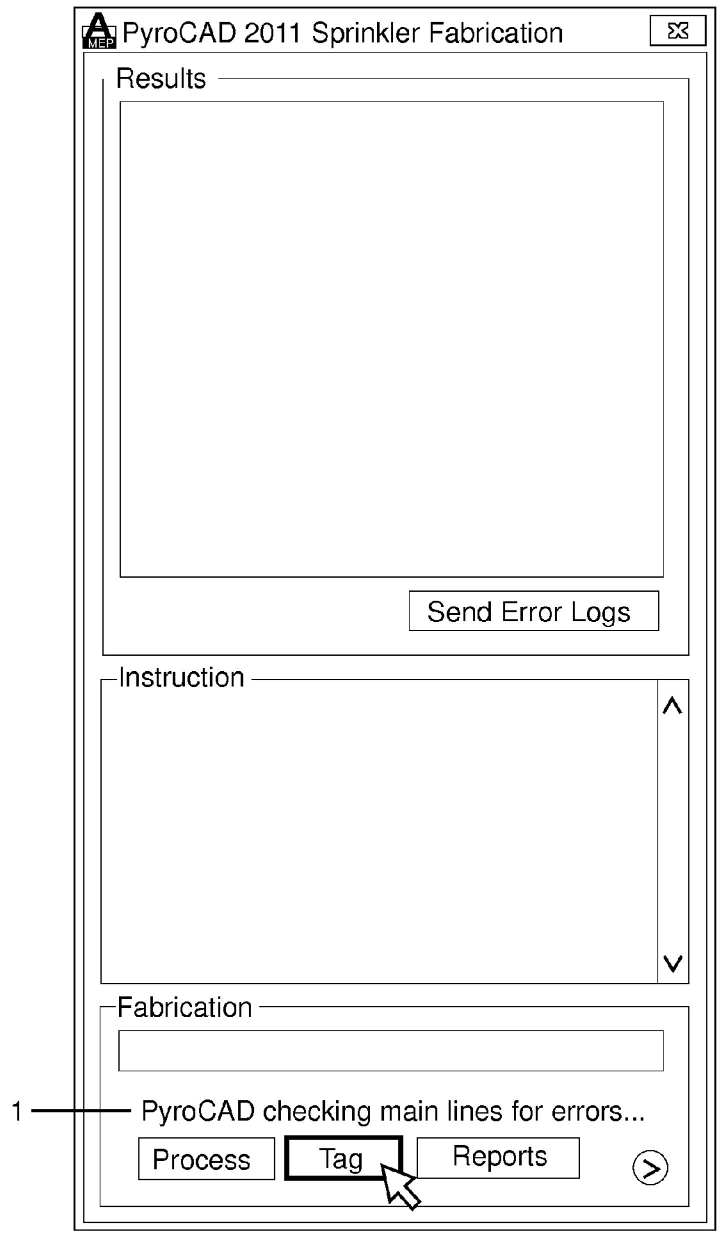

FIG. 107 is a screenshot of the PYROCAD™ application form after the tag button has been pressed and tagging has commenced.

Figure 108:
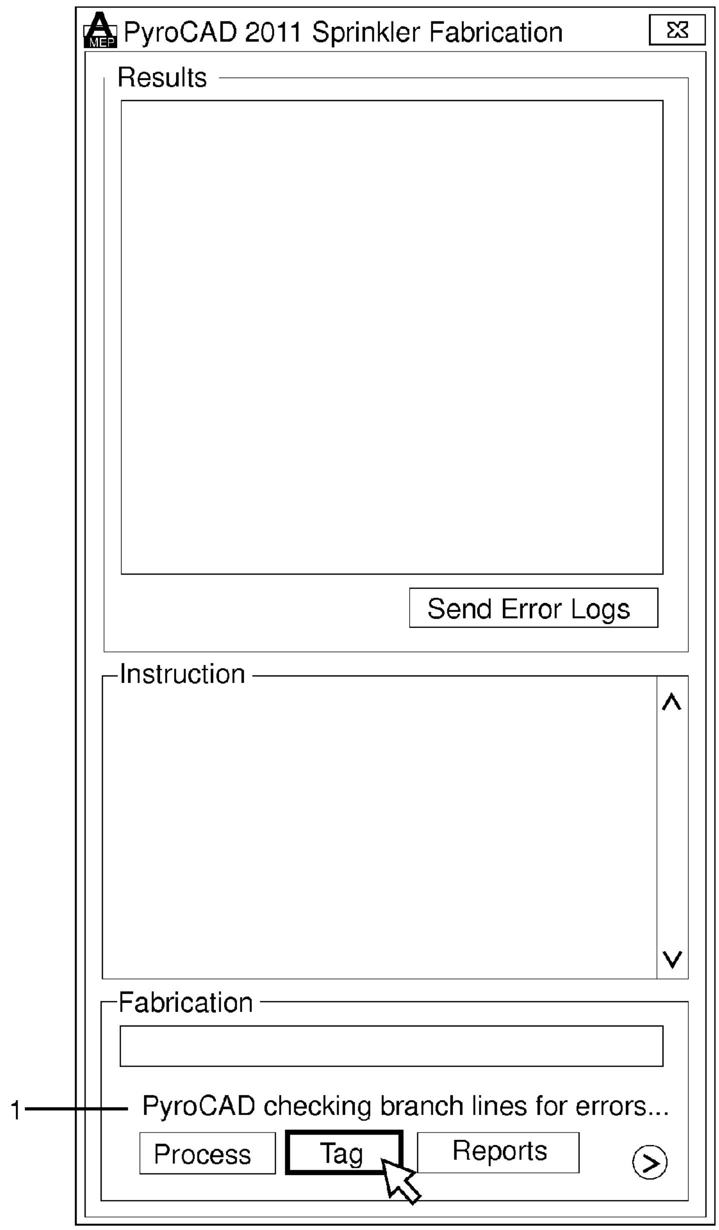

FIG. 108 is a screenshot of the PYROCAD™ application form showing checking branch lines for errors message in the status frame.

Figure 109:
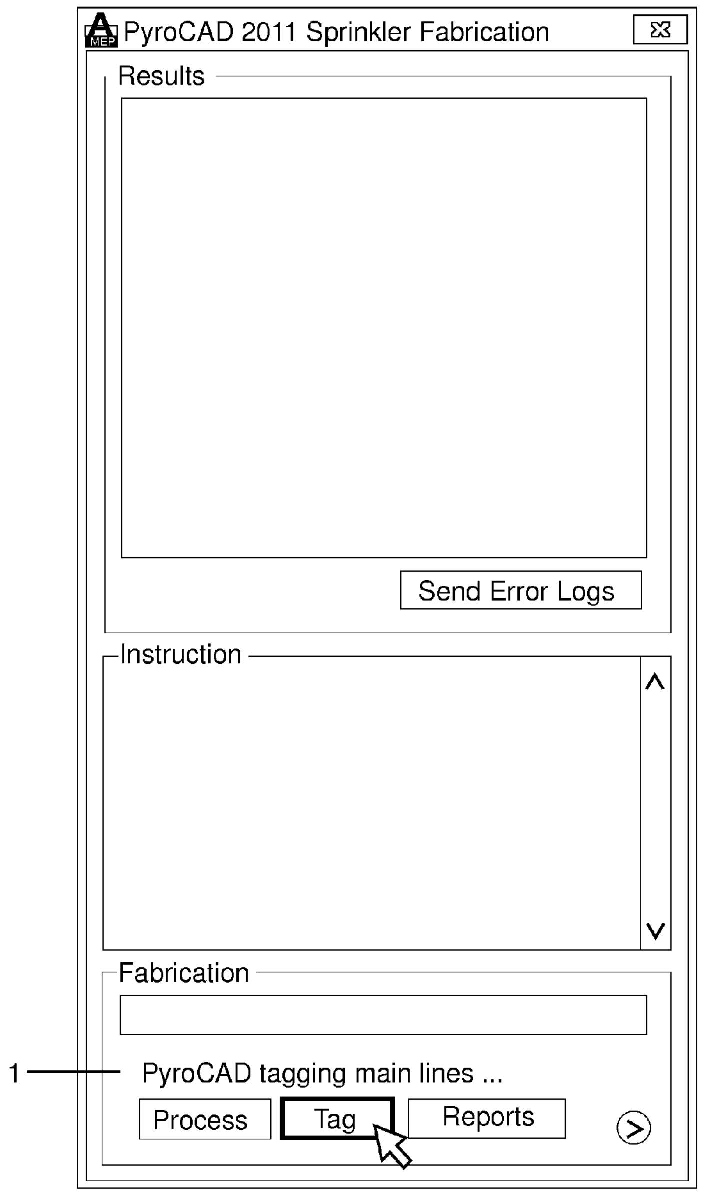

FIG. 109 is a screenshot of the PYROCAD™ application form showing tagging main lines message in the status frame.

Figure 110:
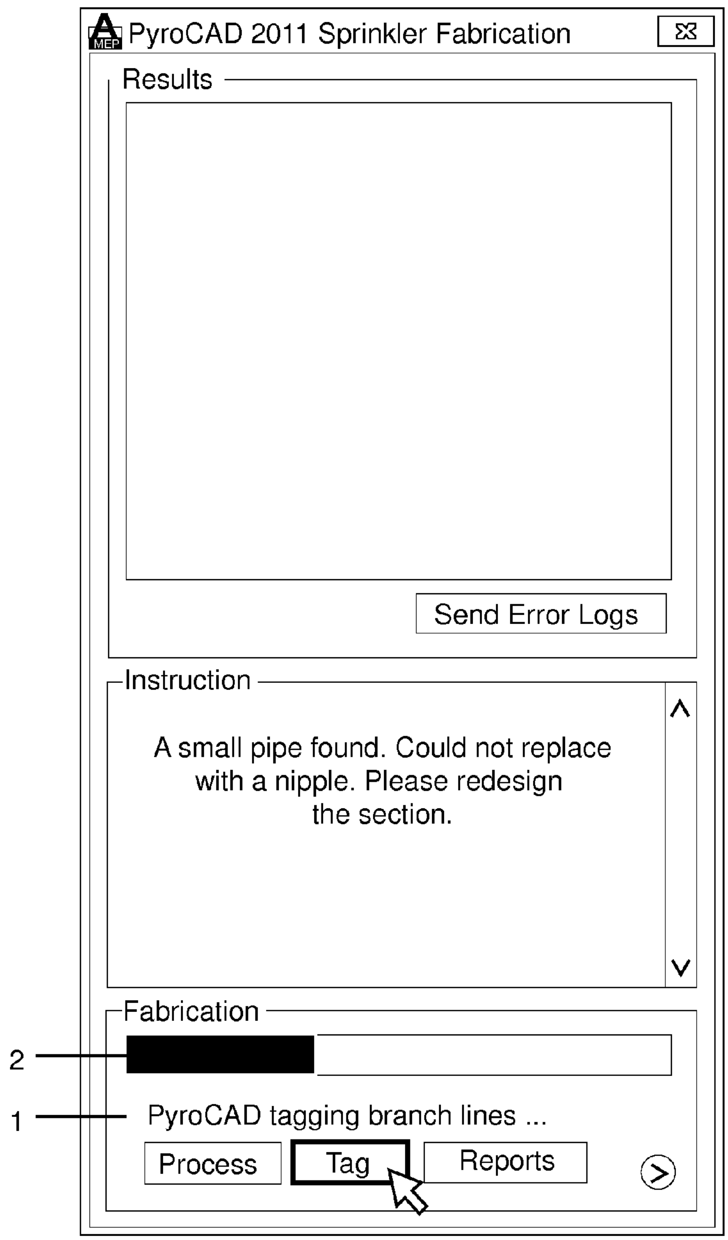

FIG. 110 is a screenshot of the PYROCAD™ application form showing tagging branch line message in the status frame and the progress bar displaying percentage complete.

Figure 111:
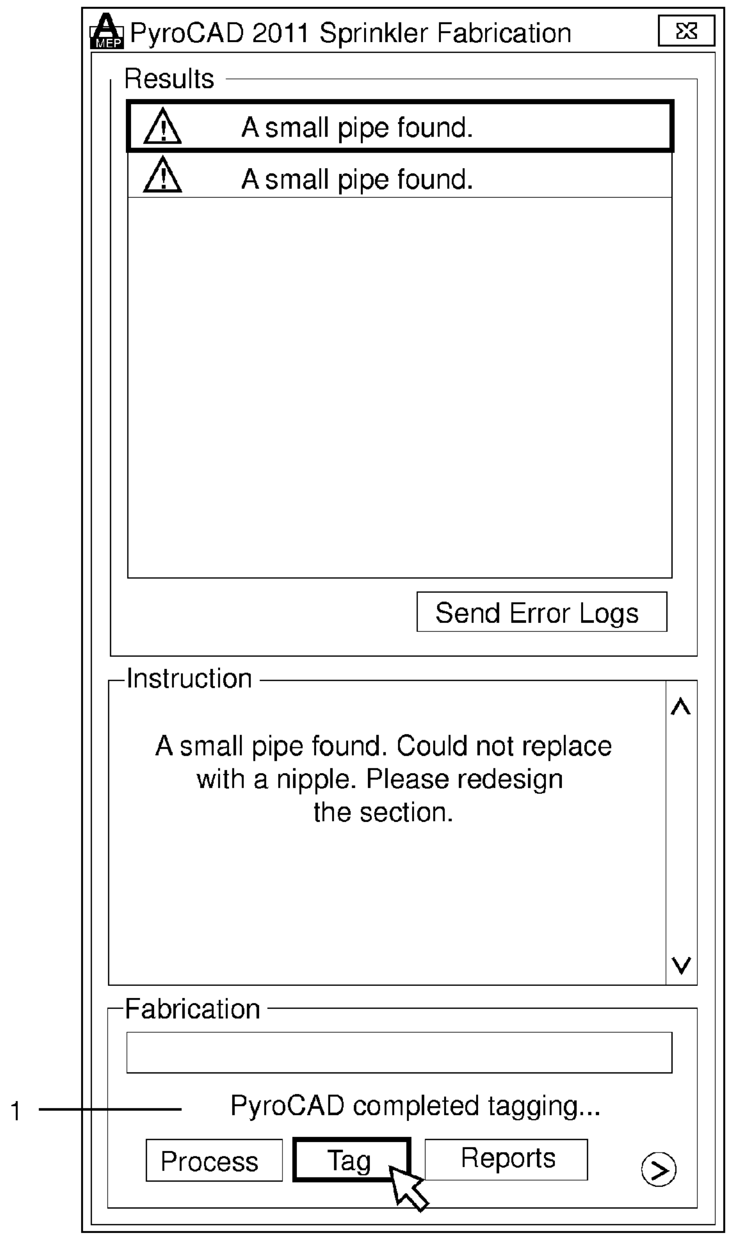

FIG. 111 is a screenshot of the PYROCAD™ application form showing completed tagging message in the status frame and two warnings in the results frame.

Figure 112:
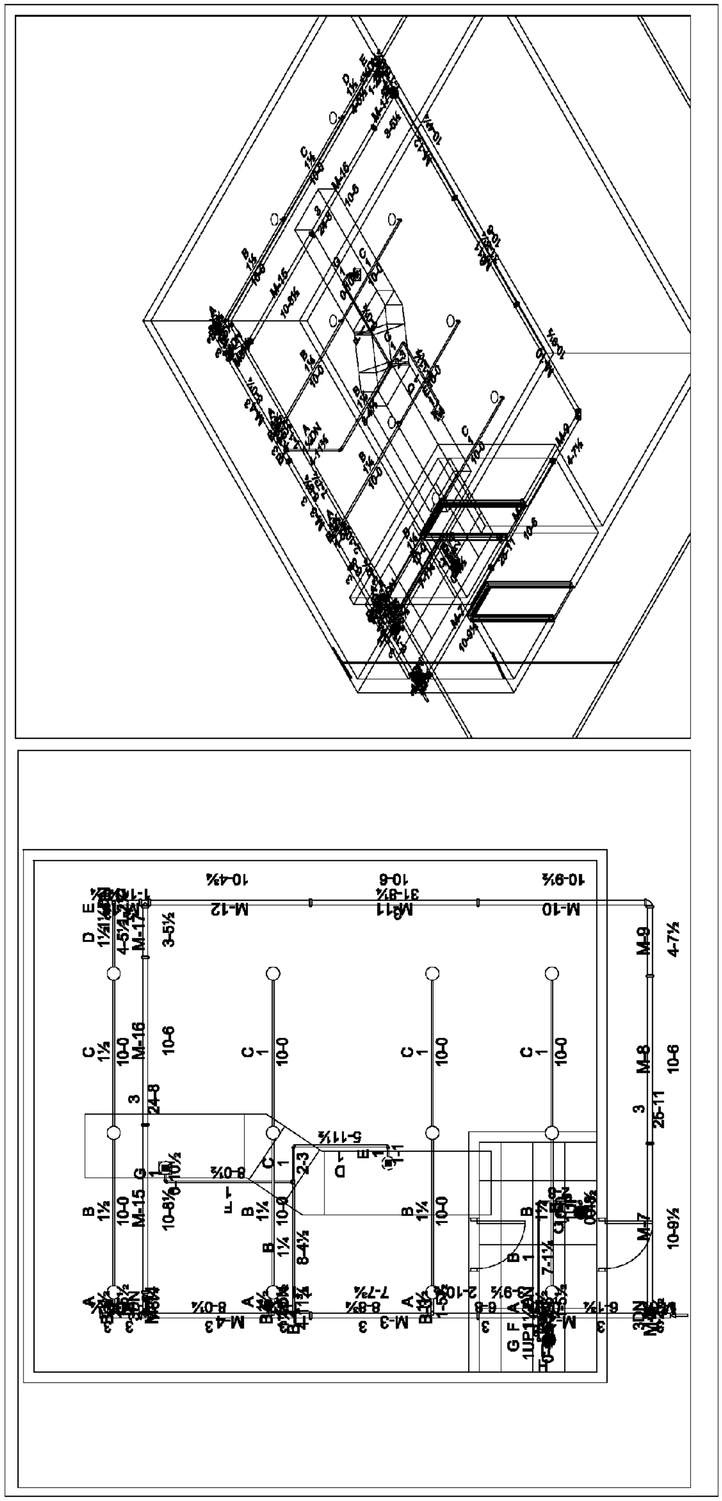

FIG. 112 is a screenshot of a view of the piping system with the newly created tags.

Figure 113:
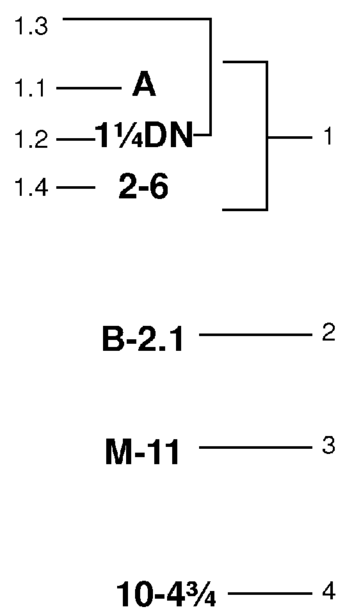

FIG. 113 is a diagram explaining the different PYROCAD™ tags and their components.

Figure 114:
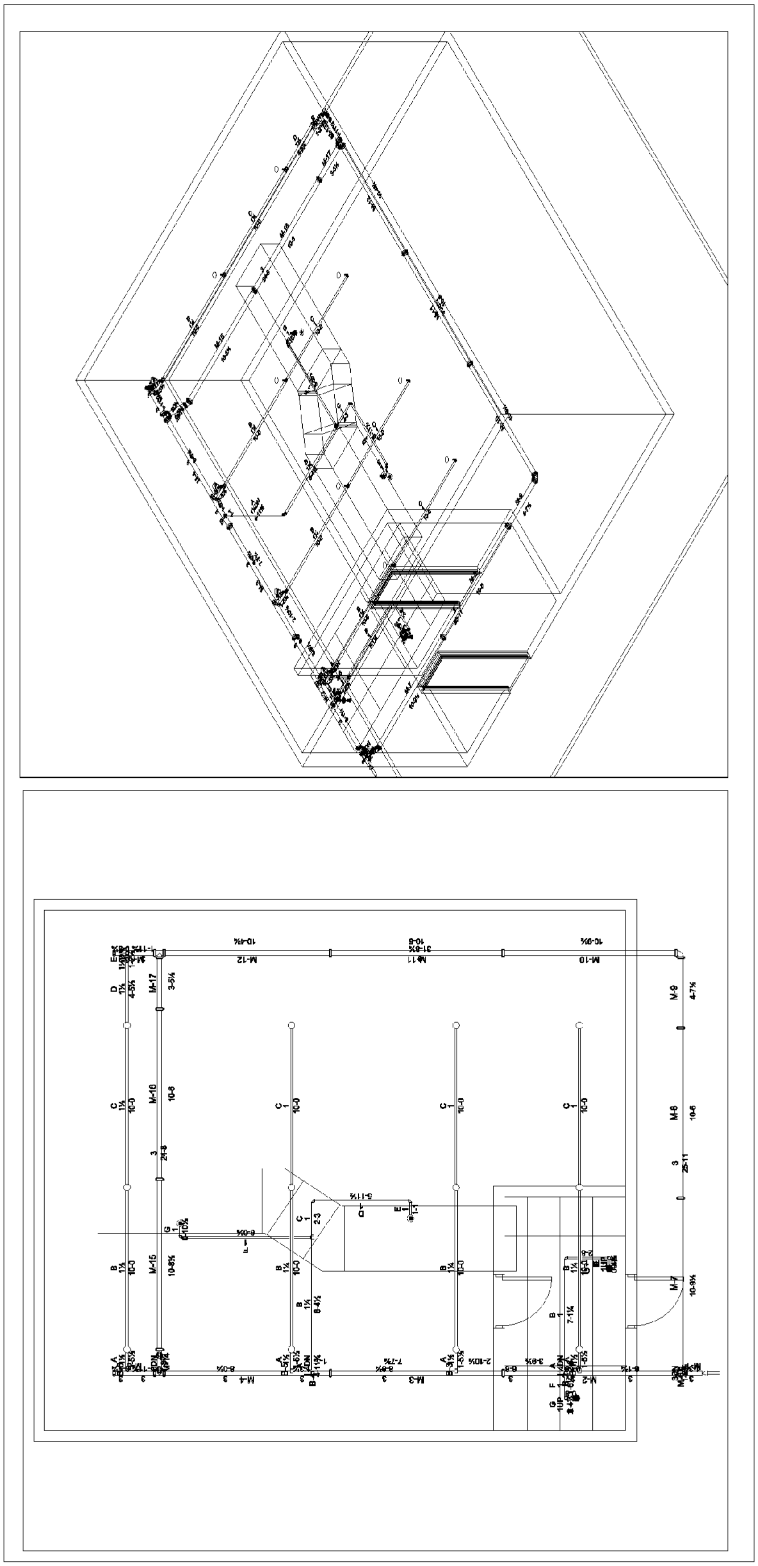

FIG. 114 is a screenshot of a view comparative to FIG. 112 showing the ability of the tags to dynamically scale up and down.

Figure 115:
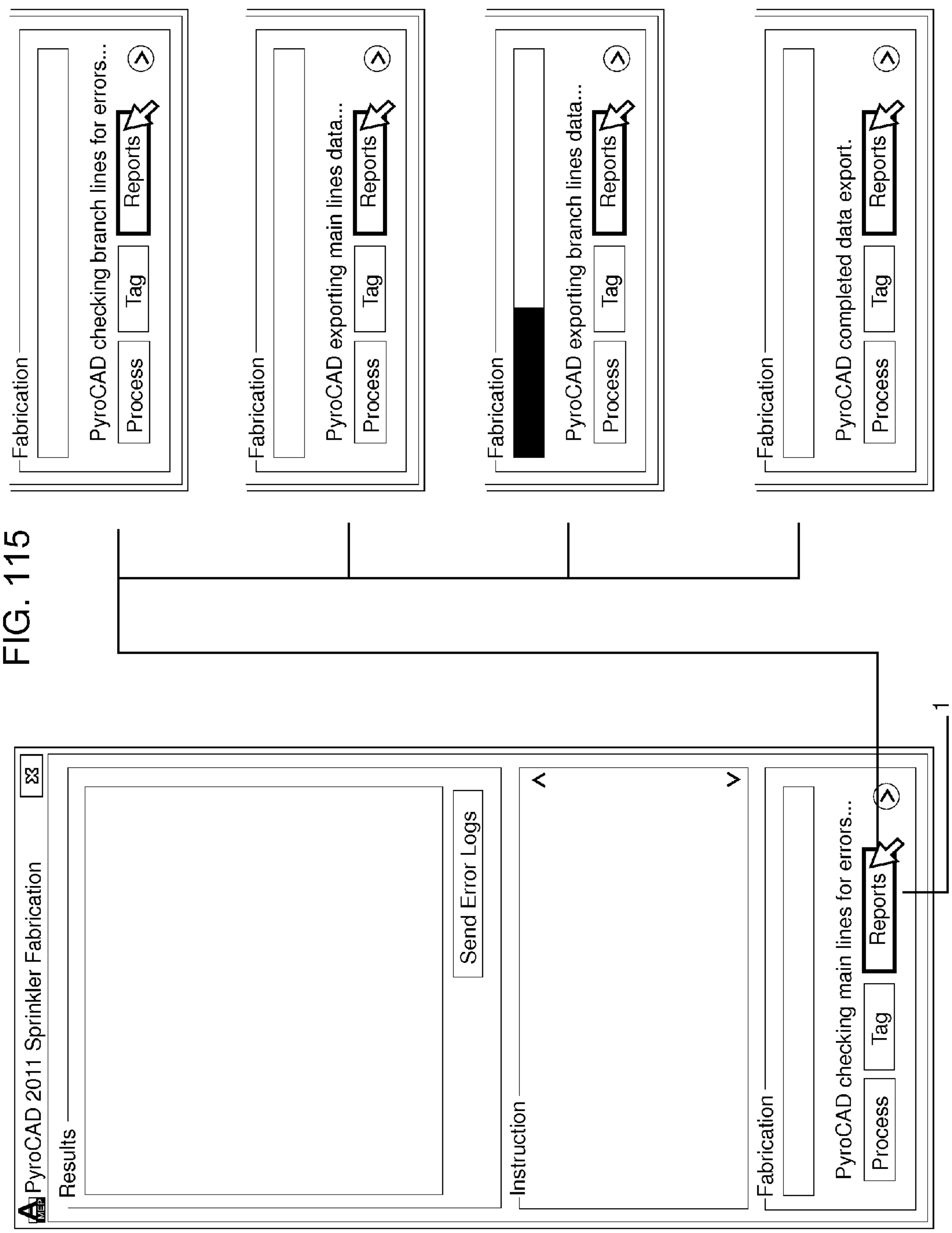

FIG. 115 is a screenshot of the PYROCAD™ application form after the reports button has been pressed and reporting has commenced.

Figure 116:
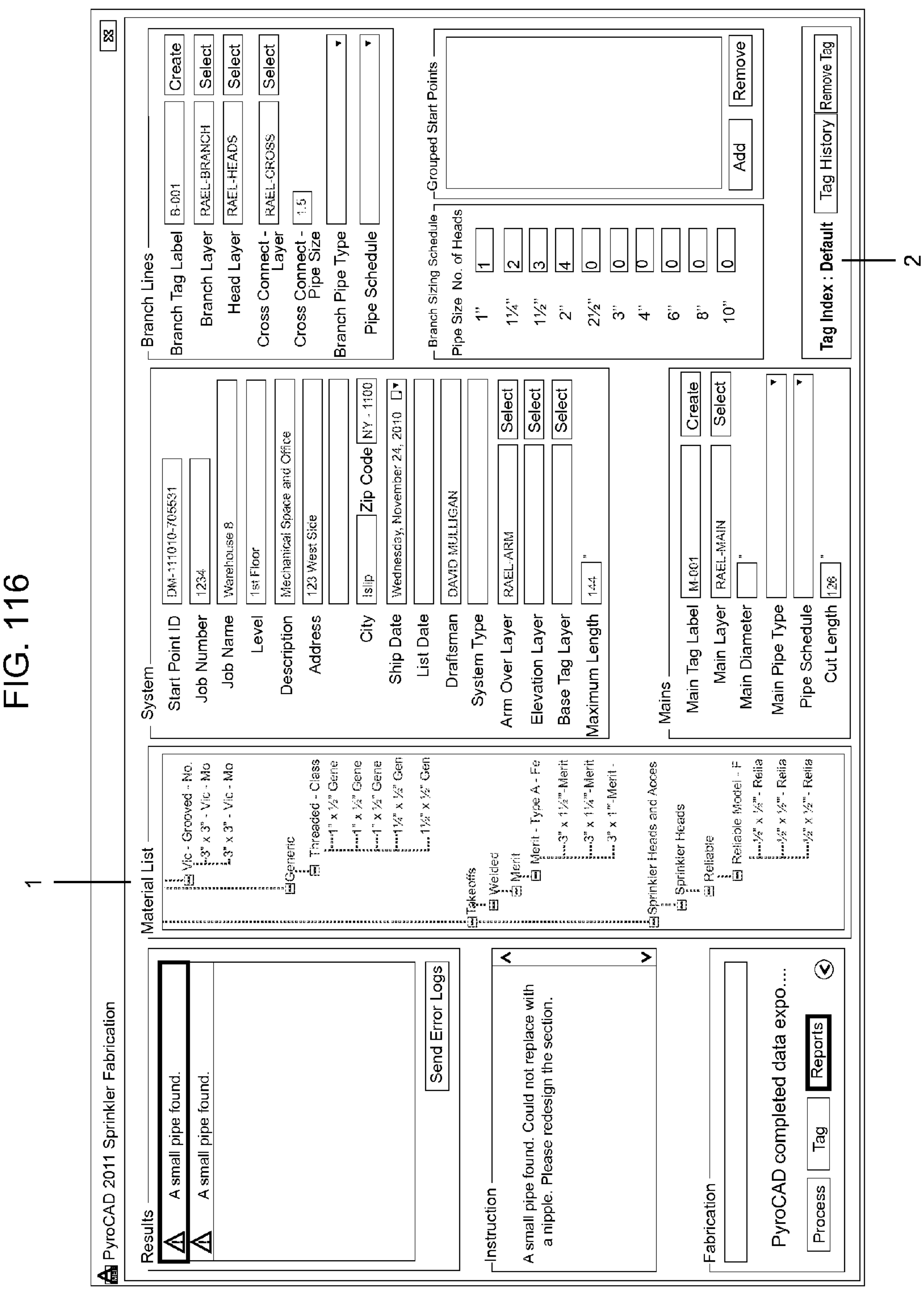

FIG. 116 is a screenshot of the PYROCAD™ application form after the reports button has been pressed and reporting has commenced showing the accumulation of the tree view of materials in the material list frame.

Figure 117:
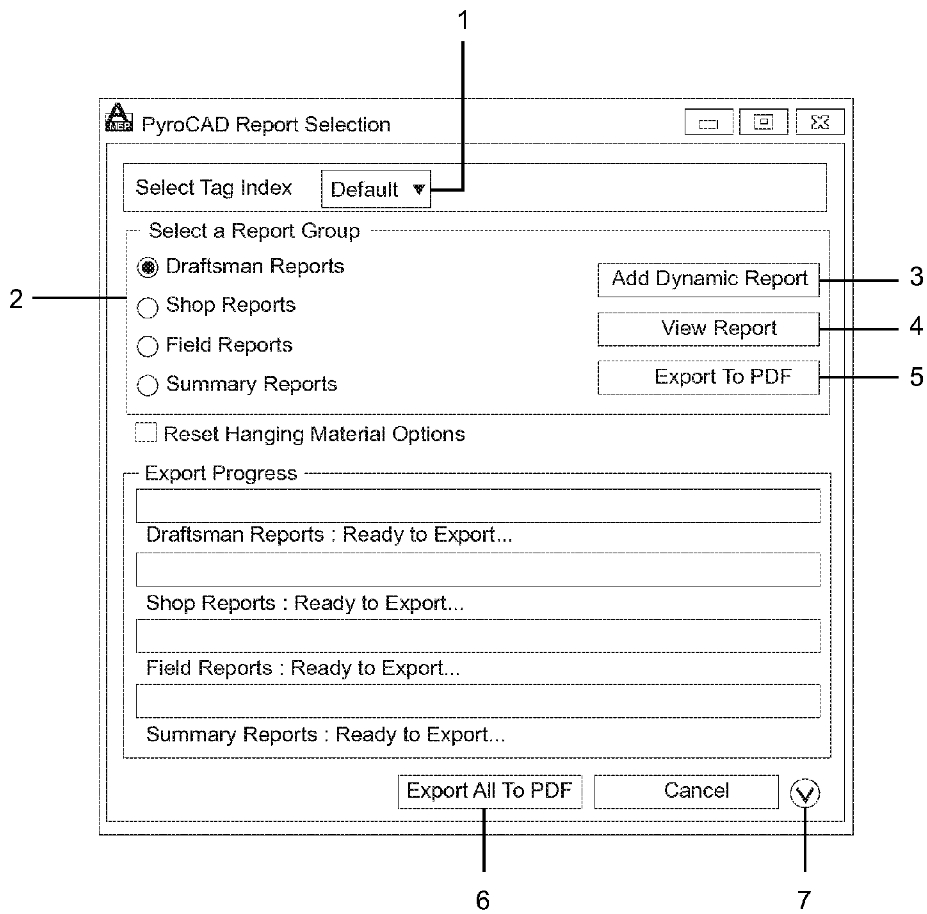

FIG. 117 is a screenshot of the PYROCAD™ report selection form in a compact state.

Figure 118:
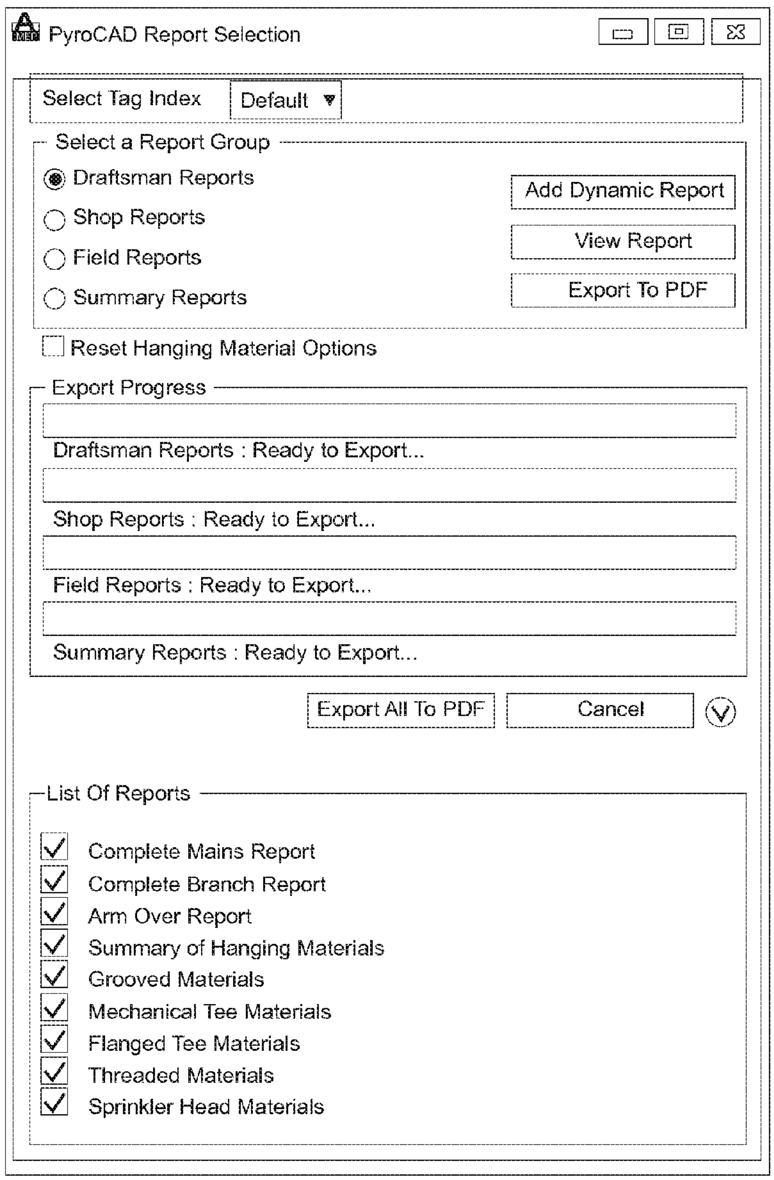

FIG. 118 is a screenshot of the PYROCAD™ report selection form in an open state showing the list of reports.

Figure 119:
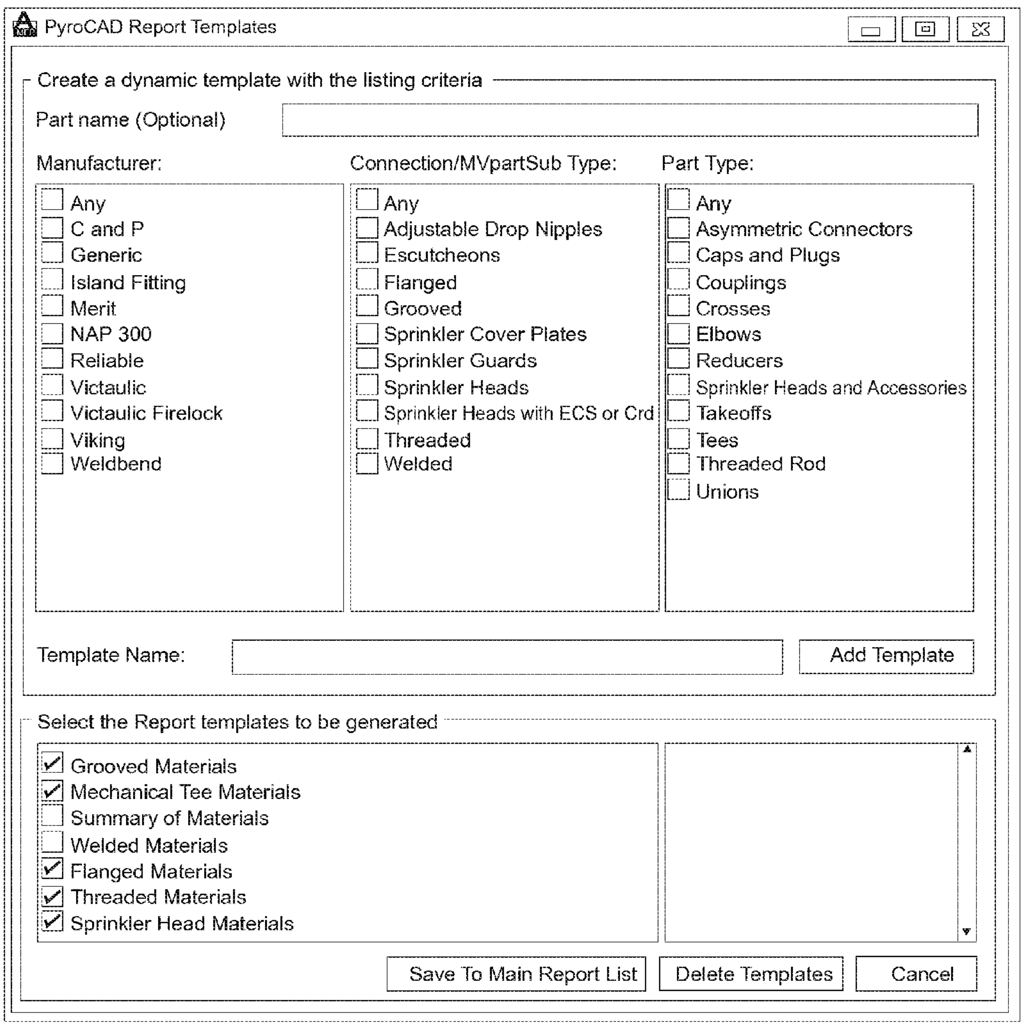

FIG. 119 is a screenshot of the PYROCAD™ report templates form.

Figure 120:
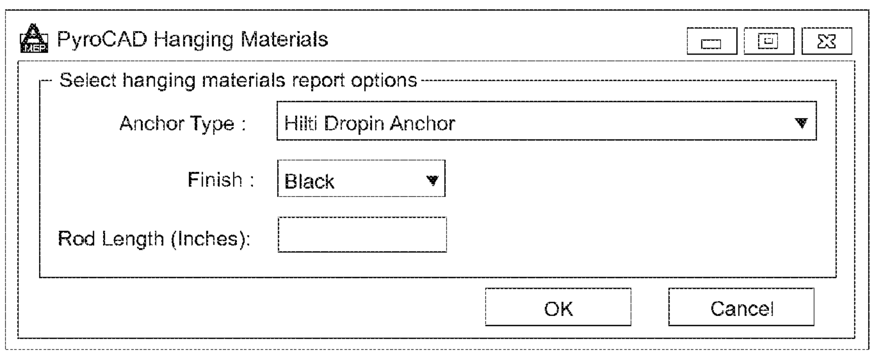

FIG. 120 is a screenshot of the PYROCAD™ hanging materials form.

Figure 121:
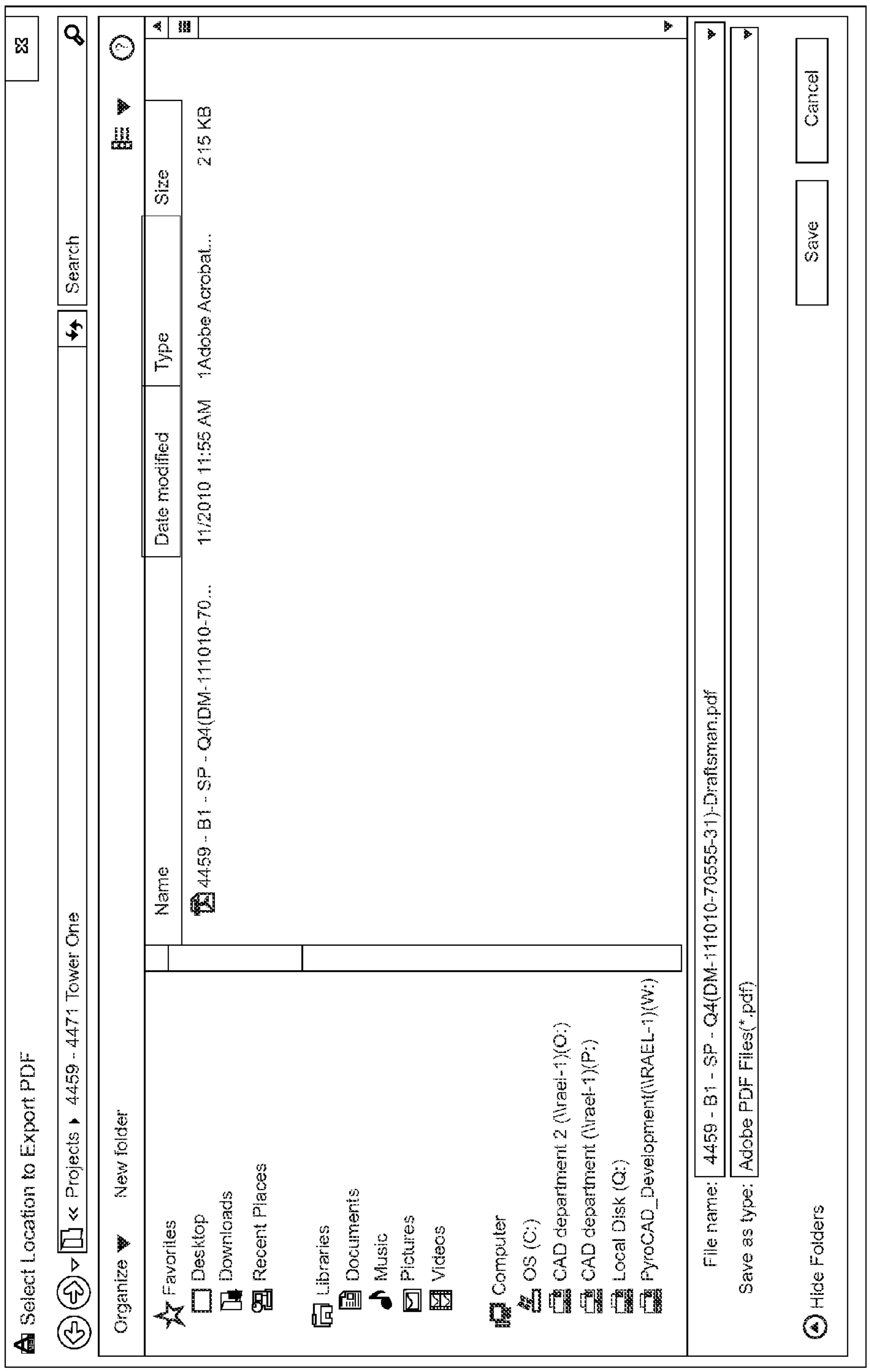

FIG. 121 is a screenshot of the PYROCAD™ select location to export PDF form.

Figure 122:
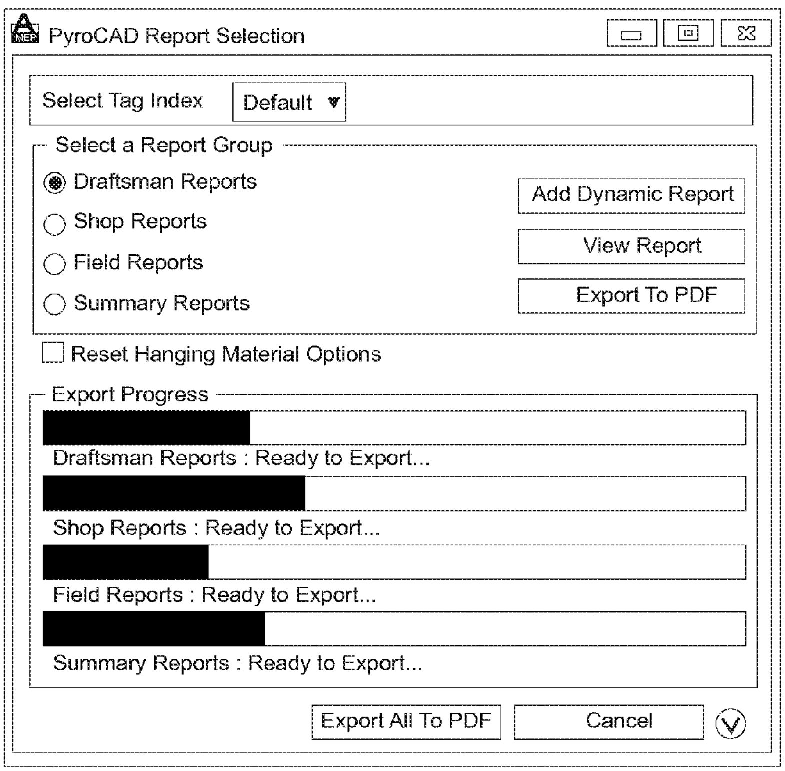

FIG. 122 is a screenshot of PYROCAD™ report selection form after the export all PDF button has been pressed.

Figure 123:
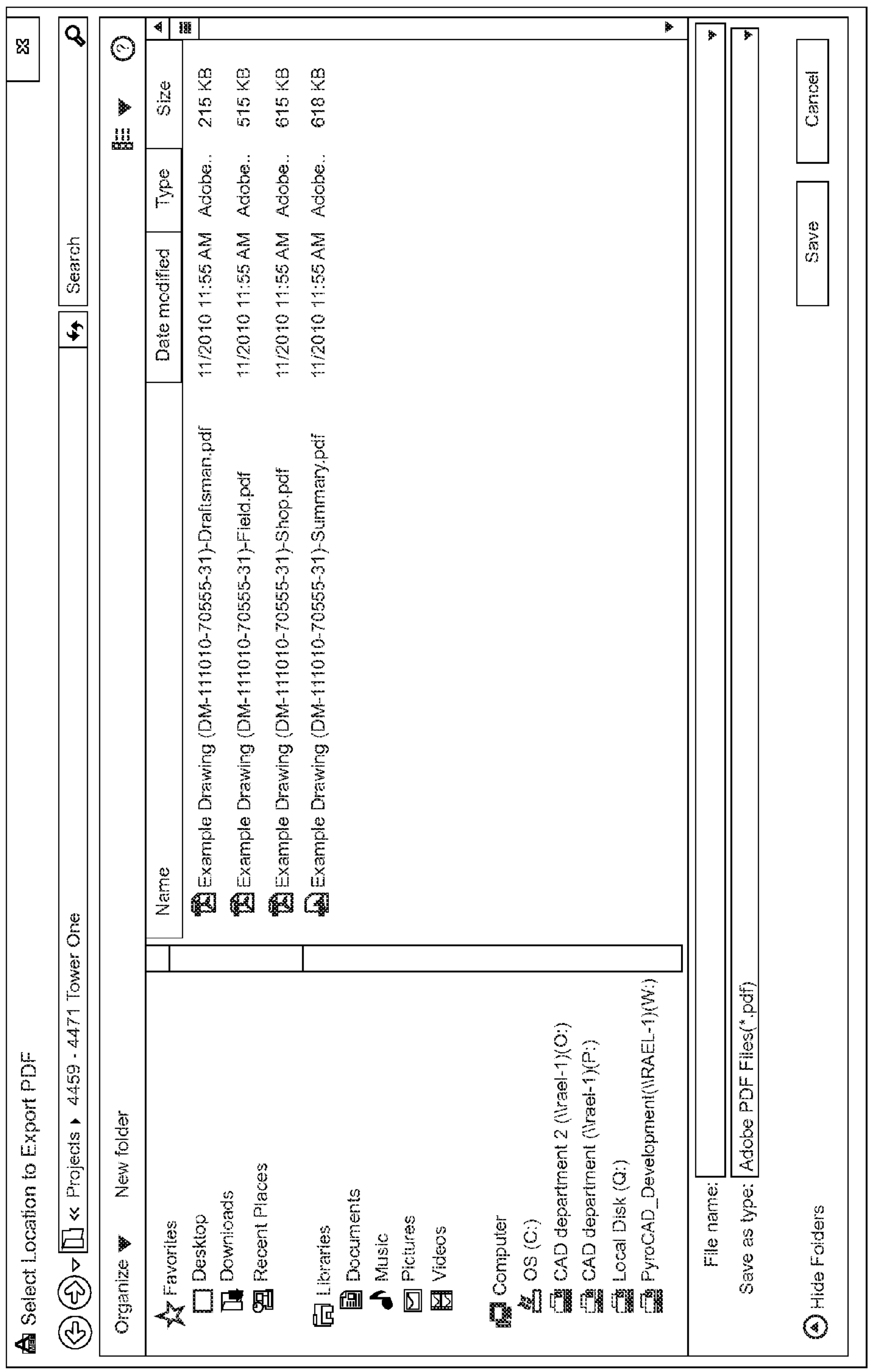

FIG. 123 is a screenshot of the PYROCAD™ select location to export PDF form showing the file naming conventions automated during the exporting to PDF process.

FIG. 124 is a screenshot of a PYROCAD™ reports cover page.

FIG. 125 is a screenshot of a page from the completed mains report section of the PDF file named example drawing (DM-111010-70555-31)-shop.pdf shown in FIG. 123.

Figure 126:
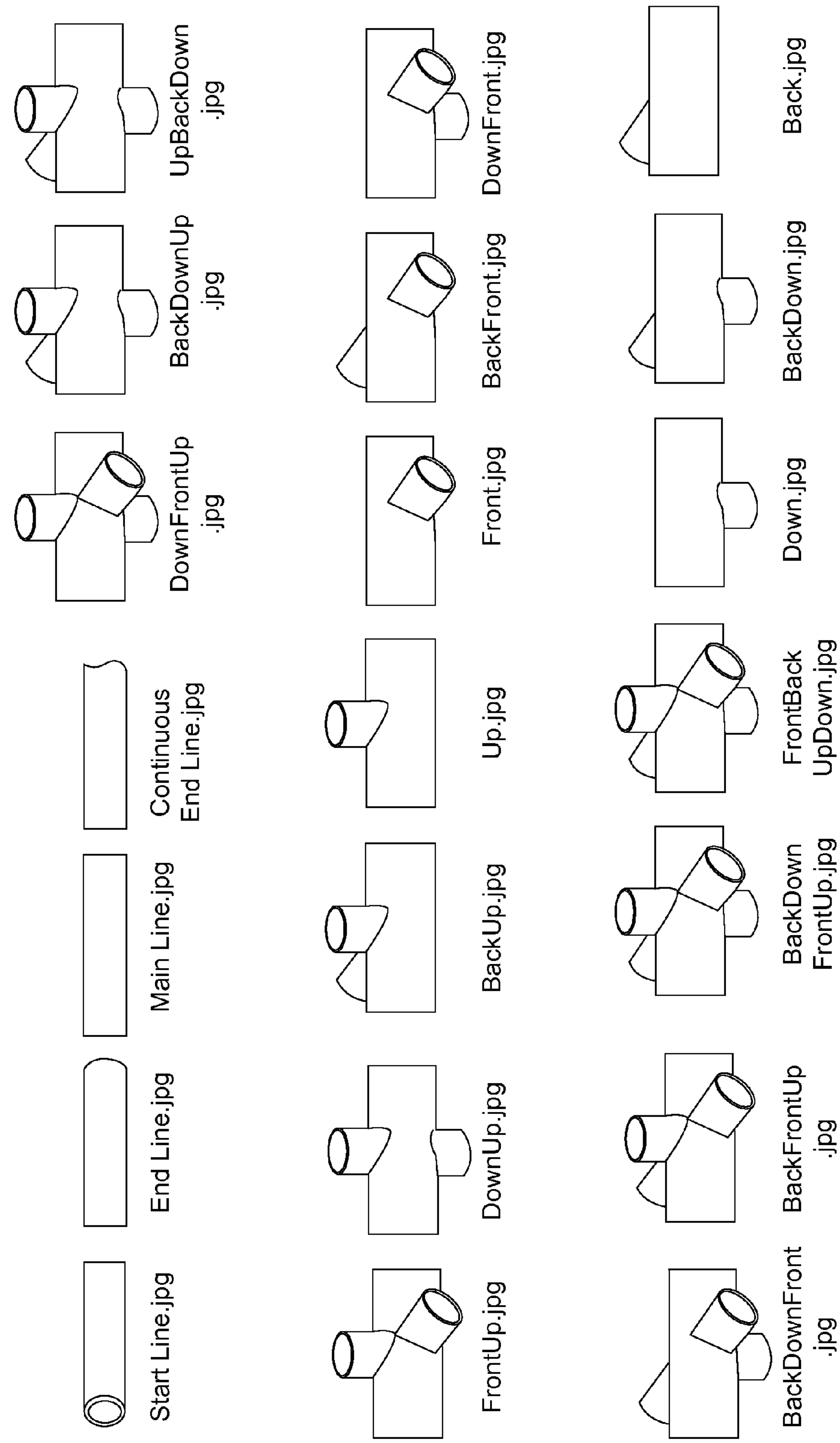

FIG. 126 is an illustration of various images showing the PYROCAD™ takeoff holes configurations for the mains reports.

FIG. 127 is a screenshot of a branch report from the draftsman report.

Figure 128:
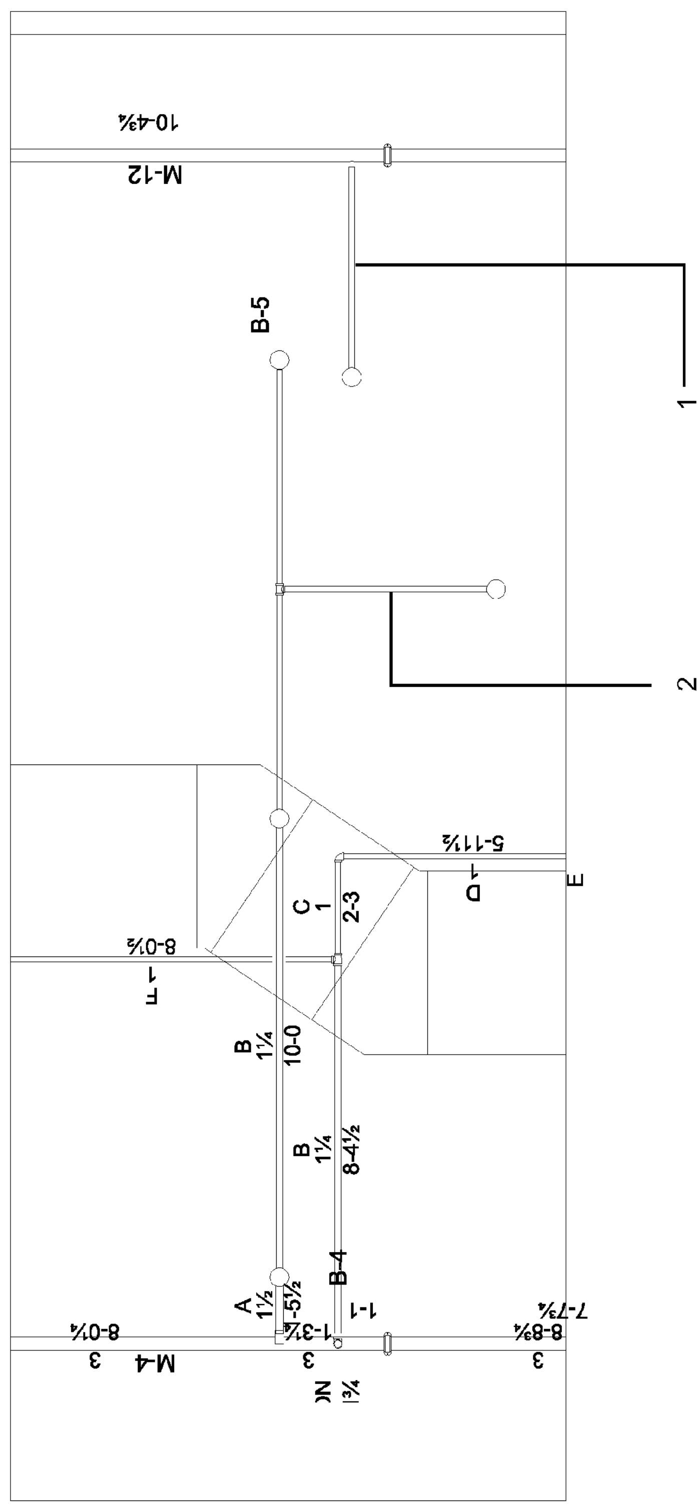

FIG. 128 is a screenshot of a view of two additional sprinkler heads being added and the associated piping to connect them to either the existing branch or main piping.

Figure 129:
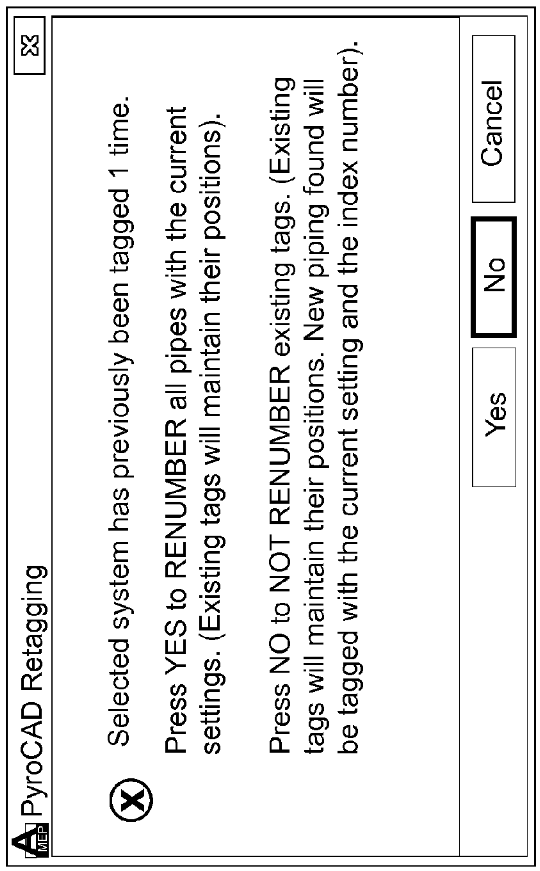

FIG. 129 is a screenshot of the PYROCAD™ retagging dialog box.

Figure 130:
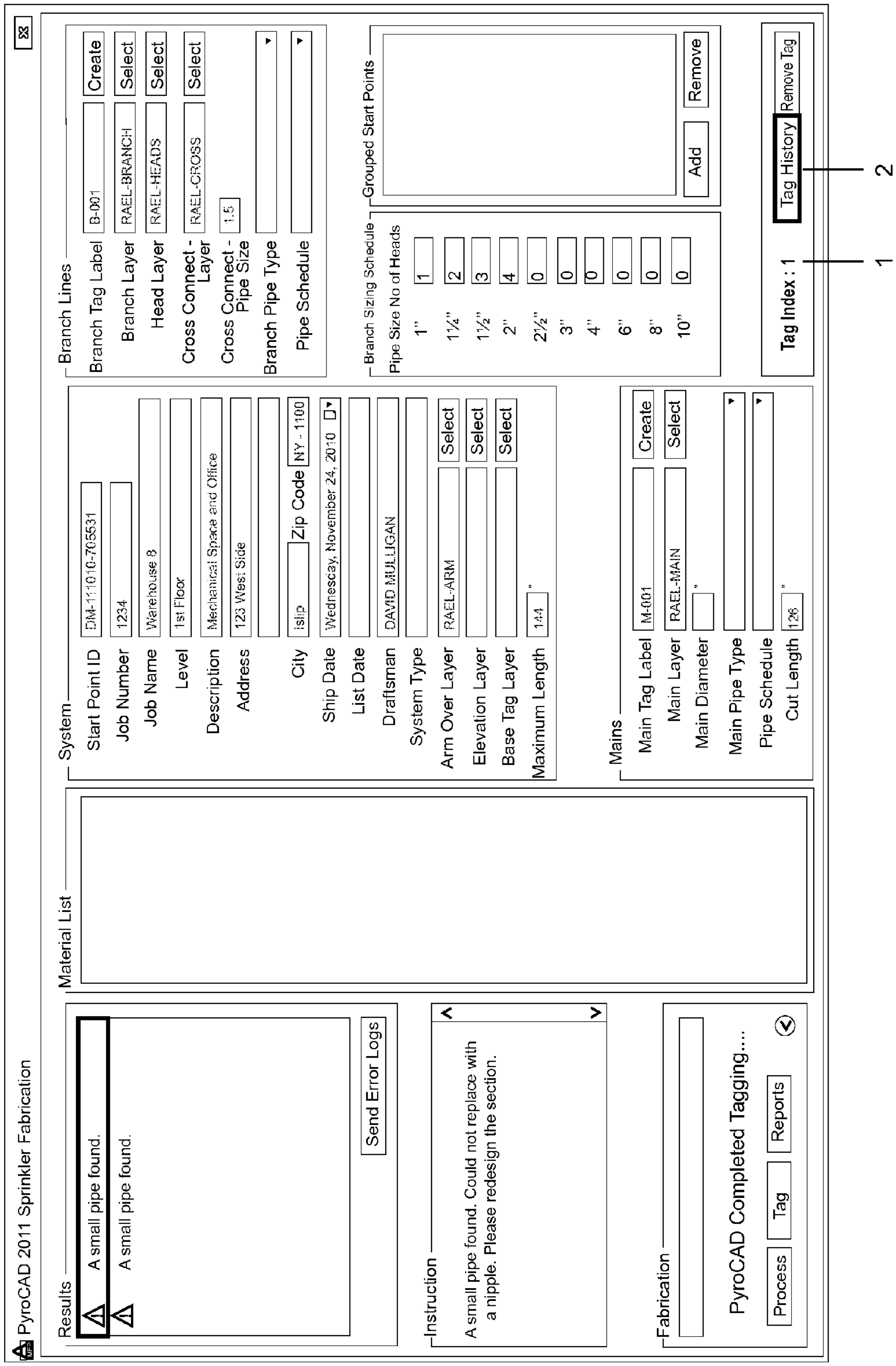

FIG. 130 is a screenshot of the PYROCAD™ application form after the system has been tagged a second time displaying a tag index of one.

Figure 131:
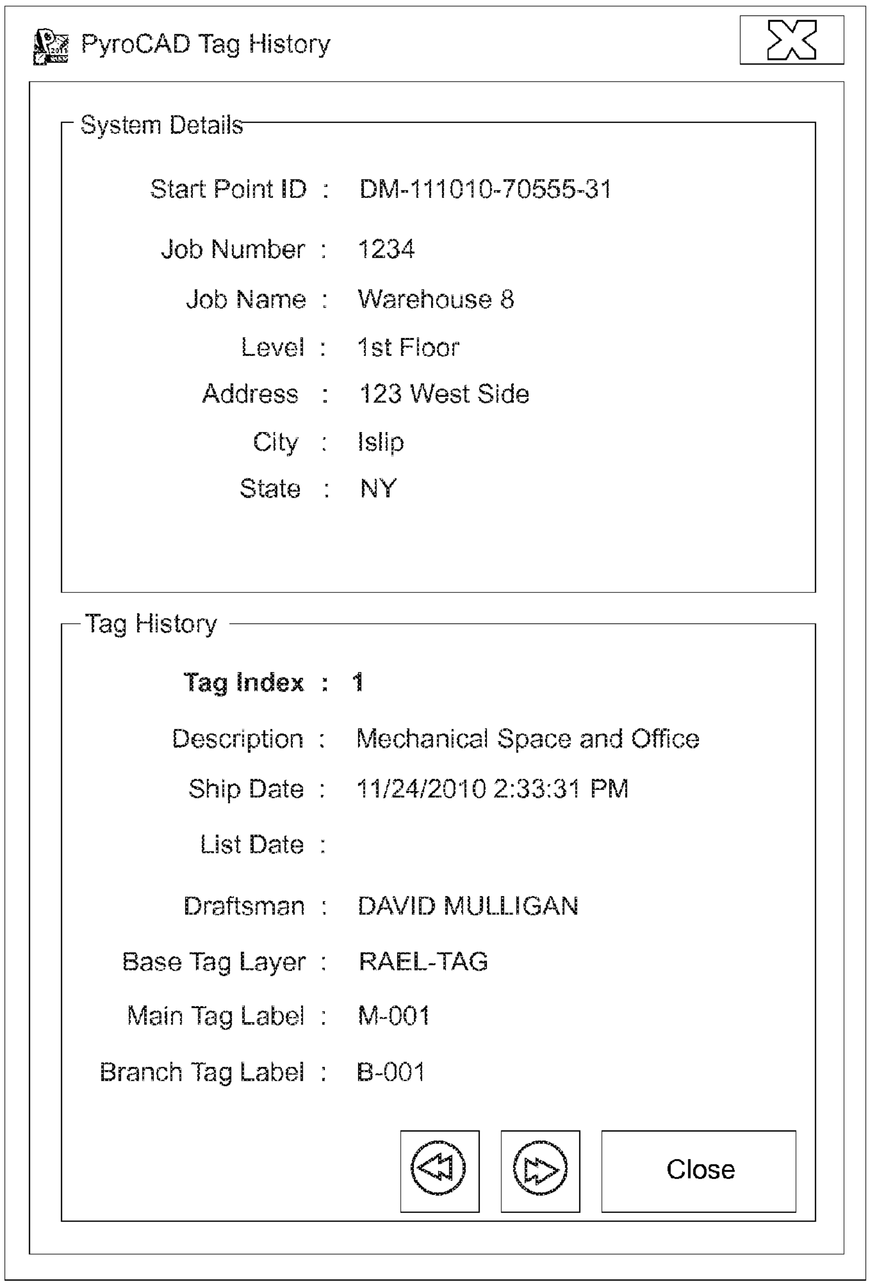

FIG. 131 is a screenshot of the PYROCAD™ tag history form.

Figure 132:
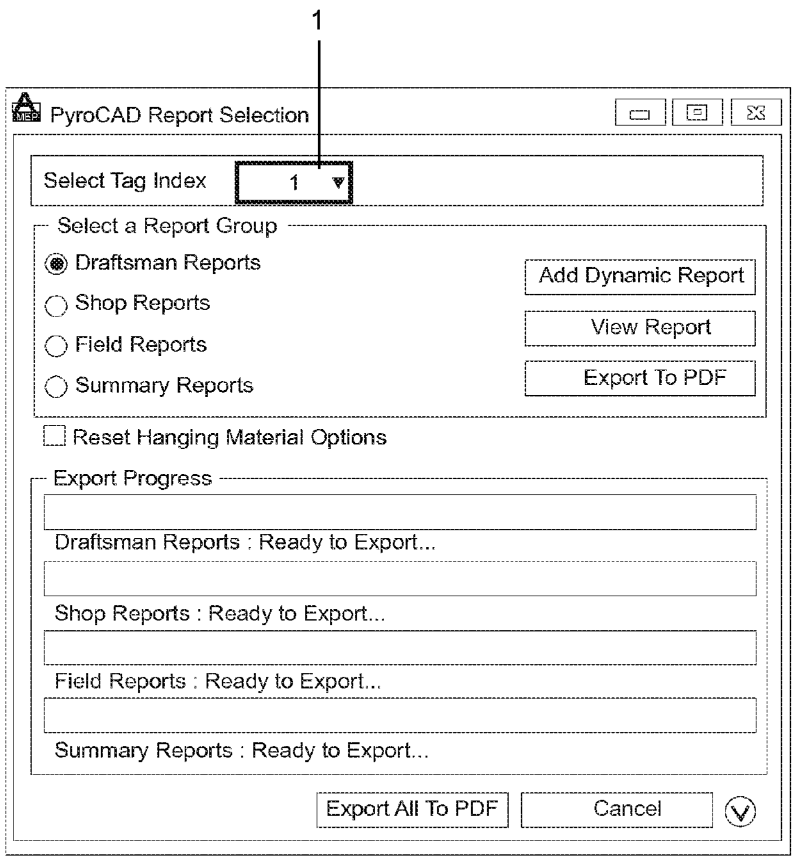

FIG. 132 is a screenshot of the PYROCAD™ report selection form showing the tag index number one selected.

Figure 133:
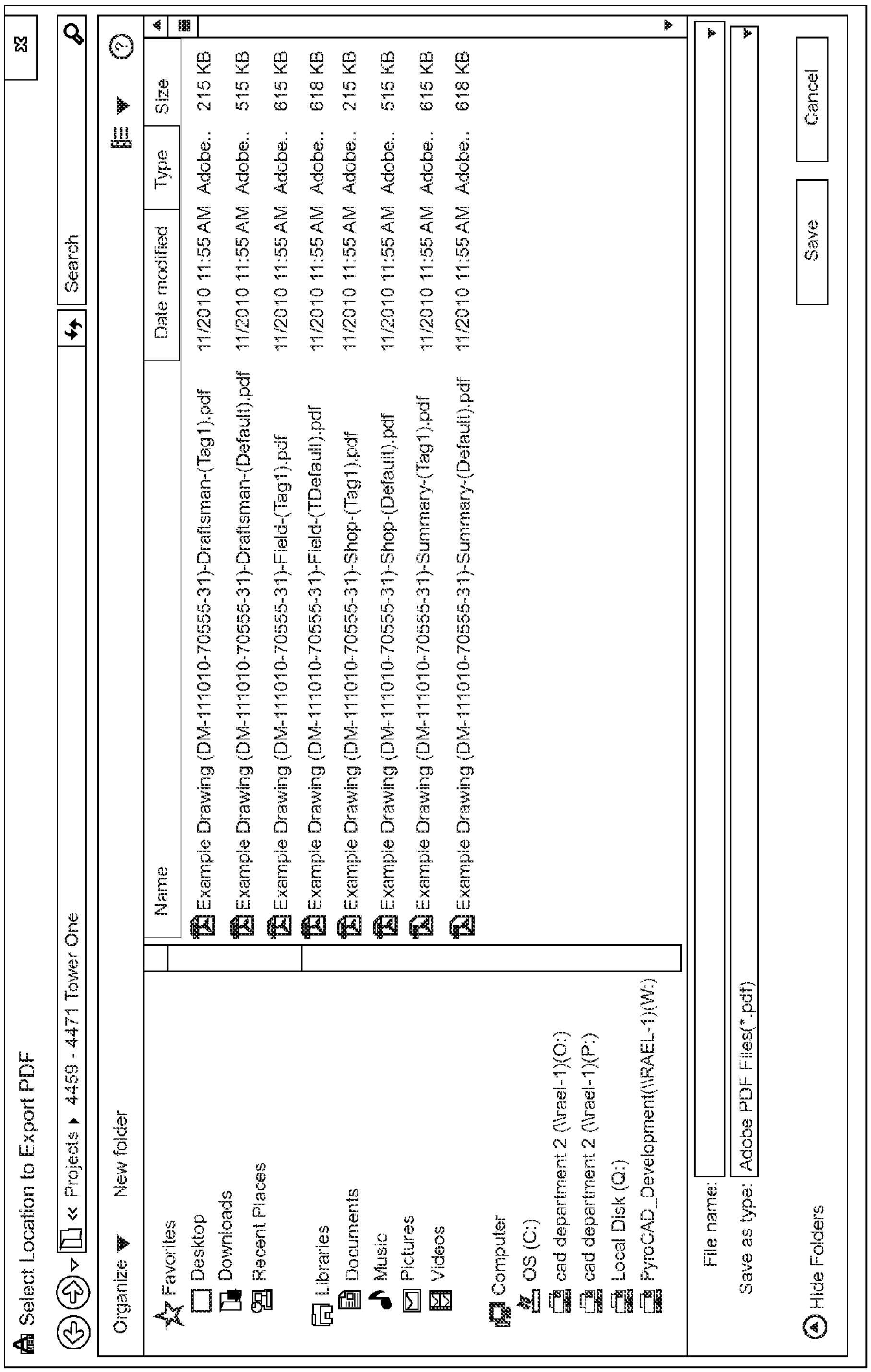

FIG. 133 is a screenshot of the PYROCAD™ select location to export PDF Form showing two files for each report differing by the concatenated tag index at the end of the filename.

Figure 134:
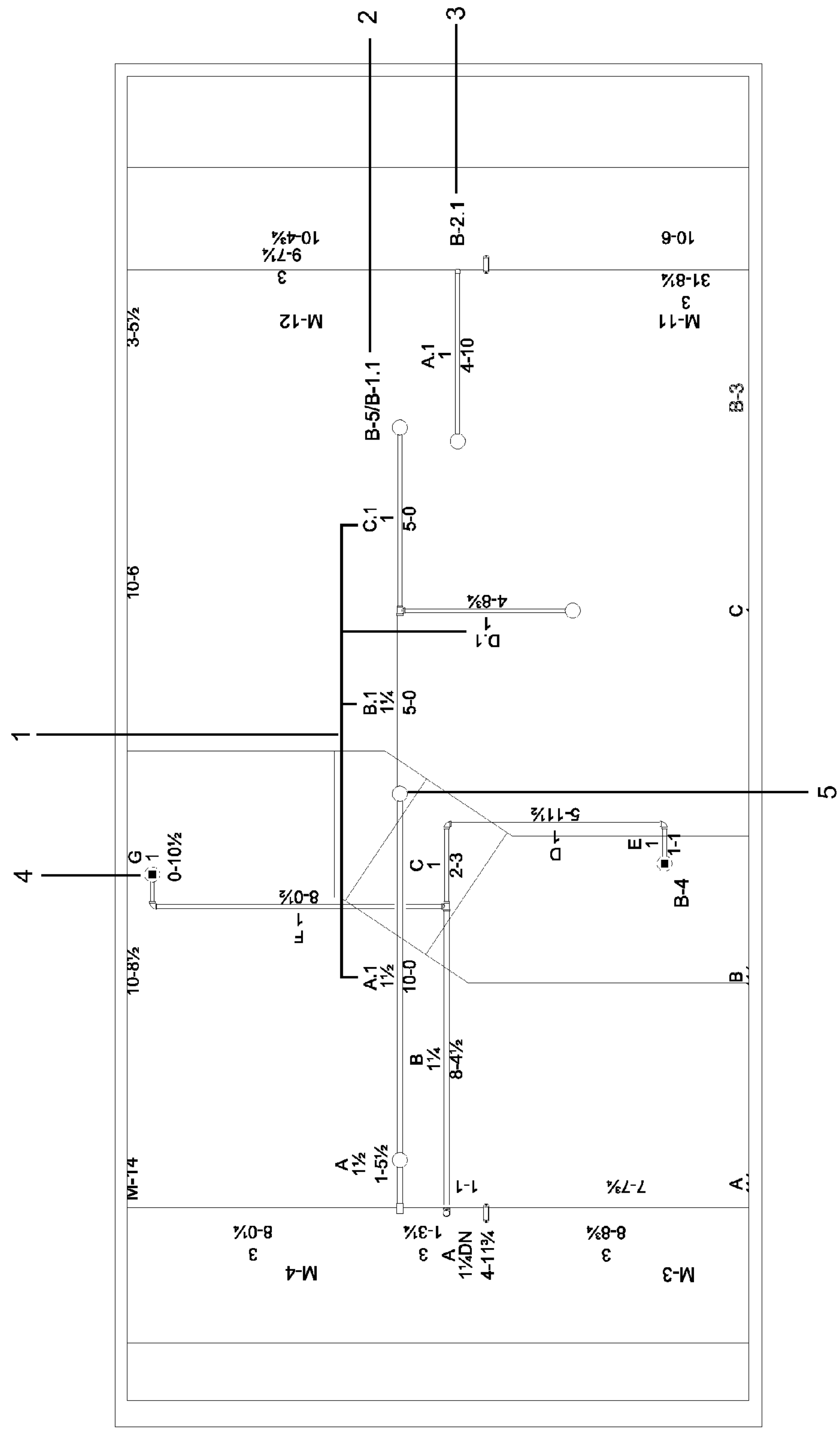

FIG. 134 is a screenshot of a view of the piping system with the newly created tags and the concatenated pipe tags and branch line tags.

Figure 135:
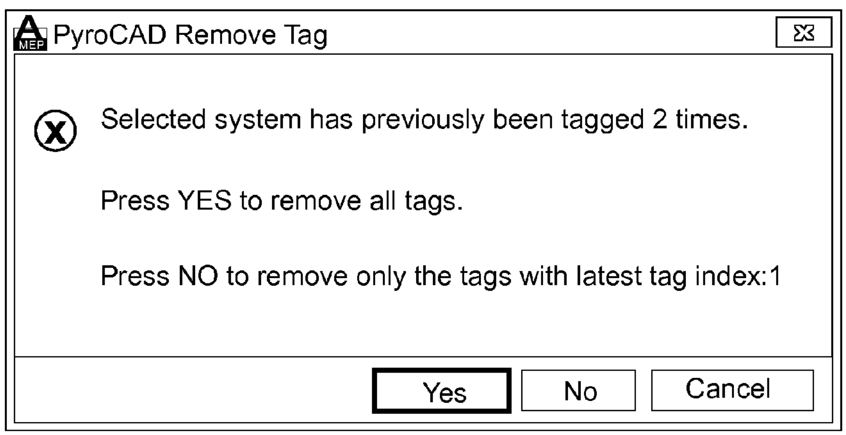

FIG. 135 is a screenshot of the PYROCAD™ remove tag confirmation dialog.

Figure 136:
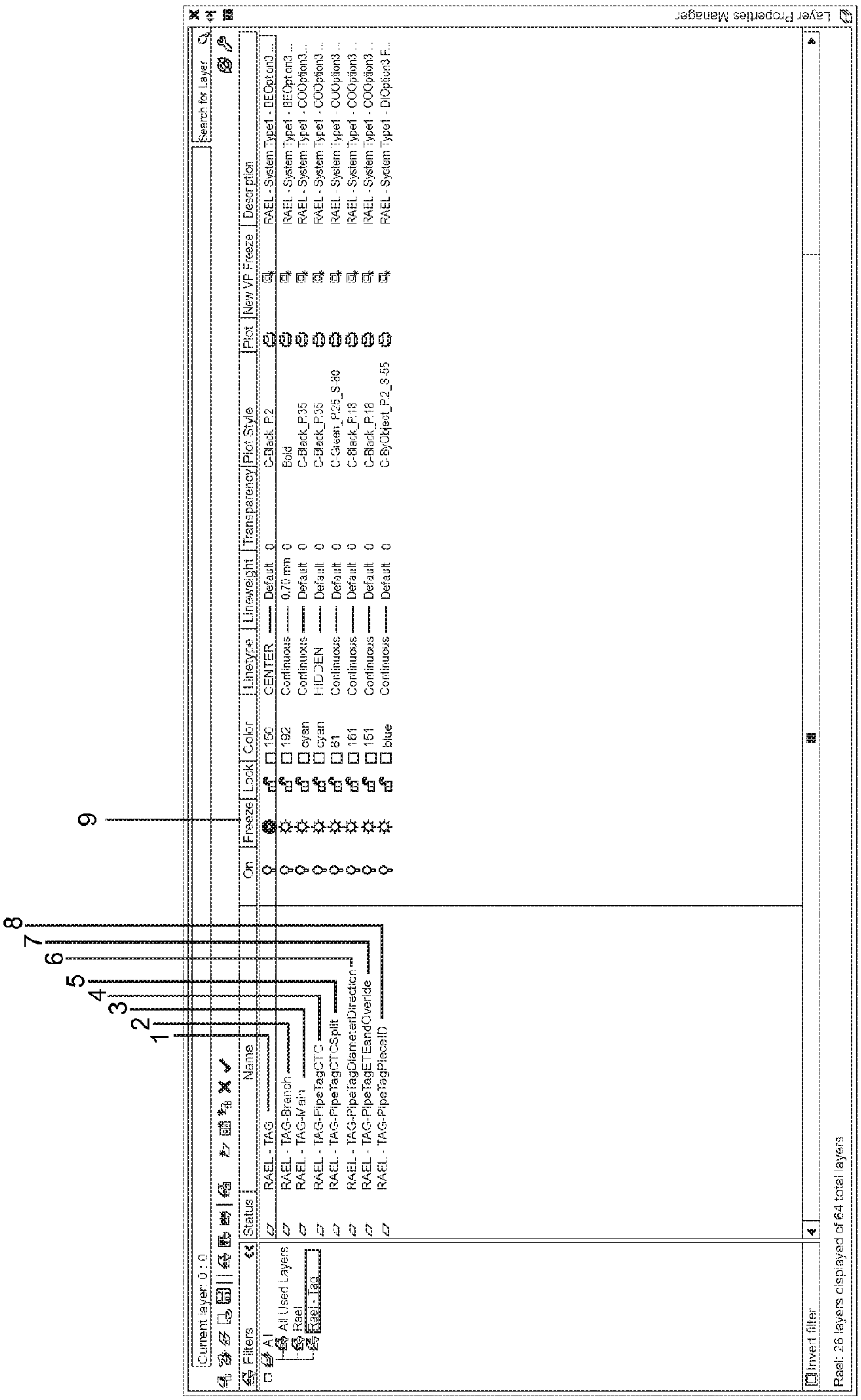

FIG. 136 is a screenshot of the AUTOCAD® MEP layer properties manager showing the PYROCAD™ created tag layers.

Figure 137:
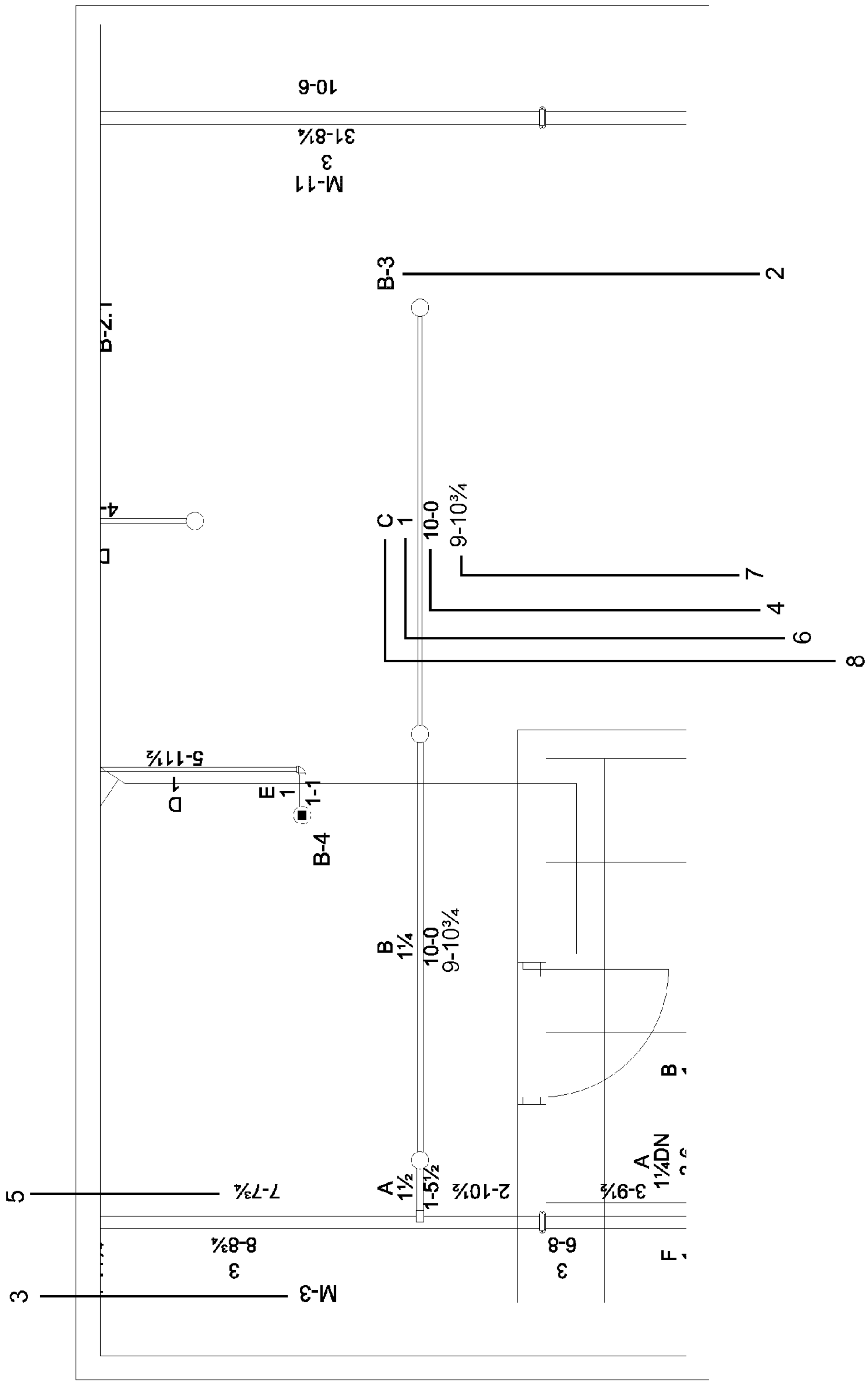

FIG. 137 is a screenshot of a view of the piping system describing which components of the tags reside on which layers.

Figure 138:
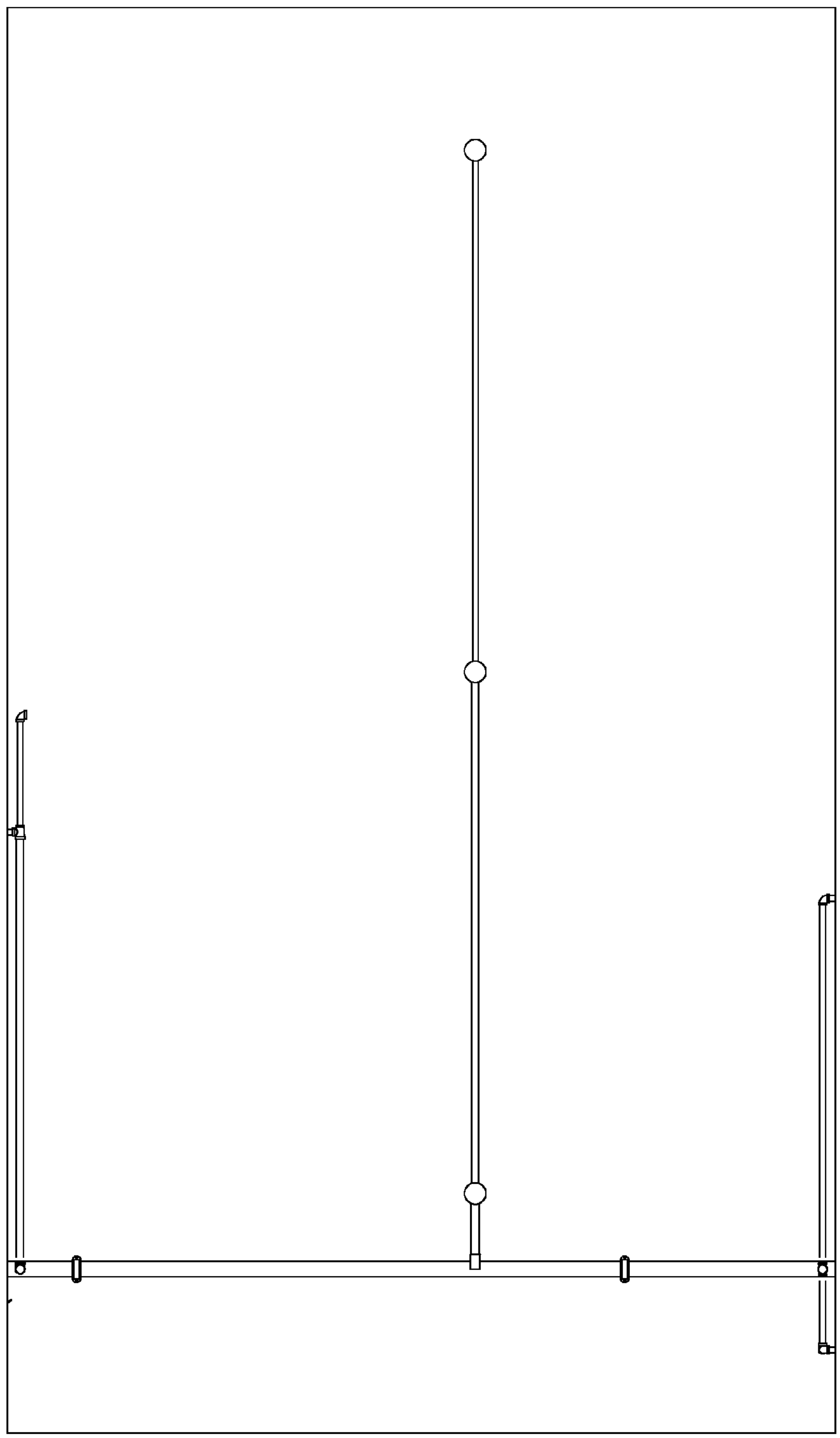

FIG. 138 is a screenshot of a view of the piping system with base of parent tag layer frozen, thereby making all tags not visible.

Figure 139:
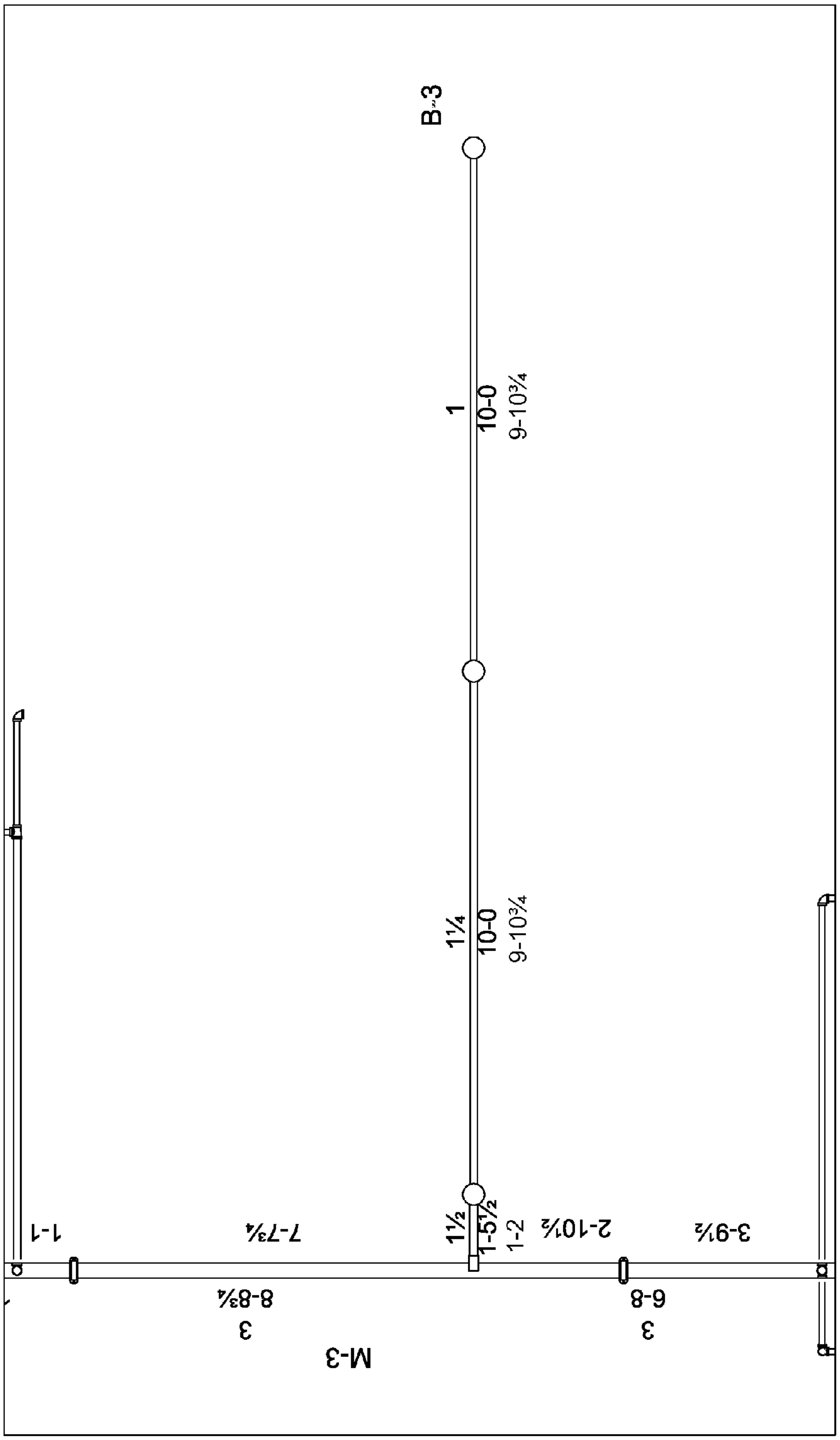

FIG. 139 is a screenshot of a view of the piping system with child tag layer controlling the piece ID frozen, thereby making all piece IDs not visible.

Figure 140:
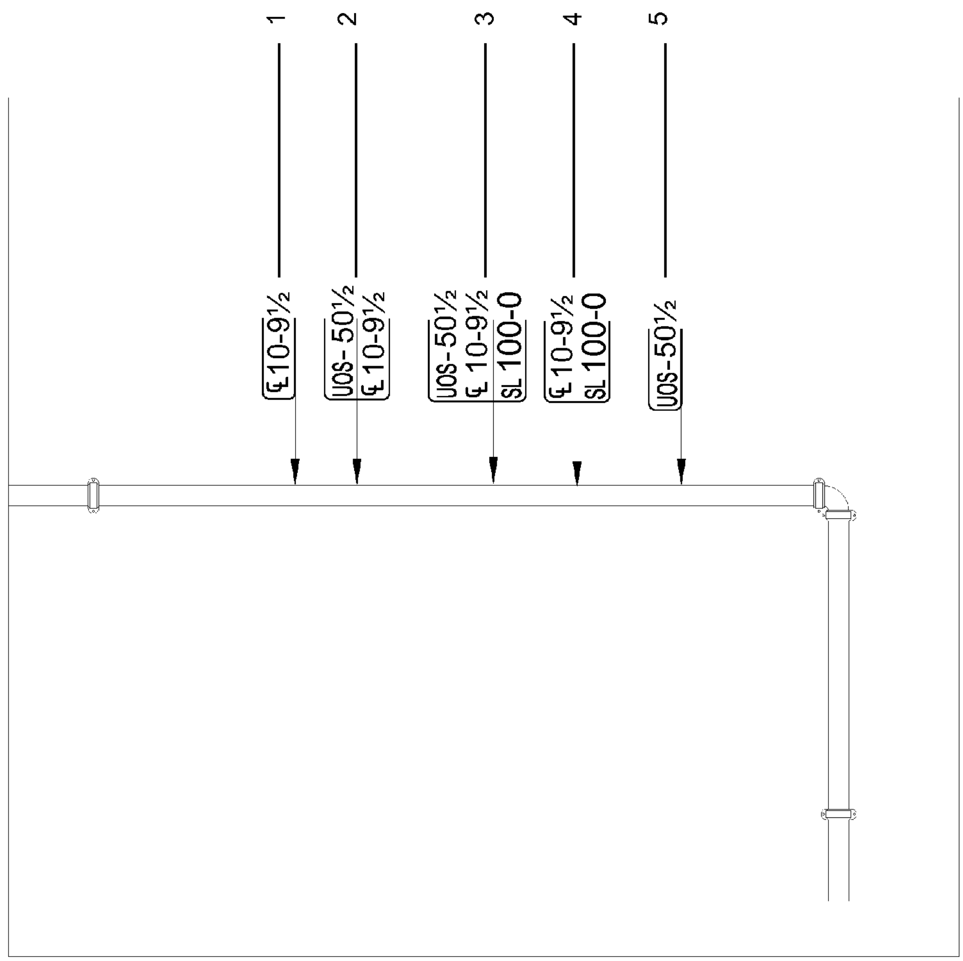

FIG. 140 is a screenshot of a view of a pipe with multiple elevation tags attached to it.

Figure 141:
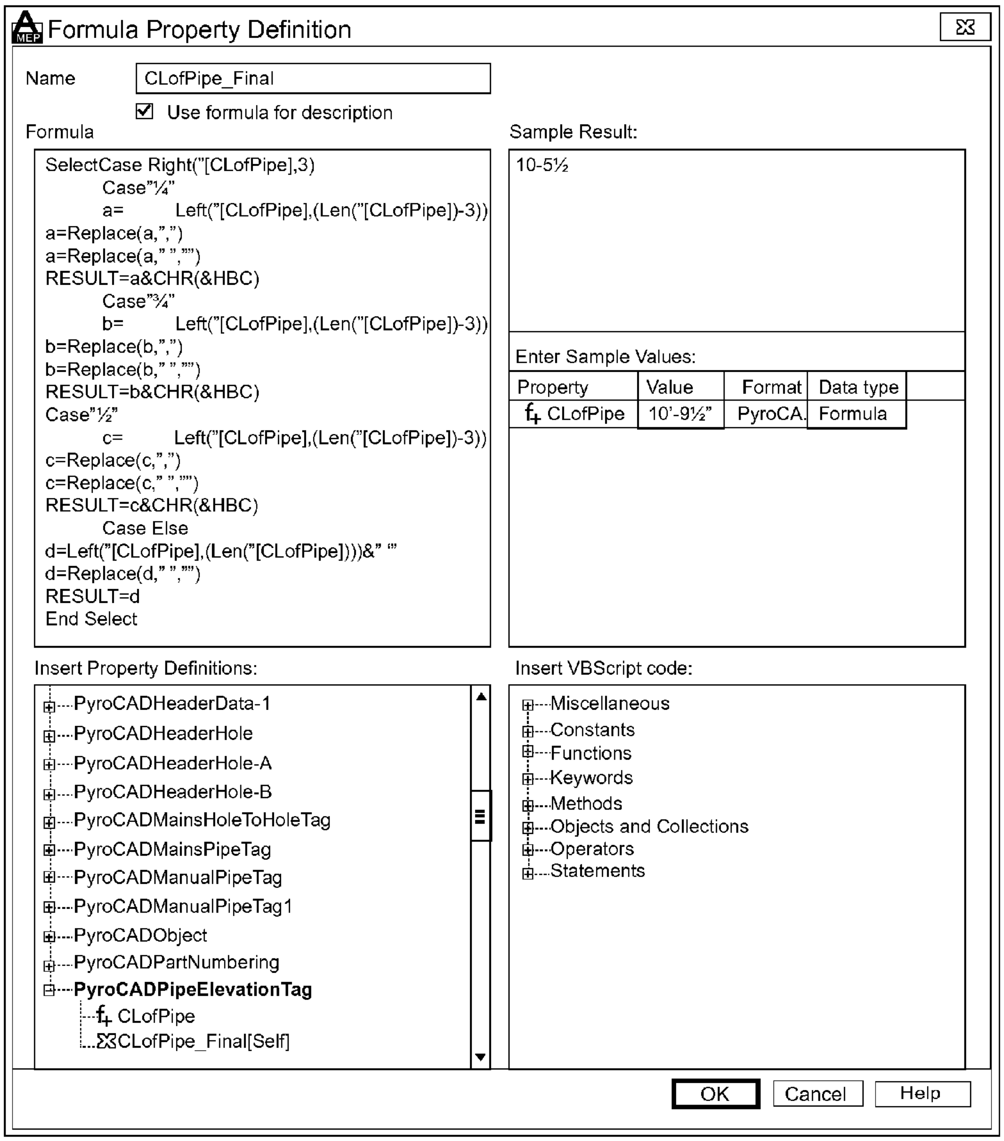

FIG. 141 is a screenshot of the AUTOCAD® MEP formula property definition from where the custom VISUAL BASIC® script is written for the PYROCAD™ elevation tags property data.

Figure 142:
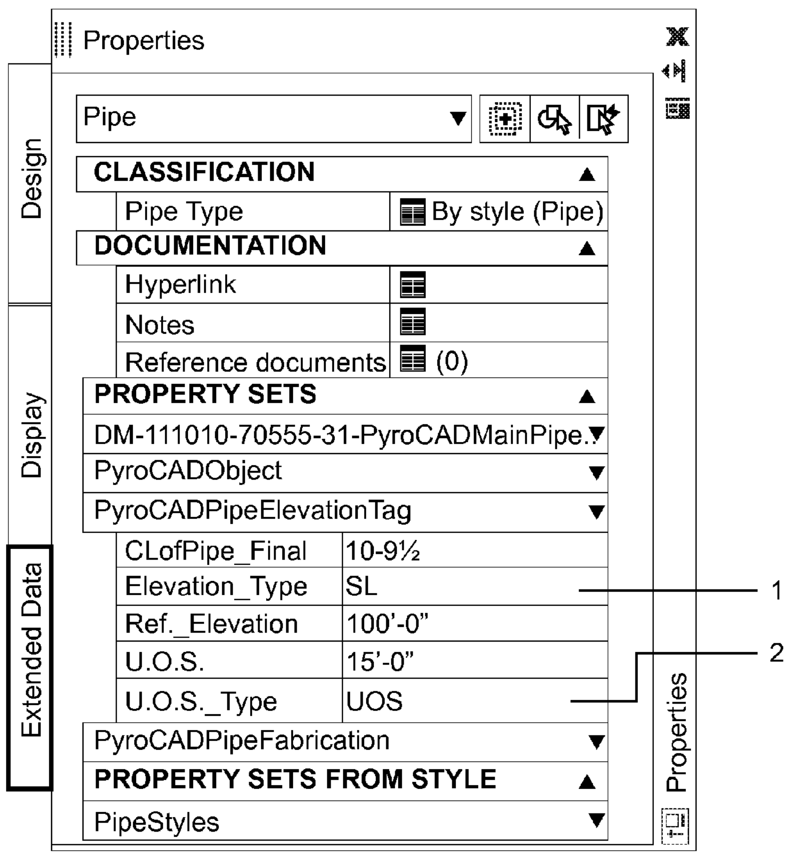

FIG. 142 is a screenshot of the AUTOCAD® MEP properties palette extended data tab showing values for the PYROCADpiepeelevationtag properties set data attached to the pipe shown in FIG. 140.

Figure 143:
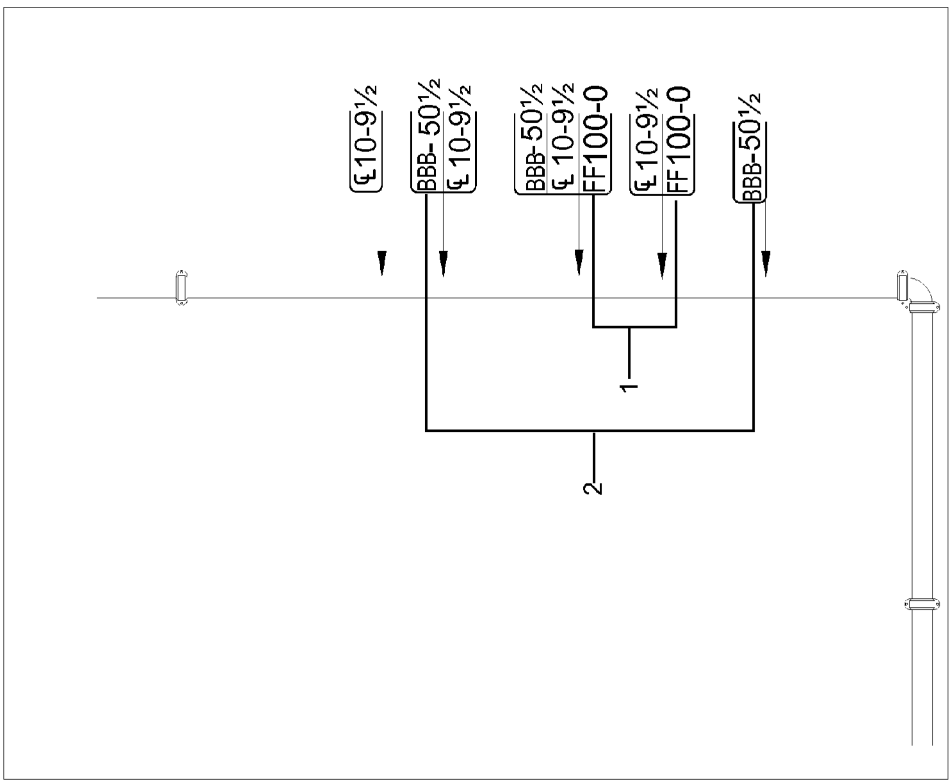

FIG. 143 is a screenshot of a view of a pipe with multiple elevation tags attached to it.

Figure 144:
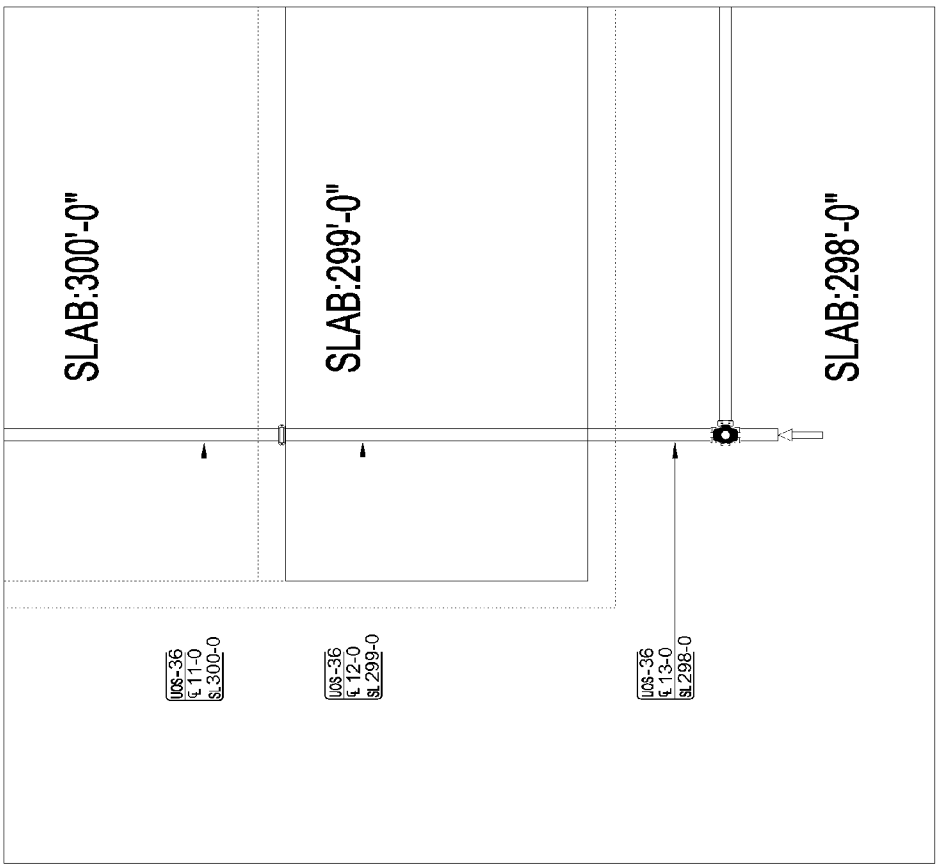

FIG. 144 is a screenshot of a view of elevations tags being used to reference multiple slab heights.

Figure 145:
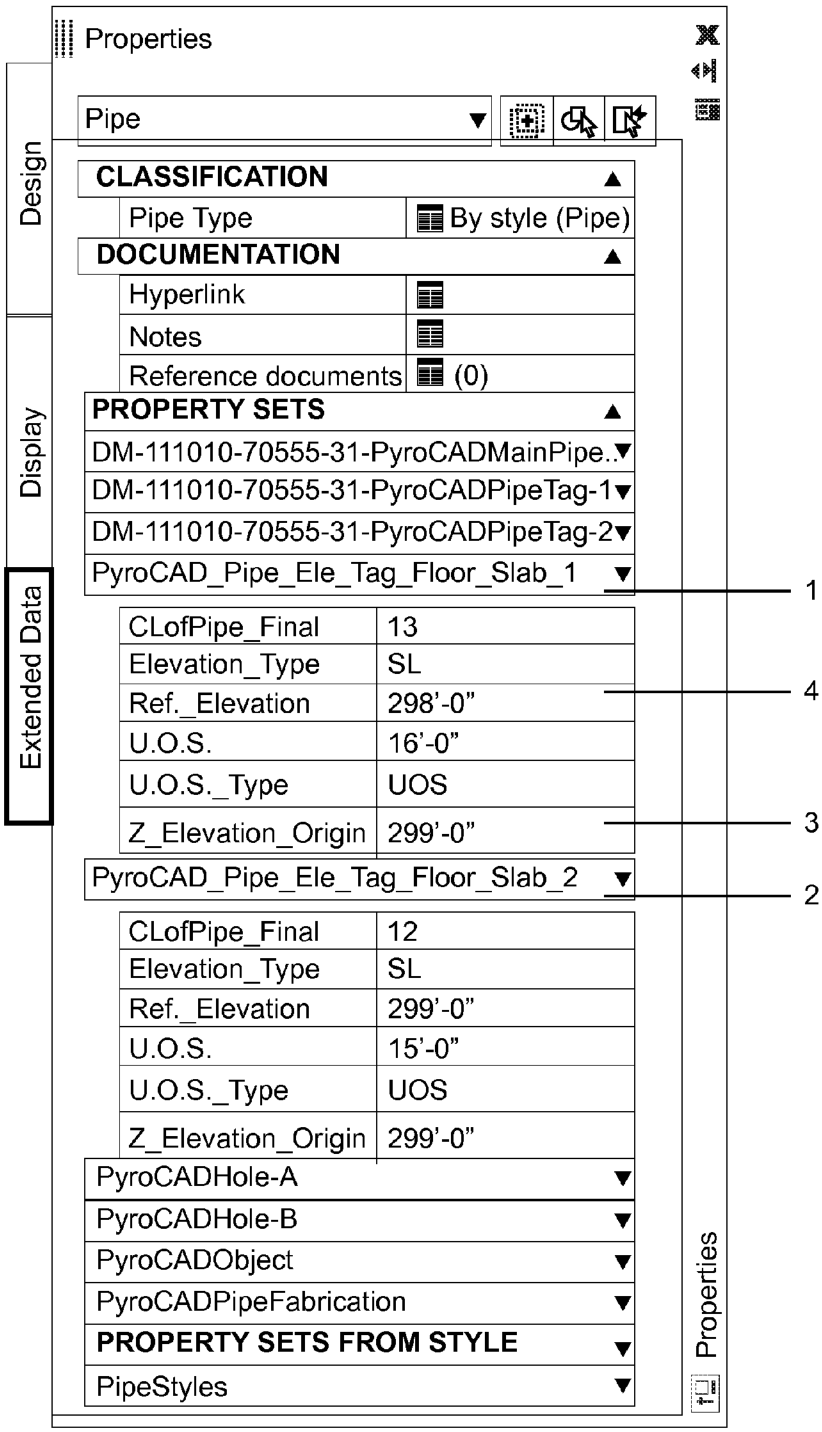

FIG. 145 is a screenshot of the AUTOCAD® MEP properties palette extended data tab showing values for the PYROCAD_pipe_ele_tag_floor_slab_1 and PYROCAD_pipe_ele_tag_floor_slab_2 properties set data attached to the pipe shown in FIG. 144.

DETAILED DESCRIPTION OF INVENTION

A. Overview

As the construction industry evolves, so will the tools that are used to aid in the design, fabrication and installation of mechanical piping systems. In the United States, Autodesk's CADD software is the dominant product used in the construction industry. Specifically, Autodesk's AUTOCAD® MEP CADD software is designed to meet the needs of the mechanical trades. Autodesk's AUTOCAD® MEP software includes the following mechanical disciplines: heating, ventilation and air conditioning; piping; electrical; and plumbing. The AUTOCAD® MEP software creates a generic foundation for these disciplines.

Although the AUTOCAD® MEP software provides an excellent foundation, the design environment it provides is very generic. This default environment is suitable for the type of basic design that is performed primarily by mechanical engineering firms, that is, piping systems that convey the design intent but are not intended to result in fabricated materials or installation drawings. For mechanical contractors (such as Rael), a more robust implementation of the AUTOCAD® MEP software is needed. This more robust implementation must be capable of taking the piping design from the early design stages through the fabrication and installation processes, as noted above.

By design the AUTOCAD® MEP software is highly customizable and automatable. The user interface of the AUTOCAD® MEP software can be customized by creating profiles, workspaces, menus, drawing templates, tool palettes, property sets, tags, part catalogs and additional constructs of the software environment. The AUTOCAD® MEP software can be automated via the built-in API, which exposes the AUTOCAD® MEP classes to allow other software applications (including the present invention) to control the AUTOCAD® MEP environment.

The PYROCAD™ software is a tightly integrated extension of the AUTOCAD® MEP software environment. This integration is achieved in two ways—first, by customizing the AUTOCAD® MEP software environment from the generic to the specific, and second, by providing new automated functionality via the built-in API. It is with this customization and automation that the present invention uniquely advances the art of computer-aided piping design.

Regarding customization, PYROCAD™ offers a specific piping design environment through custom tools and a user interface that aid in the assembly of a library of parts created specifically for this invention. When piping systems are designed in PYROCAD™ from the earliest design stages to final fabrication, the three-dimensional piping model always represents specific parts from specific manufacturers of accurate size in three-dimensional space. As such, the three-dimensional piping model generated by the present invention is a WYSIWYG (what-you-see-is-what-you-get) model.

The importance of this approach needs to be considered in light of the recent changes in the construction industry. With the adoption of building information modeling (BIM) methods by owners and construction management companies, piping systems need to be always available for integration into an overall composite model. This composite model is an integration of all of the construction disciplines, for example, steel, concrete, architectural walls, piping systems, heating and ventilation systems, and electrical systems. The composite model is a cost-saving tool used by owners and construction management companies to find and eliminate problems in a virtual model prior to the construction process. With the present invention, information is derived from the model and not vice versa, which means that information needed for fabrication, annotation and coordination with other disciplines is inherent and maintained within the model.

Regarding automation, the foundational component provided by the present invention is the traversing algorithm. The function of the traversing algorithm is to travel through the three-dimensional piping model at run time, originating from the defined start point and continuing out along all possible paths of the piping model, and make available to other functions within the application individual pieces of the piping model in a logical order. These possible paths include both looping and branching configurations within the same piping system. A spider's web by comparison is a good example of a looping configuration because there are many paths that loop back upon themselves. A tree branch by comparison is a good example of a branching configuration because, starting at the base, there are many branching paths until the final end of the branch is reached.

The traversing algorithm of the present invention relies exclusively on the AUTOCAD® MEP object connectors. The AUTOCAD® MEP connectors can be thought of like snaps that hold the pipes, fittings and multi-view parts together. These connectors can be used to travel (or "traverse") from one object to another. It is the combination of this traversing algorithm and the AUTOCAD® MEP connectors that create the unique advantages found only in this invention. Specifically, the traversing allows PYROCAD™ to automate formerly manual tasks, such as error detection, segmenting, resizing, grouping and tagging for fabrication, and reporting and summarization of materials. The result of this automation is a tremendous savings in drafting time, which provides a competitive advantage over other piping software available.

In sum, PYROCAD™ is a solution to a long-felt but unsolved need in the piping industry for an automated solution that allows designers of piping systems to build those systems precisely and efficiently. PYROCAD™ builds on the industry standard Autodesk product AUTOCAD® MEP, and it allows for a BIM-compatible design process. PYROCAD increases profits by saving drafting hours with a more efficient design environment, and it results in a higher quality design through the WYSIWYG model. Finally, it creates drawings with unique characteristics that aid in expediting the installation process.

B. Figures

Figure 3:
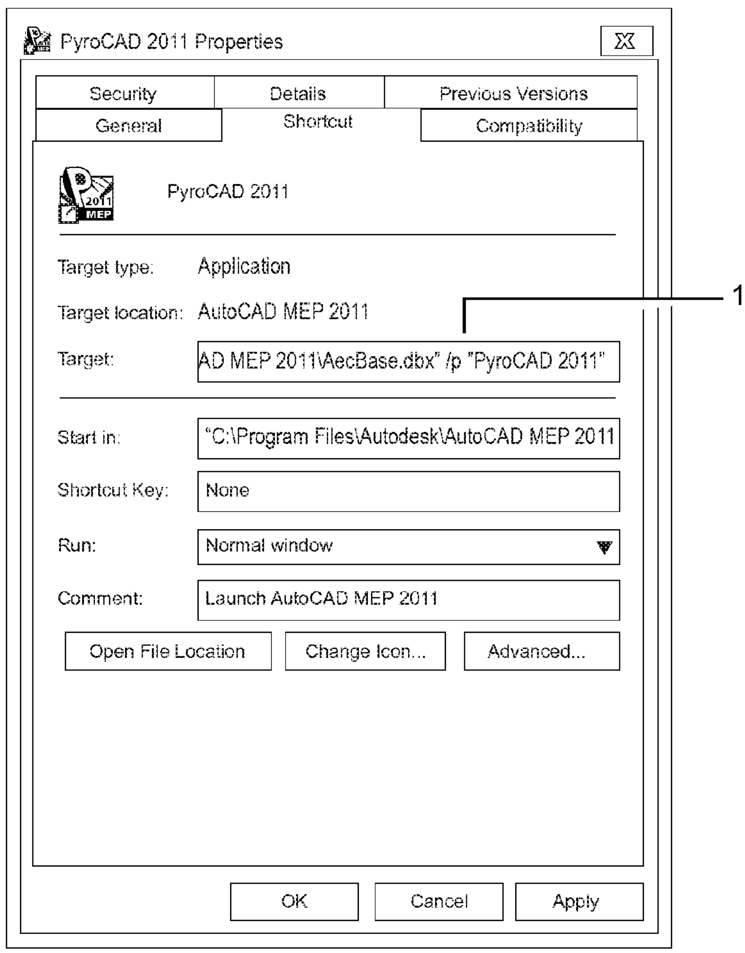
FIG. 3 is a screenshot of the PYROCAD™ WINDOWS® desktop icon properties.
Figure 4:
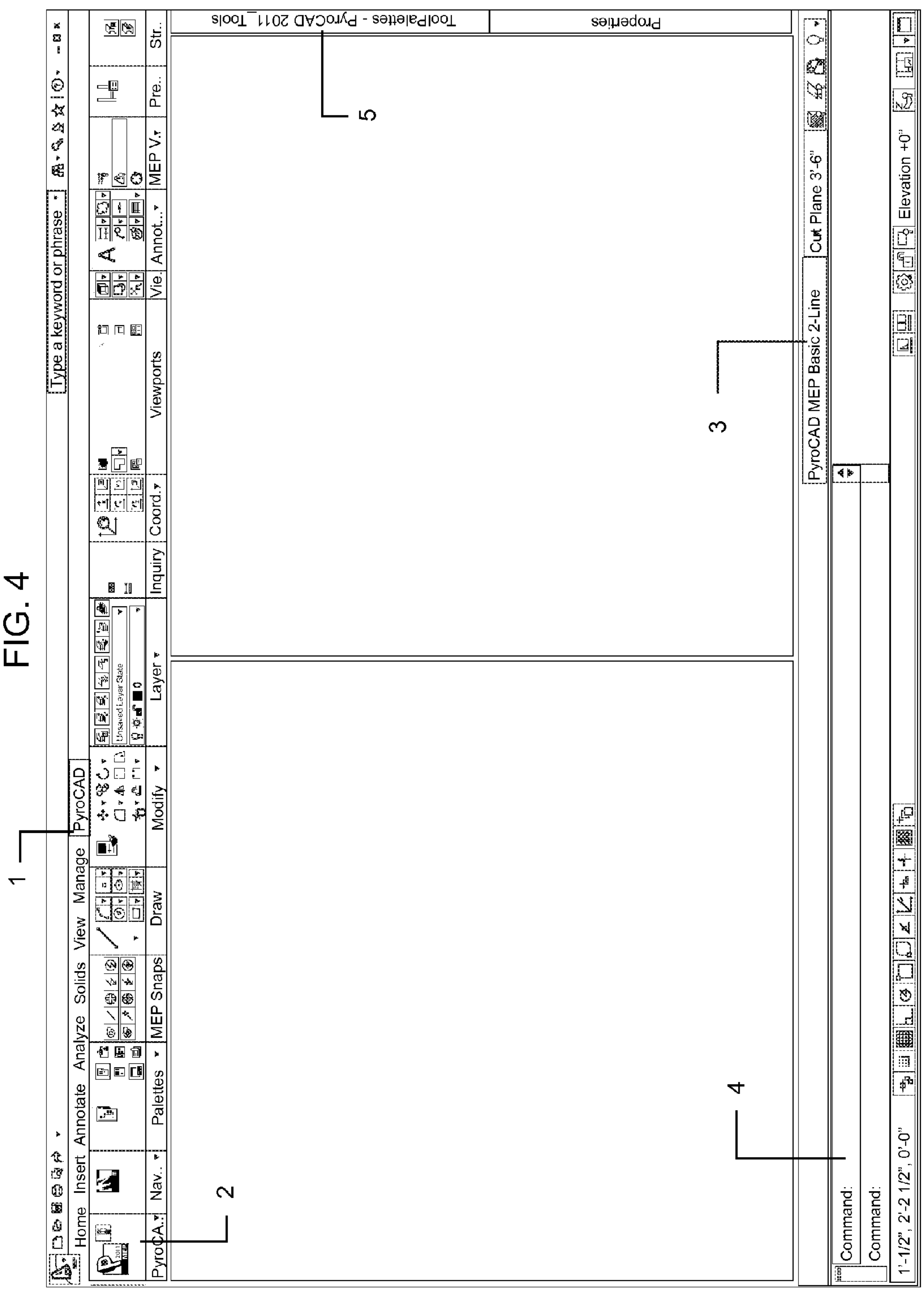
FIG. 4 is a screenshot of the AUTOCAD® MEP interface with the PYROCAD™ profile loaded.

The present invention is described more fully below in connection with the figures. As used herein, the term "PYROCAD" refers to the present invention. From this point forward, for clarity of reading, the "™" designation will not be used with the term PYROCAD; however, the PYROCAD name is a trademark owned by Rael. For ease of reference, reference numbers used herein shall refer to both the figure number and the reference number; for example, reference number 1 on FIG. 3 is referred to as 3.1, reference number 1 on FIG. 4 is referred to as 4.1, etc.

As noted above, the present invention has been designed to allow mechanical contractors to more effectively design, coordinate, fabricate and install piping systems. The subsequent discussion will walk the user through the PYROCAD application as it is used to create a piping system from inception to the final installation drawing and fabrication reports.

Figure 2:
FIG. 2 is an illustration of the PYROCAD™ desktop icon.

To get started, the user launches the PYROCAD application with the desktop icon (FIG. 2) as a standard Microsoft WINDOWS® application. The AUTOCAD® MEP would be installed as a prerequisite. It is important to note that PYROCAD does not overwrite the toolbars, menus and palettes of the AUTOCAD® MEP install, unlike most third party applications developed for AUTOCAD® products. Although overwriting the toolbars, menus and palettes is the most expedient way to create a custom interface, it is not the best way. The entire integration of PYROCAD into the AUTOCAD® MEP environment is done with a parallel approach. PYROCAD is loaded with a partial menu 6.1, its own tool palette group 4.5, and its own tab on the ribbon 4.1.

Although it is more complicated to implement in the development process, this design approach is preferred because it allows for an easier upgrade path and a better user experience. Autodesk releases an upgrade to its AUTOCAD® MEP product on a yearly basis. These updates typically add new features that result in changes to the toolbars, menus and palettes. If the third party application is designed to overwrite the toolbars, menus and palettes, then the new features that were added by the latest version of AUTOCAD® MEP get overwritten, and the user is unaware of them. Thus, the user will suffer a loss of features. The parallel install approach taken by PYROCAD avoids this loss of features.

After launching the PYROCAD application, the user is presented with an AUTOCAD® MEP environment with the PYROCAD application installed parallel. By default a blank drawing is loaded; this blank drawing originates from the pyrocad 2011.dwt template file 18.1. In a preferred embodiment, this file is the default template file for the current AUTOCAD® MEP version copied, renamed and supplemented with any additional requirements and settings needed by PYROCAD.

Figure 19:
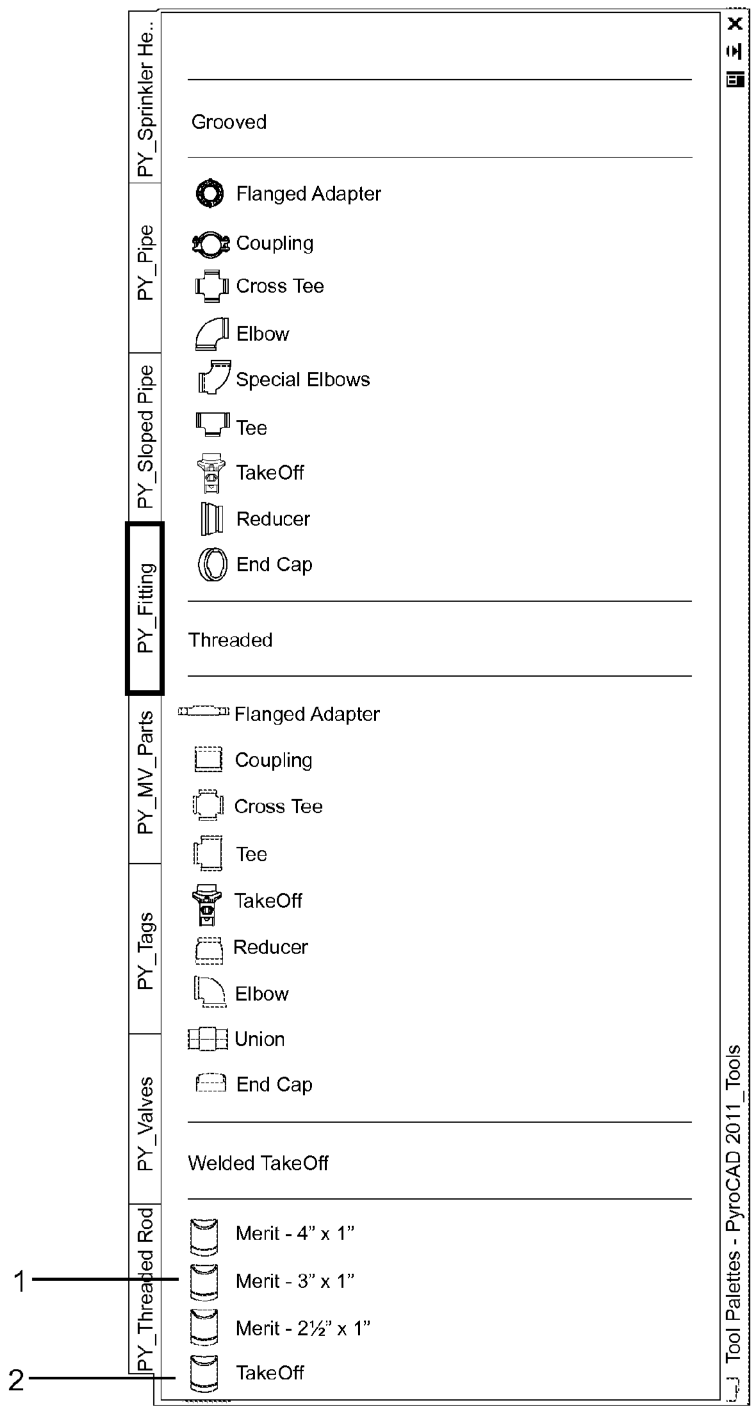
FIG. 19 is a screenshot of the py_fitting tool palette showing pipe fittings in grooved, threaded and welded takeoff categories.

To draw the piping system, a fire protection system architectural plan is needed for a background. Typically, the architectural drawings for a project are provided to the mechanical contractor in an AUTOCAD®-compatible file format. If this is not the case, then the architectural plan can be designed using the tools provide by AUTOCAD® MEP. In FIG. 19, the drawing has a rudimentary building structure with four walls and one door. The drawing area is divided into two views; on the left is the top view, and on the right is an isometric view. The need for multiple views is now common practice when working in three-dimensional space and will be used throughout the overview and explanation of the figures.

As noted above, the purpose of the present invention is to design a piping system for fire protection. The examples discussed below and shown in the figures are provided for purposes of illustrating the structure and functionality of the present invention but are not intended to limit the present invention to any particular configuration of the fire protection system. A typical fire protection system is comprised of the following components: pipes, fittings and fire sprinkler heads. The pipe finish is either unfinished steel (referred to as "black") or hot dip galvanized steel (referred to as "galvanized"). The pipes come in different wall thicknesses (commonly referred to as the "pipe schedule"). Common pipe schedules are 10, 40 and 80. (The term "pipe schedule" is a term commonly used in the industry to indicate the thickness of pipe.) The pipes may have different end finishes, such as threaded, grooved or flanged.

Figure 13:
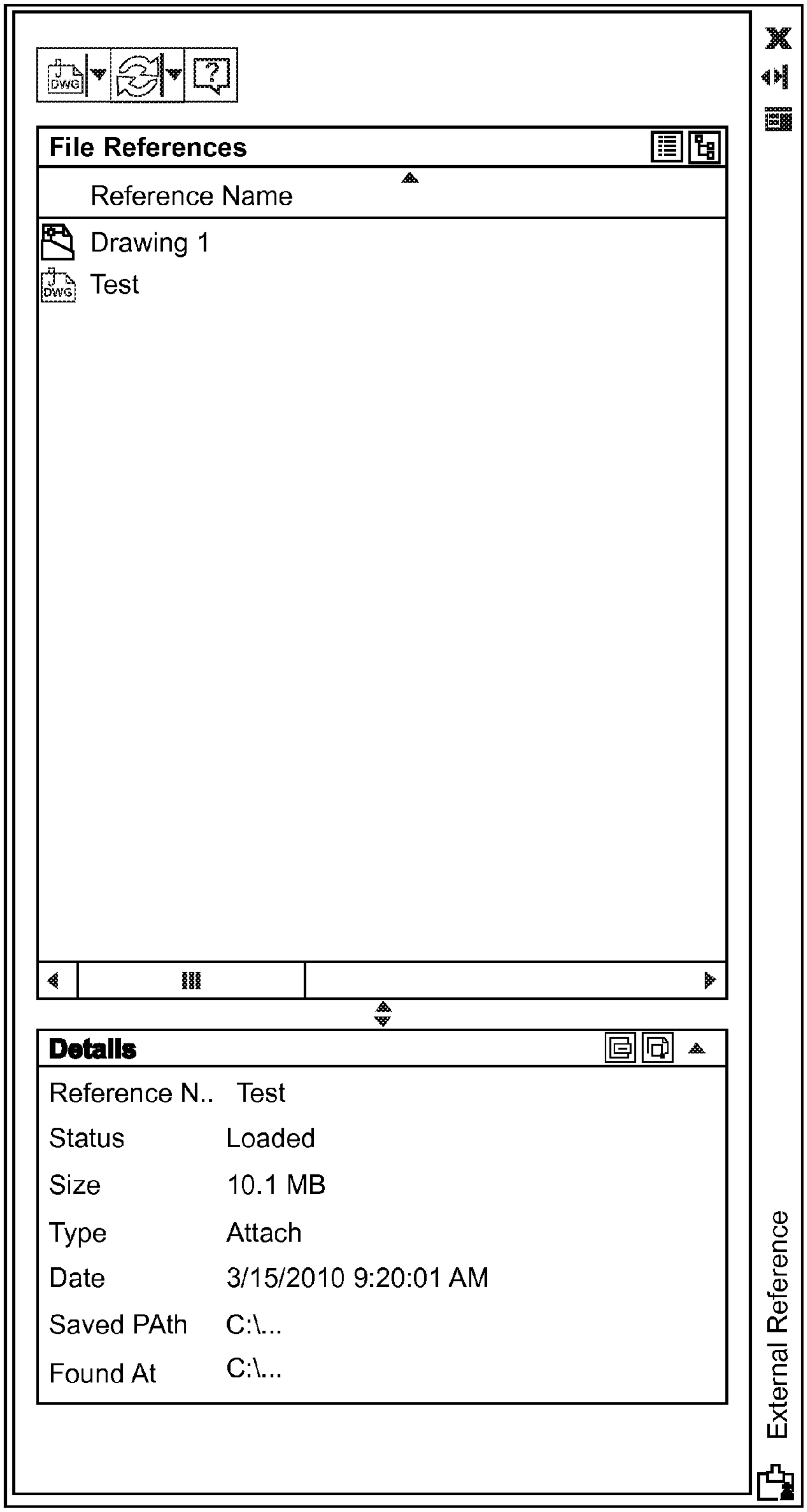
FIG. 13 is a screenshot of the AUTOCAD® MEP external reference palette.

Fittings are either unfinished or painted cast iron (both of which are referred to as "black") or hot dip galvanized cast iron (referred to as "galvanized"). Fittings come from many different manufacturers and come in numerous different models. Fittings also come with different end finishes, such as threaded, grooved or flanged, to allow them to connect to pipes. Fittings come in different types, such as elbows, tees, cross tees, couplings and takeoffs, as shown in FIG. 13.

Fire sprinkler heads come from many different manufacturers and come in numerous different models and types. One type of fire sprinkler head is an upright typically used in spaces without ceilings with the head deflector in the up position. The deflector is the portion of the head against which the water sprays to be dispersed into the smaller water droplets. Another type of fire sprinkler head is a pendent typically used in spaces without ceilings with the head deflector in the down position. Another type of fire sprinkler head is a concealer typically used in spaces with ceilings and aesthetic requirements with the head deflector in the down position. Fire sprinkler heads come in different finishes, such as chrome, brass and painted. They also come in different temperature settings, which determine when the sprinkler head opens. Fire sprinkler heads also come with different diameters for the threaded connection used to attach them to the piping system.

Having obtained or drawn the architectural plan, the user next inserts the fire sprinkler heads he will need to design the fire protection system. In this example, the user inserts an upright fire sprinkler head and copies it into three rows and four columns, filling the footprint of the room (FIG. 37). The user then places the fire sprinkler heads onto the rael-heads layer 23A.1. Layers are a construct of the AUTOCAD® software used to group objects together, assign properties and control behavior. Layers control visibility on the screen, line thickness, line type and color when plotting. In a preferred embodiment, there are seven layers within each piping system: arm over layer, elevation layer, base tag layer, main layer, branch layer, head layer and cross connect layer. (These layer names are provided by way of illustration, but the present invention is not limited to any particular layer names.) Note that there may be more than one piping system in the model space at one time. The purpose and function of these layers is described more fully below.

The terms main, branch, cross connect and arm over are used in the fire protection industry as terms to categorize the pipes that make up the fire protection system. The main pipe is the relatively large diameter pipe (relative to the other pipes) that is connected to the water source and that supplies the smaller diameter branch pipes, which in turn supplying water to the fire sprinkler heads. The branch pipes are connected to each other and originate from one connection point on the main. The cross connect is a connection of two main pipes with a group of smaller diameter pipes. The arm over is the last few pieces of the branch line as it connects to the fire sprinkler head, as shown in FIG. 39. The arm over pieces are placed on their own layer (named rael-arm in this example).

Arm overs are used when there is an installation requirement with a very small tolerance; they are most often used with concealer type fire sprinkler heads. For example, if an owner wanted the fire sprinkler head to be no greater than plus or minus one half inch from the center of the ceiling tile, arm overs would be used. The arm over pieces would not be fabricated, shipped or installed during the initial installation of the fire protection system because the exact location of the center of the ceiling tiles cannot be determined at the time of the initial installation; however, as the ceiling is installed, the arm over is assembled by field personnel to locate the fire sprinkler head in the center of the tile within the desired tolerance.

Once the fire sprinkler heads have been inserted, they need to be connected together with branch piping. To do this, the user would go to the py_pipe tool palette shown in FIG. 10B and select pipe with the desired characteristics for the branch piping. FIG. 24B shows the first piece of branch piping added to the drawing. All branch piping is initially drawn as 1" diameter and later resized and replaces by the PYROCAD automation. All branch pipes will be placed on their own layer (named rael-branch in this example).

Figure 26:
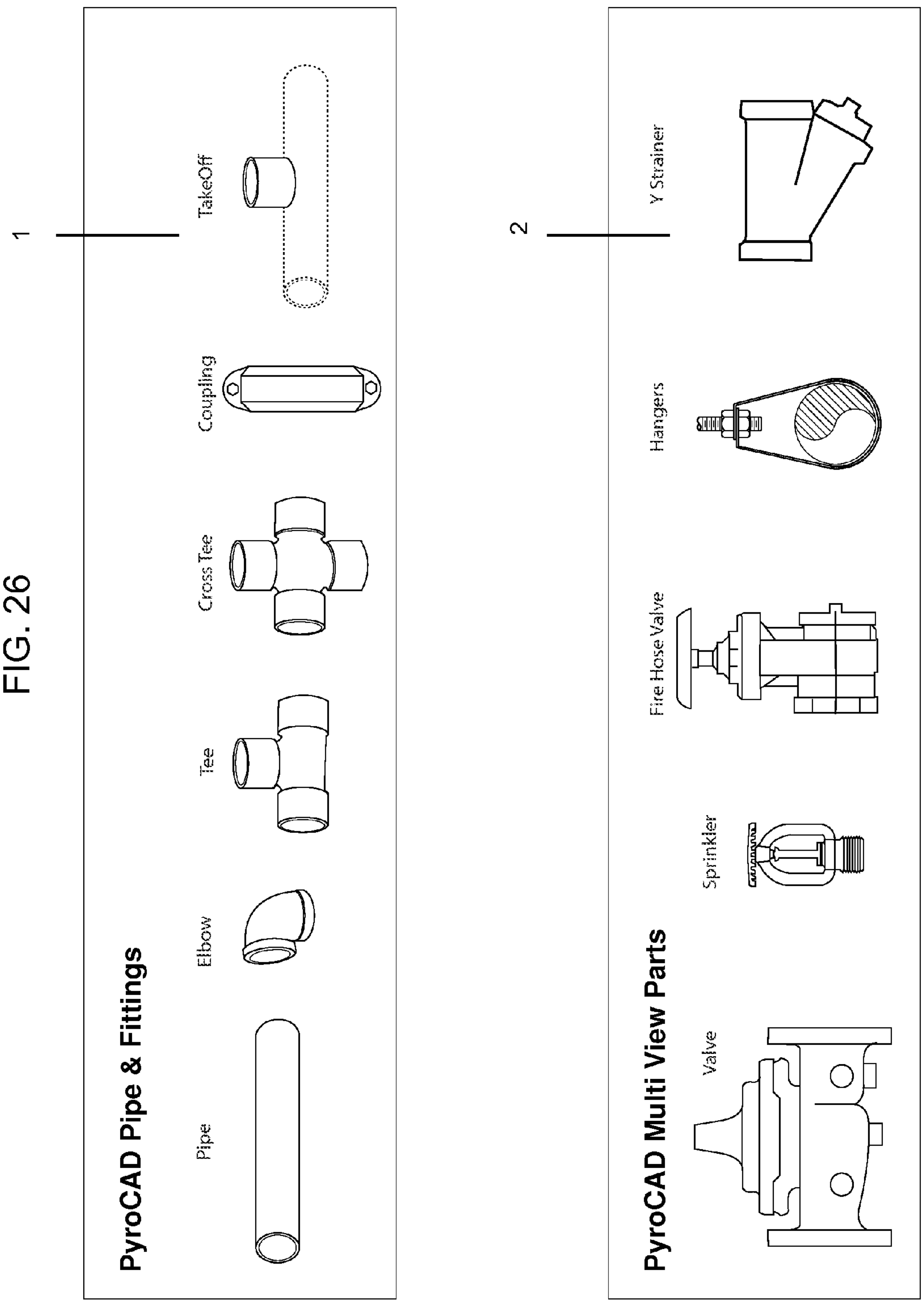
FIG. 26 is an illustration showing examples of PYROCAD™ parametric and multi-view parts.
Figure 27:
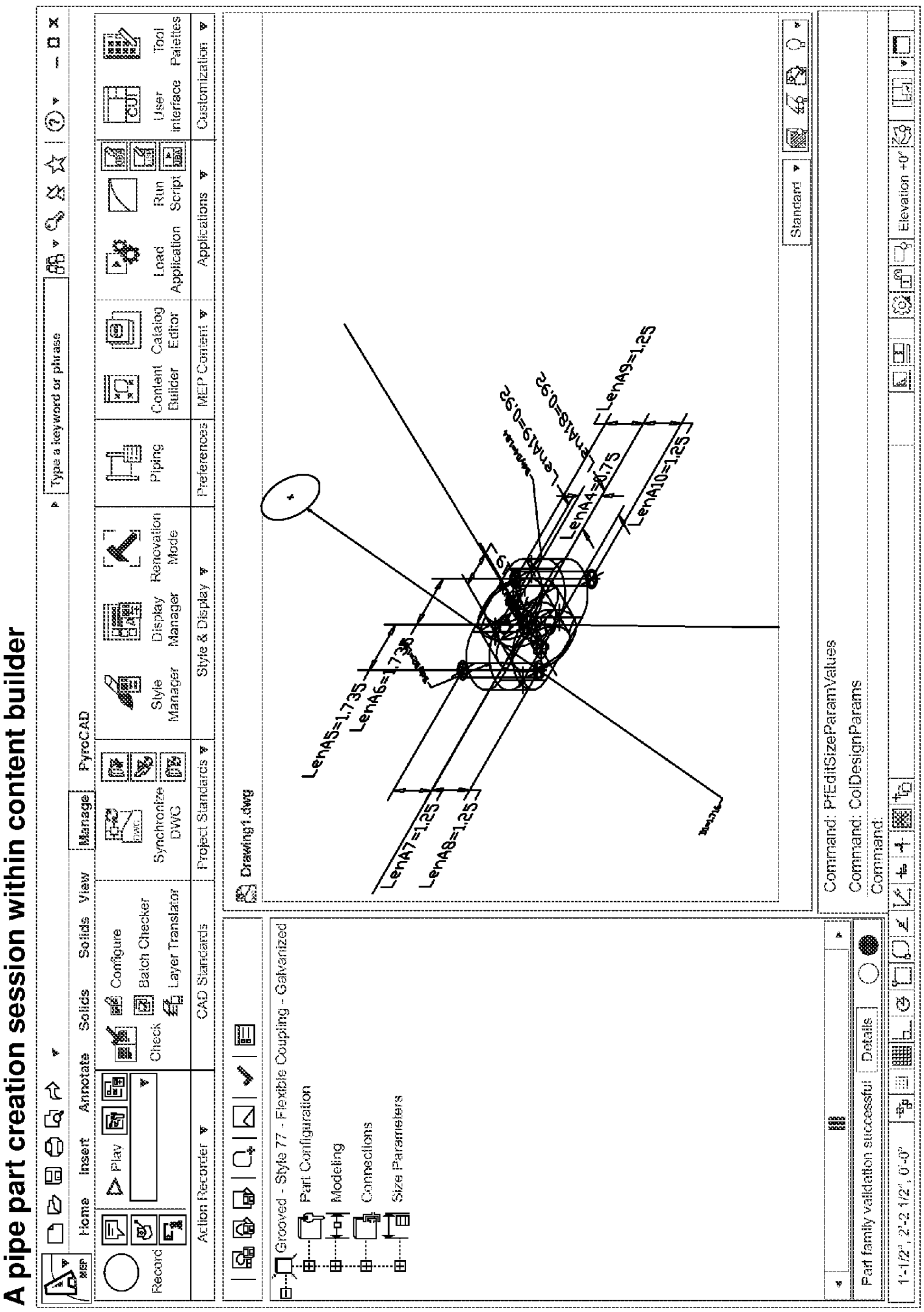
FIG. 27 is a screenshot of a pipe part creation sessions shown in the AUTOCAD® MEP content builder.

In FIG. 26, the user adds a main pipe using the same technique described for the branch piping. All main pipes are placed on their own layer (named rael-main in this example). The user then adds a takeoff fitting to the main 26B.1 to allow the smaller diameter branch pipe to connect into the main. The branch line is then copied by the user three times to connect the rest of the fire sprinkler heads to the main pipe shown in FIG. 28.

Figure 30:
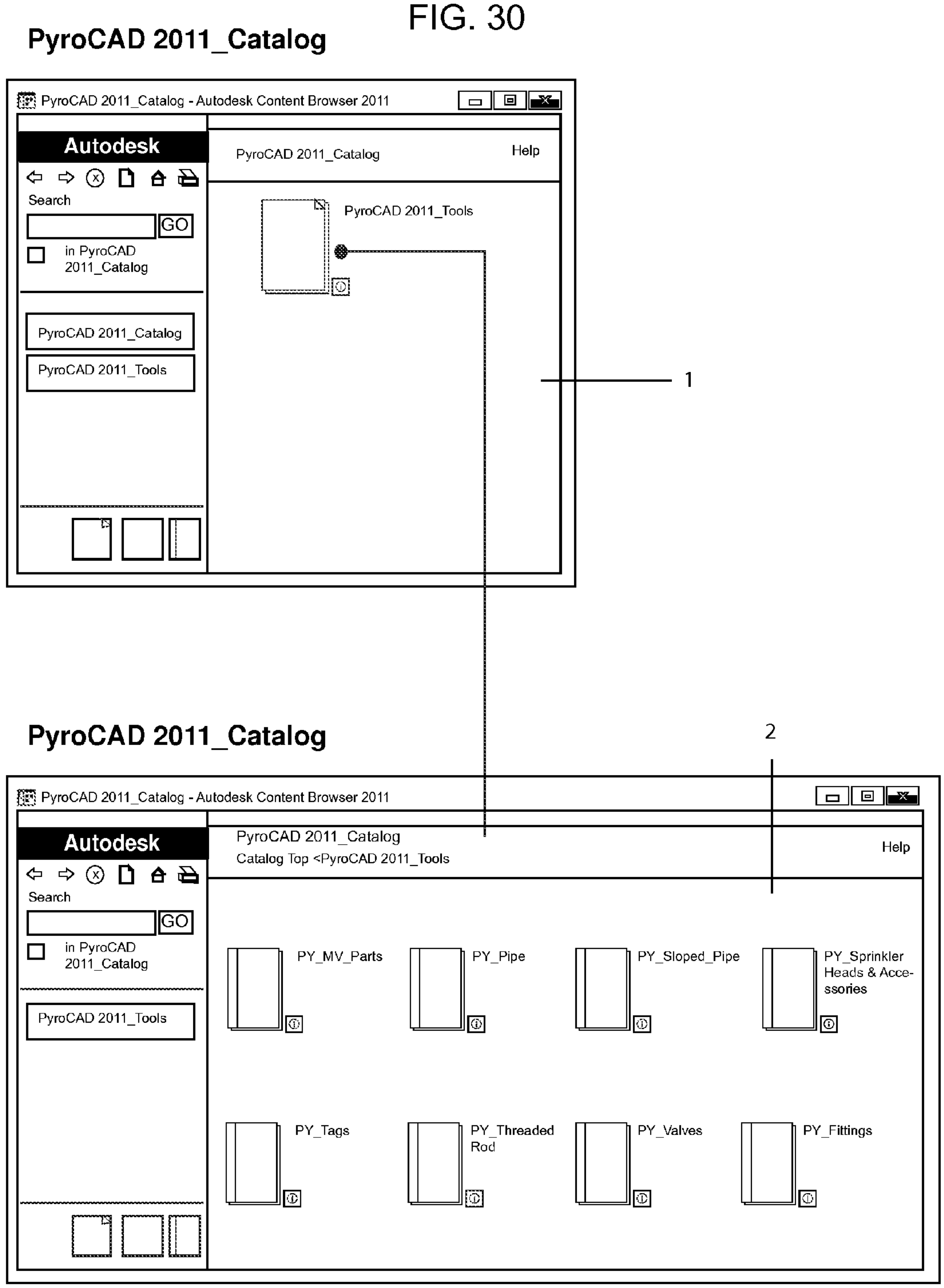

To demonstrate the function of the arm over, a vestibule with a two-foot by four-foot tile ceiling has been added by the user in the southwest corner of the building (see FIG. 30). In FIG. 36, the branch piping has been added by the user, and the two concealer heads have been connected back to the main pipe by the user. FIG. 39 is an enlarged view of an arm over used to connect the concealer type fire sprinkler heads to the branch piping.

In FIG. 44, a few pieces of ductwork have been added by the user for the heating and air conditioning of the space. FIG. 44 also shows two pendent type fire protection heads added below the ductwork that have been connected with branch piping back to the main pipe. At this point, the user runs the PYROCAD head annotation utility to add the block symbol (FIG. 46). The block symbols are used on the installation drawings to inform the field personnel as to what type of fire sprinkler head to install at each location. The block symbol refers to a legend on the installation drawing, which lists all of the fire sprinkler head characteristics by block symbol. FIG. 49 shows a fire sprinkler head with the block symbol attached. In FIG. 51, additional main pipes have been added by the user to create a looped main. In FIG. 52, the user turned the northern most branch line into a cross connect by connecting the east end back into a main pipe 52.1; the pipes making up this cross connect are then placed on their own layer (named rael-cross connect in this example).

With these steps completed, the design work has been finished; however, the user must add a start point at the open end of the main shown in FIG. 54 before fabrication can begin. The start point is an AUTOCAD® MEP object created for PYROCAD to indicate where the piping system starts fabrication and to store information about fabrication parameters (discussed below). The start point can be thought of as the water supply point.

In a preferred embodiment, the present invention generates two items for use by the mechanical contractor in installing the pipe system in building. The first item is the fabrication reports, which include pipes, fittings, fire sprinkler heads and other miscellaneous material (for example, the types of parts shown in FIG. 13). The fabrication reports are used by the fabrication personnel to manufacture the piping system from the raw materials. The important part is that all pipes get specific labeling (or "tags") generated by PYROCAD that makes each pipe unique. This information is then applied by the fabrication personnel either with a sticker or paint to each pipe. The tags that are not applied to pipes are used for informational purposes during the install.

The second item generated by the present invention and used by the mechanical contractor is the installation drawings. The installation drawings show the piping system with each piece of pipe tagged (via the tagging algorithm, described more fully below). To create the installation drawings, the user starts with the labeled piping system (each label or "tag" being unique to a particular piece of pipe within the piping system) and then takes additional steps, including positioning the unique labels (or "tags") on the pipes, and annotating the piping system with dimensions, elevations and notes. The user would also take steps in the AUTOCAD® "paper space" (as opposed to the "model space") that are not discussed here. Field personnel use the installation drawings to assemble and build the fire protection system that is designed in PYROCAD.

As used herein, the term "fabrication process" incorporates the following five algorithms of this invention: the process algorithm (FIG. 61), the main pipes algorithm (FIG. 62), the traversing algorithm (FIG. 63), the branch resizing algorithm (FIG. 79A), and the tagging algorithm (FIG. 86A). Although each of these algorithms is discussed more fully below, a brief description is provided here. The main pipes and branch resizing algorithms are both encompassed within the process algorithm. The process algorithm performs a number of functions, including, but not limited to, data validation, error checking and resolution, saving data to the start point inserted by the user, pulling layer details into programming variables, and applying processing logic to the system. The traversing algorithm supports the process algorithm, the branch resizing algorithm, and the tagging algorithm by traveling (or "traversing") the system and presenting objects to each of these algorithms in a logical order. The tagging algorithm attaches to each pipe in the system, and to other points within the system, a "tag" (which is a multi-view block) with the property set data (defined below) pulled into and displayed in the tag.

The fabrication process is controlled by the user through the PYROCAD application form (FIG. 57). To launch the PYROCAD application form, the user clicks the icon on the toolbar or types py at the command line (FIG. 55). The user is then prompted to insert or select a start point. The start point that was placed on the end of the main is selected (FIG. 54).

FIG. 56 shows the PYROCAD application form in its compact form, and FIG. 57 shows the expanded form. The reason the form is provided in both a compact and expanded view is that the PYROCAD application form is modeless, which means it can be left open and co-exist with AUTOCAD® MEP. The user is expected to and will interact with both applications simultaneously; therefore, to keep the footprint of the PYROCAD application form smaller in the compact state gives the user greater access to AUTOCAD® MEP.

The PYROCAD application form holds the user input parameters for the fabrication process stored in the various text boxes and drop-down list boxes shown in FIG. 57. There are a number of fields that are related to layers, specifically, 57.33, 57.34, 57.35, 57.37, 57.39, 57.40 and 57.41. PYROCAD has implemented a unique approach to utilizing layers that makes this invention more flexible and powerful than prior art applications. In PYROCAD, the layer name chosen by the user is matched to the type of component it represents in the piping system. For example, in 57.37 there is a field labeled Main Layer and a select button adjacent to the right. The user presses the select button and picks a piece of main pipe in the drawing. In this example, the selected pipe is on the rael-main layer. The user specifies the layer in field 57.37. The present invention applies certain logic to each layer, as discussed more fully below in connection with FIGS. 61, 62, 79A and 86A. In PYROCAD there are seven fields (57.33, 57.34, 57.35, 57.37, 57.39, 57.40 and 57.41) that need to be matched with layer names. The assignment of layers to specific constructs of the piping system guides PYROCAD's interpretation of the piping system during the fabrication process.

As used herein, the term "fabrication parameters" means the data entered by the user into the PYROCAD application form. Once the fabrication parameters have been filled out on the PYROCAD application form, the fabrication process is ready to begin. The fabrication process (which, as stated above, incorporates five algorithms, two of which are part of the process algorithm) is divided broadly into three steps. The first step is the process algorithm 57.27, which includes error checking, segmenting pipes to set lengths 57.14 and 57.18, and replacing branch pipes and fittings according to the branch sizing schedule 57.42-57.51. The second step is the tagging algorithm 57.26, which involves error checking, applying the main tag labels according to the user setting 57.36, and applying the branch tag labels according to the user setting 57.38. These labels will appear on the installation drawing per each pipe showing the field personnel where to place the pieces. The third step is the generation of reports 57.25, which entails error checking, summarizing and formatting the fabrication information extracted from the model into a number of reports.

In a preferred embodiment, the present invention generates the following reports: shop, field, summary and draftsman. The shop report is formatted to make the fabrication process as efficient as possible; it contains barcodes and sorts the pipes by descending diameter and length. The field report is used by the field personnel; this report does not have barcodes, and the pipe is sorted by main numbers and branch line numbers. The summary report is a summary of materials and is used for inventory and job costing. The draftsman report includes all of the three foregoing reports and is used by the draftsman to validate and error check the fabrication while preparing the installation drawing.

Figure 1:
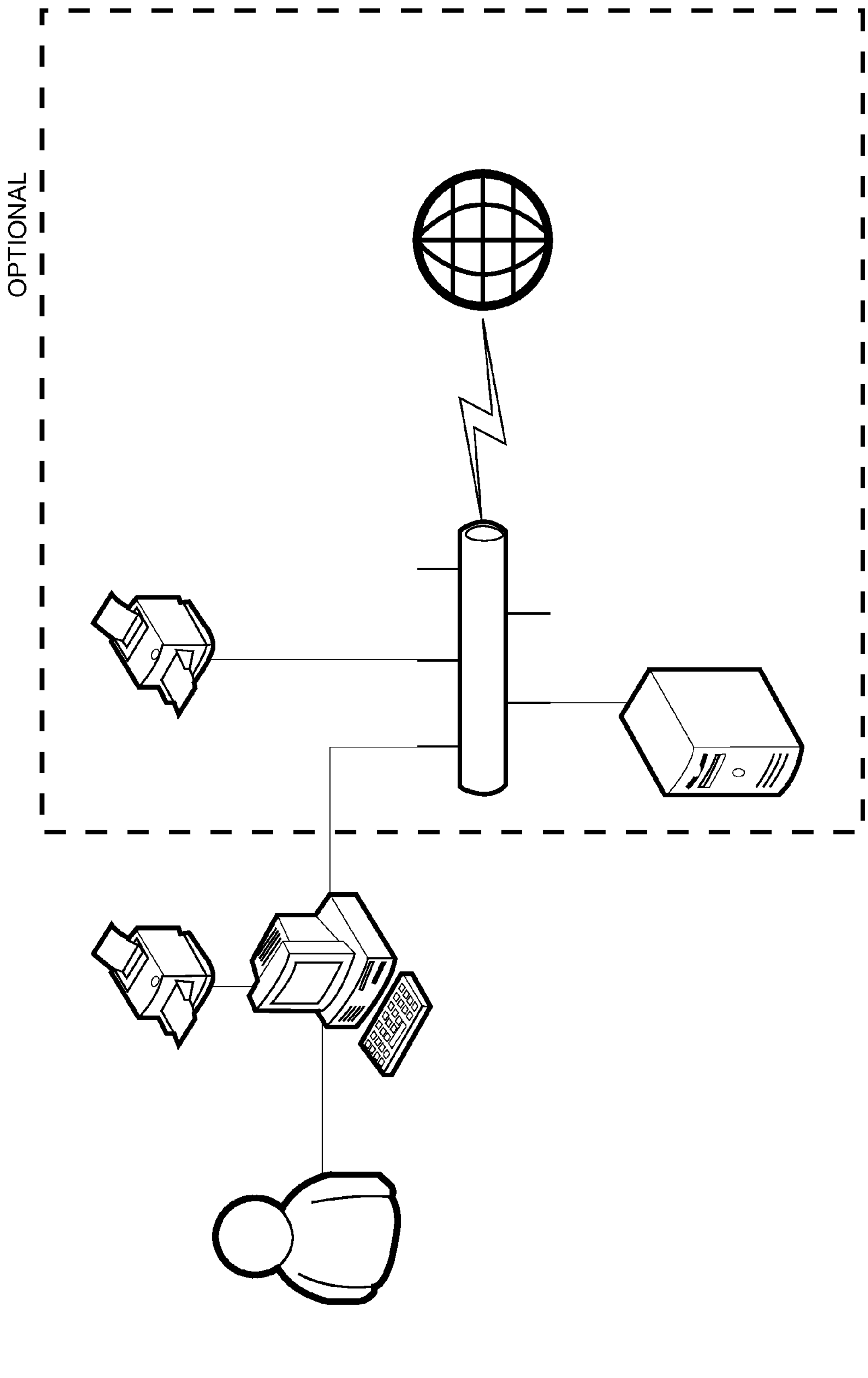
FIG. 1 is a diagram of the operating environment of the present invention.

Referring to FIG. 1, the PYROCAD operating environment is a typical Microsoft WINDOWS® operating system. This operating environment typically includes a personal computer of any form (desktop, laptop, tablet computer, etc.) that has the ability to load programs into dynamic memory and store data on a static memory device such as a hard drive. Preferably, all PYROCAD files are placed on this static storage device in a dedicated folder structure. The user has means of input, which typically consist of a keyboard, mouse, touch screen, digitizing tablet and/or voice command. The operating environment optionally includes an output device for hard copies of drawings and fabrication lists. Output may also be transmitted in electronic form via email or other electronic media.

The PYROCAD software program is started by clicking on an icon on the desktop (FIG. 2) that will launch AUTOCAD® MEP and bring up the PYROCAD profile. FIG. 3 is the properties form for the desktop icon shown in FIG. 2. The "/p" seen in the target text box 3.1 causes AUTOCAD® MEP to launch into the PYROCAD 2011 profile. The profile is a file installed on the hard drive during the PYROCAD installation named PYROCAD 2011.arg. This file contains the settings for the AUTOCAD® MEP environment as required by PYROCAD.

Figure 5:
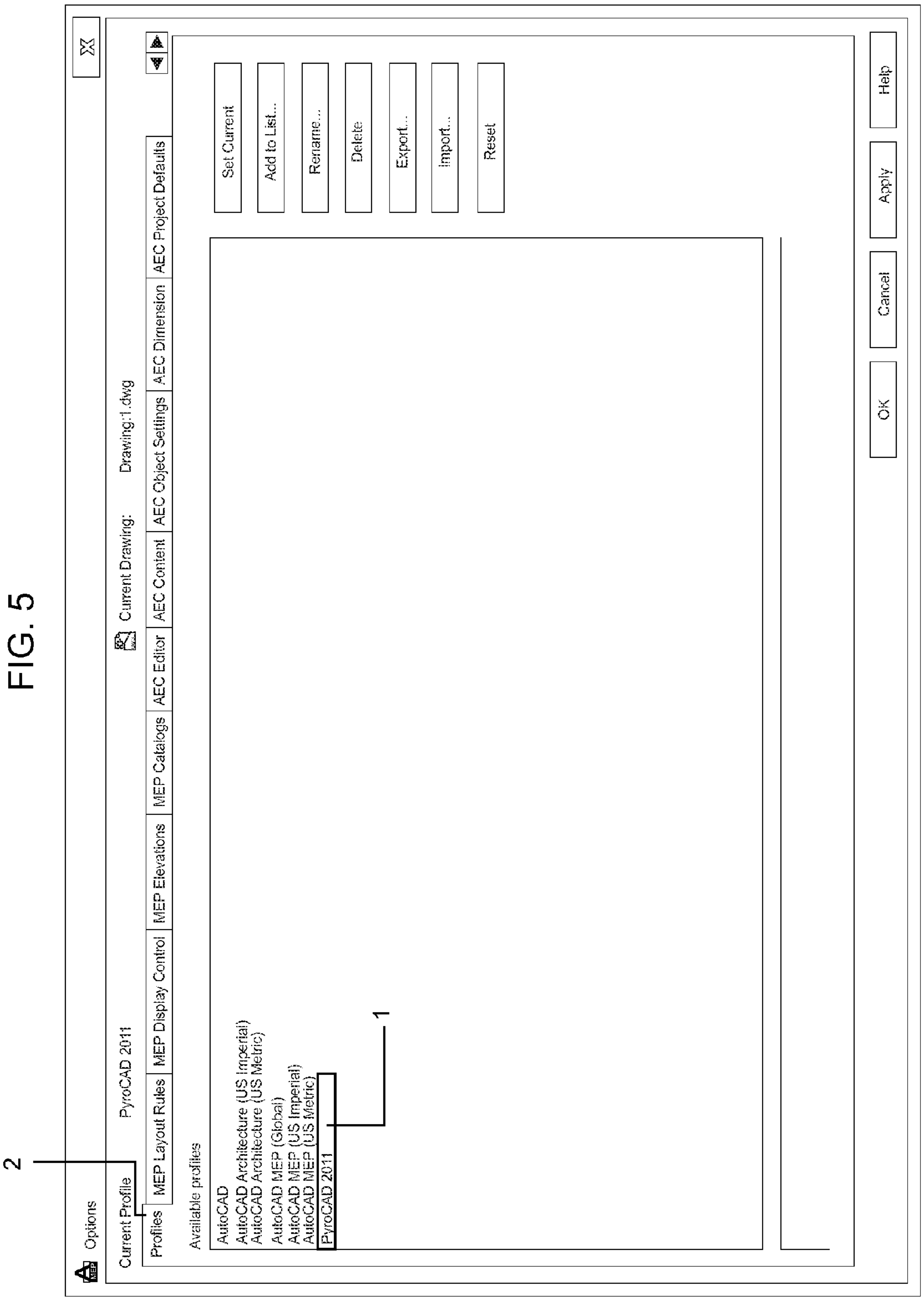
FIG. 5 is a screenshot of the AUTOCAD® MEP options form with the profiles tab selected showing the location of the PYROCAD™ profile.
Figure 6:
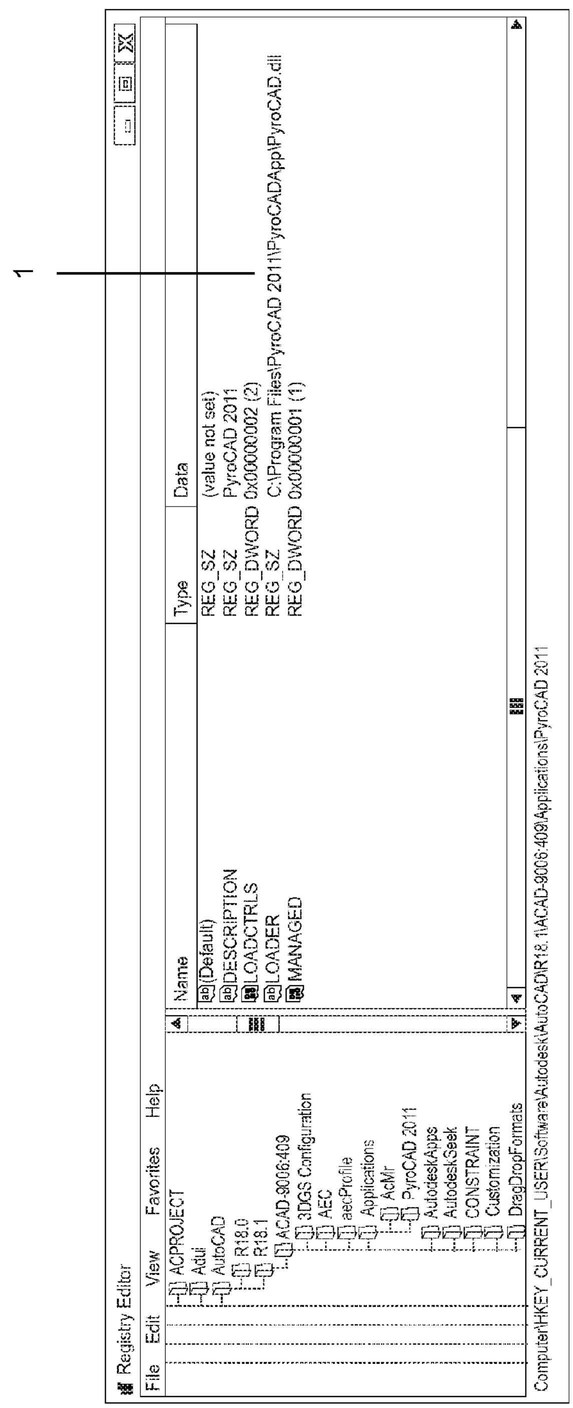
FIG. 6 is a screenshot of the WINDOWS® registry editor showing the keys that are entered by the PYROCAD™ installation process.

FIG. 4 shows the user interface of AUTOCAD® MEP with the PYROCAD 2011 profile after loading. Referring to FIG. 5, the PYROCAD 2011 profile 5.1 is shown on the AUTOCAD® MEP options form under the profile tab 5.2. The desktop icon shown in FIG. 2 and the AUTOCAD® MEP profile 5.1 it launches are unique to the present invention. Additionally, AUTOCAD® MEP has provided a mechanism via a registry entry to load custom applications automatically with the launch of AUTOCAD® MEP. The install program for PYROCAD adds this registry entry 5A.1. Once the registry entry has been added, the PYROCAD.dll (dynamic link library) will be loaded when the user launches AUTOCAD® MEP via the desktop icon shown in FIG. 2. The registry entry refers to the PYROCAD.dll file located on the system hard drive in its installed folder location.

In a preferred embodiment, the PYROCAD.dll is created using the Microsoft integrated development environment ("IDE") called visual studio.net or vs.net for short. Within vs.net and the PYROCAD.dll, project references to AUTOCAD® MEP.dll files are added 5B.1. (FIG. 5B shows many references shown to AUTOCAD® MEP assemblies otherwise known as dynamic-link libraries. The references to the AUTOCAD® MEP assemblies allow PYROCAD™ to make AUTOCAD® MEP application programming interface calls.) This allows the PYROCAD.dll to gain access to the AUTOCAD® MEP API. The AUTOCAD® MEP API allows for broad control of the AUTOCAD® MEP application by programmatically controlling almost all aspects of AUTOCAD® MEP. The AUTOCAD® MEP API also allows the creation and registering of new custom commands. The PYROCAD.dll registers two new commands, namely, "py" and "pydh" (discussed further below).

Figure 8:
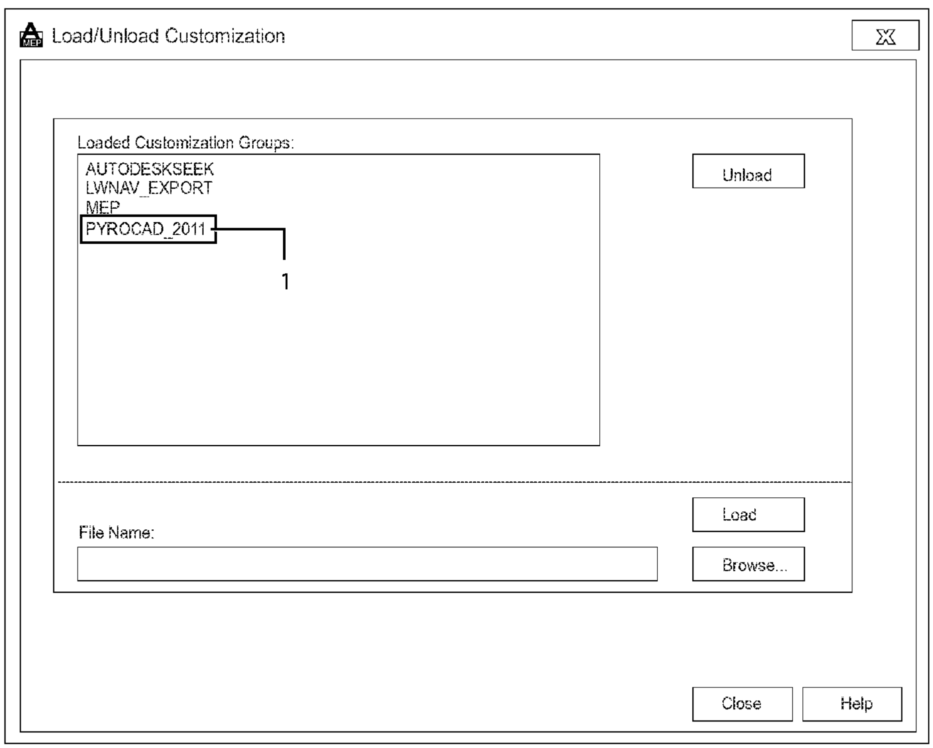
FIG. 8 is a screenshot of the AUTOCAD® MEP load/unload customization form.

The PYROCAD environment contains many customizations to the user interface to create more productive piping design software. FIG. 4.1 is the custom tab created for the PYROCAD software. This tab is created by first creating and loading our custom PYROCAD menu 6.1 that resides in the PYROCAD 2011.cuix file. The latter file is created through the use of the AUTOCAD® MEP cui command and the customize user interface form (FIG. 7). In addition, custom graphics are created for the images used on the buttons. The PYROCAD menu 6.1 is considered a partial menu and loads alongside the default AUTOCAD® MEP menu. Within the custom tab shown in FIG. 4.1, there is a custom panel 4.2 that contains buttons for launching the py and pydh commands. PYROCAD also has a number of display configurations 4.3 that affect the way objects are displayed on screen and for printing. These display configurations were created using the AUTOCAD® MEP display manager (FIG. 8). In a preferred embodiment, the invention comprises a MEP basic two-line display configuration 8.1 and a MEP conceptual display configuration 8.2.

Figure 9:
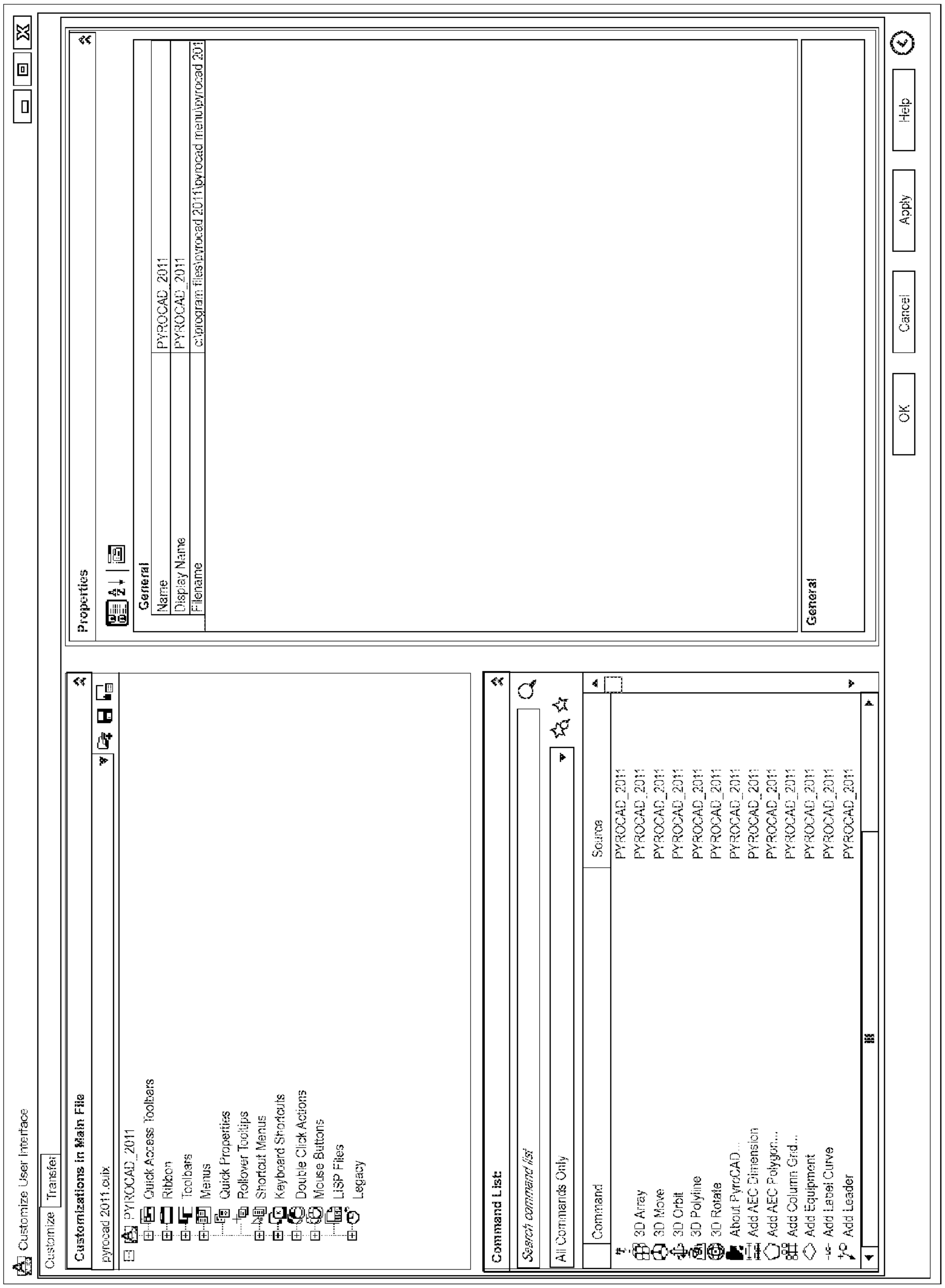
FIG. 9 is a screenshot of the AUTOCAD® MEP customize user interface form.
Figure 10:
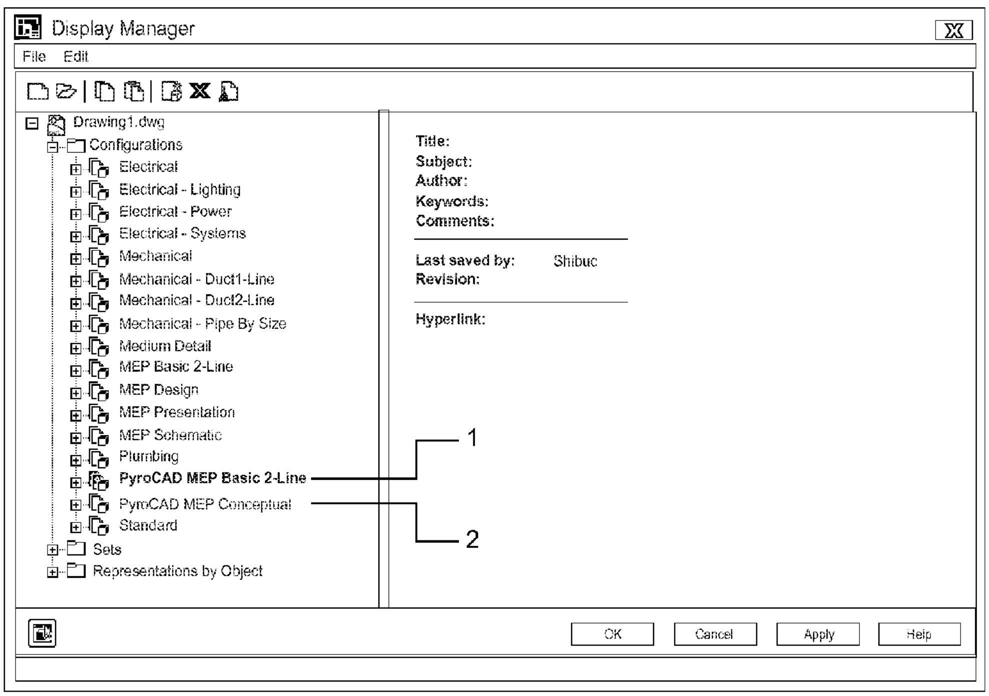
FIG. 10 is a screenshot of the AUTOCAD® MEP display manager form.

FIGS. 9A, 10, 9C and 9D show additional parts of the AUTOCAD® MEP user interface with the PYROCAD 2011 profile. FIG. 9A shows the layer properties manager. FIG. 9D shows the external reference palette. FIG. 10 shows the PYROCAD 2011 tool palettes group including custom palettes (FIGS. 10A, 10B, 10C, 10D, 10E, 10F, 10G and 10H) that have been specifically created to aid in design piping systems quickly and accurately. FIG. 9C shows the properties palette with the design tab selected 9C.1. Selection of the design tab will display the design properties of the currently selected object. FIG. 9E shows the properties palette with the extended data tab selected 9E.1. Selection of the extended data tab will display the extended data properties of the currently selected object. Commands are entered and user input is requested on the command line 4.4 of the PYROCAD profile.

Figure 11:
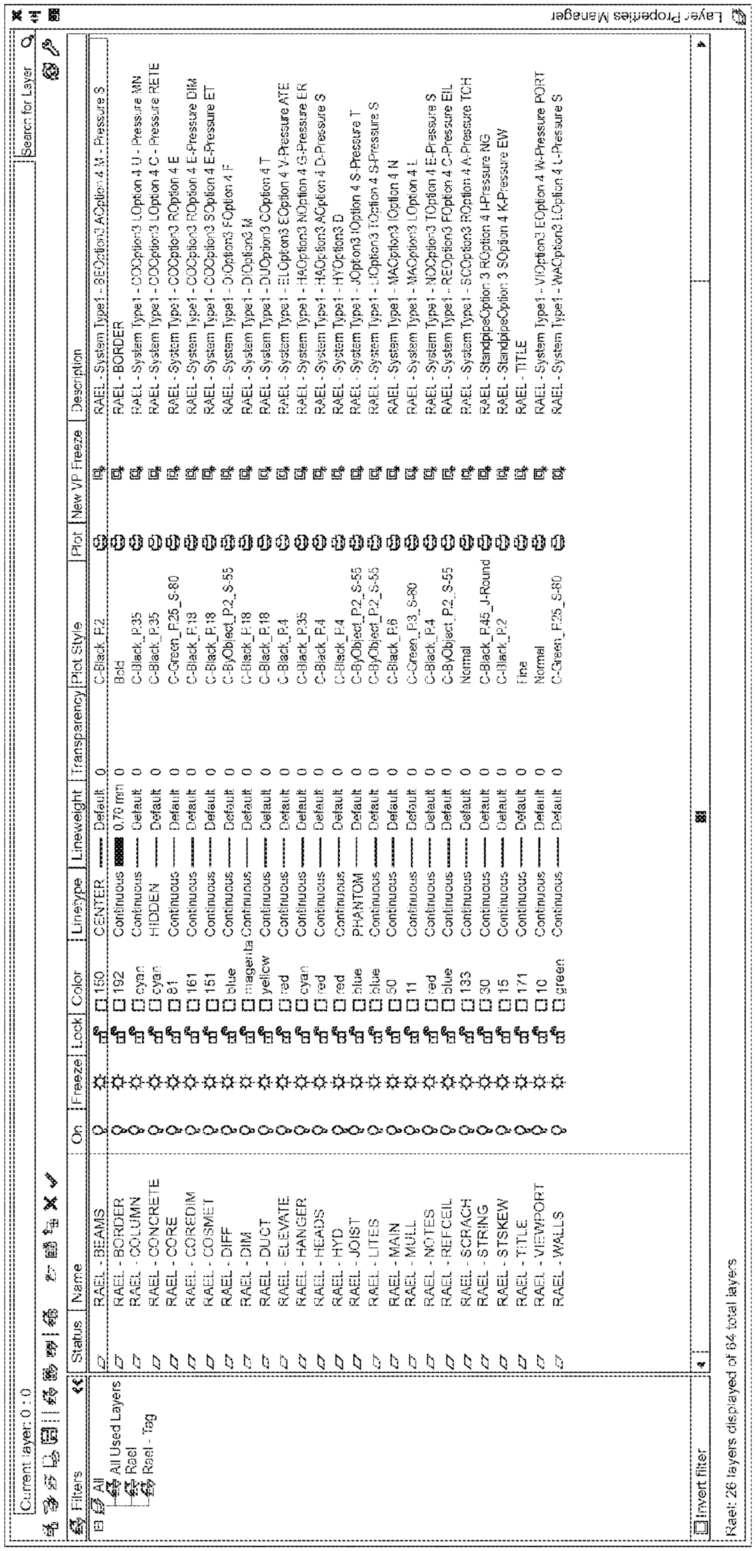
FIG. 11 is a screenshot of the AUTOCAD® MEP layer properties manager palette.

In addition to the many visible customizations to the AUTOCAD® MEP interface, the present invention comprises numerous back-end customizations that provide the functionality described more fully below. Specifically, the PYROCAD software includes the following modules (FIG. 11) integrated within AUTOCAD® MEP: PYROCAD parts catalog 11.1, PYROCAD tools catalog 11.2, PYROCAD tools palette 11.3, PYROCAD profiles 11.4, PYROCAD menus 11.5, PYROCAD property sets 11.6, PYROCAD tags 11.7, PYROCAD workspace 11.8, PYROCAD drawing templates 11.9, PYROCAD application 11.10 and PYROCAD reports 11.11. Following is a discussion of each of these modules.

The PYROCAD parts catalog 11.1 is a custom part catalog unique to the present invention. The default AUTOCAD® MEP catalog contains parts that are generic in nature. As noted above, PYROCAD is designed to be a WYSIWYG pipe design software so that the model can proceed seamlessly from design to fabrication. For PYROCAD to allow the designer the ability to create accurate models, the parts must be specific and not generic; that is, the parts must be specific to manufacturer, model, material, pressure class and all other properties that make a part unique. The parts must also be accurate dimensionally so that they take up the correct three-dimensional space within the drawing model.

Figure 12:
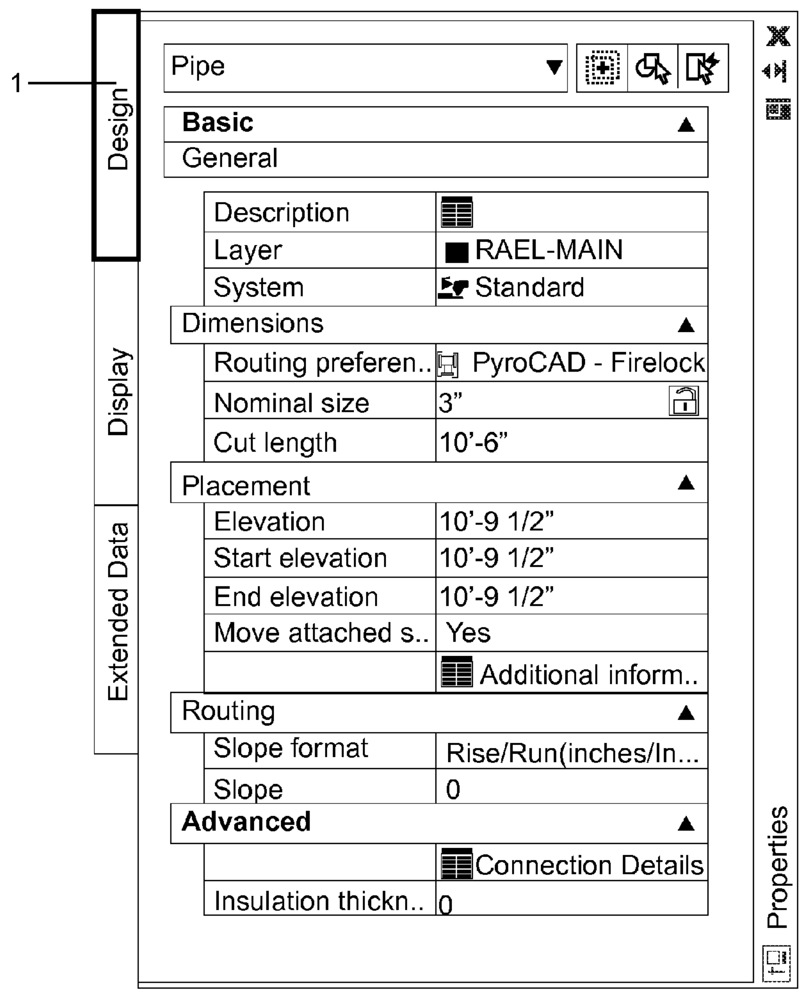
FIG. 12 is a screenshot of the AUTOCAD® MEP properties palette with the design tab selected.

The process of creating a new parts catalog is done through the AUTOCAD® MEP catalog editor (FIG. 12). In a preferred embodiment, the invention has two catalogs—named PYROCAD (us imperial).apc and PYROCAD mvpart.apc—that are stored in their respective folders under the PYROCAD 2011 installation folder. Once these files are created, they are populated by creating parts and storing them into their respective catalog. The PYROCAD (us imperial).apc catalog is used to store parametric pipes and fittings 13.1 that have been created for use with the present invention. These pipes and fittings are created and edited through the AUTOCAD® MEP content builder (FIG. 13A). The nature of a parametric part is such that the dimensional properties of the part are controlled by a variable related to a data table. The PYROCAD mvpart.apc catalog is used to store multi-view parts 13.2 that have been created for use with the present invention. These parts are created and edited through the AUTOCAD® MEP content builder (FIG. 13A) and can be both parametric and block-based.

The block-based multi-view parts are created first using the AUTOCAD® MEP block editor to create the block. Then the blocks are loaded into the AUTOCAD® MEP content builder (FIG. 13B). The PYROCAD tools catalog 11.2 is a file named PYROCAD 2011_catalog.atc that is stored in its respective folder under the PYROCAD 2011 installation folder. This file can be viewed via the Autodesk content browser 13C.1. Within this browser, the PYROCAD tools palette group 13D.1 and the individual tool palettes 13D.2 are stored. Both the function and the graphics of the individual tool palettes (FIGS. 10A, 10B, 10C, 10D, 10E, 10F, 10G and 10H) were created specifically for implementation of the present invention.

Figure 14:
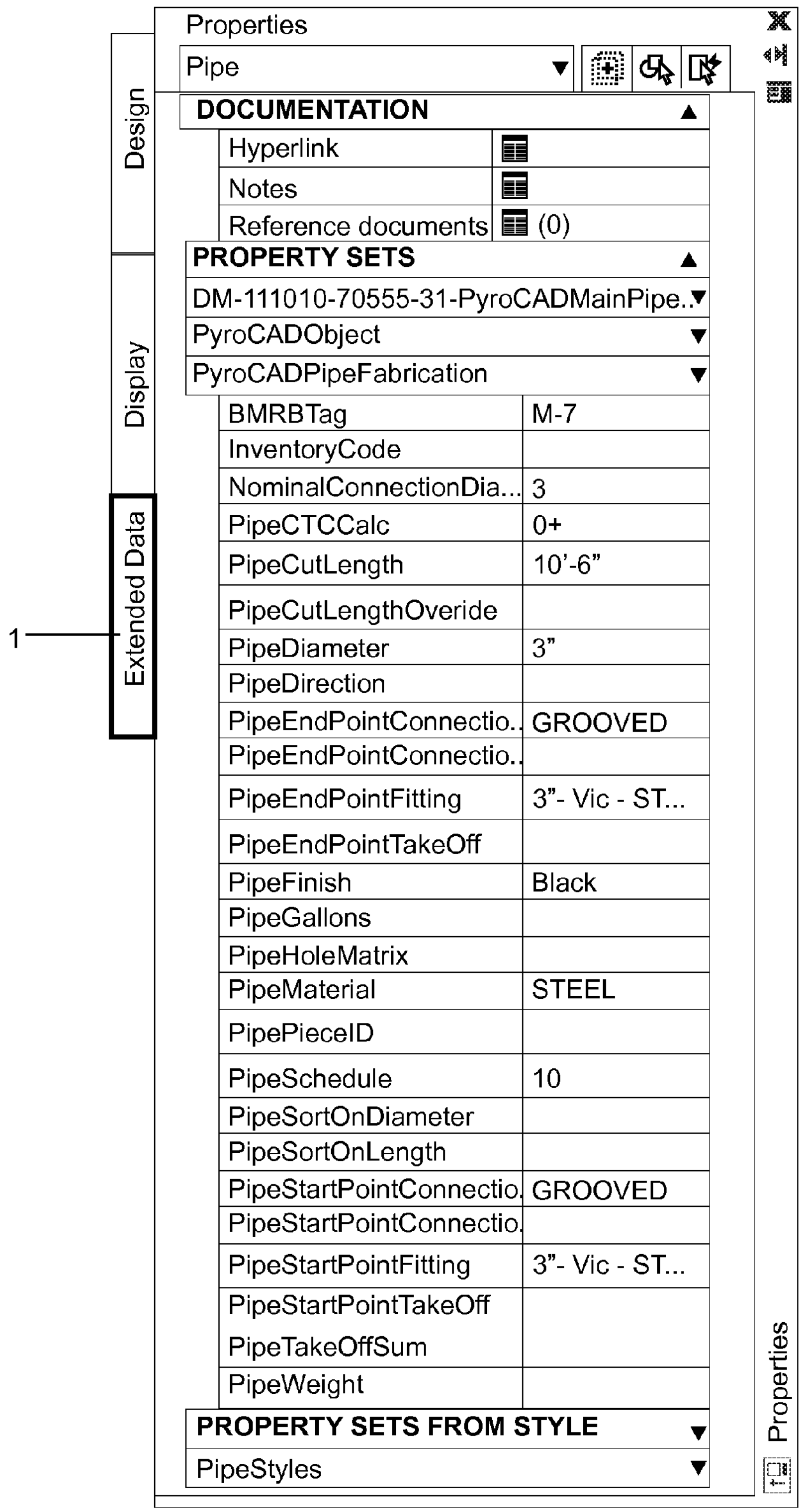
FIG. 14 is a screenshot of the AUTOCAD® MEP properties palette with the extended data tab selected.
Figure 15:
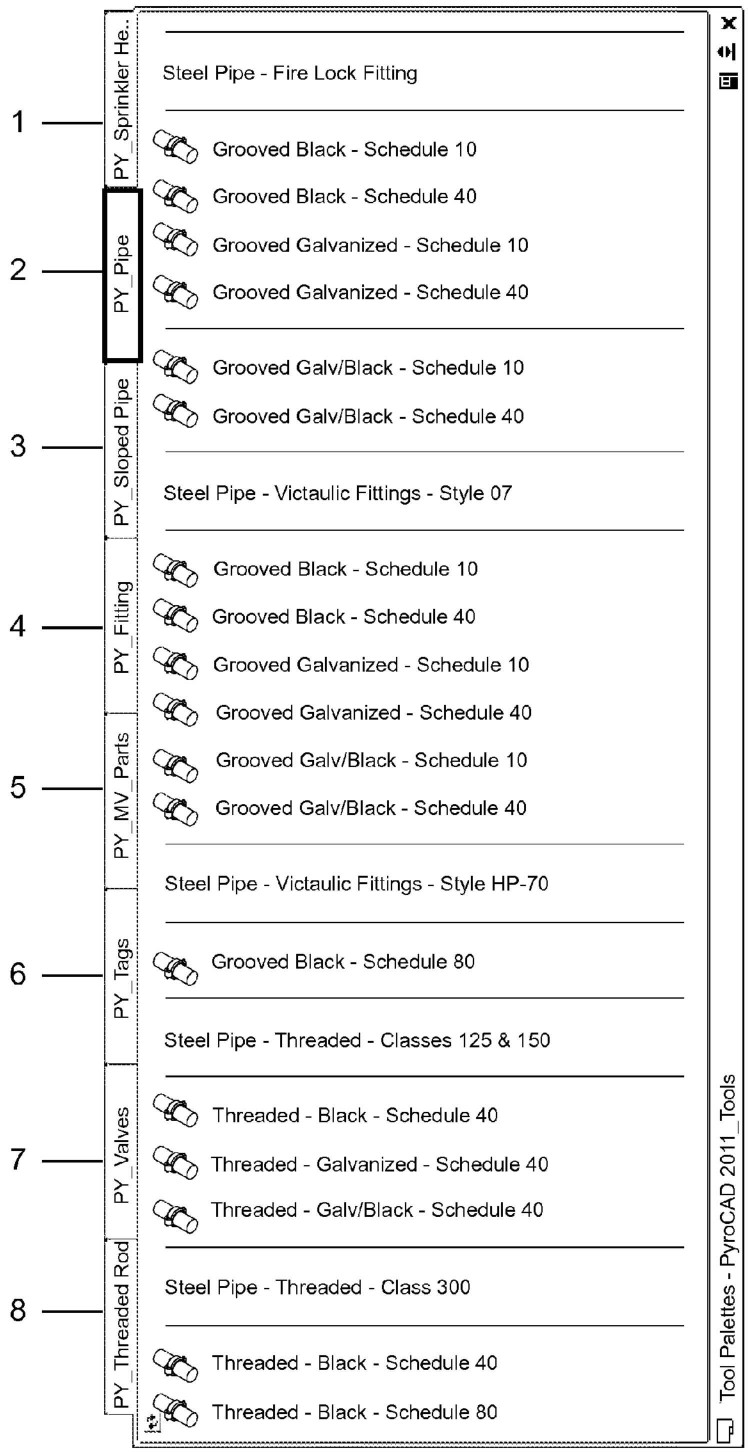
FIG. 15 is a screenshot of the PYROCAD™ tool palette group.
Figure 16:
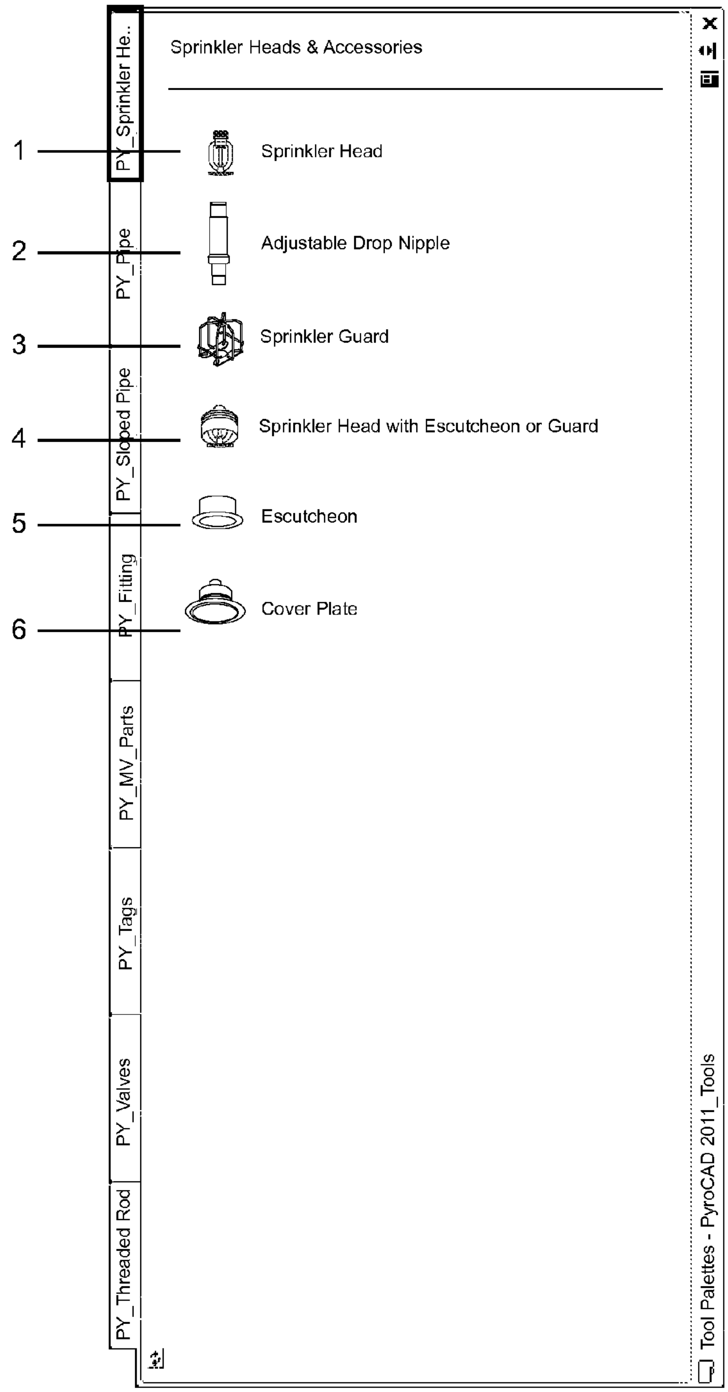
FIG. 16 is a screenshot of the py_sprinkler head tool palette showing sprinkler heads and accessories.

PYROCAD profiles 11.4 and menus 11.5 have been previously explained. PYROCAD property sets 11.6 are a collection of custom property set definitions that are created through the use of the AUTOCAD® MEP style manager (FIG. 14). These property set definitions are sets of data that are attached to the AUTOCAD® MEP objects. The present invention reads and writes data to the objects via this property set data. In a preferred embodiment, some but not all of this data is pulled into and displayed within a "tag" attached to an object. PYROCAD tags 11.7 are a collection of AUTOCAD® MEP multi-view block definitions that are created through the use of the AUTOCAD® MEP style manager (FIG. 16). The PYROCAD tags have place holders inside of them that link to the PYROCAD property set data and will display this data when attached to their respective AUTOCAD® MEP objects.

The PYROCAD workspace 11.8 is a collection of custom workspaces that are used to store the settings of the user interface. The user manages these workspaces with the workspace settings form (FIG. 17). These settings include, but are not limited to, menu or palette location, open/closed state, and docked/undocked state. The PYROCAD drawing template 11.9 is an AUTOCAD® MEP drawing template file named PYROCAD 2011.dwt stored in its respective folder under the PYROCAD 2011 installation folder 18.1. This file contains customizations required by the present invention including, but not limited to, PYROCAD property sets, PYROCAD tags and their multi-view block definitions, block definitions, routing preferences, layers and text styles.

The PYROCAD application 11.10 is a dynamic-link library that is loaded upon startup of AUTOCAD® MEP. This application allows a user to programmatically control the AUTOCAD® MEP environment and objects. PYROCAD reports 11.11 is a dynamic-link library that is loaded by the PYROCAD application 11.10 and is used to output the reports.

Figure 29:
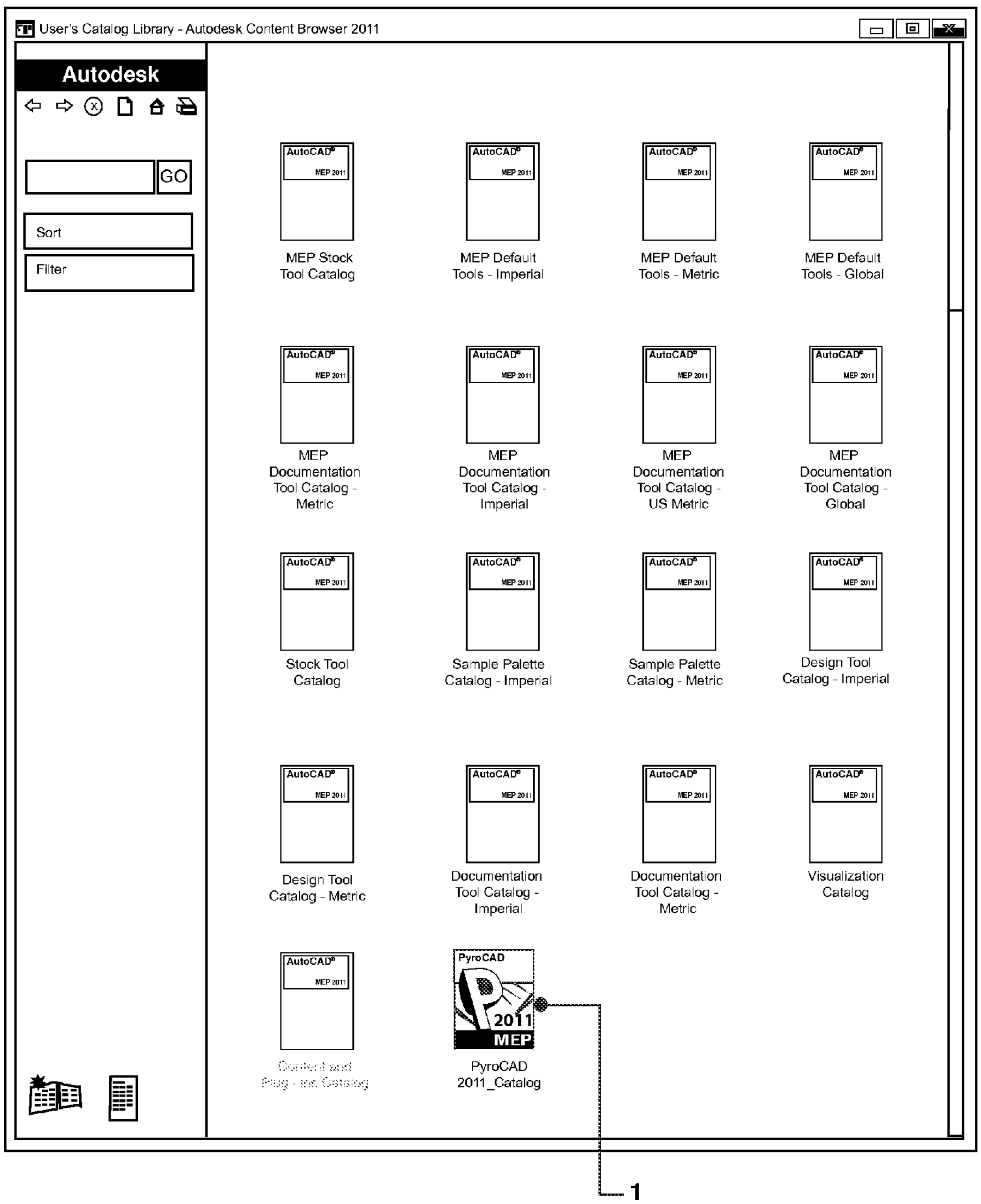
FIG. 29 is a screenshot of the AUTOCAD® content browser form where the PYROCAD™ library is managed shown at the catalog level.

In most cases, a piping system is drawn on top of an architectural plan (FIG. 19). If an architectural plan is not provided, then the architectural tool palette (FIG. 29) found in AUTOCAD® MEP can be used to prepare the architectural drawing. FIG. 19 shows both a plan or top view of the model space (on the left) and an isometric view of the model space (on the right).

Figure 20:
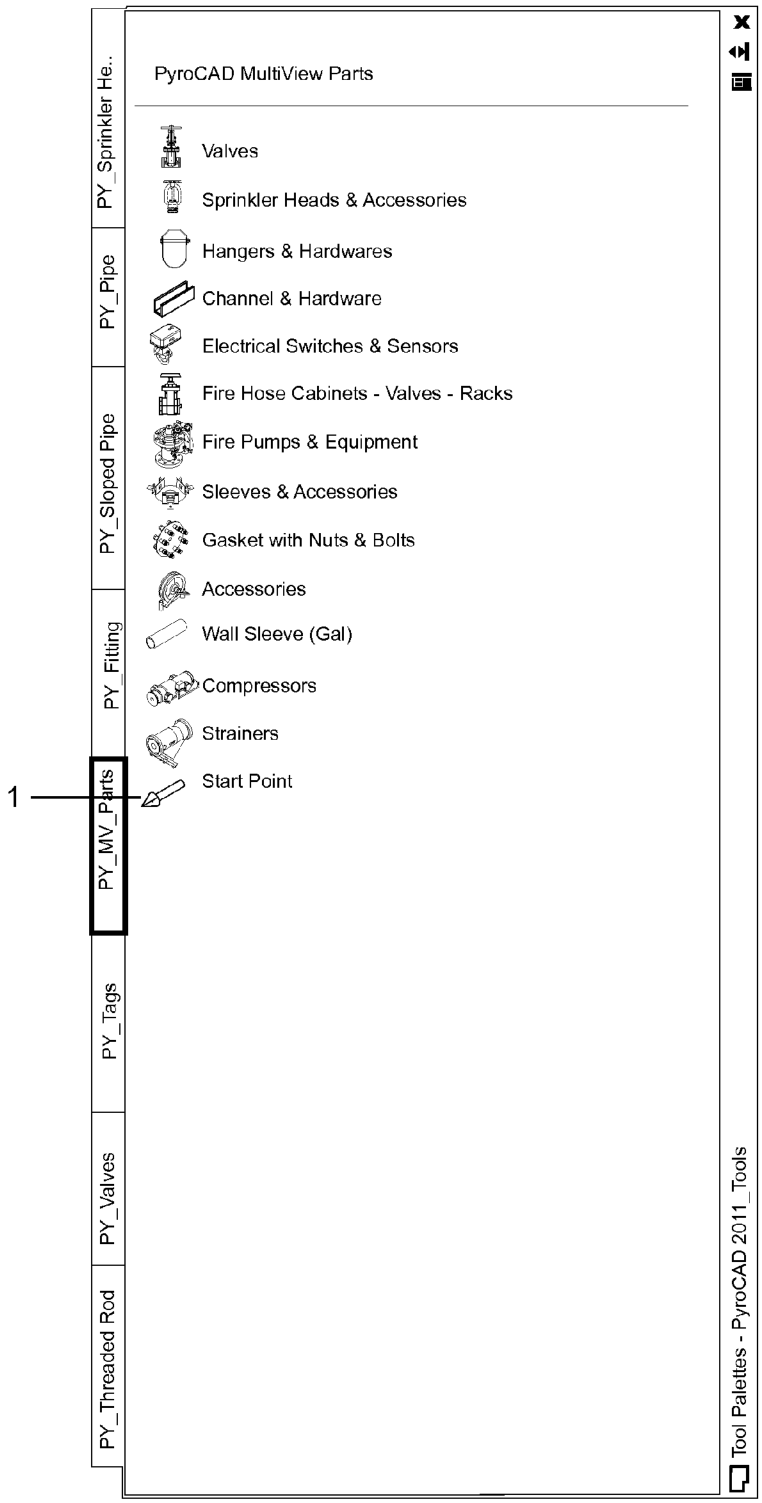
FIG. 20 is a screenshot of the py_my_parts tool palette showing the multi-view parts.
Figure 21:
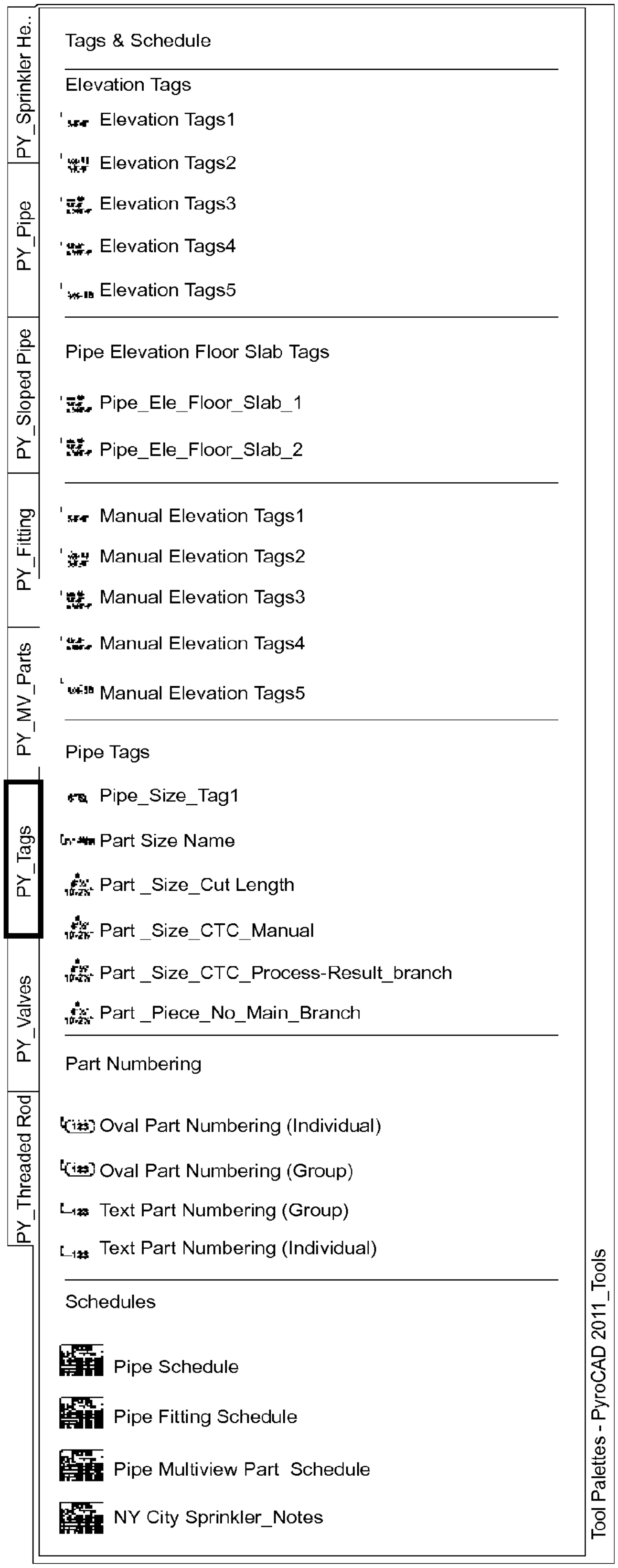
FIG. 21 is a screenshot of the py_tags tool palette showing tags.

The first step in drawing piping system is to insert a fire sprinkler head into the drawing. The user goes to the py_sprinkler heads tab on the PYROCAD 2011_Tools tool palette 10.1 and selects the fire sprinkler head button 10A.1. This will launch the AUTOCAD® MEP add multi-view parts form (FIG. 20), which is linked to the PYROCAD mvparts catalog 11.2, 20.1. Next, the user must select the exact part that is needed. Upon opening the PYROCAD multi-view parts catalog folder, the categories folders are displayed 20.2. Upon opening one of the categories folders, the types folders are displayed 20.3, and upon opening one of the types folders, the manufacturer folders are displayed 20.4. Upon opening one of the manufacturer folders, the individual multi-view parts are displayed 20.5.

Figure 22:
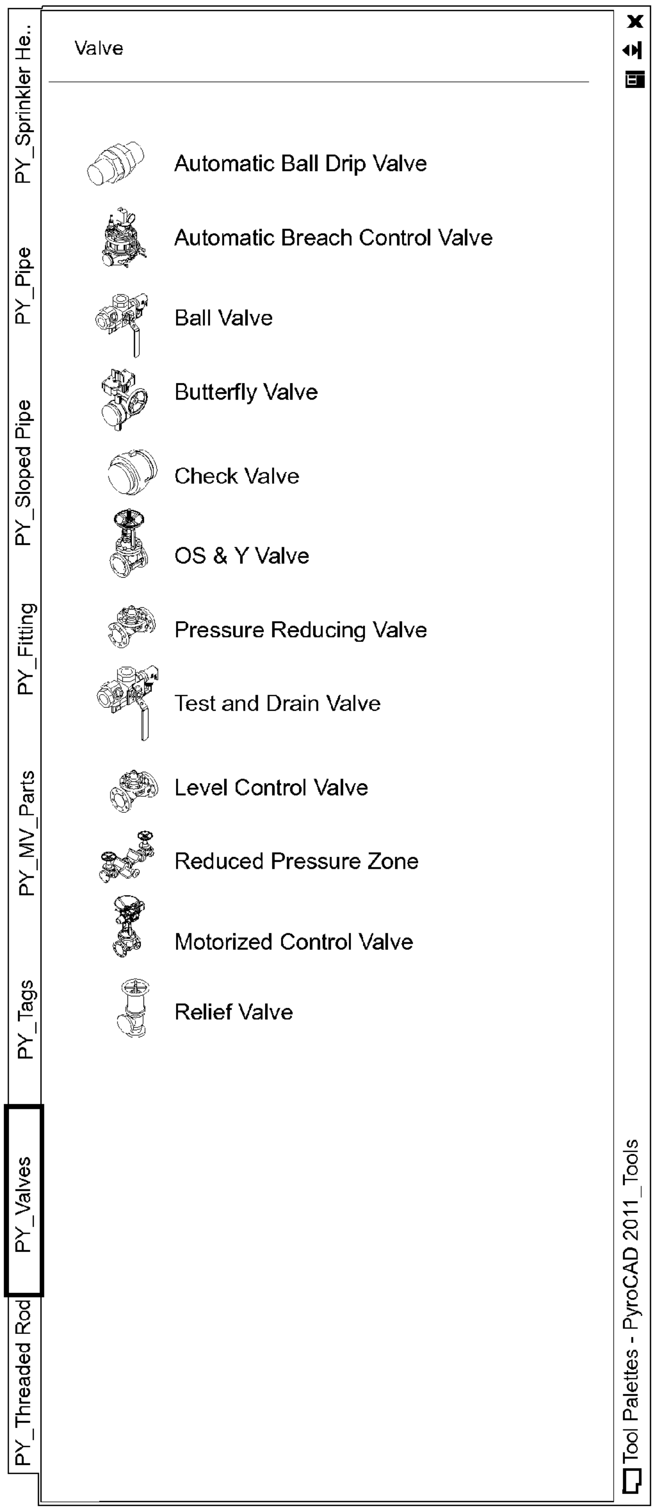
FIG. 22 is a screenshot of the py_valves tool palette showing valves.
Figure 23:
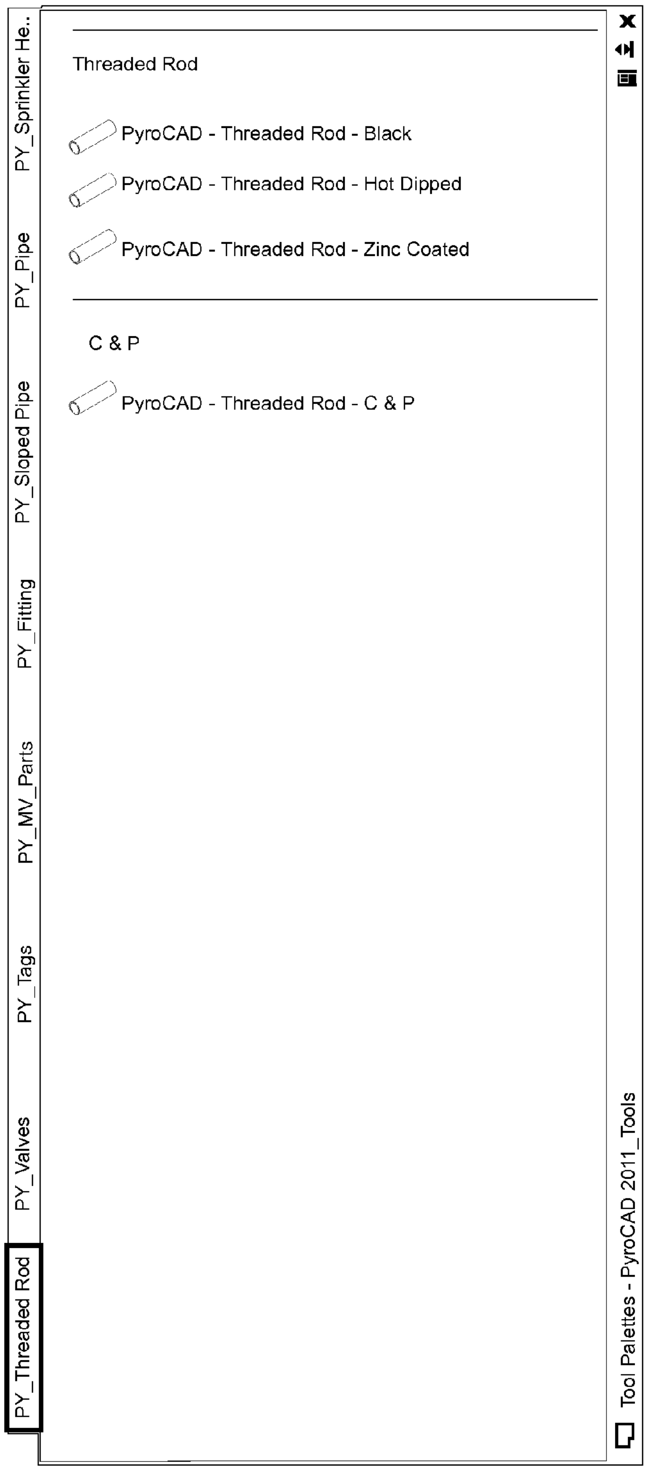
FIG. 23 is a screenshot of the py_threaded rod tool palette showing threaded rods.

To narrow down the multi-view parts, the user selects the part filter tab 20.6. As each custom property is selected 21.1, the list is narrowed until the desired part is identified 21.2. The user then places this part into the drawing (FIG. 22). In this example, the fire sprinkler head (is a multi-view part) now resides in the drawings model space 22.1. FIG. 22A provides an enlarged view 22A.1, 22A.2 of the views shown in FIG. 22 22.1, 22.1. In FIG. 23, the fire sprinkler head has been copied into multiple locations as required by the design. Next, the user selects the fire sprinkler heads and sets the elevation 23A.1 and layer 23A.2 in the properties palette.

Figure 24:
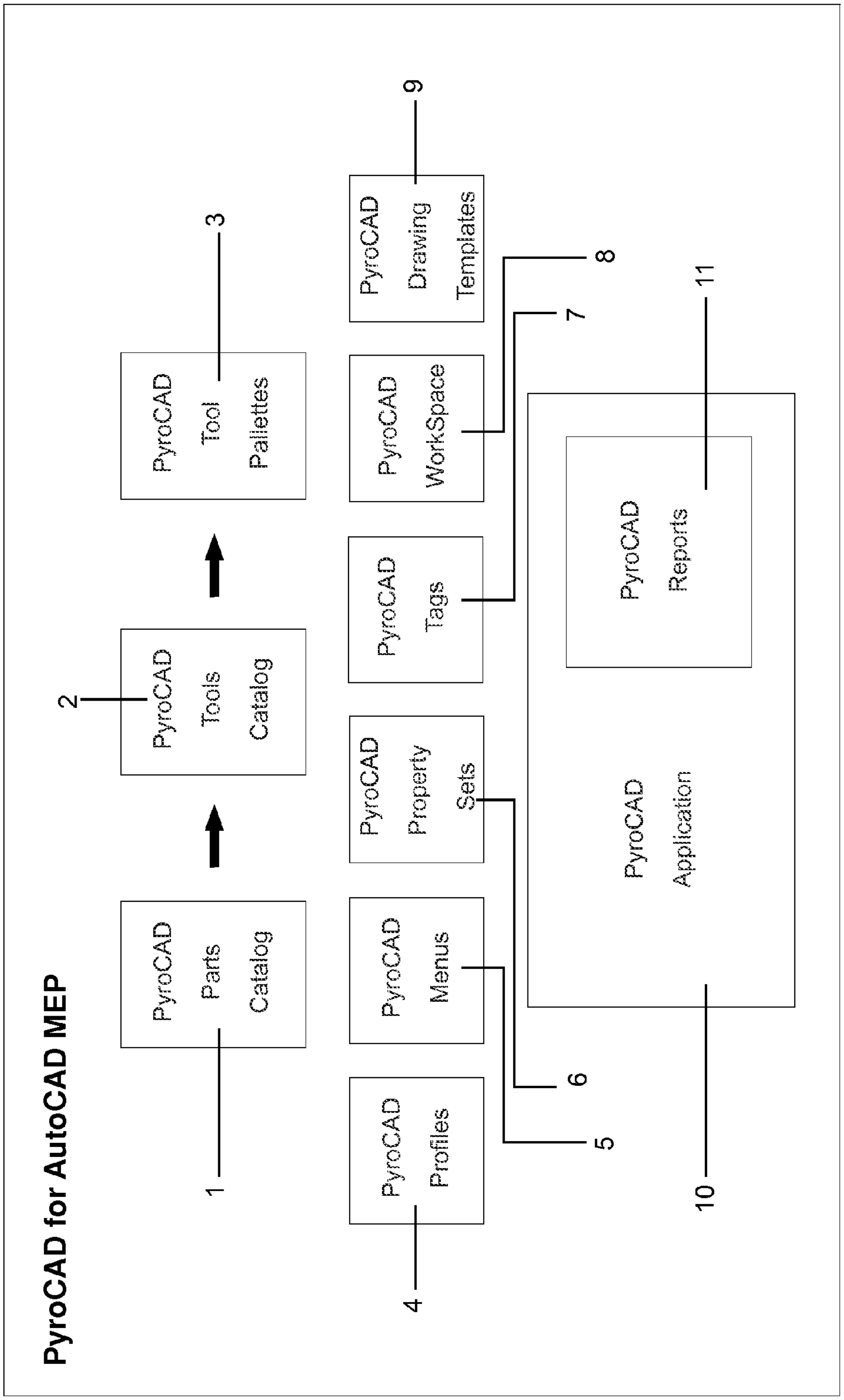
FIG. 24 is a diagram of the PYROCAD™ system architecture showing the modules included in the PYROCAD™ application.

Once the sprinkler heads have been added, the next step is to add the pipe that will supply water to the fire sprinkler heads. To do this, the user goes to the py_pipe tab on the PYROCAD 2011_Tools tool palette 10.2 and selects the desired pipe and fitting button 10B.1. This will execute the AUTOCAD® MEP "pipe add" command with the parameters that have been defined in the properties of the button on the palette (FIG. 24A). Each button on the palette corresponds to a specific routing preference with specific settings. The custom PYROCAD routing preferences are defined in the AUTOCAD® MEP style manager (FIG. 24) and are assembled from the pipes and fittings within the PYROCAD parts catalog 11.1, specifically, the parametric pipes and fittings stored in the PYROCAD (us imperial).apc file. In FIG. 24A, the tool properties for the button 10B.1 are displayed, showing both the routing preference 24A.1 and the drawing template in which the routing preference is found 24A.2, 11.9.

Next, the user must draw the pipe connecting the sprinkler heads. This pipe is considered to be a branch line. For the purposes of explaining the AUTOCAD® MEP pipe connectors, FIG. 24B shows the pipe and fitting disconnected and moved to the side of the sprinkler head in both plan and isometric view. FIG. 24C is an enlarged view of the isometric view shown in FIG. 24B that shows the dialog box with which the user would be presented if he hovered the cursor over the triangle warning sign presented by AUTOCAD® MEP. The dialog box states that "the pipe connector is not connected to another object." In AUTOCAD® MEP, connectors are the glue that holds the individual parts or objects of the mechanical disciplines together. There are AUTOCAD® MEP connectors of the following types: schematic, duct, pipe, electrical, and wire ways.

Pipe connectors are attached to the PYROCAD parts during construction of the pipe connectors in the model space. The pipe connector type is another important property that is determined at the time of the construction of the part (FIG. 24D). The type of connector also gives AUTOCAD® MEP certain intelligence in handling the points of connection. For instance, if the connector is grooved type, then AUTOCAD® MEP knows that to connect grooved pipe and fittings together, there must be a coupling in between. If the connector is threaded type, AUTOCAD® MEP knows that the pipe will engage or thread into the fitting a certain distance as defined in the catalog. In addition, in AUTOCAD® MEP a pipe with an undefined connector type inherits its connector type from the connector to which it is joined.

FIG. 26 shows the branch line connected to the sprinkler heads, as well as the addition of a larger pipe to supply this branch line and other yet to be drawn branch lines. This larger pipe is referred to as a "main." In FIG. 26, the branch line 26.1 needs to be connected to the main 26.2. This is accomplished by adding a fitting onto the main. To add the fitting onto the main, the user goes to the py_fitting tab on the PYROCAD 2011_Tools tool palette 10.4 and selects the desired fitting button 10D.1. This will execute the AUTOCAD® MEP "pipefittingadd" command with the parameters that have been defined in the properties of the button on the palette. In the case of FIG. 10D.1, a specific fitting has been preselected in the tool properties similar to FIG. 24A described previously; however, if the user needed a fitting other than the preconfigured one, he would select 10D.2 and then select the fitting image 26A.1 on the AUTOCAD® MEP properties palette. This will display the AUTOCAD® MEP select a part form 26A.2, where the user can access additional catalog content. The user then places the fitting on the main pipe 26B.1 and stretches the branch pipe into the connector of the fitting 27.1. This type of fitting is called a "takeoff" because it allows a branching pipe to attach to a larger run of pipe.

Figure 28:
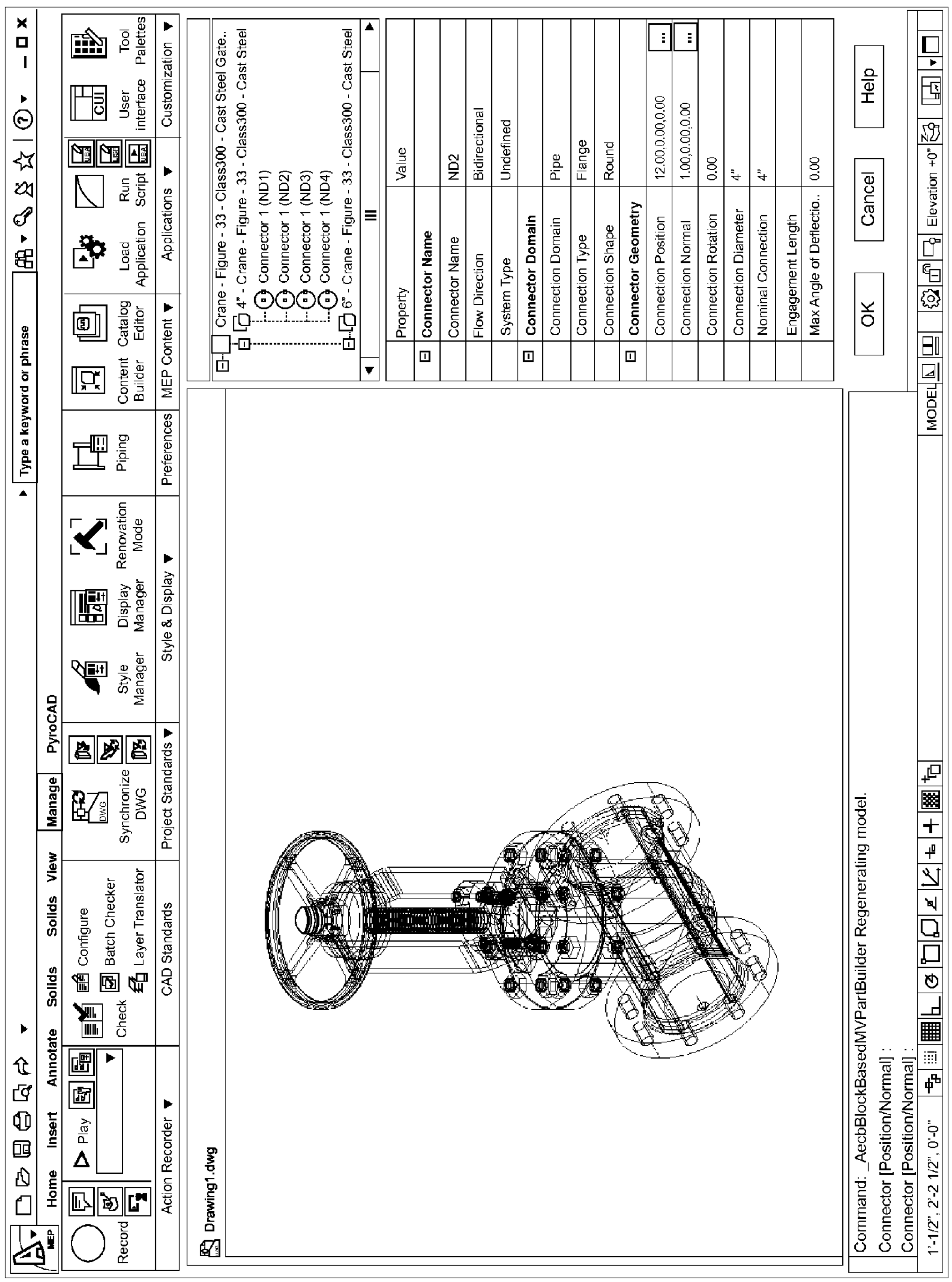
FIG. 28 is a screenshot of a multi-view part creation session shown in the AUTOCAD® MEP content builder.

For explanatory purposes, this branch pipe will be copied three times to create a total of four branch lines connected to a main pipe (FIG. 28). Next, the user adds a vestibule and ceiling grid (FIG. 30). This is done using the tools shown in FIG. 29 and provided with AUTOCAD® MEP. The user then adds an additional sprinkler head to the ceiling of the vestibule 31.1. This sprinkler head is a concealer type, which means there will be a decorative cover plate to cover it at the ceiling. In FIG. 32, the sprinkler head shows that it has two connectors by indicating two triangle warnings 32.1. The reason this sprinkler head has two connectors is to attach the decorative cover plate at the ceiling on one connector and the supply piping at the other connector. Next, to add the adjustable drop nipple onto the sprinkler head, the user goes to the py_sprinkler heads tab on the PYROCAD 2011_Tools tool palette 10.1 and selects the desired button 10A.2.

Next, the user selects the exact multi-view part (FIG. 33) that will be connected to the sprinkler head 34.1. This part is one that allows a height adjustment in the installation process and is commonly used in ceiling installations. Next, to add the cover plate onto the sprinkler head, the user goes to the py_sprinkler heads tab on the PYROCAD 2011_Tools tool palette 10.1 and selects the desired button 10A.6. Next, the user selects the exact multi-view part (FIG. 35) that will be connected to the sprinkler head 35A.1. The remaining branch pipe is drawn and connected to the main pipe 36.1.

Next, the user creates a new layer named rael-arm layer using the PYROCAD layer standard (FIGS. 37, 38 and 38A). This layer standard is used to guide the creation of layers by predefining choices that are concatenated together into new layers. In FIG. 39, the adjustable drop nipple and the two nearest elbows and pipes are put onto the rael-arm layer. The parts are put onto different layers so that they can be treated differently when the system is processed for fabrication.

In FIG. 40, a piece of duct work has been added to the architectural background. This will allow the demonstration of additional features of this invention in relation to the "pyhd" command 45.1. Next, using the AUTOCAD® MEP "mvpartadd" command, the user inserts a new pendent sprinkler (FIG. 41) with a protective guard (FIG. 42) under the duct (FIG. 43). Then the sprinkler head is copied north to create an additional head under the duct. Next, the sprinkler heads are connected with branch piping to the main pipe using the AUTOCAD® MEP "pipeadd" command. In FIG. 44, the resulting branch piping is shown 44.1. Next, the user selects the "pydh" command 45.1 from the PYROCAD panel 4.2. This launches the PYROCAD head annotation form (FIG. 46), which is discussed more fully below.

As shown in FIG. 22A and FIG. 23, the multi-view part sprinkler heads that are used in the piping model are of real scale, which means they are tiny. In the present invention, a visual symbol is used to make the sprinkler heads visible and distinct from each other on the final output, whether electronic or paper (see 111.4 and 111.5). The PYROCAD head annotation form (FIG. 46) automates the process of assigning block symbols representing different sprinkler head types to their matching multi-view parts in the model space. When launched, the "pydh" command programmatically makes a selection set of all sprinkler heads in the drawing and then looks at each head to see if the PYROCAD_sprinkler_head property set data is attached. If the PYROCAD_sprinkler_head property set data is not attached, this means that the "pydh" command has not been run since this multi-view part sprinkler head has been placed in the drawing. In FIG. 46, an image is shown in column 46.1 if the multi-view part sprinkler head comes from the PYROCAD multi-view part catalog. Column 46.2 displays the name of the sprinkler head with its corresponding properties, such as national pipe thread size, orifice size, manufacturer, model, temperature, type, finish, cover or escutcheon finish, and head guard.

In FIG. 46, each unique sprinkler head is assigned its own row and two unique block symbols. The standard annotation symbol is selected and shown in column 46.3, and the below annotation symbol is selected and shown in column 46.5. The standard annotation symbol is the default symbol that is applied to the multi-view part sprinkler head. The below annotation symbol is applied when the users wants to designate that the multi-view part sprinkler head is under an obstruction such as a piece of heating and ventilation ductwork. (The way the user switches from standard to the below annotation is explained below.) If desired, the user can assign up to six characters in the attribute column 46.4 and 46.6 to display in the drawing next to the block symbols. Attributes may be used to distinguish similar parts with different characteristics. For example, two multi-view part sprinkler heads might have the same manufacturer, model, size, orifice, and color but a different temperature setting. The user is limited to a certain number of block symbol choices in 46.3 and 46.5, but the attribute fields of 46.4 and 46.6 allow the user to create numerous annotations (i.e., block symbol plus attribute(s)) for each multi-view part sprinkler head.

FIG. 46 also shows the drop-down box 46.7 that is associated with the PYROCAD start points that are in the drawing. This drop-down list box 46.7 controls the quantities that are displayed in column 46.8, which is composed of text boxes. Within these text boxes is a count of each unique multi-view part sprinkler head. These counts will be filtered according to the start point selected in the count/start point ID drop-down list box 46.7. A label 46.9 provides the total count for all sprinkler heads shown in column 46.8. Clicking the apply button 46.10 will cause the block symbols to be applied to the multi-view part sprinkler heads in the drawings model space and close the form. FIG. 47 shows the block symbol anchored to all of the multi-view part sprinkler heads.

FIG. 48 shows how the user would change the properties of the sprinkler head from standard annotation to below annotation. The user can switch the block symbols assigned to the multi-view part sprinkler heads from the standard annotation to the below annotation by selecting individual or multiple sprinkler heads and right clicking the screen. This will display a menu (FIG. 48) that allows the user to select head position of standard or below. (When a sprinkler head is located under an obstruction such as ductwork, the below head position would be selected.) FIG. 49 displays the multi-view part sprinkler head now with the below annotation block symbol.

In FIG. 51, the user added additional main pipe and created a loop 51.1. In FIG. 52, the northern most branch line has been connected into the opposing main pipe, causing what would be termed a cross connection 52.1.

At this point, the design work has been completed to represent an actual three-dimensional piping system. The next steps in the process include defining the fabrication parameters, processing, annotating and reporting of the system for fabrication. To define the fabrication parameters, the user first inserts a start point and places it on the main pipe. In a preferred embodiment, the start point object is a custom AUTOCAD® MEP multi-view part that was developed for PYROCAD. Preferably, the start point object is shaped like an arrow with a pipe connector at the arrows tip, and it can be attached to a MEP object like a pipe or fitting. PYROCAD uses the start point to both indicate the starting point of the piping system ready for fabrication and to store the fabrication parameters.

To insert a start point, the user selects the start point from the PYROCAD tool palette 10E.1. Selection of the start point launches the AUTOCAD® MEP add multi-view parts form (FIG. 53) and opens the start point category. (Since there is only one start point we do not need to narrow down our selection and can proceed with the default start point that is already selected 53.1.) Next, the user places the start point on the main pipe in a location that would be indicative of the water supply point (FIG. 54). Once the start point has been added to the piping system, the user launches the PYROCAD application form and fills out the required fields. These fields are shown in FIG. 57 and are the fabrication parameters that will be stored in the property set data attached to the start point. To launch the PYROCAD application form (FIG. 55), the user goes to the PYROCAD tools panel of the PYROCAD tab on the ribbon 4.2 or types the "py" command at the command line 4.4. The user will be prompted on the command line to "please insert and select a start point object" at this point; because the start point has already been inserted, the user needs only to select it.

The start point object is used to define the actual source point or the starting point from which the user wants the system to start traversing. Upon selection of a start point, the PYROCAD application form (FIG. 56) is displayed. The initial view of this form is a compact view, but the button 57.1 expands the form to the full-size view shown in FIG. 57. (This button 57.1 will both expand and contract the PYROCAD application form depending on its current state.)

When the PYROCAD application form is loaded, it will check to see if the selected start point has the required PYROCAD property sets attached. If there are no PYROCAD property sets attached, this fact would indicate that this is a new start point. If the start point is new, PYROCAD will attach the required PYROCAD property sets to the start point. The required PYROCAD property sets are used to store the data that will be entered into the PYROCAD application form. FIG. 60 shows the extended data tab of the AUTOCAD® MEP properties palette with a start point selected. The PYROCAD property sets named pyrocadheaderdata and pyrocadstartpoint are both present and filled with data from the PYROCAD application form (FIG. 57).

The next step is to fill out all of the fields on the form. A non-editable text field 57.2 is the start point ID; this field is filled out automatically by the PYROCAD application. The job number field 57.3 is a text field in which a company-specific job number is entered. For example, 4459 could be the reference number for a new parking garage at a certain location. The job name field 57.4 is a text field in which a company-specific job name is entered. For example, "Big Trucks Parking Garage" could be the name of the job. The level field 57.5 is a text field indicating the level of the building with which the pipe system is associated. For example, "Ground Floor" would indicate that the system is for the ground floor of the building. The description field 57.6 allows a description of the project, such as "Preaction System West Side," to be entered. Text fields 57.7, 57.8 and 57.9 allow the street address, city and zip code, respectively, of the location of the job to be entered.

Text field 57.10 is for the ship date of the pipe system to the job site. Text field 57.11 is for the list date of the pipe system. The list date is the date on which the fabrication reports or lists are generated; the text field 57.11 is filled in automatically when the user presses the reports button 57.25. Text field 57.12 identifies the draftsman working on the project and is filled out automatically by the PYROCAD application based on the WINDOWS® login information. Text field 57.13 indicates the system type, examples of which include wet, dry and preaction.

The next field is the first field of seven fields that require a layer name. PYROCAD gets the layer names by prompting the user to select an object of the piping system on the desired layer. Then PYROCAD retrieves the layer name from the object via the AutoCAD MEP API. This method has been chosen for PYROCAD because it eliminates the need to validate the layer name. In contrast, if the layer name were filled in by the user typing the layer name into a text box, PYROCAD would have to confirm that the layer existed in the drawing. Additionally, the user may have typed a layer name that does exist in the drawing but was not the correct name corresponding to the construct in the piping system. Another approach could have been to ask the user to choose the layer from a drop-down list box. The disadvantage to this approach is that a drawing may contain many hundreds of layers, which would make it cumbersome to choose a layer from a list box. For these reasons, PYROCAD has been designed to procure the layer name by having the user select an object on that layer.

Text field 57.33 indicates the arm over layer. This field is filled by pressing the adjacent select button, resulting in a prompt in the command line to select an object that is already drawn in the arm over layer (FIG. 57A). Text field 57.34 indicates the elevation layer. This field is filled by pressing the adjacent select button, resulting in a prompt in the command line to select an object that is already drawn in the elevation layer (FIG. 57A). Text field 57.35 indicates the base tag layer. This field is filled by pressing the adjacent select button, resulting in a prompt in the command line to select an object that is already draw in the base tag layer (FIG. 57A). Text field 57.14 indicates the maximum length. This is a numerical number, designated in inches, for the maximum pipe length of an individual pipe to be allowed during the fabrication process.

Text field 57.36 shows a sample of a main tag label that will be used during the tagging process (FIG. 86A) and applied to the individual pieces of main pipe. To designate the main tag label, the user selects the adjacent create button on 57.26. This adjacent create button displays the create label form (FIG. 57C), which is used to designate the labeling for the main and branch numbering. In FIG. 57C, the user enters a prefix into the text field labeled field. Then the user enters a number in the starting # field. This number will be the first number from which the mains will start numbering with an increment of one. For example, the main tag labels could be m-100, m-101, m-102, etc. The add button concatenates field and starting # together and shows an example in the tag label field. When the user confirms that the tag label field shows the desired combination, he presses save, and the form closes, returning the results to text field 57.36.

Text field 57.37 indicates the main layer. This field is filled by pressing the adjacent select button and selecting an object in the drawing on the desired layer. The user will also be prompted in the command line similar to FIG. 57A. Text field 57.15 indicates the main pipe diameter. This field is used to validate the main pipes diameter in the model and to warn the user to make a correction if any deviation is found. Text field 57.16 indicates the main pipe type, examples of which include black, galvanized, copper, etc. This field is used to validate the main pipe type in the model and to warn the user to make a correction if any deviation is found. Text field 57.17 indicates the main pipe schedule. This will be used to validate the main pipe schedule in the model and to warn the user to make a correction if any deviation is found. Text field 57.18 indicates the cut length of the main pipes. This is a numerical number, designated in inches, for the desired cut length of the mains for the fabrication process.

Text field 57.38 shows the branch tag label. This field 57.38 has the same function and purpose as 57.36 previously described except it is for the branch lines. Text field 57.39 indicates the branch layer. This field is filled by pressing the adjacent select button and selecting an object in the drawing on the desired layer. The user will also be prompted in the command line similar to FIG. 57A. Text field 57.40 indicates the head layer. This field is filled by pressing the adjacent select button and selecting an object in the drawing on the desired layer. The user will also be prompted in the command line similar to FIG. 57A. Text field 57B.31 indicate the cross connect layer. This field is filled by pressing the adjacent select button and selecting an object in the drawing on the desired layer. The user will also be prompted in the command line similar to FIG. 57A. Text field 57.19 is a text field for the diameter of the cross connect layer.

Text field 57.20 indicates the branch pipe type, examples of which include black, galvanized, copper, etc. This field is used to validate the branch pipe type in the model and to warn the user to make a correction if any deviation is found. Text field 57.21 indicates the branch pipe schedule. This field is used to validate the branch pipe schedule in the model and to warn the user to make a correction if any deviation is found. The text fields 57.42 thru 57.51 make up the branch sizing schedule. The branch sizing schedule is determined by doing a hydraulic calculation of the piping system with hydraulic calculation software. The branch sizing schedule determined by the hydraulic calculation software is then be placed into text fields 57.42 thru 57.51. Text field 57.42 indicates the number of sprinkler heads one-inch pipe can supply, text field 57.43 indicates the number of sprinkler heads 1¼" pipe can supply, and text field 57.44 indicates the number of sprinkler heads 1½" pipe can supply. Text field 57.45 indicates the number of sprinkler heads 2" pipe can supply, text field 57.46 indicates the number of sprinkler heads 2½" pipe can supply, and text field 57.47 indicates the number of sprinkler heads 3" pipe can supply. Text field 57.48 indicates the number of sprinkler heads 4" pipe can supply, text field 57.49 indicates the number of sprinkler heads 6" pipe can supply, and text field 57.50 indicates the number of sprinkler heads 8" pipe can supply. Text field 57.51 indicates the number of sprinkler heads 10" pipe can supply.

The area entitled "grouped start points" on FIG. 57 is used to group together child start points to connect separate piping systems from the model for fabrication purposes. If there were more than one piping model in the drawing space that were not connected, but the user desired to have the piping models fabricated together, the user would place the start point on one, and the "child start points" on the other piping models. PYROCAD would start traversing from the parent start point and then traverse all the child start points, thereby causing the piping systems to be fabricated together (i.e., included in the same fabrication reports and/or installation drawings). Label 57.53 is for the tag index. The tag index (explained more fully below) is an incremented value for the number of times the piping system has been listed. Button 57.22 launches the PYROCAD tag history form (FIG. 107), which allows the user to review the fabrication history for the piping system to which this selected start point is attached. Button 57.23 allows the user to remove tags either one index at a time or all tags at once.

Now that the user has filled in all the required fields on the PYROCAD application form (FIG. 56), PYROCAD is ready to process the piping system. The next step is to press the process button 66.1 to start the processing of the piping system. FIG. 61 is a flowchart representing the process algorithm of PYROCAD. PYROCAD begins by validating the start point data 61.1. This procedure validates the data entered by the user for basic errors. For example, it checks if the mandatory fields like maximum length, main layer, branch layer, head layer and branching schedule are filled out correctly. PYROCAD creates process results and error results documents 61.2. This procedure creates xml files for storing the process results and error reports. The process results file stores all information that is not an error, such as warnings. An example of a warning would be "a small pipe found." The error results file stores all information related to errors. An example of an error would be "Autodesk.AutoCAD.Runtime.Exception: eKeyNotFound." These files are used by the development team for debugging purposes. These files are xml files named in a format <drawing file name>(<start point id>).xml for process results and <drawing file name>(<start point id>)-errorlog.xml for error reports. These files are stored under c:\program files\PYROCAD 2011\PYROCAD-results folder.

PYROCAD will save the start point data 61.3. This process automatically takes the data entered by the user into the PYROCAD form (FIG. 57) and stores the data into corresponding property sets attached to the start point. The saving of the form (FIG. 57) data is handled automatically, relieving the user of managing when and how to save.

PYROCAD gets layer details from start point 61.4. This step retrieves the layers defined by the user: main layer, branch layer, arm over layer, base tag layer, elevation layer, cross connect layer and head layer. PYROCAD next traverses through the pipes on the main layer 61.5 for the purpose of error checking. (The traversing algorithm begins with the start point, which is always on the main layer.) As explained above, layers are defined by the user at the time of PYROCAD start point data entry. The purpose of the traversing algorithm is to travel all possible paths through the three-dimensional piping model.

The traversing algorithm supports many of the automated tasks PYROCAD performs on the piping system. The traversing algorithm is explained in greater detail in connection with the PYROCAD traversing algorithm flowchart (FIG. 63) and FIG. 65 (a partial piping system). Generally, the traversing algorithm steps through each object of the piping system and enables PYROCAD to perform any necessary processing on the current MEP object by providing it for read-write operations (only one object is the "current object" at any point in time). In this example, because the traversing is being used for the error checking of the main pipes (i.e., in support of the process algorithm 61.5), PYROCAD will error check each main pipe while traversing.

The traversing logic is as follows: Leaving step 61.5, the process proceeds to step 63.1 and begins a recursive loop. In FIG. 65, the numbers represent objects such as the start point, pipes, fittings and fire sprinkler heads. In FIG. 65, the letters represent the connectors. In FIG. 65, the paths are labeled P1 thru P6. The traversing algorithm utilizes the following five variables: current object, initial point, previous object, unused connectors list and connectors to visit list. In FIG. 63, two loops are shown: the connectors to visit 63.2 and the path loop 63.3.

In 63.1 the current object is set to be the start point 65.1. Next, the current object is passed from the connectors to visit loop to the path loop. The path loop is controlled by the condition found in 63.4. The path loop repeats as long as there is a current object; otherwise, the path loop exits, returning to the connectors to visit loop 63.2.

The next step within the path loop 63.5 is to get all the connectors of the current object that are not connected to the previous object or the defined initial point. At this point, because this is the first object, there is no previous object, and the initial point has not been set. Continuing with 63.5, the current object being 65.1, the start point has one connector 65.A. This connector 65.A is placed into the unused connectors list 63.6. The next step 63.7 is to do all processing on the current object. In this particular example, "do all processing" 63.7 means error checking; however, the traversing algorithm supports other automation processes, such as coupling insertion, pipe and fitting resizing, tagging and reporting, which would all fall within the "do all processing" step 63.7. To clarify, these processes do not happen all in one traversing, but each process uses the traversing functionality to accomplish its goal. The traversing algorithm is the wrapper around each of these processes.

If at this process of error checking 63.7, an error is found on the current object, PYROCAD stops the traversing and returns to 61.6. Because the condition in 61.6 is yes, PYROCAD proceeds to 61.7 and 61.12, which display the results of the error checking process in the results frame 67.1, and stops until the user has resolved the errors. Returning to 63.7, from this point forward it will be assumed that all current objects are error-free, and the traversing will continue uninterrupted. In 63.8 PYROCAD is continuing the path loop with each unused connector. In 63.9 the initial point is set from the unused connectors list 63.6. By way of reminder, the current object is the start point 65.1, and in step 63.5 the connector 65.A was placed in the unused connectors list 63.6. In 63.10 PYROCAD stores the rest of the unused connectors in the connectors to visit list 63.11. With the current object of 65.1 as the start point, there is only one connector and, therefore, no connectors to be placed in connectors to visit list 63.11.

The next part of the traversing algorithm is 63.12, where the current object is tested for conditions. In 63.12 the current object is checked to confirm that (a) it is not a sprinkler and its unused connector count is not zero or (b) it is a start point. Because the current object 65.1 is a start point, the traversing will continue with a yes onto 63.13. The other conditions in 63.12 are explained below in connection with the next pass through the path loop with the next current object.

The next step 63.13 is to get the connected object at the initial point and set the next initial point. In step 63.13, PYROCAD queries the AUTOCAD® MEP API to return the object that is connected to the connector 65.A of the current object 65.1. It should be noted that at the lettered references in FIG. 65 (such as 65.A, 65.B., etc.), there are two connectors (one from each adjoining object) at each point. At 65.A the start point object 65.1 has a connector, and the pipe 65.2 also has a connector. The two objects (the start point object 65.1 and the pipe 65.2) are joined together by these connectors; therefore, when PYROCAD queries the AUTOCAD® MEP API for the connected object at the start point's 65.1 connector 65.A, it will return the pipe's 65.2 connector at 65.A. To finish this step, the initial point is set to the pipe's connector at 65.A.

The next step is to make the connected object the current object 63.14, which means that the current object start point 65.1 is finished being traversed, and the new current object becomes pipe 65.2. The path loop 63.3 then loops back to the top 63.4 and checks the condition and repeats until current object becomes nothing (i.e., until there is no current object). Because the current object is now the pipe 65.2, the path loop will continue.

PYROCAD now continues the traversing with the next current object pipe 65.2. The next step 63.5 is to get all connectors of the current object that are not connected to the previous object or the initial point. Because the initial point is now the pipe's 65.2 connector 65.A, the only remaining connector of the pipe is 65.B. The latter connector is placed in the unused connectors list 63.6. The next step 63.7 is do all processing on current object. The pipe will be assumed to be error-free for purposes of this example.

PYROCAD will now go to 63.8 and continue to loop with each unused connector. In 63.9 the pipe's 65.2 connector 65.B stored in the unused connectors list 63.6 is now assigned as the initial point. In step 63.10, there are no extra connectors to place in the connectors to visit list 63.11. In 63.12 the current object pipe 65.2 is checked to confirm that (a) it is not a sprinkler and its unused connector count is not zero or (b) it is a start point. The pipe 65.2 still has one unused connector 65.B because what is connected to it has not been determined yet (that happens in step 63.13). Step 63.12 will, therefore, evaluate as a yes because either the first two conditions are true or the current object is a start point. Because the first two conditions are true, the path loop continues to step 63.13. At step 63.13, PYROCAD queries the AUTOCAD® MEP API to return the object that is connected to the current object's 65.2 connector 65.B. This will return the cross tee fitting 65.3. Also in step 63.13, PYROCAD sets the cross tee fitting's 65.3 connector 65.B to the new initial point. In 63.14 the cross tee fitting 65.3 becomes the new current object, and the path loop returns to the top 63.4.

In FIG. 65, there are a total of six paths defined (65.P1 through 65.P6). At this point, the third object in the 65.P1 path has been reached. The current object is cross tee fitting 65.3, and the initial point is 65.B. If the current object is an object (i.e., not nothing), the path loop continues 63.4. In the next step 63.5, PYROCAD places connectors 65.C, 65.D and 65.E of the current object into the unused connectors list 63.6. Step 63.7 can be skipped assuming no errors. Step 63.8 continues the loop with each unused connector. In step 63.9, the first unused connector from the unused connectors list 63.6 is assigned as the new initial point. The unused connectors list 63.6 works on a first-in-first-out basis (FIFO). The new initial point will now be the cross tee fitting's 65.3 connector 65.C.

The cross tee fitting 65.3 that is the current object is the first object that has more than two connectors. This causes something new to happen in step 63.10. In 63.10 the remaining connectors in the unused connectors list 63.6 are moved onto the connectors to visit list 63.11. The connectors to visit list 63.11 exists in the connectors to visit loop 63.2 outside of the path loop 63.3. The connectors to visit list 63.11 restarts the path loop with a new object when a path has been completed.

The remainder of this path 65.P1 is described briefly in this paragraph by the changing of the values until the sprinkler head is reached. The current object is 65.3, the unused connectors list 63.6 is empty, the connectors to visit list has connectors 65.D and 65.C, and the initial point is 65.C. Step 63.12 evaluates to yes. Step 63.13 gets pipe 65.4 and sets new initial point to its connector at 65.C. At step 63.14, the new current object becomes pipe 65.4. Step 63.4 is true and continues. Step 63.5 places connector 65.F into the unused connectors list 63.6. Step 63.7 is error-free and skipped. Step 63.8 continues. Step 63.9 set 65.F from the unused connectors list 63.6 as the new initial point. At step 63.11, there are no unused connectors. Step 63.12 evaluates to yes. Step 63.13 sets the new initial point to the connector 65.F of the tee fitting 65.5. Step 63.14 sets the new current object to the tee fitting 65.5. The path loop returns to 63.4.

With the current object as a tee fitting 65.5, the condition 63.4 evaluates true, and the path loop continues. Step 63.5 places connectors 65.G and 65.H into the unused connectors list 63.6. Step 63.7 is error-free and skipped. Step 63.8 continues. At step 63.9, PYROCAD sets 65.G from the unused connectors list 63.6 as the new initial point. In 63.10 the remaining connector 65.H in the unused connectors list 63.6 is moved onto the connectors to visit list 63.11. Step 63.12 evaluates to yes. Step 63.13 sets the new initial point to the connector 65.G of the pipe 65.6. Step 63.14 sets the new current object to the pipe 65.6. The path loop returns to 63.4.

With the current object as a pipe 65.6, the condition 63.4 evaluates true, and the path loop continues. Step 63.5 places connector 65.I into the unused connectors list 63.6. Step 63.7 is error-free and skipped. Step 63.8 continues. At step 63.9, connector 65.I from the unused connectors list 63.6 is set as the new initial point. At step 63.11, there are no unused connectors. Step 63.12 evaluates to yes. Step 63.13 sets the new initial point to the connector 65.I of the elbow fitting 65.7. Step 63.14 sets the new current object to the elbow fitting 65.7. The path loop returns to 63.4.

With the current object as an elbow fitting 65.7, the condition 63.4 evaluates true, and the path loop continues. Step 63.5 places connector 65.J into the unused connectors list 63.6. Step 63.7 is error-free and skipped. Step 63.8 continues. At step 63.9, connector 65.J from the unused connectors list 63.6 is set as the new initial point. At step 63.11, there are no unused connectors. Step 63.12 evaluates to yes. Step 63.13 sets the new initial point to the connector 65.J of the sprinkler head 65.8. Step 63.14 sets the new current object to the sprinkler head 65.8. The path loop returns to 63.4.

With the current object as a sprinkler head 65.8, the condition 63.4 evaluates true, and the path loop continues. In step 63.5, there are no unused connectors. Step 63.7 is error-free and skipped. Step 63.8 passes the current object directly to 63.12 because the unused connectors list is empty. Step 63.12 evaluates to no because the current object is a sprinkler. This sets the current object to nothing, and the path loop returns to 63.4. PYROCAD now ends the path loop because the condition on 63.4 of the current object being nothing is true. This completes the path 65.P1 and returns control back to the connectors to visit loop 63.2.

This is the point where the recursive nature of the traversing algorithm begins. At this time, the connectors to visit list 63.11 has connectors 65.D, 65.E and 65.H. The connectors to visit loop 63.2 takes the first connector 65.D in the connectors to visit list 63.11 and retrieves its connected object (pipe 65.9) and then restarts the path loop with this pipe 65.9 as the current object. This path 65.P2 will be traversed by the path loop 63.3 terminating at the sprinkler head. PYROCAD adds one connector 65.K to the connectors to visit list 63.11. PYROCAD then returns to the connectors to visit loop 63.2.

The connectors to visit loop 63.2 will continue to restart the path loop as long as there are connectors in the connectors to visit list 63.11. At this time, the connectors to visit list 63.11 has connectors 65.E, 65.H and 65.K. The connectors to visit loop 63.2 takes the first connector 65.E in the connectors to visit list 63.11 and retrieves its connected object (pipe 65.10) and then restarts the path loop with this pipe 65.10 as the current object. This path 65.P3 will be traversed by the path loop 63.3 terminating at the sprinkler head, and no connectors will be added to the connectors to visit list 63.11. PYROCAD then returns to the connectors to visit loop 63.2.

At this point, the connectors to visit list 63.11 has connectors 65.H and 65.K. The connectors to visit loop 63.2 takes the first connector 65.H in the connectors to visit list 63.11 and retrieves its connected object (pipe 65.11) and then restarts the path loop with this pipe 65.11 as the current object. This path 65.P4 will be traversed by the path loop 63.3 terminating at the sprinkler head. PYROCAD adds one connector 65.L to the connectors to visit list 63.11. PYROCAD then returns to the connectors to visit loop 63.2.

At this time, the connectors to visit list 63.11 has connectors 65.K and 65.L. The connectors to visit loop 63.2 takes the first connector 65.K in the connectors to visit list 63.11 and retrieves its connected object (pipe 65.12) and then restart the path loop with this pipe 65.12 as the current object. This path 65.P5 will be traversed by the path loop 63.3 terminating at the sprinkler head, and no connectors will be added to the connectors to visit list 63.11. PYROCAD then returns to the connectors to visit loop 63.2.

At this time, the connectors to visit list 63.11 has connector 65.L. The connectors to visit loop 63.2 takes the first connector 65.L in the connectors to visit list 63.11 and retrieves its connected object (pipe 65.13) and then restarts the path loop with this pipe 65.13 as the current object. This path 65.P6 will be traversed by the path loop 63.3 terminating at the sprinkler head, and no connectors will be added to the connectors to visit list 63.11. PYROCAD then returns to the connectors to visit loop 63.2. The traversing of the piping system is complete when there are no connectors in the connectors to visit list 63.11.

As noted above, the process involved in step 63.7 was error checking, and the traversing algorithm was used to support this process; however, the traversing algorithm is used to support other processes of the present invention, such as coupling insertion, pipe and fitting resizing, tagging and reporting. The traversing algorithm enables these processes to have access to each object in all paths.

The above discussion of the traversing algorithm is in the context of the process algorithm (and error checking in particular). From a user perspective, when the user presses the process button 66.1, the following text appears on the PYROCAD application form 66.4: "PYROCAD checking main lines for errors . . . . " In AUTOCAD® MEP, the user will see the main piping becoming selected one pipe at a time as the processing traverses through the main pipes until they are all selected; when an object is selected in AUTOCAD® MEP, it visually changes to hidden lines. This is a visual indication that the error checking is taking place.

When the user sees the pipes being selected, PYROCAD is error checking the main pipes 61.6. This step takes each main (a MEP pipe object) and validates it to find out if there are any drafting errors that may cause the rest of the process (FIG. 61) to fail. If any errors are found, the process results are loaded 61.7, the results are displayed 61.12, and the process stops 61.12. The results of the error checking process are displayed in the results frame 67.1 until the user has resolved the errors.

PYROCAD error checking is called from a number of different points in the fabrication process and may involve error checking any of the objects found in the piping system. The "current object" is the object that causes the error. The following are examples of conditions that would evaluate as errors and would be presented to the user via the results frame 67.1.

An error would occur if a takeoff fitting connected to a main pipe is not on the same layer as the main designates in field 57.37. The brief description in the results frame 67.1 would read "takeoff not in main layer." An error would occur if any object in the piping system has an unconnected connector. The brief description in the results frame 67.1 would read "open ended pipe found" if the object type were a pipe. An error would occur if more than two objects are connected at the same connector. The brief description in the results frame 67.1 would read "a point found to which more than two objects are connected." An error would occur if any object other than a sprinkler guard or a cover plate is connected at the remaining connection point of a sprinkler head with two connectors.

If a sprinkler head that has an additional connector is used, then the user must connect a sprinkler guard or a cover plate to its second connection point. The brief description in results frame 67.1 would read "an invalid object connected to the connector of the sprinkler head." An error would occur if the same type of objects are connected together. For example, it is not allowed to connect a pipe to another pipe directly or an elbow to another elbow directly. This has to be done using the interconnecting fittings like reducer, coupling etc. The brief description in results frame 67.1 would read "a connection between same type objects is found." An error would occur if the current object is not in one of the layers defined by the user during the start point data entry. The brief description in results frame 67.1 would read "an object on a unspecified layer found in piping system."

Referring back to step 61.6, if an error is found in the PYROCAD sprinkler fabrication form (FIG. 67), the fabrication frame 67.2 displays a message informing the user that "PYROCAD found listed errors on main line. Please clear all errors and try again!" In the instruction frame 67.3, the user is told that the error is "a branch line starting with takeoff not in main layer." In the results frame 67.1, a new line item has been entered. It starts with a red circle with a white x in it, indicating that this is a critical error and PYROCAD cannot proceed until the error is resolved. The text states "takeoff not in main layer" to indicate which error this is.

To resolve the error, the user will then double left mouse click the line in the results frame, which will cause the AUTOCAD® model to zoom to and select the object that is causing the error. Then the user will fix the error, which in this case entails changing the layer of the takeoff fitting to the main piping layer (FIG. 68).

The user would press the process button 66.1 again. This will continue the process algorithm shown in FIG. 61. If all errors have been resolved, the insert couplings to main step 61.8 will begin. FIG. 69 indicates in the fabrication frame 69.1 "PYROCAD inserting couplings to main . . . . " This part of the process breaks the main into the cut length indicated in 57.14 and places a coupling at the break. The logic for the main pipes algorithm is shown in FIG. 62, which is an expansion of 61.8.

At step 62.1, PYROCAD traverses through the entire piping system 62.1 and sequentially provides each object used in the system as the current object. The first condition 62.2 checks if the pipe is in the main layer specified in field 57.67. In step 62.3, PYROCAD checks the pipe's length; PYROCAD inserts couplings only to main pipes that are longer than maximum length. This maximum length is defined by the user in the PYROCAD application form (FIG. 57) and is called maximum length 57.14. All the pipes that evaluate yes on condition 62.3 need a coupling inserted into them and are placed into a collection 62.4.

Next, PYROCAD loops through each pipe from the collection that needs a coupling 62.5 and performs the processes shown in 62.6, 62.7 and 62.8. In 62.6 PYROCAD rotates the pipe 180 degrees if it is not in the correct orientation. (AUTOCAD® MEP pipes have a start and end point that defines its location in the 3D model space.) Orientation of the pipe as it was drawn is checked and rotated 180 degrees if not drawn in the direction in which the traversing is taking place. This is necessary to ensure the correctness of any main pipes fabricated with takeoff fittings. The takeoff fittings are always dimensioned from the pipe's AUTOCAD MEP® endpoint; therefore, this AUTOCAD® MEP endpoint always needs to be consistent in its relation to the traversing direction when the fabrication processing occurs.

The final portion of the main pipes algorithm continues with PYROCAD breaking the pipe at cut length and inserting coupling 62.7. The cut length is defined by the user in the PYROCAD application form (FIG. 57) at 57.18. The pipe cut length can be extended up to the maximum length under two conditions. The first condition is if extending the pipe saves a coupling, in which case the pipe is allowed any length above the cut length and less than the maximum length. The second condition is if the cut length falls on a takeoff fitting, in which case the pipe is extended in 6-inch increments up to the maximum length.

After breaking the pipe at cut length, it becomes two pieces. This new pipe is again evaluated, checked for its length and cut at cut length if necessary. This process is done in a repeating loop and continued until the length of the new piece of pipe becomes less than the maximum length 57.14. FIG. 70 shows the main pipes after this portion of the process algorithm is completed, the main pipes having been cut into their respective pieces and new coupling added. Once the main pipes algorithm is completed, PYROCAD proceeds to step 61.9 in the process algorithm.

In step 61.9, PYROCAD traverses through main pipes again and collects branch connectors. The branch lines are the branch pipes that begin from the mains with a takeoff fitting and end at the sprinkler heads. This routine traverses through the main pipe and identifies if there are any takeoffs and places those branch lines into a collection 61.9. The distance of each takeoff is stored from the starting end of the main pipe to which it is connected. At the end of the procedure, the branches are sorted based on the distance from the starting end of the pipe so that all of the branch labels are in correct order when the tagging process is run.

The process algorithm continues to step 61.10 and the traversing of the branch lines for the purpose of error checking. The user receives the message indicated in the fabrication frame 71.1 "PYROCAD checking branch lines for errors . . . . " If errors are found such as in FIG. 72, they will be listed in the results frame 72.1. In 72.1 there are three results; one of the results is an error, thereby stopping the processing until resolution. The other two results presented are yellow triangles with a black apostrophe in the middle. These are warnings and will not stop the processing but should be reviewed by the user as a precaution.

In this scenario 72.1, some small pipes have been found that could become a problem in the next step, which is resizing. The branch line warnings and errors are fixed and reviewed in the same fashion as done with the main pipe errors. The user selects the line in the results frame 72.1, which causes text to be displayed in the instructions frame 72.2 for the selected result. The user double left mouse clicks the line in the results frame 72.1 to switch to AUTOCAD® MEP and fix or review the result. After the user reviews the warnings and fixes the errors, the processing resumes when the user presses the process button 66.1.

When all branch pipe errors have been resolved, PYROCAD continues with the resizing of the branch line pipes and fittings 61.11. The branch lines and fittings are resized to conform to the schedule that is defined in the PYROCAD application form 57.42 through 57.51. FIG. 79A is a flowchart showing the branch resizing algorithm of the present invention. FIG. 79B is a diagram that explains the logic behind the head count calculation of the branch system. The way PYROCAD resizes the branch lines is explained in connection with both of these figures.

It should be noted that the branch resizing algorithm is taking place within the process algorithm, which utilizes (or is supported by) the traversing algorithm. Note that the term "current object" refers to the object that is made available by the traversing algorithm (FIG. 63) to other processes within the present invention. The first current object would be from the collection of takeoff fittings that were collected in 61.9. In FIG. 79B the current object would be takeoff fitting 79B.1. In FIG. 79A, PYROCAD needs to determine whether the current object is a branching object 79A.2. This check is done by looking at the layer in which the object is drawn and the type of object it is. Any MEP object that can split a traversing path into more than one direction is known as a branching object. In other words, a MEP object with more than two connectors is considered a branching object. Examples of branching objects are tees, cross tees, and takeoffs.

Because the current object takeoff fitting 79B.1 is a branching object, PYROCAD moves to step 79A.3. In this case, the current object 79B.1 is the first branching object, which means that a new path relation collection is created. PYROCAD uses the path relation collection 79A.3 to store the path from the root of the branch up to the current object. Every branching object's incoming connector is designated as the root connector, and the path relation collection stores objects in relation to the root connector. The path relation collection contains the current branching object and all the previous branching objects through which the traversing algorithm passed until it reached the current object.

Now that PYROCAD has created the path relation collection, the path data is stored as the branch line is traversed. In step 79A.4, the current object's information is stored in the path relation collection. The particular information that is stored is shown in 79A.5. The first piece of information is the incoming connector's parent object ID, which is the object ID of the object to which this incoming connector is connected. In the example provided in 79B.1, the current object is a takeoff fitting. An object ID is an AUTOCAD® MEP-created value that is assigned to each object and is unique to that object. PYROCAD queries the AUTOCAD® MEP API with an object ID, and the AUTOCAD® MEP API returns the actual object.

The second piece of information that is stored in the path relation collection is the connector's number. As explained above, objects can have multiple connectors. AUTOCAD® MEP gives each connector of an object a number. For example, an elbow fitting might have a connector number one and a connector number two. A tee fitting might have three connectors connector numbers one, two and three. By keeping track of the connector number, PYROCAD knows which connector on the fitting is the incoming connector. The third piece of information that is stored in the path relation collection is head count. The head count is the number of sprinkler heads that are on the outgoing side of that connector. The fourth piece of information that is stored in the path relation collection is the path relationships, which contain the branching objects upstream of the current object.

Continuing with the example, at step 79A.4 PYROCAD stores for takeoff fitting 79B.1 the following information in the path relation collection. For the connector parent object ID, PYROCAD stores the object ID of the takeoff fitting 79B.1. For the connector number, PYROCAD stores number one. (For the sake of this example, all incoming connectors are number one.) For the head count, PYROCAD leaves this field blank because it is updated at step 79A.6. For the path relationships, PYROCAD stores takeoff fitting 79B.1, indicating that this is the first root connector. For the override diameter, PYROCAD leaves this field blank because it is updated at step 79A.10. Now that the initial values for the current object have been set in the path relation collection, PYROCAD moves to step 79A.6.

The next step in the branch resizing algorithm is 79A.6, which involves updating the head count when a sprinkler head is found on a run of the current object. As used herein, the term "run" means a straight traversing path with no branching objects terminating in a sprinkler head. In FIG. 79B, paths 79B.P3, 79B.P5 and 79B.P6 are all runs because there are no branching fittings. PYROCAD uses a function found in the AUTOCAD® MEP API called "getrun" to check to see what objects are attached to the other connectors of the current object and whether they terminate in a sprinkler head. In this case, the getrun function is called using the outgoing connector of the current object, which is the takeoff fitting 79B.1. AUTOCAD® MEP returns only the pipe that is the next object along the 79B.P1 path.

The reason the AUTOCAD® MEP getrun function only returns one pipe is because the cross tee fitting 79B.2 is a branching object and, therefore, terminates the run. Note that a run can only have one traversing path. Because no sprinkler heads are found with the getrun function for this current object, the head count is not changed. In step 79A.7 the root connector for the current object, the takeoff fitting 79B.1, is stored in the root connectors list 79A.6. In step 79A.8, the branch resizing algorithm is finished with the current object and returns control to the traversing algorithm, which will present the next current object to the branch resizing algorithm. This completes the gathering of information into the path relation collection for the first branching object (takeoff fitting 79B.1) in FIG. 79B.

The next current object encountered by PYROCAD in traversing path 79B.P1 is a pipe. A pipe is not a branching object, which means that PYROCAD would skip to step 79A.8 and return control to the traversing algorithm to get the next current object (a cross tee fitting 79B.2). The cross tee fitting 79B.2 is considered a branching object in step 79A.2. Because the path relation collection already exists, PYROCAD needs only to add this current object's data to the path relation collection. The five pieces of data that are added are shown in 79A.5: the cross tee fitting's object ID, the connector number (which is one for all branching objects in this example), head count (which is empty in this example), path relationship (takeoff fitting 79B.1 and cross tee fitting 79B.2), and override diameter (which is empty in this example). In step 79A.6, one sprinkler head is found with the getrun function, which means that the head count of each root connection in the path relationship will be incremented by one. Takeoff fitting 79B.1 and the current object, which is the cross tee fitting 79B.2, each gets a head count of one. In step 79A.7, the root connector for the current object (the cross tee fitting 79B.2) is stored in the root connectors list 79A.6. This completes the second branching object in FIG. 79B.

The next current object encountered by PYROCAD while traversing the path 79B.P1 is a pipe. Because a pipe is not a branching object, PYROCAD would skip to step 79A.8 and return control to the traversing algorithm to get the next object. The next current object is a tee fitting 79B.3, which is considered a branching object in step 79A.2. Because the path relation collection already exists, PYROCAD need only add this current object's data to the path relation collection. Specifically, the five pieces of data shown in 79A.5 are added: the tee fitting's object ID, the connector number (which is one for all branching objects in this example), head count (which is empty in this example), path relationship (takeoff fitting 79B.1 and cross tee fitting 79B.2 and tee fitting 79B.3), and override diameter (which is empty in this example).

In step 79A.6, one sprinkler head is found with the getrun function, which means that the head count of each root connection in the path relationship will be incremented by one. Takeoff fitting 79B.1 and cross tee fitting 79B.2 each now has a head count of two, and the current object tee fitting 79B.3 gets a head count of one. In step 79A.7, the root connector for the current object (tee fitting 79B.3) is stored in the root connectors list 79A.6. This completes the third branching object in FIG. 79B.

The next three current objects encountered by PYROCAD while traversing the path 79B.P1 are a pipe, elbow fitting and sprinkler head. Neither a pipe, elbow fitting nor sprinkler head is a branching object; therefore, PYROCAD skips to step 79A.8 and returns control to the traversing algorithm to get the next object. The next three current objects in the path 79B.P2 are a pipe, elbow fitting and a pipe, none of which is a branching object; therefore, PYROCAD skips to step 79A.8 and returns control to the traversing algorithm to get the next object. The next current object is a tee fitting 79B.4, which is a branching object (step 79A.2). Because the path relation collection already exists, PYROCAD need only add this current object's data to the path relation collection.

The five pieces of data that are added to the path relation collection are shown in 79A.5 and include: the tee fitting's object ID, the connector number (which is one for all branching objects in this example), head count (which is empty in this example), path relationship (takeoff fitting 79B.1 and cross tee fitting 79B.2 and tee fitting 79B.4), and override diameter (which is empty in this example). In step 79A.6, two sprinkler heads are found with the getrun function, which means that the head count of each root connection in the path relationship is incremented by two. The result is that takeoff fitting 79B.1 and cross tee fitting 79B.2 each has a head count of four, and the current object tee fitting 79B.4 gets a head count of two. In step 79A.7, the root connector for the current object (tee fitting 79B.4) is stored in the root connectors list 79A.6. This completes the fourth branching object in FIG. 79B.

The next three current objects PYROCAD encounters while traversing the path 79B.P3 are a pipe, elbow fitting and sprinkler head, none of which is a branching object; therefore, PYROCAD skips to step 79A.8 and returns control to the traversing algorithm to get the next object. The next three current objects encountered by PYROCAD while traversing path 79B.P4 are a pipe, elbow fitting and a pipe, none of which is a branching object; therefore, PYROCAD skips to step 79A.8 and returns control to the traversing algorithm to get the next object. The next current object is a tee fitting 79B.5, which is a branching object (step 79A.2). Because the path relation collection already exists, PYROCAD need only add this current object's data to the path relation collection. The five pieces of data added are shown in 79A.5: the tee fitting's object ID, the connector number (which is one for all branching objects in this example), head count (which is empty in this example), path relationship (takeoff fitting 79B.1 and cross tee fitting 79B.2 and tee fitting 79B.3 and tee fitting 79B.5), and override diameter (which is empty in this example).

In step 79A.6, two sprinkler heads are found with the getrun function, which means that the head count of each root connection in the path relationship is incremented by two. Takeoff fitting 79B.1 and cross tee fitting 79B.2 will have a head count of six, tee fitting 79B.3 will have a head count of three, and current object tee fitting 79B.5 will now get a head count of two. In step 79A.7, the root connector for the current object (tee fitting 79B.5) is stored in the root connectors list 79A.6. This completes the fifth and final branching object in FIG. 79B.

Now that all the branching objects and path relationships have been stored, the next step in the branch resizing algorithm is the actual resizing of the branch line. To begin the process of resizing of the branch line, PYROCAD proceeds to step 79A.9 and loops through the root connectors list 79A.8 and applies the head count that is found for each root connector to all of the MEP objects in the run that are attached to the incoming connector.

Turning to the example provided in FIG. 79B, PYROCAD retrieves the takeoff fitting 79B.1 from the root connectors list 79A.8. PYROCAD then uses the getrun function to retrieve all objects attached to the incoming connector of the takeoff fitting 79B.1. The getrun function returns no objects. PYRO- CAD then uses the getrun function on the remaining connectors of the object to see if any run terminates in a sprinkler head. In the case of the takeoff fitting 79B.1, none of its connectors terminates in a sprinkler head. PYROCAD then places the takeoff fitting 79B.1 into the collection 79B.11 named member sizes 79B.12 with a head count of six. PYROCAD then proceeds to the next item in the root connectors list 79A.8.

PYROCAD retrieves the cross tee fitting 79B.2 from the root connectors list 79A.8 and then uses the getrun function to retrieve all objects attached to the incoming connector of the cross tee fitting 79B.2. The getrun function returns one pipe. PYROCAD then places the cross tee fitting 79B.2 and the pipe into the collection 79B.11 named member sizes 79B.12 with a head count of six. PYROCAD then uses the getrun function on the remaining connectors of the object to see if any run terminates in a sprinkler head. The getrun function returns the pipe and elbow fitting from path 79B.P3. PYROCAD then places the pipe and elbow fitting from path 79B.P3 into the collection 79B.11 named member sizes 79B.12 with a head count of one. PYROCAD then proceeds to the next item in the root connectors list 79A.8.

PYROCAD retrieves the tee fitting 79B.3 from the root connectors list 79A.8 and then uses the getrun function to retrieve all objects attached to the incoming connector of the tee fitting 79B.3. The getrun function returns one pipe. PYROCAD then places the tee fitting 79B.3 and the pipe into the collection 79B.11 named member sizes 79B.12 with a head count of three. PYROCAD then uses the getrun function on the remaining connectors of the object to see if any run terminates in a sprinkler head. The getrun function returns the pipe and elbow fitting from the end of path 79B.P1. PYROCAD then places the pipe and elbow fitting from the end of path 79B.P1 into the collection 79B.11 named member sizes 79B.12 with a head count of one. PYROCAD then proceeds to the next item in the root connectors list 79A.8.

PYROCAD retrieves the tee fitting 79B.4 from the root connectors list 79A.8 and then uses the getrun function to retrieve all objects attached to the incoming connector of the tee fitting 79B.4. The getrun function returns two pipes and one elbow fitting. PYROCAD then places the tee fitting 79B.4 and the two pipes and one elbow fitting into the collection 79B.11 named member sizes 79B.12 with a head count of two. PYROCAD then uses the getrun function on the remaining connectors of the object to see if any run terminates in a sprinkler head. The getrun function returns the pipe and elbow fitting from the end of path 79B.P2 and the pipe and elbow fitting from path 79B.P5. PYROCAD then places the pipe and elbow fitting from the end of path 79B.P2 and the pipe and elbow fitting from path 79B.P5 into the collection 79B.11 named member sizes 79B.12 with a head count of one. PYROCAD then proceeds to the next item in the root connectors list 79A.8.

PYROCAD retrieves the tee fitting 79B.5 from the root connectors list 79A.8 and then uses the getrun function to retrieve all objects attached to the incoming connector of the tee fitting 79B.5. The getrun function returns two pipes and one elbow fitting. PYROCAD then places the tee fitting 79B.4 and the two pipes and one elbow fitting into the collection 79B.11 named member sizes 79B.12 with a head count of two. PYROCAD then uses the getrun function on the remaining connectors of the object to see if any run terminates in a sprinkler head. The getrun function returns the pipe and elbow fitting from the end of path 79B.P4 and the pipe and elbow fitting from path 79B.P6. PYROCAD then places the pipe and elbow fitting from the end of path 79B.P4 and the pipe and elbow fitting from path 79B.P6 into the collection 79B.11 named member sizes 79B.12 with a head count of one. PYROCAD then proceed to the next item in the root connectors list 79A.8.

If the branch line objects are found to be on the cross connect layer 79A.10, then PYROCAD resizes the pipe and fittings that are in the cross connect layer to the size in the field on the PYROCAD application form FIG. 57 named cross connect pipe size 75.19. At this stage, PYROCAD knows what the head count of each object in the branch line is and has stored this information in the member size collection 79A.12. This member size collection 79A.12 is referenced by the resize pipe 79A.15 and resize fittings 79A.14. PYROCAD loops through each object in the branch line and resizes each object in the branch line 79A.13. The head counts for each object in the branch line are matched to the branch sizing schedule (57.42-57.51) to determine the diameter for each pipe and each fitting outlet. In step 79A.14, each fitting object in the branch line from the member size collection 79A.12 and its respective outlet diameters are determined from the head counts.

The fitting and the new diameters are then sent to an AUTOCAD® MEP fitting resizing API call to resize the fitting. Due to the nature of the AUTOCAD® MEP API and the fact that an existing fitting may be replaced with a larger fitting, the resized fittings connectors and center point are moved in the 3D model space. The center point of the fitting is the point where the pipes would intersect if a line were drawn along the center of the diameter of the pipes and projected into the fitting. PYROCAD keeps track of the old center point and moves the fitting to its old center point after resizing to maintain its original location. PYROCAD might also need to rotate the fitting a few times and flip it few times to get the new resized fitting in the correct orientation. Once all the fittings are resized, rotated and flipped, PYROCAD moves to the resizing of the pipes.

In this step 79A.15, the pipes that were connected to the original fittings become disconnected because the newly sized fittings connectors are in a slightly different location. The center points of the fittings are the same; therefore, to reconnect the pipes, PYROCAD needs to either extend or reduce the length of the pipes. In order to achieve this, PYROCAD draws new pipes, in new lengths and diameters, from one fitting connector to the next fitting connector. When PYROCAD has processed the entire member size collection 79A.12, the branch line resizing algorithm is completed.

By way of review, the branch line resizing algorithm began by traversing the branch line 61.11 starting with one of the takeoff fittings collected in step 61.9. PYROCAD repeats this process of branch line resizing 61.11 until all of the takeoff fittings in 61.9 have been used as the starting current object for a branch line to be resized.

Returning to FIG. 79A, the user is shown the message on the form (FIG. 79) in the fabrication frame "PYROCAD resizing branch lines . . . " 79.1. In the AUTOCAD® MEP screen, PYROCAD selects each branch line fitting and pipe in the order in which it would be processed by steps 61.9, 61.11 and FIG. 79A. When the branch line fittings and pipes are selected, they become dashed lines and change appearance on the screen. This is a visual indicator of the progress of the branch resizing algorithm (FIG. 79A). In addition, the fabrication screen will now start to fill the progress bar to estimate completion of the process portion of the fabrication 79.2.

After all the branch piping has been selected and analyzed, the new sizing is determined in accordance with the input provided by the user in 57.42 through 57.51. PYROCAD now replaces all of the objects in the piping system that need to be resized using the geometry from the existing system. FIGS.

82, 83 and 84 show some of the newly resized pipe, sprinkler heads and fittings. FIG. 83 is an enlarged view of 82.1 showing a tee fitting that has been resized. The tee's first and second connectors are one-inch diameter, and the third connector is one and a quarter-inch diameter. FIG. 84 is an enlarged view of 82.2 showing a tee fitting that has been resized. The tee's first connector is one and a half-inch diameter, the second connector is one and a quarter-inch diameter, and the third connector is a half-inch diameter. FIG. 64 is provided as a reference for a typical tee's connector numbers.

Referring back to FIG. 61, the last steps in the process algorithm (after the branch resizing algorithm) are 61.7 and 61.12. In these two steps, PYROCAD posts any final messages or warnings in the results frame 85.2 for the user's review prior to moving on to the tagging process. (Some examples of possible messages and/or warnings are discussed above in connection with FIG. 72.) FIG. 85 displays in the fabrication frame the message "PYROCAD completed processing" 85.1.

By way of review, referring to FIG. 61 (the process algorithm), the first step after the user presses the process button 57.27 is the validation 61.1 of the information filled out by the user on the PYROCAD application form FIG. 57. The next step is the traversing of the main pipes for error checking 61.5 and 61.6. The next step is the traversing of the main pipes to insert couplings and segment pipes into cut length 61.8. Moving onto the branch lines, PYROCAD traverses the main pipes, collecting all of the takeoff fittings to store the beginning point of each branch line 61.9. PYROCAD also error checks the branch lines in 61.9 and 61.10. Finally, PYROCAD traverses through each branch line, resizing each pipe and fitting as required by the branch sizing schedule (57.42-57.51).

In a preferred embodiment, if the user encounters an error that he considers outside of the normal operation of PYROCAD, he can send an error log to the support staff by selecting the send error logs button 57.30. This will launch the PYROCAD error log submission form (FIG. 86), which allows the user to type comments and send a copy of the drawing file with the error logs to the support staff.

As stated above, the fabrication process can generally be thought of as comprising three steps, namely, the processing algorithm, the tagging algorithm, and the generation of reports. These three steps (or processes) are separate and distinct, and they need not be run in immediate succession. In fact, these processes could be run minutes or days apart. For this reason, PYROCAD runs error checking as one of the initial steps in each of the three processes. Because the state of the piping model is never assumed, it is always validated by PYROCAD (i.e., error checking always comes first in each of these processes). Having completed the discussion of the process algorithm, the present discussion will now turn to the tagging algorithm.

Now that the piping model has been resized, it represents an accurate depiction of what the user wants to fabricate. FIG. 86A is a flowchart showing the tagging algorithm of the present invention. The user presses the tag button 66.2 to begin the tagging portion of the fabrication process.

The first step in the tagging algorithm is to validate start point data 86A.1. The validation of start point data is described above in connection with step 61.1. Next, PYROCAD erases orphaned tags 86A.2. (As explained above, the tags are labels that will appear on the installation drawing per each pipe, showing the field personnel where to place the pieces.) PYROCAD considers a tag an orphan when it is not anchored to any of the MEP objects. For example, when a user releases an anchored tag from a pipe or fitting and later deletes the pipe or fitting, the leftover tag becomes orphaned. The orphaned tags must be deleted before new tags can be added.

PYROCAD uses the property set data 11.6 that is attached to the pipes to identify whether a tag is orphaned. For example, the handle of the MEP object is stored in the property set data and attached to the MEP object. A handle is a unique value assigned to each object by AUTOCAD® MEP. When PYROCAD reviews the handle stored in the property set data that is attached to a given pipe, PYROCAD queries AUTOCAD® MEP API for the handle of that pipe. If the two values do not match, then PYROCAD knows that the tag is orphaned. Note that this step 86A.2 applies only when the user is revisiting a system that has already been tagged.

Next, PYROCAD obtains layer details for the tags 57.35 from the PYROCAD application form FIG. 57. AUTOCAD® MEP tags are custom multi-view block references 11.7. Each of those blocks contains attribute definitions within it. Every PYROCAD tag is placed in a parent tag layer as a whole object, and each of the attribute definitions is placed in a PYROCAD-generated child tag layer. This layer structure helps the user to turn on or off a single group or multiple groups of tags when needed. PYROCAD gets the parent tag layer details from the user through the PYROCAD application form 57.35, and it creates all the child tag layers dynamically during the tagging process.

Next, PYROCAD gets the user-defined tag details from the start point and stores them in variables for future tagging use 57.36, 57.38. For example, if the user selects a parent tag layer as "mytaglayer," then PYROCAD puts all of the tags as parent objects into this particular layer and further creates child layers like "mytaglayer-pipetagctc," "mytaglayer-pipetag-pieceid," "mytaglayer-main" and "mytaglayer-branch" and assigns each of the attribute definitions into these layers.

Next, PYROCAD traverses 86A.4, error checks 86A.5, and collects branch connectors 86A.6. These routines have been explained in connection with FIG. 61 (the processing algorithm). Next, PYROCAD tags the main pipes 86A.7. Users are allowed to tag a piping system a multiple number of times. A tag index is used for keeping track of the number of times each system is tagged. This tag index is attached to every tag and incremented by one each time the system is tagged, with the first tag index being zero. This tag index is also used for revisions and modifications. If the entire system has been processed, tagged and fabricated, and a change to the system is subsequently made, the newly created or modified portions of the system would receive a tag index of one upon the second tagging. This material could then be broken out separately at the reporting phase.

PYROCAD stores the tag index in the start point, and this value is fetched to find out how many times the system was tagged before. This information is presented to the user at the beginning of the tagging process and provides him with an option to retag the complete system with an initial index of zero or tag only the portion that has not previously been tagged with a new tag index. If the user chooses to retag only the new portion, then later he would be able to list only that portion separately for fabrication.

Main pipes are tagged with information like "center to center length," "pipe diameter," "pipe direction" and "end to end length." Every time a tag is placed, PYROCAD checks to see whether the required tag is already available in the drawing database. If available, then PYROCAD uses it; if not available, then PYROCAD creates the required tag dynamically using the following procedure. First, PYROCAD clones the required property sets from property sets found in the PYROCAD drawing template 11.9 and then attaches the required property sets to the MEP object to which the tag is being anchored. PYROCAD then conducts another clone operation that duplicates the mvblock found in the PYROCAD drawing template 11.9 for the tag itself. Next, PYROCAD modifies the cloned mvblock to match with the newly created property sets, and this step makes the values appear on the screen after anchoring. It also modifies the layer details, as explained above. The location at which the tag should appear is calculated by taking the positional data of the MEP object to which it is anchored. Finally, the tag is anchored to the MEP object, and its angle of rotation is defined so that it appears in a desired orientation.

PYROCAD will now iterate through each of the branch lines and error check 86A.8, traverse and tag branch pipes 86A.9 with the branch tags. Unlike main pipes, branch pipes gets only one tag called PYROCAD_pipetag, which consists of a unique piece ID to each branch, pipe diameter, pipe center to center length, pipe direction and tag index. Branch tags are created and placed similar to the procedure found in tag main pipes section 86A.7.

Next, PYROCAD performs the error checking routines 87.1 and 88.1. The text string in the fabrication frame 89.1 indicates "PYROCAD tagging main lines . . . ," the text string in the fabrication frame 90.1 indicates "PYROCAD tagging branch lines . . . ," and the progress bar 90.2 will fill. When tagging is completed, the text string in the fabrication frame 92.1 reads "PYROCAD completed tagging." FIG. 93 shows the piping system with the newly created tags.

There are a number of tags that are applied by the tagging process. The PYROCAD_pipetag is the tag 93.1 that is placed as follows: on the midpoint of each pipe without takeoffs, on the midpoint distance between takeoffs, on the midpoint between a fitting (excluding coupling and takeoffs), and at the midpoint between two fittings (excluding couplings). The PYROCAD_pipetag tag contains a piece ID 93A.1.1, which is a sequentially iterated alpha character that is given to each pipe on a branch line. The PYROCAD_pipetag tag contains a diameter 93A.1.2 to represent the diameter of the pipe. The PYROCAD_pipetag tag contains a direction 93A.1.3 to indicate if the pipe is going up, down or sloping. The PYROCAD_pipetag tag contains a center to center 93A.1.4 to indicate the distance from centerline of pipe to pipe, pipe to takeoff of takeoff to takeoff. The PYROCAD_pipetag_ctc_split is the tag 93A.4 that is placed at the midpoint and below in the following locations: between two fittings, between two couplings, and between a fitting and a coupling. The PYROCAD_branch_main_riser_bulk_tag is the tag 93A.2 and 93A.3 that contains the branch line or main number and is placed on each main and each fitting starting a new branch line. FIG. 94 shows the ability for all of the PYROCAD tags to dynamically scale up or down according to the AUTOCAD® MEP annotation scale (compare to FIG. 93).

The next step is to press the reports button 95.1, which will again run error checking routines first. Any results will be presented in the results frame. Once the error checking is finished, the exporting of the fabrication data starts. This fabrication data is collected from the different custom property set data that have been attached and filled by the tagging process (FIG. 86A). 95A.1 shows the materials list frame found in the PYROCAD 2011 sprinkler fabrication form. This frame is filled in real-time while the exporting of the property set data is happening. This frame displays in a Microsoft WINDOWS® tree view a list of all the materials and quantities. This information is used for the user to quickly check for any unexpected results before proceeding to the next step.

The user will be presented with the progress in the fabrication frame. The steps will be "PYROCAD exporting main lines . . . ", "PYROCAD exporting branch lines . . . " and "PYROCAD completed data export." When the export finishes, the PYROCAD reports selection (FIG. 96) will display. The tag index is a drop-down list box 96.1 that will allow the user to select the desired tag index to which the system will be set to default. The different report groups in 96.2 are different subsets of the fabrication data. The draftsman report has all the data of the other reports and is the master report. The shop report has the fabrication data put into certain order that is desirable for fabrication, such as ordering the threaded pipe by diameter and descending length. The field report has the threaded pipe grouped by branch line number that is desirable for installation. The summary report is for inventory purposes.

The add dynamic report button in 96.3 launches the PYROCAD report template form (FIG. 98). This form allows the user to create a custom report by selecting the desired criteria and adding the template. When the user selects save to main report list, this will close this form. If the user presses the button to expand the form 96.7, it will expand and look like FIG. 97. In the list of reports, the user would see the default reports and any new templates that were created. The user would check the check box associated with a desired custom report to include it in one of the four primary reports: draftsman, shop, field and summary.

If the user presses the view report button 96.4, a viewer will open and allow the user to review the report. If the user presses the export to PDF (portable document format) button, the individual report will export to a PDF file 96.5. If the user selects the export all to PDF button, all the reports will export to PDF files. Upon pressing either the view report button or the export to PDF button or the export all to PDF button, the PYROCAD hanging materials form (FIG. 99) will display. The user will fill in the hanging material information specific to this piping system and continue with OK.

Next, the select location to export PDF form FIG. 100 is displayed. This form allows the user to browse to the desired location to save the PDF formatted reports. The name of the file has already been filled out and is a concatenation of the drawing name-start point id-report name-tag index. This can be changed if the user wants to type in another name. This select location to export PDF form (FIG. 100) will display four times, once for each report being exported (draftsman, shop, field and summary). When the locations and file names have been selected, the reports will begin to export to PDF, and the progress will be displayed by the four progress bars on the PYROCAD report selection form (FIG. 101).

FIG. 102 shows the four exported reports with their default concatenated names. FIG. 102A shows a cover sheet for the shop report; the information is pulled from the user input in FIG. 57. FIG. 102B is a sample of the "main report for shipment now." This report has both a barcode and a graphic representation of the pipes that need to be fabricated. This information is used to fabricate the main pipes.

One unique aspect of this report (FIG. 102B) is the way the graphic is assembled at runtime from a series of premade images. FIG. 102C shows a screenshot of some of the images found in the PYROCAD\images installation folder. These images are placed on the report at runtime depending on the data in the reports xml file. This creates a technique for creating unlimited combinations of outlet quantities and direction by placing the correct pictures in order. FIG. 102D represents a branch line portion of the shop report.

This completes the discussion of the reporting process (i.e., generation of reports), which is the final step in the fabrication process of the present invention. Other aspects of the invention are discussed below.

PYROCAD also allows the user to make revisions and additions to the piping system. If the user needs to add new piping, he would draw the new piping as desired and delete any tags that are no longer valid because of the addition. In the case of revising pipe, the user would erase, add and modify the piping as required and remove any tags that are no longer valid. FIGS. 103 and 106 demonstrate this functionality.

FIG. 103 shows a new branch line that has been added to the main 103.1 and an additional sprinkler head that has been added to the b-5 branch line 103.2. To create the fabrication for these additions and modifications, the same fabrication process described above is applied. The user enters the py command by typing it or pressing the button on the ribbon and selects the start point for the revised piping system.

In FIG. 106, the PYROCAD application form shows that the tag index is default, which means that this piping system has been tagged once. When the system has been tagged once, there are only a few fields that are still accessible to the user. These fields are: the description field, the ship date, the base tag layer (if the base tag layer is changed, the new tags for the additions/modifications will be on the new base tag layer), and the main tag label and branch tag labels (both of which could be changed to a new convention if desired). The user may change any of these fields to create an indication of the reason for the addition or revision. By way of example, the architect may have issued a new drawing called addendum 3; therefore, the user could add "addendum #3" in the description field. The base tag layer could be add-3. The main tag label could be m-add3-1. The branch line tag label could be b-add3-1. If the user changed the base tag layer, main tag label and branch line tag layer, this would help to isolate and manage the object per each revision and change in the drawing. This is important because there are costs associated with each revision.

Following the same steps as in the previous example, the user presses the process button 66.1 to resize any of the new pipe. Next, after pressing the tag button 66.2, the user is presented with a new dialog box (FIG. 104). This PYROCAD retagging dialog is presented when a piping system has been previously tagged at least once. There are two choices that will allow the user to proceed with tagging. The "yes" button will renumber all the pipes with the current settings. The "no" button will not renumber existing tags. New pipe will be tagged with the current setting and the index number. In both conditions, all existing tags will maintain their position. This is important if the user has already positioned the tags as desired on the drawing because the user will only have to position the newly added tags.

In this example, the user will press the no button (FIG. 104) to not renumber existing tags, and the tagging process runs and completes. In 106.1 the tag index is now set to one, indicating that this system has been tagged more than once. In addition, most of the fields on the form now become inaccessible. Only certain fields can be edited: description, ship date, base tag layer, main tag label and branch tag label. If the tag history button 106.2 is pressed, it will load and display the PYROCAD tag history form (FIG. 107). This form displays relevant information about each iteration of lists generated for the currently selected start point and piping system. The forward button 107.1 displays the next tag index, and the back button 107.2 displays the previous tag index.

In 109.1 (FIG. 109), the user selects the number one for the tag index from the drop-down list. This will control what portion of the system will report. The piping system will have multiple indexes due to revisions and modifications. In this case, it would have the default and a one because this system has been tagged two times. This drop-down list 109.1 allows the user to select the index for which the four reports (draftsman, shop, field and summary) will be generated. In this example, the index of one has been selected.

The naming convention that is automatically created for the PDF export of the reports will show the tag index in the file name (FIG. 110). The original reports have the (default) appended to the file name, indicating that these are the reports from the first tagging of the system. The files with the (tag1) appended to the file name are the reports from the second tagging of the system or index one.

In FIG. 111, the new branch line pieces a.1, b.1, c.1 and d.1 (111.1) on the branch line b-5/b-1.1 (111.2) have the original piece ID with the tag index appended separated by a ".". This gives a visual indicator that these pieces are part of tag index one. Also in 111.2 the new branch line number b-1.1 has been concatenated onto the previous branch line number b-5 separated by a "/". This indicates that this branch line has new pieces on it for tag index one. In 111.3 the user sees a completely new branch line b-2.1 for the tag index one. This happens because this was not a modification of an existing branch line but a completely new branch line.

Another feature of PYROCAD is the remove tag utility. In 57.23 the remove tag button allows the user to remove the tags from the system one index at a time or all tags at once. FIG. 112 is the dialog box with which the user is presented to make the selection to either delete all tags by pressing yes or only the latest tag index by pressing no. This is a useful utility if the user wants to set a piping system back to its original state prior to the fabrication process. This could be used if there was a desire to label the piping system with different branch 57.38 or main 57.36 tag labels or if the user wanted to change the base tag layer 57.35 to another layer.

FIG. 113 displays a screenshot of the AUTOCAD® MEP layer manager with the group of layers used by PYROCAD for tags being displayed. The user has already selected the base tag layer (FIG. 57.35). From this base tag layer name, seven child layers are "programmatically" created. The child layers are the base tag layer name 113.1 appended with the following "-branch" 113.2, "-main" 113.3, "-pipetagctc" 113.4, "-pipetagctcsplit" 113.5, "-pipetagdiameterdirection" 113.6, "-pipetageteandoveride" 113.7, and "-pipetagpieceid" 113.8. FIG. 113.9 shows the row of controls that allow the user to freeze and thaw the individual layers. Each of these layers controls its respective tag component, allowing the tag component to be frozen/thawed "invisible/visible on the screen" independently of each other.

FIG. 114 shows a screenshot of a small portion of a piping system with tags applied. In FIG. 114, all of the tag layers are thawed and are visible on the screen. The layers from FIG. 113 correspond with the tag components in FIG. 114 as follows: 113.1 (this is the base tag layer and can control all tag components at once); 113.2 (controls the branch line number component of the tag 114.2); 113.3 (controls the main number component of the tag 114.3); 113.4 (controls the center to center length component of the tag 114.4); 113.5 (controls the center of hole to end of pipe length component of the tag 114.5); 113.6 (controls the diameter and/or direction "up/dn" component of the tag 114.6); 113.7 (controls the end to end length and/or end to end length override component of the tag 114.7); and 113.8 (controls the piece ID component of the tag 114.8).

In FIG. 115, the base tag layer 113.1 has been frozen, making all tag components invisible on the screen. In FIG. 116, the "pipetagpieceid" layer component 113.8 has been frozen, making the piece ID component 114.8 invisible on the screen. The screen visibility of each tag component for all tags in the system can be controlled in this manner. In addition, the visibility of all tags in the base tag layer may be turned on or off by the user. This is beneficial because not all information is always desirable for every drawing. For example, the installation drawing for the field personnel would show the piece ID 114.8; however, the submission drawing for the engineer's review would not. In addition to generating installation drawings, PYROCAD also generates submission drawings, which are based on the installation drawings but omit any information the mechanical engineer may not need or want to see (such as the piece IDs 114.8).

In FIG. 117 five examples of the custom PYROCAD elevation tags are shown. These elevation tags are accessed through the py_tags tool palette FIG. 10F. Elevation tags are used to annotate the height of the pipe above a certain reference point and/or below a certain reference point. As an example, the elevation could be given from the floor slab and the underside of the slab above. If the floor slab equals an elevation of zero, and the underside of the slab above equals 15'-0", the results would be as shown in 117.1 through 117.5.

In AUTOCAD® MEP pipe objects have inherent data within them that is added by AUTOCAD® MEP. One such value is the centerline height of the pipe above the zero point in the z coordinate. The PYROCAD elevation tags use this centerline height and apply a form of Visual Basic scripting language provided by AUTOCAD® MEP in the formula property definition form (FIG. 117A) to format and expand the usefulness of this information. The PYROCAD elevation tags are multi-view blocks, as are the PYROCAD pipe tags. Multi-view blocks can pull their data from property set data, and this is the case for the PYROCAD elevation tags. There are property set definitions named PYROCADpipeelevationtag, PYROCADpipe_ele_tag_floor_slab_1 and PYROCADpipe_ele_tag_floor_slab_2 that contain all of the property set definitions for the data that is used in the PYROCAD elevation tags.

FIG. 118 shows the AUTOCAD® MEP properties palette with the pipe shown in FIG. 117 selected. This shows that the PYROCADpipeelevationtag property set definition is attached to the pipe and holds the values (property set data) that are being pulled through and into the PYROCAD elevation tags seen in 117.1 through 117.5. In 118.1 and 188.2, these two fields are changeable by the user. The user can select from a drop-down list. FIG. 118A shows an example of this. For the elevation type 118.1, the user can select from three different values el (elevation), ff (finished floor) and sl (slab). These are common references in the construction industry. Similarly, the u.o.s_type field 118.2 can be user-defined with a choice of three options bbb (below bottom of beam), btb (below top of beam) and uos (underside of slab). FIG. 118A shows the results of the elevation_type 118.1 being set to ff and the u.o.s_type 118.2 being set to bbb.

There is another variation of the PYROCAD elevation tag that allows the user to overcome an inherent limitation of AUTOCAD® MEP property set data related to the "z" coordinate. As has been stated, AUTOCAD® MEP pipe objects automatically have their centerline height information maintain by AUTOCAD® MEP relative to the zero "z" coordinate. This causes a problem when the floor slab is not at one universal height for the entire piping system. In FIG. 119 a top view of a floor plan that has three different floor slab heights 300'-0", 299'-0" and 298'-0" is shown. As a standard drafting convention, the user will make a choice and decide which elevation in the real world—typically 300'-0", 299'-0" or 298'-0"—will be equal to the AUTOCAD® MEP zero "z" coordinate.

In FIG. 119 the AUTOCAD® MEP zero "z" coordinate will be considered to be equal to the 299'-0" slab; therefore, any pipes that are above a 299'-0" slab would have the correct height because AUTOCAD® MEP calculates the correct height automatically from zero "z" coordinate, and zero "z" equals 299'-0." If the pipe is over a slab of 300'-0" (a foot higher) or 298'-0" (a foot lower), the elevation tag needs to compensate. The PYROCAD_pipe_ele_tag_floor_slab_1 and PYROCAD_pipe_ele_tag_floor_slab_2 pipe tags allow the user to enter the base elevation as a substitute for the AUTOCAD® MEP zero "z" coordinate elevation. Then PYROCAD will automatically calculate the correct elevation relative to the deviation of slab heights.

FIG. 119 shows an example of this. The pipe is 11'-0" above a 300'-0" slab, 12'-0" above a 299'-0" slab, and 13'-0" above a 298'-0" slab. FIG. 120 shows the AUTOCAD® MEP properties palette with the pipe shown in FIG. 119 selected. The PYROCADpipe_ele_tag_floor_slab_1 120.1 and PYROCADpipe_ele_tag_floor_slab_2 120.2 property set definitions are attached to the pipe. These property set definitions hold the values that are being pulled through and into the PYROCAD elevation tags shown in FIG. 119. Field 120.3 is where the user enters the elevation that is equal to AUTOCAD® MEP zero "z" coordinate. Field 120.4 is where the user enters the reference elevation, which would be the elevation from which the user wants to calculate the elevation. In this case, the reference elevation is 298'-0", which provides the results shown in 119.1. Finally, the PYROCADpipe_ele_tag_floor_slab_2 property set definition 120.2 is used when the user wants to apply two elevation tags to one pipe, as shown in 119.2 and 119.2.

It should be noted that the processing and tagging algorithms, in combination with the traversing algorithm, work together to transform an "unintelligent" virtual piping model into an "intelligent" virtual piping system that can be used for fabrication purposes. Specifically, the processing algorithm analyzes the mains and segments them into proper lengths, adds couplings, resizes branch lines and replaces fittings according to business rules built into the system. The tagging algorithm traverses through the system in a logical manner, grouping branch pipes into branch lines for numbering purposes, numbering mains and branch lines, and attaching to every pipe in the system a tag that reflects the property set data for that pipe. This information is used to generate the installation drawings and fabrication reports that will be used by the shop and field personnel to install the physical piping system.

Although the preferred embodiment of the present invention has been shown and described, it will be apparent to those skilled in the art that many changes and modifications may be made without departing from the invention in its broader aspects. In addition, although the above description relates solely to a fire protection system, the software application described above may also be used in connection with any piping system.

We claim:

1. A computer-implemented system for designing a fire protection system comprising:

(a) a personal computer for loading programs into dynamic memory and storing data on a static memory device;

(b) means for providing user input; and (c) program files comprising a process algorithm, a traversing algorithm, and a tagging algorithm;

wherein the process algorithm performs data validation, error checking and error resolution, saves data to a start point inserted by a user, pulls layer details into programming variables, applies processing logic to the system, and comprises a main pipes algorithm and a branch resizing algorithm;

wherein the traversing algorithm supports the process algorithm, the main pipes algorithm, the branch resizing algorithm, and the tagging algorithm by traveling the system and presenting objects to each of these algorithms in a logical order; and wherein the tagging algorithm attaches to each pipe in the system a tag with property set data pulled into and displayed in the tag.

2. The system of claim 1, further comprising an output device for generating hard copies of drawings and fabrication lists.

3. The system of claim 1, wherein the main pipes algorithm breaks main pipes at cut lengths specified by the user, rotates main pipes in a model space, and inserts couplings to the main pipes that have been broken at the specified cut lengths.

4. The system of claim 1, wherein the traversing algorithm presents a current object to the branch resizing algorithm, and the branch resizing algorithm determines whether the current object is a branching object, creates and stores path relation collections for branching objects, updates a head count when a sprinkler head is found on a run of the current object, stores a root connector for the current object in a root connectors list, loops through the root connectors list and applies the head count that is found for each root connector to all objects in a run that are attached to an incoming connector, and loops through each branch line and automatically resizes branch pipes and replaces fittings according to sizing specifications provided by the user.

5. The system of claim 4, wherein the path relation collection for a current object comprises a parent object ID for the incoming connector, a connector number, a head count, and path relationships including branching objects upstream of the current object.

6. The system of claim 1, wherein the user inserts a parent start point on a main pipe, and the system stores fabrication parameters in the parent start point.

7. The system of claim 6, wherein the fabrication parameters include start point ID, job number, job name, level, description of project, ship date, list date, and system type.

8. The system of claim 6, wherein the fabrication parameters include a branch resizing schedule, and wherein the branch resizing schedule is used by a branch resizing algorithm to resize branch pipes and replace fittings.

9. The system of claim 6, wherein the traversing algorithm begins at the parent start point inserted by the user.

10. The system of claim 9, wherein the system allows the user to insert a child start point in each of one or more separate piping systems, wherein the system groups the child start points together to connect separate piping systems for fabrication purposes, and wherein the traversing algorithm traverses from the parent start point and from all child start points in all of the connected piping systems.

11. The system of claim 1, wherein property set data is attached to objects in the system, and wherein the property set data comprises custom property set definitions.

12. The system of claim 1, wherein the tagging algorithm validates start point data, identifies orphaned tags, obtains parent layer details for the tags, and dynamically creates child tag layers.

13. The system of claim 1, wherein the tagging algorithm creates and maintains a tag index that is attached to every tag and incremented by one each time the system is tagged.

14. The system of claim 13, wherein the tag index for all tags in the system is stored in the parent start point.

15. The system of claim 1, wherein the tagging algorithm creates a tag dynamically by cloning a required property set from a drawing template, attaching the cloned property set to an object, cloning an mvblock for the tag in the drawing template, modifying the cloned mvblock to match the required property sets, and anchoring the tag to the object.

16. The system of claim 1, wherein the tagging algorithm groups branch pipes into branch lines and numbers both mains and branch lines.

17. The system of claim 1, wherein tags in a given layer are shown or not shown based on parent layers specified by the user.

18. The system of claim 1, wherein tag components in a given layer are shown or not shown based on child layers created automatically by the system.

19. The system of claim 1, further comprising a head annotation utility that automatically adds block symbols to installation drawings.

20. The system of claim 19, wherein the system allows the user to switch block symbols assigned to a multi-view part sprinkler head from standard to below and from below to standard.

21. A computer-implemented method for designing a fire protection system comprising:

(a) providing a personal computer for loading programs into dynamic memory and storing data on a static memory device;

(b) providing means for providing user input; and (c) installing on the personal computer program files comprising a process algorithm, a traversing algorithm, and a tagging algorithm;

wherein the process algorithm performs data validation, error checking and error resolution, saves data to a start point inserted by a user, pulls layer details into programming variables, applies processing logic to the system, and comprises a main pipes algorithm and a branch resizing algorithm;

wherein the traversing algorithm supports the process algorithm, the main pipes algorithm, the branch resizing algorithm, and the tagging algorithm by traveling the system and presenting objects to each of these algorithms in a logical order; and wherein the tagging algorithm attaches to each pipe in the system a tag with property set data pulled into and displayed in the tag.

22. The method of claim 21, further comprising providing an output device for generating hard copies of drawings and fabrication lists.

23. The method of claim 21, wherein the main pipes algorithm breaks main pipes at cut lengths specified by the user, rotates main pipes in a model space, and inserts couplings to the main pipes that have been broken at the specified cut lengths.

24. The method of claim 21, wherein the traversing algorithm presents a current object to the branch resizing algorithm, and the branch resizing algorithm determines whether the current object is a branching object, creates and stores path relation collections for branching objects, updates a head count when a sprinkler head is found on a run of the current object, stores a root connector for the current object in a root connectors list, loops through the root connectors list and applies the head count that is found for each root connector to all objects in a run that are attached to an incoming connector, and loops through each branch line and automatically resizes branch pipes and replaces fittings according to sizing specifications provided by the user.

25. The method of claim 24, wherein the path relation collection for a current object comprises a parent object ID for the incoming connector, a connector number, a head count, and path relationships including branching objects upstream of the current object.

26. The method of claim 21, further comprising allowing the user to insert a parent start point on a main pipe and storing fabrication parameters in the parent start point.

27. The method of claim 26, wherein the fabrication parameters include start point ID, job number, job name, level, description of project, ship date, list date, and system type.

28. The method of claim 26, wherein the fabrication parameters include a branch resizing schedule, and wherein the branch resizing schedule is used by a branch resizing algorithm to resize branch pipes and replace fittings.

29. The method of claim 26, wherein the traversing algorithm begins at the parent start point inserted by the user.

30. The method of claim 29, further comprising allowing the user to insert a child start point in each of one or more separate piping systems and grouping the child start points together to connect separate piping systems for fabrication purposes, wherein the traversing algorithm traverses from the parent start point and from all child start points in all of the connected piping systems.

31. The method of claim 21, further comprising attaching to objects property set data comprising custom property set definitions.

32. The method of claim 21, wherein the tagging algorithm validates start point data, identifies orphaned tags, obtains parent layer details for the tags, and dynamically creates child tag layers.

33. The method of claim 21, wherein the tagging algorithm creates and maintains a tag index that is attached to every tag and incremented by one each time the system is tagged.

34. The method of claim 33, wherein the tag index for all tags is stored in the parent start point.

35. The method of claim 21, wherein the tagging algorithm creates a tag dynamically by cloning a required property set from a drawing template, attaching the cloned property set to an object, cloning an mvblock for the tag in the drawing template, modifying the cloned mvblock to match the required property sets, and anchoring the tag to the object.

36. The method of claim 21, wherein the tagging algorithm groups branch pipes into branch lines and numbers both mains and branch lines.

37. The method of claim 21, wherein tags in a given layer are shown or not shown based on parent layers specified by the user.

38. The method of claim 21, wherein tag components in a given layer are shown or not shown based on automatically created child layers.

39. The method of claim 21, further comprising providing a head annotation utility that automatically adds block symbols to installation drawings.

40. The method of claim 39, further comprising allowing the user to switch block symbols assigned to a multi-view part sprinkler head from standard to below and from below to standard.

41. A computer-implemented system for designing a piping system comprising:

(a) a personal computer for loading programs into dynamic memory and storing data on a static memory device;

(b) means for providing user input; and (c) program files comprising a process algorithm, a traversing algorithm, and a tagging algorithm;

wherein the process algorithm performs data validation, error checking and error resolution, saves data to a start point inserted by a user, pulls layer details into programming variables, applies processing logic to the system, and comprises a main pipes algorithm and a branch resizing algorithm;

wherein the traversing algorithm supports the process algorithm, the main pipes algorithm, the branch resizing algorithm, and the tagging algorithm by traveling the system and presenting objects to each of these algorithms in a logical order; and wherein the tagging algorithm attaches to each pipe in the system a tag with property set data pulled into and displayed in the tag.

42. The system of claim 41, further comprising an output device for generating hard copies of drawings and fabrication lists.

43. The system of claim 41, wherein the main pipes algorithm breaks main pipes at cut lengths specified by the user, rotates main pipes in a model space, and inserts couplings to the main pipes that have been broken at the specified cut lengths.

44. The system of claim 41, wherein the traversing algorithm presents a current object to the branch resizing algorithm, and the branch resizing algorithm determines whether the current object is a branching object, creates and stores path relation collections for branching objects, updates a head count when a sprinkler head is found on a run of the current object, stores a root connector for the current object in a root connectors list, loops through the root connectors list and applies the head count that is found for each root connector to all objects in a run that are attached to an incoming connector, and loops through each branch line and automatically resizes branch pipes and replaces fittings according to sizing specifications provided by the user.

45. The system of claim 44, wherein the path relation collection for a current object comprises a parent object ID for the incoming connector, a connector number, a head count, and path relationships including branching objects upstream of the current object.

46. The system of claim 41, wherein the user inserts a parent start point on a main pipe, and the system stores fabrication parameters in the parent start point.

47. The system of claim 46, wherein the fabrication parameters include start point ID, job number, job name, level, description of project, ship date, list date, and system type.

48. The system of claim 46, wherein the fabrication parameters include a branch resizing schedule, and wherein the branch resizing schedule is used by a branch resizing algorithm to resize branch pipes and replace fittings.

49. The system of claim 46, wherein the traversing algorithm begins at the parent start point inserted by the user.

50. The system of claim 49, wherein the system allows the user to insert a child start point in each of one or more separate piping systems, wherein the system groups the child start points together to connect separate piping systems for fabrication purposes, and wherein the traversing algorithm traverses from the parent start point and from all child start points in all of the connected piping systems.

51. The system of claim 41, wherein property set data is attached to objects in the system, and wherein the property set data comprises custom property set definitions.

52. The system of claim 41, wherein the tagging algorithm validates start point data, identifies orphaned tags, obtains parent layer details for the tags, and dynamically creates child tag layers.

53. The system of claim 41, wherein the tagging algorithm creates and maintains a tag index that is attached to every tag and incremented by one each time the system is tagged.

54. The system of claim 53, wherein the tag index for all tags in the system is stored in the parent start point.

55. The system of claim 41, wherein the tagging algorithm creates a tag dynamically by cloning a required property set from a drawing template, attaching the cloned property set to an object, cloning an mvblock for the tag in the drawing template, modifying the cloned mvblock to match the required property sets, and anchoring the tag to the object.

56. The system of claim 41, wherein the tagging algorithm groups branch pipes into branch lines and numbers both mains and branch lines.

57. The system of claim 41, wherein tags in a given layer are shown or not shown based on parent layers specified by the user.

58. The system of claim 41, wherein tag components in a given layer are shown or not shown based on child layers created automatically by the system.

59. The system of claim 41, further comprising a head annotation utility that automatically adds block symbols to installation drawings.

60. The system of claim 59, wherein the system allows the user to switch block symbols assigned to a multi-view part sprinkler head from standard to below and from below to standard.

61. A computer-implemented method for designing a piping system comprising:

(a) providing a personal computer for loading programs into dynamic memory and storing data on a static memory device;

(b) providing means for providing user input; and (c) installing on the personal computer program files comprising a process algorithm, a traversing algorithm, and a tagging algorithm;

wherein the process algorithm performs data validation, error checking and error resolution, saves data to a start point inserted by a user, pulls layer details into programming variables, applies processing logic to the system, and comprises a main pipes algorithm and a branch resizing algorithm;

wherein the traversing algorithm supports the process algorithm, the main pipes algorithm, the branch resizing algorithm, and the tagging algorithm by traveling the system and presenting objects to each of these algorithms in a logical order; and wherein the tagging algorithm attaches to each pipe in the system a tag with property set data pulled into and displayed in the tag.

62. The method of claim 61, further comprising providing an output device for generating hard copies of drawings and fabrication lists.

63. The method of claim 61, wherein the main pipes algorithm breaks main pipes at cut lengths specified by the user, rotates main pipes in a model space, and inserts couplings to the main pipes that have been broken at the specified cut lengths.

64. The method of claim 61, wherein the traversing algorithm presents a current object to the branch resizing algorithm, and the branch resizing algorithm determines whether the current object is a branching object, creates and stores path relation collections for branching objects, updates a head count when a sprinkler head is found on a run of the current object, stores a root connector for the current object in a root connectors list, loops through the root connectors list and applies the head count that is found for each root connector to all objects in a run that are attached to an incoming connector, and loops through each branch line and automatically resizes branch pipes and replaces fittings according to sizing specifications provided by the user.

65. The method of claim 64, wherein the path relation collection for a current object comprises a parent object ID for the incoming connector, a connector number, a head count, and path relationships including branching objects upstream of the current object.

66. The method of claim 61, further comprising allowing the user to insert a parent start point on a main pipe and storing fabrication parameters in the parent start point.

67. The method of claim 66, wherein the fabrication parameters include start point ID, job number, job name, level, description of project, ship date, list date, and system type.

68. The method of claim 66, wherein the fabrication parameters include a branch resizing schedule, and wherein the branch resizing schedule is used by a branch resizing algorithm to resize branch pipes and replace fittings.

69. The method of claim 66, wherein the traversing algorithm begins at the parent start point inserted by the user.

70. The method of claim 69, further comprising allowing the user to insert a child start point in each of one or more separate piping systems and grouping the child start points together to connect separate piping systems for fabrication purposes, wherein the traversing algorithm traverses from the parent start point and from all child start points in all of the connected piping systems.

71. The method of claim 61, further comprising attaching to objects property set data comprising custom property set definitions.

72. The method of claim 61, wherein the tagging algorithm validates start point data, identifies orphaned tags, obtains parent layer details for the tags, and dynamically creates child tag layers.

73. The method of claim 61, wherein the tagging algorithm creates and maintains a tag index that is attached to every tag and incremented by one each time the system is tagged.

74. The method of claim 73, wherein the tag index for all tags is stored in the parent start point.

75. The method of claim 61, wherein the tagging algorithm creates a tag dynamically by cloning a required property set from a drawing template, attaching the cloned property set to an object, cloning an mvblock for the tag in the drawing template, modifying the cloned mvblock to match the required property sets, and anchoring the tag to the object.

76. The method of claim 61, wherein the tagging algorithm groups branch pipes into branch lines and numbers both mains and branch lines.

77. The method of claim 61, wherein tags in a given layer are shown or not shown based on parent layers specified by the user.

78. The method of claim 61, wherein tag components in a given layer are shown or not shown based on automatically created child layers.

79. The method of claim 61, further comprising providing a head annotation utility that automatically adds block symbols to installation drawings.

80. The method of claim 79, further comprising allowing the user to switch block symbols assigned to a multi-view part sprinkler head from standard to below and from below to standard.

* * * * *